US007143066B2

(12) United States Patent
Shear et al.

(10) Patent No.: US 7,143,066 B2
(45) **Date of Patent: *Nov. 28, 2006**

(54) SYSTEMS AND METHODS FOR MATCHING, SELECTING, NARROWCASTING, AND/OR CLASSIFYING BASED ON RIGHTS MANAGEMENT AND/OR OTHER INFORMATION

(75) Inventors: Victor H. Shear, Bethesda, MD (US); David M. Van Wie, Sunnyvale, CA (US); Robert P. Weber, Menlo Park, CA (US)

(73) Assignee: Intertrust Technologies Corp., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/272,911

(22) Filed: Oct. 18, 2002

(65) Prior Publication Data

US 2003/0046244 A1 Mar. 6, 2003

Related U.S. Application Data

(60) Division of application No. 09/498,369, filed on Feb. 4, 2000, which is a continuation of application No. 08/965,185, filed on Nov. 6, 1997, now Pat. No. 6,112,181.

(51) Int. Cl.
*G06Q 99/00* (2006.01)

(52) U.S. Cl. ........................................................ 705/54

(58) Field of Classification Search .................. 715/53, 715/54

See application file for complete search history.

(56) References Cited

U.S. PATENT DOCUMENTS 3,573,747 A 4/1971 Adams et al.

(Continued)

FOREIGN PATENT DOCUMENTS

AU A-36815/97 2/1998

(Continued)

OTHER PUBLICATIONS

Sibert et al; DigiBox: A Self-Prtecting Container for Information Commerce; Electronic Publishing Resources Inc.; USENIX workshop on Electronic Commerce; Jul. 1995; pp. 10-14.*

(Continued)

*Primary Examiner*—Thomas A. Dixon
(74) *Attorney, Agent, or Firm*—Finnegan Henderson Farabow Garrett & Dunner LLP

(57) ABSTRACT

Rights management information is used at least in part in a matching, narrowcasting, classifying and/or selecting process. A matching and classification utility system comprising a kind of Commerce Utility System is used to perform the matching, narrowcasting, classifying and/or selecting. The matching and classification utility system may match, narrowcast, classify and/or select people and/or things, non-limiting examples of which include software objects. The Matching and Classification Utility system may use any pre-existing classification schemes, including at least some rights management information and/or other qualitative and/or parameter data indicating and/or defining classes, classification systems, class hierarchies, category schemes, class assignments, category assignments, and/or class membership. The Matching and Classification Utility may also use at least some rights management information together with any artificial intelligence, expert system, statistical, computational, manual, or any other means to define new classes, class hierarchies, classification systems, category schemes, and/or assign persons, things, and/or groups of persons and/or things to at least one class.

26 Claims, 95 Drawing Sheets

U.S. PATENT DOCUMENTS 3,609,697 A 9/1971 Blevins
3,790,700 A 2/1974 Callais et al.
3,796,830 A 3/1974 Smith
3,798,359 A 3/1974 Feistel
3,798,360 A 3/1974 Feistel
3,798,605 A 3/1974 Feistel
3,806,874 A 4/1974 Ehrat
3,806,882 A 4/1974 Clarke
3,829,833 A 8/1974 Freeny
3,845,391 A 10/1974 Crosby
3,906,448 A 9/1975 Henriques
3,911,397 A 10/1975 Freeny
3,924,065 A 12/1975 Freeny
3,931,504 A 1/1976 Jacoby
3,946,200 A 3/1976 Juodikis
3,946,220 A 3/1976 Brobeck et al.
3,956,615 A 5/1976 Anderson et al.
3,958,081 A 5/1976 Ehrsam et al.
3,970,992 A 7/1976 Boothroyd et al.
3,996,449 A 12/1976 Attanasio et al.
4,020,326 A 4/1977 Coulthurst
4,048,619 A 9/1977 Forman et al.
4,071,911 A 1/1978 Mazur
4,104,721 A 8/1978 Markstein et al.
4,112,421 A 9/1978 Freeny
4,120,030 A 10/1978 Johnstone
4,162,483 A 7/1979 Entenman
4,163,280 A 7/1979 Mori et al.
4,168,396 A 9/1979 Best
4,183,085 A 1/1980 Roberts et al.
4,196,310 A 4/1980 Forman et al.
4,200,913 A 4/1980 Kuhar et al.
4,209,787 A 6/1980 Freeny
4,217,588 A 8/1980 Freeny
4,220,991 A 9/1980 Hamano et al.
4,232,193 A 11/1980 Gerard
4,232,317 A 11/1980 Freeny
4,236,217 A 11/1980 Kennedy
4,246,638 A 1/1981 Thomas
4,253,157 A 2/1981 Kirschner et al.
4,259,720 A 3/1981 Campbell
4,262,329 A 4/1981 Bright et al.
4,265,371 A 5/1981 Desai et al.
4,270,182 A 5/1981 Asija
4,278,837 A 7/1981 Best
4,305,131 A 12/1981 Best
4,306,289 A 12/1981 Lumley
4,309,569 A 1/1982 Merkle
4,319,079 A 3/1982 Best
4,321,672 A 3/1982 Braun et al.
4,323,921 A 4/1982 Guillou
4,328,544 A 5/1982 Baldwin et al.
4,337,483 A 6/1982 Guillou
4,361,877 A 11/1982 Dyer et al.
4,375,579 A 3/1983 Davida et al.
4,405,829 A 9/1983 Rivest et al.
4,433,207 A 2/1984 Best
4,434,464 A 2/1984 Suzuki et al.
4,442,484 A 4/1984 Childs, Jr. et al.
4,442,486 A 4/1984 Mayer
4,446,519 A 5/1984 Thomas
4,454,594 A 6/1984 Heffron et al.
4,458,315 A 7/1984 Uchenick
4,462,076 A 7/1984 Smith
4,462,078 A 7/1984 Ross
4,465,901 A 8/1984 Best
4,471,163 A 9/1984 Donald et al.
4,471,216 A 9/1984 Herve
4,484,217 A 11/1984 Block et al.
4,494,156 A 1/1985 Kadison et al.
4,513,174 A 4/1985 Herman
4,523,271 A 6/1985 Levien
4,525,599 A 6/1985 Curran et al.
4,528,588 A 7/1985 Lofberg
4,528,643 A 7/1985 Freeny
4,529,870 A 7/1985 Chaum
4,553,252 A 11/1985 Egendorf
4,558,176 A 12/1985 Arnold et al.
4,558,413 A 12/1985 Schmidt et al.
4,562,305 A 12/1985 Gaffney, Jr.
4,562,306 A 12/1985 Chou et al.
4,562,495 A 12/1985 Bond et al.
4,573,119 A 2/1986 Westheimer et al.
4,577,289 A 3/1986 Comerford et al.
4,578,530 A 3/1986 Zeidler
4,584,639 A 4/1986 Hardy
4,584,641 A 4/1986 Guglielmino
4,588,991 A 5/1986 Atalla
4,589,064 A 5/1986 Chiba et al.
4,590,552 A 5/1986 Guttag et al.
4,593,183 A 6/1986 Fukatsu
4,593,353 A 6/1986 Pickholtz
4,593,376 A 6/1986 Volk
4,595,950 A 6/1986 Lofberg
4,597,058 A 6/1986 Izumi et al.
4,598,288 A 7/1986 Yarbrough et al.
4,599,489 A 7/1986 Cargile
4,609,777 A 9/1986 Cargile
4,609,985 A 9/1986 Dozier
4,621,321 A 11/1986 Boebert et al.
4,621,334 A 11/1986 Garcia
4,622,222 A 11/1986 Horvath et al.
4,634,807 A 1/1987 Chorley et al.
4,644,493 A 2/1987 Chandra et al.
4,646,234 A 2/1987 Tolman et al.
4,652,990 A 3/1987 Pailen et al.
4,658,093 A 4/1987 Hellman
4,670,857 A 6/1987 Rackman
4,672,572 A 6/1987 Alsberg
4,672,605 A 6/1987 Hustig et al.
4,677,434 A 6/1987 Fascenda
4,677,552 A 6/1987 Sibley, Jr.
4,680,731 A 7/1987 Izumi et al.
4,683,553 A 7/1987 Mollier
4,683,968 A 8/1987 Appelbaum et al.
4,685,056 A 8/1987 Barnsdale et al.
4,688,169 A 8/1987 Joshi
4,691,350 A 9/1987 Kleijne et al.
4,696,034 A 9/1987 Wiedemer
4,700,296 A 10/1987 Palmer, Jr. et al.
4,701,846 A 10/1987 Ikeda et al.
4,712,238 A 12/1987 Gilhousen et al.
4,713,753 A 12/1987 Boebert et al.
4,727,550 A 2/1988 Chang et al.
4,740,890 A 4/1988 William
4,747,139 A 5/1988 Taaffe
4,748,561 A 5/1988 Brown
4,757,533 A 7/1988 Allen et al.
4,757,534 A 7/1988 Matyas et al.
4,757,914 A 7/1988 Roth et al.
4,768,087 A 8/1988 Taub et al.
4,780,821 A 10/1988 Crossley
4,791,565 A 12/1988 Dunham et al.
4,796,181 A 1/1989 Wiedemer
4,796,220 A 1/1989 Wolfe
4,798,209 A 1/1989 Klingenbeck et al.
4,799,156 A 1/1989 Shavit
4,807,288 A 2/1989 Ugon et al.
4,816,655 A 3/1989 Musyck et al.
4,817,140 A 3/1989 Chandra et al.
4,823,264 A 4/1989 Deming
4,827,508 A 5/1989 Shear
4,858,121 A 8/1989 Barber et al.
4,864,494 A 9/1989 Kobus 4,864,616 A 9/1989 Pond et al.
4,866,769 A 9/1989 Karp
4,868,736 A 9/1989 Walker
4,868,877 A 9/1989 Fischer
4,888,798 A 12/1989 Earnest
4,893,248 A 1/1990 Pitts et al.
4,893,332 A 1/1990 Brown
4,903,296 A 2/1990 Chandra et al.
4,919,545 A 4/1990 Yu
4,924,378 A 5/1990 Hershey et al.
4,926,480 A 5/1990 Chaum
4,930,073 A 5/1990 Cina
4,937,863 A 6/1990 Robert et al.
4,941,175 A 7/1990 Enescu et al.
4,949,187 A 8/1990 Cohen
4,953,209 A 8/1990 Ryder, Sr. et al.
4,962,533 A 10/1990 Krueger et al.
4,975,647 A 12/1990 Downer et al.
4,975,878 A 12/1990 Boddu et al.
4,977,594 A 12/1990 Shear
4,995,082 A 2/1991 Schnorr
4,999,806 A 3/1991 Chernow et al.
5,001,752 A 3/1991 Fischer
5,005,122 A 4/1991 Griffin et al.
5,005,200 A 4/1991 Fischer
5,010,571 A 4/1991 Katznelson
5,014,234 A 5/1991 Edwards, Jr.
5,022,080 A 6/1991 Durst et al.
5,023,907 A 6/1991 Johnson et al.
5,027,397 A 6/1991 Double et al.
5,032,979 A 7/1991 Hecht et al.
5,047,928 A 9/1991 Wiedemer
5,048,085 A 9/1991 Abraham et al.
5,050,213 A 9/1991 Shear
5,058,162 A 10/1991 Santon et al.
5,065,429 A 11/1991 Lang
5,079,648 A 1/1992 Maufe
5,091,966 A 2/1992 Bloomberg et al.
5,103,392 A 4/1992 Mori
5,103,459 A 4/1992 Gilhousen et al.
5,103,476 A 4/1992 Waite et al.
5,109,413 A 4/1992 Comerford et al.
5,111,390 A 5/1992 Ketcham
5,113,518 A 5/1992 Durst, Jr. et al.
5,119,493 A 6/1992 Janis et al.
5,126,936 A 6/1992 Champion et al.
5,128,525 A 7/1992 Stearns et al.
5,129,084 A 7/1992 Kelly, Jr. et al.
5,136,643 A 8/1992 Fischer
5,136,646 A 8/1992 Haber et al.
5,136,647 A 8/1992 Haber et al.
5,136,716 A 8/1992 Harvey et al.
5,138,712 A 8/1992 Corbin
5,146,575 A 9/1992 Nolan
5,148,481 A 9/1992 Abraham et al.
5,150,407 A 9/1992 Chan
5,155,680 A 10/1992 Wiedemer
5,163,091 A 11/1992 Graziano
5,164,988 A 11/1992 Matyas et al.
5,168,147 A 12/1992 Bloomberg
5,185,717 A 2/1993 Mori
5,187,787 A 2/1993 Skeen et al.
5,191,573 A 3/1993 Hair
5,199,066 A 3/1993 Logan
5,199,074 A 3/1993 Thor
5,201,046 A 4/1993 Goldberg et al.
5,201,047 A 4/1993 Maki et al.
5,204,897 A 4/1993 Wyman
5,206,951 A 4/1993 Khoyi et al.
5,208,748 A 5/1993 Flores et al.
5,214,702 A 5/1993 Fischer
5,216,603 A 6/1993 Flores et al.
5,218,605 A 6/1993 Low et al.
5,221,833 A 6/1993 Hecht
5,222,134 A 6/1993 Waite et al.
5,224,160 A 6/1993 Paulini et al.
5,224,163 A 6/1993 Gasser et al.
5,227,797 A 7/1993 Murphy
5,235,642 A 8/1993 Wobber et al.
5,241,671 A 8/1993 Reed et al.
5,245,165 A 9/1993 Zhang
5,247,575 A 9/1993 Sprague et al.
5,251,294 A 10/1993 Abelow
5,257,369 A 10/1993 Skeen et al.
5,260,999 A 11/1993 Wyman
5,263,157 A 11/1993 Janis
5,263,158 A 11/1993 Janis
5,263,165 A 11/1993 Janis
5,265,164 A 11/1993 Matyas et al.
5,276,735 A 1/1994 Boebert et al.
5,276,901 A 1/1994 Howell et al.
5,280,479 A 1/1994 Mary
5,283,830 A 2/1994 Hinsley et al.
5,285,494 A 2/1994 Sprecher et al.
5,287,407 A 2/1994 Holmes
5,291,598 A 3/1994 Grundy
5,301,231 A 4/1994 Abraham et al.
5,301,326 A 4/1994 Linnett et al.
5,311,591 A 5/1994 Fischer
5,319,705 A 6/1994 Halter et al.
5,319,735 A 6/1994 Preuss et al.
5,319,785 A 6/1994 Thaller
5,325,524 A 6/1994 Black et al.
5,335,169 A 8/1994 Chong
5,335,346 A 8/1994 Fabbio
5,337,357 A 8/1994 Chou et al.
5,337,360 A 8/1994 Fischer
5,341,429 A 8/1994 Stringer et al.
5,343,526 A 8/1994 Lassers
5,343,527 A 8/1994 Moore et al.
5,347,579 A 9/1994 Blandford
5,349,642 A 9/1994 Kingdon
5,351,293 A 9/1994 Michener et al.
5,355,474 A 10/1994 Thurasingham et al.
5,359,721 A 10/1994 Kempf et al.
5,361,359 A 11/1994 Tajalli et al.
5,365,587 A 11/1994 Campbell et al.
5,367,621 A 11/1994 Cohen et al.
5,369,702 A 11/1994 Shanton
5,369,707 A 11/1994 Follendore, III
5,371,792 A 12/1994 Asai et al.
5,373,440 A 12/1994 Cohen et al.
5,373,561 A 12/1994 Haber et al.
5,383,113 A 1/1995 Kight et al.
5,388,211 A 2/1995 Hornbuckle
5,390,247 A 2/1995 Fischer
5,390,297 A 2/1995 Barber et al.
5,390,330 A 2/1995 Talati
5,392,220 A 2/1995 van den Hamer et al.
5,392,390 A 2/1995 Crozier
5,394,469 A 2/1995 Nagel et al.
5,410,598 A 4/1995 Shear
5,412,717 A 5/1995 Fischer
5,418,713 A 5/1995 Allen
5,420,927 A 5/1995 Michali
5,421,006 A 5/1995 Jablon
5,422,953 A 6/1995 Fischer
5,428,606 A 6/1995 Moskowitz
5,432,851 A 7/1995 Scheidt et al.
5,432,928 A 7/1995 Sherman
5,432,950 A 7/1995 Sibigtroth
5,438,508 A 8/1995 Wyman
5,440,634 A 8/1995 Jones et al.
5,442,645 A 8/1995 Ugon
5,444,779 A 8/1995 Daniele
5,449,895 A 9/1995 Hecht et al.

5,449,896 A 9/1995 Hecht et al.
5,450,490 A 9/1995 Jensen et al.
5,450,493 A 9/1995 Maher
5,453,601 A 9/1995 Rosen
5,453,605 A 9/1995 Hecht et al.
5,455,407 A 10/1995 Rosen
5,455,861 A 10/1995 Faucher et al.
5,455,953 A 10/1995 Russell
5,457,746 A 10/1995 Dolphin
5,457,747 A 10/1995 Drexler et al.
5,458,494 A 10/1995 Krohn et al.
5,463,565 A 10/1995 Cookson et al.
5,473,687 A 12/1995 Lipscomb et al.
5,473,692 A 12/1995 Davis
5,479,509 A 12/1995 Ugon
5,485,622 A 1/1996 Yamaki
5,490,216 A 2/1996 Ricahrdson, III
5,491,800 A 2/1996 Goldsmith et al.
5,497,479 A 3/1996 Hornbuckle
5,497,491 A 3/1996 Mitchell et al.
5,499,298 A 3/1996 Narasimhalu et al.
5,504,757 A 4/1996 Cook et al.
5,504,818 A 4/1996 Okano
5,504,837 A 4/1996 Griffeth et al.
5,508,913 A 4/1996 Yamamoto et al.
5,509,070 A 4/1996 Schull
5,513,261 A 4/1996 Maher
5,524,933 A 6/1996 Kunt et al.
5,530,235 A 6/1996 Stefik et al.
5,530,752 A 6/1996 Rubin
5,533,123 A 7/1996 Force et al.
5,534,855 A 7/1996 Shockley et al.
5,534,975 A 7/1996 Stefik et al.
5,535,322 A 7/1996 Hecht
5,537,526 A 7/1996 Anderson et al.
5,539,735 A 7/1996 Moskowitz
5,539,828 A 7/1996 Davis
5,550,971 A 8/1996 Brunner et al.
5,553,282 A 9/1996 Parrish et al.
5,557,518 A 9/1996 Rosen
5,557,798 A 9/1996 Skeen et al.
5,563,946 A 10/1996 Cooper et al.
5,568,552 A 10/1996 Davis
5,572,673 A 11/1996 Shurts
5,574,962 A 11/1996 Fardeau et al.
5,577,209 A 11/1996 Boyle et al.
5,581,800 A 12/1996 Fardeau et al.
5,592,549 A 1/1997 Nagel et al.
5,603,031 A 2/1997 White et al.
5,606,609 A 2/1997 Houser et al.
5,613,004 A 3/1997 Cooperman et al.
5,621,797 A 4/1997 Rosen
5,625,693 A 4/1997 Rohatgi et al.
5,629,770 A 5/1997 Brassil et al.
5,629,980 A 5/1997 Stefik et al.
5,633,932 A 5/1997 Davis et al.
5,634,012 A 5/1997 Stefik et al.
5,636,276 A 6/1997 Brugger et al.
5,636,292 A 6/1997 Rhoads
5,638,443 A 6/1997 Stefik
5,638,504 A 6/1997 Scott et al.
5,640,546 A 6/1997 Gopinath et al.
5,649,099 A 7/1997 Theimer et al.
5,655,077 A 8/1997 Jones et al.
5,671,279 A 9/1997 Elgamal
5,678,170 A 10/1997 Grube et al.
5,687,236 A 11/1997 Moskowitz et al.
5,689,565 A 11/1997 Spies et al.
5,689,566 A 11/1997 Nguyen
5,689,587 A 11/1997 Bender et al.
5,692,047 A 11/1997 McManis
5,692,180 A 11/1997 Lee
5,699,427 A 12/1997 Chow et al.
5,710,834 A 1/1998 Rhoads
5,715,314 A 2/1998 Payne et al.
5,715,403 A 2/1998 Stefik
5,717,923 A 2/1998 Dedrick
5,721,788 A 2/1998 Powell et al.
5,724,424 A 3/1998 Gifford
5,724,425 A 3/1998 Chang
5,732,398 A 3/1998 Tagawa
5,740,549 A 4/1998 Reilly et al.
5,745,569 A 4/1998 Moskowitz et al.
5,745,604 A 4/1998 Rhoads
5,745,678 A 4/1998 Herzberg et al.
5,748,763 A 5/1998 Rhoads
5,748,783 A 5/1998 Rhoads
5,748,960 A 5/1998 Fischer
5,754,849 A 5/1998 Dyer et al.
5,757,914 A 5/1998 McManis
5,758,152 A 5/1998 LeTourneau
5,765,152 A 6/1998 Erickson
5,768,426 A 6/1998 Rhoads
5,774,872 A 6/1998 Golden et al.
5,787,334 A 7/1998 Fardeau et al.
5,802,590 A 9/1998 Draves
5,819,263 A 10/1998 Bromley et al.
5,842,173 A 11/1998 Strum et al.
5,845,281 A 12/1998 Benson et al.
5,892,899 A 4/1999 Aucsmith et al.
5,892,900 A 4/1999 Ginter et al.
5,896,454 A 4/1999 Cookson et al.
5,910,987 A * 6/1999 Ginter et al. ................. 705/52
5,915,019 A 6/1999 Ginter et al.
5,917,912 A 6/1999 Ginter et al.
5,920,861 A 7/1999 Hall et al.
5,940,504 A 8/1999 Griswold
5,940,505 A 8/1999 Kanamaru
5,943,422 A * 8/1999 Van Wie et al. .............. 705/54
5,949,876 A 9/1999 Ginter et al.
5,956,408 A 9/1999 Arnold
5,966,440 A 10/1999 Hair
5,978,484 A 11/1999 Apperson et al.
5,982,891 A 11/1999 Ginter et al.
5,999,949 A 12/1999 Crandall
6,009,170 A 12/1999 Sako et al.
6,016,393 A 1/2000 White et al.
6,102,965 A 8/2000 Dye et al.
6,112,181 A 8/2000 Shear et al.
6,135,646 A 10/2000 Kahn et al.
6,138,119 A 10/2000 Hall et al.
6,157,721 A 12/2000 Shear et al.
6,185,683 B1 2/2001 Ginter et al.
6,237,786 B1 5/2001 Ginter et al.
6,240,185 B1 5/2001 Van Wie et al.
6,253,193 B1 6/2001 Ginter et al.
6,292,569 B1 9/2001 Shear et al.
6,363,488 B1 3/2002 Ginter et al.
6,389,402 B1 5/2002 Ginter et al.
6,427,140 B1 7/2002 Ginter et al.
6,449,367 B1 9/2002 Van Wie et al.
6,640,304 B1 10/2003 Ginter et al.
6,658,568 B1 12/2003 Ginter et al.
6,668,325 B1 12/2003 Collberg et al.
6,618,484 B1 9/2004 Van Wie et al.

FOREIGN PATENT DOCUMENTS

AU A-36816/97 2/1998
AU A-36840/97 2/1998
BE 62-241061 12/1984
DE 29 43 436 A1 10/1979
DE D. 3803982 A1 1/1990
EP 0 084 441 A1 7/1983
EP 0 128 672 A1 12/1984
EP 0 135 422 A1 3/1985

| | | | |
|---|---|---|---|
| EP | 0 180 460 | A1 | 5/1986 |
| EP | 0 370 146 | A1 | 11/1988 |
| EP | 0 367 700 | A2 | 5/1990 |
| EP | 0 398 645 | | 11/1990 |
| EP | 0 399 822 | A2 | 11/1990 |
| EP | 0 421 409 | A2 | 4/1991 |
| EP | 0 456 386 | A2 | 11/1991 |
| EP | 0 469 864 | A2 | 2/1992 |
| EP | 0 469 864 | A3 | 2/1992 |
| EP | 0 565 314 | A2 | 10/1993 |
| EP | 0 567 800 | A1 | 11/1993 |
| EP | 0 570 123 | | 11/1993 |
| EP | 0 593 305 | A2 | 4/1994 |
| EP | 0 651 554 | A1 | 5/1995 |
| EP | 0 653 695 | A2 | 5/1995 |
| EP | 0 668 695 | A2 | 8/1995 |
| EP | 0 668 695 | A3 | 8/1995 |
| EP | 0 695 985 | A1 | 2/1996 |
| EP | 0 696 798 | A1 | 2/1996 |
| EP | 0 714 204 | A2 | 5/1996 |
| EP | 0 715 243 | A1 | 6/1996 |
| EP | 0 715 244 | A1 | 6/1996 |
| EP | 0 715 245 | A1 | 6/1996 |
| EP | 0 715 246 | A1 | 6/1996 |
| EP | 0 715 247 | A1 | 6/1996 |
| EP | 0 725 376 | A2 | 8/1996 |
| EP | 0 763 936 | A2 | 9/1996 |
| EP | 0 749 081 | A1 | 12/1996 |
| EP | 0 778 513 | A2 | 6/1997 |
| EP | 0 795 873 | A2 | 9/1997 |
| EP | 0 800 312 | A1 | 10/1997 |
| EP | 0 913 757 | A2 | 5/1999 |
| GB | A2136175 | | 9/1984 |
| GB | 2264796 | A | 9/1993 |
| GB | 2294348 | | 4/1996 |
| GB | 2295947 | | 6/1996 |
| JP | 57-726 | | 5/1982 |
| JP | 61 121145 | A | 6/1986 |
| JP | 62-225059 | | 8/1987 |
| JP | 62-241061 | | 10/1987 |
| JP | 63 129564 | A | 6/1988 |
| JP | 63 289646 | A | 11/1988 |
| JP | 01-068835 | | 3/1989 |
| JP | 01 068853 | A | 3/1989 |
| JP | 64-68835 | | 3/1989 |
| JP | 01 248891 | A | 10/1989 |
| JP | 01 296363 | A | 11/1989 |
| JP | 02-242352 | | 9/1990 |
| JP | 02-247763 | | 10/1990 |
| JP | 02-294855 | | 12/1990 |
| JP | 04 117548 | A | 4/1992 |
| JP | 04 504794 | A | 8/1992 |
| JP | 04-369068 | | 12/1992 |
| JP | 05 173892 | A | 7/1993 |
| JP | 05-181734 | | 7/1993 |
| JP | 05-257783 | | 10/1993 |
| JP | 05 258463 | A | 10/1993 |
| JP | 05-268415 | | 10/1993 |
| JP | 06 501120 | A | 1/1994 |
| JP | 06 152585 | A | 5/1994 |
| JP | 06 161719 | A | 6/1994 |
| JP | 06-175794 | | 6/1994 |
| JP | 06-215010 | | 8/1994 |
| JP | 06 225059 | | 8/1994 |
| JP | 06 250924 | A | 9/1994 |
| JP | 07-056794 | | 3/1995 |
| JP | 07-084852 | | 3/1995 |
| JP | 07-141138 | | 6/1995 |
| JP | 07-200317 | | 8/1995 |
| JP | 07-200492 | | 8/1995 |
| JP | 07-244639 | | 9/1995 |
| JP | 07 319681 | A | 12/1995 |
| JP | 08-137795 | | 5/1996 |
| JP | 08-152990 | | 6/1996 |
| JP | 08-185292 | | 7/1996 |
| JP | 08-185298 | | 7/1996 |
| WO | WO 85/02310 | | 5/1985 |
| WO | WO 85/03584 | | 8/1985 |
| WO | WO 90/02382 | | 3/1990 |
| WO | WO 92/06438 | | 4/1992 |
| WO | WO 92/22870 | | 12/1992 |
| WO | WO 93/01550 | | 1/1993 |
| WO | WO 94/01821 | | 1/1994 |
| WO | WO 94/03859 | | 2/1994 |
| WO | WO 94/06103 | | 3/1994 |
| WO | WO 94/16395 | | 7/1994 |
| WO | WO 94/18620 | | 8/1994 |
| WO | WO 94/22266 | | 9/1994 |
| WO | WO 94/27406 | | 11/1994 |
| WO | WO 95/14289 | | 5/1995 |
| WO | WO 96/00963 | | 1/1996 |
| WO | WO 96/03835 | | 2/1996 |
| WO | WO 96/05698 | | 2/1996 |
| WO | WO 96/06503 | | 2/1996 |
| WO | WO 96/13013 | | 5/1996 |
| WO | WO 96/17467 | | 6/1996 |
| WO | WO 96/21192 | | 7/1996 |
| WO | WO 96/24092 | | 8/1996 |
| WO | WO 96/27155 | | 9/1996 |
| WO | WO 96/27155 | A2 * | 9/1996 |
| WO | WO 96/27155 | A3 * | 9/1996 |
| WO | WO 97/03423 | | 1/1997 |
| WO | WO 97/07656 | | 3/1997 |
| WO | WO 97/25816 | | 7/1997 |
| WO | WO 97/32251 | | 9/1997 |
| WO | WO 97/43761 | | 11/1997 |
| WO | WO 97/48203 | | 12/1997 |
| WO | WO 98/09209 | | 3/1998 |
| WO | WO 98/10381 | | 3/1998 |
| WO | WO 98/37481 | | 8/1998 |
| WO | WO 98/45768 | | 10/1998 |
| WO | WO 99/01815 | | 1/1999 |
| WO | WO 99/24928 | | 5/1999 |
| WO | WO 99/48296 | | 9/1999 |

OTHER PUBLICATIONS

Scherwin, Rich; Pay-per-view Web Content' Feb. 1997; PC/Computing, v10, n2, p. 288(1); dialog copy 1 page.*

Abadi, M., et al., "Authentication and Delegation with Smart-cards," Technical Report 67, DEC Systems Research Center, Oct. 1990, pp. 1-19.

Arneke, D., et al., "AT&T Encryption System Protects Information Services," (News Release), Jan. 9, 1995, 1 page.

Baggett, D., "Cable's Emerging Role in the Information Superhighway," Cable Labs, (undated), 13 slides.

Barassi, T.S., "The Cybernotary: Public Key Registration and Certification and Authentication of International Legal Transactions," (undated), 4 pages.

Barnes, H., memo to Henry LaMuth, subject: George Gilder articles, May 31, 1994, 2 pages.

Bart, D., "Comments in the Matter of Public Hearing and Request for Comments on the International Aspects of the National Information Infrastructure," Before the Department of Commerce, Aug. 12, 1994, pp. 1-15.

Baum, M., "Worldwide Electronic Commerce: Law, Policy and Controls Conference," Nov. 11, 1993, 18 pages.

Best, R.M., "Preventing Software Piracy With Crypto-Microprocessors," Digest of Papers, VLSI: New Architectural Horizons, Feb. 1980, pp. 466-469.

Bisbey II, R.L., et al., "Encapsulation: An Approach to Operating System Security," (USC/Information Science Institute, Marina Del Rey, CA), Oct. 1973, pp. 66-75.

Blaze; M:, "A Cryptographic File System for Unix," pre-print of paper for First ACM Conference on Computer and Communications Security, Fairfax, Virginia, Nov. 3-5, 1993, pp. 1-8.

Blaze, M., "Key Management in an Encrypting File System," Proc. Summer '94 USENIX Tech. Conference, Boston, MA. Jun. 1994, available at <http://www.usenix.org/publicaitons/libratry/proceedings/bos94/full_papers/blaze.asp>, pp. 1-12.
Blom, R., et al., "Encryption Methods in Data Networks," Ericsson Technics, No. 2, Stockholm, Sweden, 1978.
Bruner, R.E., "Power Agent, NetBot Help Advertisers Reach Internet Shoppers," Aug. 1997, 3 pages.
Caruso, D., "Technology, Digital Commerce: 2 Plans for Watermarks, Which Can Bind Proof of Authorship to Electronic Works," N.Y. Times, Aug. 7, 1995, p. D5.
Castano, S., et al., *Database Security*, Addison-Wesley & Acm Press, 1995.
Champine, G., *MIT Project Athena: A Model for Distributed Campus Computing*, Digital Equipment Corporation, 1991.
Chaum, D., "Achieving Electronic Privacy," Scientific American, Aug. 1992, pp. 96-101.
Chaum, D., et al. "Wallet databases with observers," Ernest F. Brickell, editor, Advances in Cryptology—CRYPTO '92, 12th Annual International Cryptology Conference, Santa Barbara, CA, Aug. 16-20, 1992, Proceedings, pp. 89-105.
Chaum, D., "Security Without Identification Card Computers to Make Big Brother Obsolete," Communications of the ACM, vol. 28, No. 10, Oct. 1985, pp. 1-24.
"List of Articles," <www.chaum.com/articles/list-of-articles.htm>, as on Aug. 23, 2002, 4 pages.
Choudhury, A.K., et al., "Copyright Protection for Electronic Publishing Over Computer Networks," AT&T Bell Laboratories, Murray Hill, NJ, Jun. 1994, 17 pages.
Clark, T., "Ad Service Gives Cash Back," (visited Aug. 4, 1997), 2 pages.
Cohen, F.B., "Operating System Protection Through Program Evolution," 8246 Computers & Security, No. 6, (Oxford, Great Britain) Oct. 1993, pp. 565-584.
Cox, B., "What if There is a Silver Bullet and the competition gets it first?" Journal of Object-Oriented Programming, Jun. 1992, available at, pp. 1-5.
Cunningham, D., et al., "AT&T, VLSI Technology Join To Improve Info Highway Security," (News Release) Jan. 31, 1995, 3 pages.
CUPID Protocols and Services (Version 1): "An Architectural Overview," Nov. 1992, available at, 25 pages.
Custer, H. *Inside Windows NT*, Microsoft Press, Redmond WA, 1993.
Davies, D., et al., *Security for Computer Networks*, John Wiley & Sons, 1989.
Dempsey L.., "The Warwick Metadata Workshop: A Framework for the Deployment of Resource Description," D-Lib Magazine, Jul. 15, 1996, 8 pages.
Denning, D.E., "Cryptography and Data Security," Addison-Wesley, 1982.
Denning, D.E., et al., Data Security, 11 Computing Surveys No. 3, Sep. 1979, pp. 227-249.
Denning, D. E., "Secure Personal Computing in an Insecure Network," Communications of the ACM, Aug. 1979, vol. 22, No. 8, pp. 476-482.
Diffie, W. et al., "New Directions in Cryptography," IEEE Transactions on Information Theory, vol. 22, No. 6, Nov. 1976, pp. 644-651.
Diffie, W. et al., "Privacy and Authentication: An Introduction to Cryptography," Proceedings of the IEEE, vol. 67, No. 3, Mar. 1979, pp. 397-427.
Dussee, S.R., et al., "A Cryptographic Library for the Motorola 56000," Advances in Cryptology-Proceedings of Eurocrypt 90, (I.M. Damgard, ed., Springer-Verlag) 1991, pp. 230-244.
Dyson, E., "Intellectual Value," WIRED Magazine, Jul. 1995, pp. 136-141 and 182-183.
Garcia, D.L., "Science, Space and Technology, Hearing before Subcomm. On Technology, Environment, and Aviation," May 26, 1994.
Gleick, J., "Dead as a Dollar," The New York Times Magazine, Jun. 16, 1996, Sect. 6, pp. 26-30, 35, 42, 50, 54.
Greguras, F., "Softic Symposium '95, Copyright Clearances and Moral Rights," Dec. 11, 1995, 3 pages.
Guillou, L.C., "Smart Cards and Conditional Access," Advances in Cryptography—Proceedings of EuroCrypt 84 (T. Beth et al, Ed., Springer-Veriag, 1985) pp. 480-490.
Haar, S.V., Document from the Internet: "PowerAgent Launches Commercial Service," Interactive Week, Aug. 4, 1997, 1 page.
Harman, H., *Modern Factor Analysis*, Third Edition Revised, University of Chicago Press, Chicago and London, 1976.
Hearst, M.A., "Filtering Information on the Internet," Scientific American, Mar. 1997, pp. 68-72.
Herzberg, A., et al., "Public Protection of Software," ACM Transactions on Computer Systems, vol. 5, No. 4, Nov. 1987, pp. 371-393.
Hofmann, J., "Interfacing the NII to User Homes," Consumer Electronic Bus. Committee, NIST, Jul. 1994, 12 slides.
Holt, S., "Start-Up Promises User Confidentiality in Web Marketing Service," InfoWorld Electric News, updated Aug. 13, 1997, 2 pages.
Ioannidis, J., et al., "The Architecture and Implementation of Network-Layer Security Under Unix," Fourth USENIX Security Symposium Proceedings (Oct.), USENIX, Berkeley, Calif. 1993, pp. 1-11.
Jiang, J.J., et al., "A Concept-based Approach to Retrieval from an Electronic Industrial Directory," International Journal of Electronic Commerce, vol. 1, No. 1 (Fall 1996) pp. 51-72.
Jones, D., Document from the Internet: "Top Tech Stories, PowerAgent Introduces First Internet 'Informediary' to Empower and Protect Consumers," (updated Aug. 13, 1997) 3 pages.
Kelly, K., "E-Money," Whole earth Review, Summer 1993, pp. 40-59.
Kent, S. T., "Protecting Externally Supplied Software in Small Computers," (MIT/LCS/TR-255) Sep. 1980, 254 pages.
Kohl, J., et al., "The Kerberos Network Authentication Service (V 5), "Network Working Group Request for Comments RFC-1510, Sep. 1993, pp. 1-104.
Kohl, U, et al., "Safeguarding Digital Library Contents and Protecting Documents Rather Than Channels," in *D-lib Magazine* , Sep. 1997, available at <http://www.dlib.org/dlib/september97/ibm/09lotspiech.html>, pp. 1-9.
Kristol, D.M., et al., "Anonymous Internet Mercantile Protocol," AT&T Laboratories, Murray Hill, NJ, Mar. 17, 1994, pp. 1-16.
Lagoze, C., "The Warwick Framework, A Container Architecture for Diverse Sets of Metadata," D-Lib Magazine, Jul./Aug. 1996, 7 pages.
Lanza, M., "George.Gilder's_Fifth Article-Digital Darkhorse," Newspapers, Feb. 21, 1994, 2 pages.
Lampson, B., et al., "Authentication in Distributed Systems: Theory and Practice," ACM Trans. Computer Systems, vol. 10, No. 4 (Nov. 1992), pp. 265-310.
Levy, S., "E-Money, That's What I Want," WIRED, Dec. 1994, 10 pages.
Low, S.H., et al., "Anonymous Credit Cards," AT&T Bell Laboratories, Proceedings of the 2nd ACM Conference on Computer and Communication Security, Fairfax, VA, Nov. 2-4, 1994, 10 pages.
Low, S.H., et al., "Anonymous Credit Cards and Its Collusion Analysis" AT&T Bell Laboratories, Murray Hill, NJ, Oct. 10, 1994, 18 pages.
Low, S.H., et al., "Document Marking and Identification Using both Line and Word Shifting" AT&T Bell Laboratories, Murray Hill, NJ, Jul. 29, 1994, 22 pages.
Lynch, C., "The Internet Bringing Order from Chaos," Scientific American, Mar. 1997, pp. 49-56.
Maclachlan, M., Document from the Internet: "PowerAgent Debuts Spam-Free Marketing," TechWire, Aug. 13, 1997, 3 pages.
Maxemchuk, N.F., "Electronic Document Distribution," AT&T Bell Laboratories, Murray Hill, NJ, (undated), 11 pages.
Milbrandt, E., Document from the Internet: "Steganography Info and Archive," 1996, 2 pages.
Mori, R., et al., "Superdistribution: The Concept and the Architecture," The Transactions of the EIEICE, V, E73, No. 7, Tokyo, Japan, Jul. 1990, pp. 1133-1146.
Mossberg, W.S., "Personal Technology, Threats to Privacy On-Line Become More Worrisome," The Wall Street Journal, Oct. 24, 1996, 2 pages.

Negroponte, N., "Some Thoughts on Likely and Expected Communications Scenarios: A Rebuttal," Telecommunications, Jan. 1993, pp. 41-42.
Negroponte, N., "Electronic Word of Mouth," WIRED, Oct. 1996, p. 218.
Neumann, P.G., et al., "A Provably Secure Operating System: The System, Its Applications, and Proofs," Computer Science Laboratory Report CSL-116, Second Edition, SRI International, Jun. 1980, 206 pages.
Olivier, M.S., et al., "A Taxonomy for Secure Object-oriented Databases," ACM Transactions on Database Systems, vol. 19, No. 1, Mar. 1994, pp. 3-46.
Olivier, M.S., et al., "Building a Secure Database using Self-protecting Objects," Computers & Security, vol. 11, No. 3, 1992, pp. 259-271.
Olivier, M.S., et al., "Secure Object-oriented Databases," Ph.D. Thesis, Rand Afrikaans University, Johannesburg, Dec. 1991, pp. 1 to xiv and 1-183.
Olivier, M.S., et al., "DISCO: A Discretionary Security Model for Object-oriented Databases," in GG Gable and WJ Caelli, Eds., IT Security: The Need for International Cooperation, pp. 345-357, Elsevier Science Publishers B.V. (North Holland), 1992.
Pelton, J.N., "Why Nicholas Negroponte is Wrong About the Future of Telecommunications," Telecommunications, Jan. 1993, pp. 35-40.
"Proceedings: Technological Strategies for Protecting Intellectual Property in the Networked Multimedia Environment," 1994, Coalition for Networked Information, Interactive Multimedia Association, John F. Kennedy School of Government, Journal of the Interactive Multimedia Association, available at, 308 pages.
Rankine, G., "Thomas—A Complete Single-Chip RSA Device," Advances in Cryptography, Proceedings of CRYPTO 86, (A.M. Odiyzko Ed., Springer-Verlag) 1987, pp. 480-487.
Reilly, A.K., "Input to the 'International Telecommunications Hearings,' Panel 1: Component Technologies of the NII/GII," Standards Committee T1-Telecommunciations (undated).
Resnick, P., et al., "Recommender Systems," Communications of the ACM, vol. 40, No. 3, Mar. 1997, pp. 56-89.
Resnick, P., "Search the Internet," Scientific American, Mar. 1997, pp. 62-67.
Rose, L., *Cyberspace and the Legal Matrix: Laws or Confusion?*, 1991.
Rosenthal, S., "Interactive Network: Viewers Get Involved, New Media," Dec. 1992, pp. 30-31.
Rosenthal, S., "Interactive TV: The Gold Rush is on, New Media," Dec. 1992, pp. 27-29.
Rosenthal, S., "Mega Channels," New Media, Sep. 1993, pp. 36-46.
Rothstein, E., "Technology Connections, Making The Internet Come To You Through 'Push' Technology," N.Y. Times, Jan. 20, 1997, p. D5.
Rutkowski, K., "PowerAgent Introduces First Internet 'Informediary' to Empower and Protect Consumers," Tech Talk News Story, Aug. 4, 1997, 1 page.
Sager, I., "Bits & Bytes," Business Week, Sep. 23, 1996, p. 142E.
Schlosstein, S., "America: The G7's Comeback Kid, International Economy," Jun./Jul. 1993, 5 pages.
Scnaumueller-Bichl, S., et al., "A method of Software Protection Based on the Use of Smart Cards and Cryptographic Techniques," (undated), 9 pages.
Schumann, J., "Pattern Classification, a Unified View of Statistical and Neural Approaches," John Wiley & Sons, Inc., 1996.
Shear, V., "Solutions for CD-ROM Pricing and Data Security Problems," CD ROM Yearbook 1988-1989 (Microisoft Press 1988 or 1989) pp. 530-533.
Sibert, O., et al., "DigiBox: A Self-Protecting Container for Information Commerce," Proceedings of the First USENIX Workshop on Electronic Commerce, New York, NY, Jul. 1995, pp. 1-13.
Sibert, O., et al., "Securing the Content, Not the Wire, for Information Commerce," InterTrust Technologies Corporation, 1996, 12 pages.
Siuda, K., "Security Services in Telecommunications Networks," Seminar: Mapping New Applications Onto New Technologies, edited by B. Plattner and P. Gunzburger; Zurich, Mar. 8-10, 1988, pp. 45-52.
Smith, S., et al., "Signed Vector Timestamps: A Secure Protocol for Partial Order Time," CMU-93-116, School of Computer Science-Carnegie Mellon University, Pittsburgh, Pennsylvania, Oct. 1991; version of Feb. 1993, 15 pages.
Stefik, M., "Interfaces for Searching the Web," Scientific American, Mar. 1997, pp. 78-81.
Stefik, M., "Letting Loose the Light: Igniting Commerce in Electronic Publication," Xerox PARC, Palo Alto, CA, 1994-1995, 35 pages.
Stefik, M., "Letting Loose the Light: Igniting Commerce in Electronic Publication," Internet Dreams: Archetypes, Myths, and Metaphors. Massachusetts Institute of Technology, 1996, pp. 219-253.
Stefik, M., "Chapter 7, Classification, Introduction to Knowledge Systems," Morgan Kaufmann Publishers, Inc., 1995, pp. 543-607.
Stephenson, T., "The Info Infrastructure Initiative: Data Super Highways and You," Advanced Imaging, May 1993, pp. 73-74.
Sterling, B., "Literary Freeware: Not for Commercial Use," Computers, Freedom and Private Conference IV, Chicago, IL, Mar. 26, 1994.
Struif, B., "The Use of Chipcards for Electronic Signatures and Encryption," Proceedings for the 1989 Conference on VSLI and Computer Peripherals, IEEE Computer Society Press, 1989, pp. (4)155-(4)158.
Symposium: "Applications Requirements for Innovative Video Programming: How to Foster (or Cripple) Program Development Opportunities for Interactive Video Programs Delivered on Optical Media: A Challenge for the Introduction of DVD (Digital Video Disc)" (Oct. 19-20, 1995, Sheraton Universal Hotel, Universal City CA).
Tygar, J.D., et al., "Cryptography: It's Not Just for Electronic Mail Anymore," CMU-CS-93-107, School of Computer Science Carnegie Mellon University, Pittsburgh, PA, Mar. 1, 1993, 21 pages.
Tygar, J.D., et al., "Dyad: A System for Using Physically Secure Coprocessors," School of Computer Science, Carnegie Mellon University, Pittsburgh, PA, May 1991, 36 pages.
Tygar, J.D., et al., "Strongbox: A System for Self Securing Programs," CMU Computer Science: 25th Anniversary Commemorative, R. Rashid (ed.) Addison-Wesley, 1991, pp. 163-197.
Valovic, T., "The Role of Computer Networking in the Emerging Virtual Marketplace," Telecommunications, (undated), pp. 40-44.
Voight, J., "Beyond the Banner," Wired, Dec. 1996, pp. 196, 200, 204.
Weber, R., "Metering Technologies for Digital Intellectual Property," A Report to the International Federation of Reproduction Rights Organisations (Boston, MA), Oct. 1994, pp. 1-29.
Weber, R., Document from the Internet: "Digital Rights Management Technologies," Oct. 1995, 21 pages.
Weber, R., "Digital Rights Management Technologies," A Report to the International Federation of Reproduction Rights Organisations, Northeast Consulting Resources, Inc., Oct. 1995, 49 pages.
Weder, A., "Life on the Infohighway," INSITE, (undated), pp. 23-25.
Weingart, S.H., "Physical Security for the ABYSS System," (IBM Thomas J. Watson Research Center, Yorktown Heights, NY), 1987, pp. 52-58.
Weitzner, D.J., "A Statement on EFF's Open Platform Campaign as of November," 1993, 3 pages.
White, J.E., "Telescript Technology: The Foundation for the Electronic Marketplace," General Magic, 1994.
White, S.R., "ABYSS: A Trusted Architecture for Software Protection," (IBM Thomas J. Watson Research Center, Yorktown Heights, NY), 1987, pp. 38-50.
Wobber, E., et al., "Authentication in the Taos Operating System," an extended version of a paper presented at the 14th ACM Symposium on Operating System Principles, Dec. 1993, pp. 1-38.
Yee, B., "Using Secure Coprocessors," CMU-CS-94-149, School of Computer Science, Carnegie Mellon University, Pittsburgh, PA, 1994, 94 pages.

Yellin, F., Document from the Internet: "Low Level Security in Java," Sun Microsystems, 1996, 8 pages.
"Argent Information, Q&A Sheet," Document from the Internet: <http://www.digital-watermark.com/>, Copyright 1995, The DICE Company, (last modified Jun. 16, 1996), 7 pages.
"New Products, Systems and Services," AT&T TECHNOLOGY, vol. 9, No. 4, (undated), pp. 16-19.
"Cable Television and America's Telecommunications Infrastructure," (National Cable Television Association, Washington, D.C.), Apr. 1993, 19 pages.
CD ROM: "Introducing . . . The Workflow CD-ROM Sampler," Creative Networks, MCI Mail: Creative Networks, Inc., (undated).
"Codercard, Basic Coder Subsystem," Interstate Electronics Corp., Anaheim, CA, (undated), 4 pages.
"Protecting Electronically Published Properties, Increasing Publishing Profits," Electronic Publishing Resources Inc., Jan. 1993, 25 pages.
"Communications of the ACM," vol. 39, No. 6, Jun. 1996, 130 pages.
"Communications of the ACM, Intelligent Agents," vol. 37, No. 7, Jul. 1994, 170 pages.
"Computer Systems Policy Project (CSSP), Perspectives on the National Information Infrastructure: Ensuring Interoperability," Feb. 1994, 5 slides.
"DiscStore" (Electronic Publishing Resources, Chevy Chase, MD), 1991.
"DSP56000/DSP56001 Digital Signal Processor User's Manual," (Motorola), 1990, p. 2-2.
"White Paper: The Future of Electronic.Commerce," A Supplement to Midrange Systems, Premenos Corp. Document from Internet, Aug. 1995, 4 pages.
"CGI Common Gateway Interface,"Document from the Internet cgi@ncsa.uiuc.edu, 1996, 1 page.
"HotJava™: The Security Story," (undated) 4 pages.
"About the Digital Notary Service,": Surety Technologies, 1994-5, 6 pages.
"Templar Overview: Premenos," undated, 4 pages.
Templar Software and services, Secure, Reliable, Standards-Based EDI Over the Internet ,undated, 1 page.
"JAVASOFT, Frequently Asked Questions-Applet Security," Jun. 7, 1996, 8 pages.
"News from The Document Company XEROX, Xerox Announces Software Kit for Creating 'Working Documents' with Dataglyphs," Nov. 6, 1995, 13 pages.
"Premenos Announces Templar 2.0—Next Generation Software for Secure Internet EDI," Jan. 17, 1996, 1 page.
"WEPIN Store, Stenography (Hidden Writing)," Common Law, 1995, 1 page.
"Sag's durch die Blume," (undated), 5 pages.
"A Publication of the Electronic Frontier Foundation," EFFector Online vol. 6 No. 6., Dec. 6, 1993, 8 pages.
"EIA and TIA White Paper on National Information Infrastructure," The Electronic Industries Association and the Telecommunications Industry Association, Washington, D.C., (undated), 27 pages.
"Electronic Currency Requirements," XIWT (Cross Industry Working Group), (undated), 16 pages.
"Electronic Publishing Resources Inc. Protecting Electronically Published Properties Increasing Publishing Profits" (Electronic Publishing Resources, Chevy Chase, MD) 1991, 19 pages.
"What is Firefly?," Firefly Network, Inc., Firefly revision: 41.4, Copyright 1995, 1996, 1 page.
"First CII Honeywell Bull International Symposium on Computer Security and Confidentiality," Conference Text, Jan. 26-28, 1981, pp. 1-21.
"Framework for National information Infrastructure Services," Draft, U.S. Department of Commerce, Jul. 1994.
"Framework for National Information Infrastructure Services," NIST, Jul. 1994, 12 Slides.
"Intellectual Property and the National Information Infrastructure, a Preliminary Draft of the Report of the Working Group on Intellectual Property Rights," Green paper, Jul. 1994, 141 pages.
"Multimedia Mixed Object Envelopes Supporting a Graduated Fee Scheme Via Encryption," IBM Technical Disclosure Bulletin, vol. 37, No. 3, Mar. 1, 1994, pp. 413-417.
"Transformer Rules Strategy for Software Distribution Mechanism-Support Products," IBM Technical Disclosure Bulletin, vol. 37, No. 48, Apr. 1994, pp. 523-525.
"IISP Break Out Session Report for Group No. 3," Standards Development and Tracking System, (undated).
Information Infrastructure Standards Panel: NII "The Information Superhighway," NationsBank—HGDeal—ASC X9, (undated), 15 pages.
"Invoice? What's an Invoice?," Business week, Jun. 10, 1996, pp. 110-112.
"Micro Card," Micro Card Technologies, Inc., Dallas, TX, (undated), 4 pages.
"Background on the Administration's Telecommunications Policy Reform Initiative," News Release, The White House, Office of the President, Jan. 11, 1994, 7 pages.
"NII, Architecture Requirements, XIWT," (undated), 38 pages.
Symposium: "Open System Environment Architectural Framework for National Information Infrastructure Services and Standards, in Support of National Class Distributed Systems," Distributed System Engineering Program Sponsor Group, Draft 1.0, Aug. 5, 1994, 34 pages.
"Proper Use of Consumer Information on the Internet," White Paper, Power Agent Inc., Menlo Park, CA, Jun. 1997, 9 pages.
"What the Experts Are Reporting on PowerAgent," PowerAgent Press Releases, Aug. 13, 1997, 6 pages.
"Portland Software's Ziplock," Internet Information, Copyright Portland Software 1996-1997, 12 pages.
Press Release, National Semiconductor and EPR Partner for Information Metering/Data Security Cards (Mar. 4, 1994).
"R01—Solving Critical Electronics Publishing Problems," Personal Library Software, 1987 or 1988, 4 pages.
"Serving the Community: A Public Interest Vision of the National Information Infrastructure," Computer Professionals for Social Responsibility, Executive Summary, (undated), pp. 8-38.
"The 1:1 Future of the Electronic Marketplace: Return to a Hunting and Gathering Society," (undated), 2 pages.
"The Benefits of RDI for database Protection and Usage Based Billing," Personal Library Software, 1987 or 1988, 5 pages.
"The New Alexandria No. 1," Alexandria Institute, Jul.-Aug. 1986, pp. 1-12.
"Is Advertising Really Dead?," Wired 1.02, Part 2, 1994.
"How Can I Put an Access Counter on My Home Page?," World Wide Web FAQ, 1996, 1 page.
XIWT Cross Industry Working Team, Jul. 1994, 5 pages.
A Brief History of the Green Project, viewed on Mar. 12, 2002 pp. 1-2.
A Guide to Understanding Security Modeling in Trusted Systems, National Security Agency, Oct. 1992, 122 pages.
A2b's Recent Press Coverage, 1998.
Abadi, M., et al., "A Calculus for Access Control in Distributed Systems", Digital Equipment Corporation, Feb. 28, 1991, revised Aug. 28, 1991.
Abrams, Marshall D, "Renewed Understanding of Access Control Policies", Proceedings of the 16th Computing Natioal Security Conference, 1993.
Access Control and Copyright Protection for Images Security Technology for Graphics and Communication Systems—RACE M1005:ACCOPI, webpage, Security Projects at Fraunhofer 1GD, 2002.
Achievements Archive.
Aharonian, G., "Software Patents—Relative Comparison of EPO/PTO/JPO Software Searching Capabilities," Source Translation & Optimization.
An Introduction to Safety and Security in Telescript, (undated), 8 pages.
Anderson, R., "Why Cryptosystems Fail," University Computer Laboratory, Cambridge, Massachusetts, (undated), pp. 1-34.
Antonelli et al. "Access Control in a Workstation-Based Distributed Computing Environment," CITI Technical Report 90-2, Jul. 17, 1990.

Arms, W.Y., "Key Concepts in the Architecture of the Digital Library," D-Lib Magazine, Jul. 1995.
Atkins, D., et al., "The Magic Words are Squeamish Ossifrage," (undated), 15 pages.
Atkinson, R., "Security Architecture for the Internet Protocol," Network Working Group RFC 1825, Aug. 1995.
Aucsmith, D., et al., "Common Data Security Architecture," Intel Architecture Lab, Presentation Material, Jan. 22, 1996, pp. 1-16.
Aucsmith, David, "Tamper Resistant Software: An Implementation", IAL.
Authentification dans les environnements de traitement distributes, Information Systems Audit and Control Association-Montreal Chapter, viewed on Mar. 25, 2002 at.
Avery, et al., "Recommender Systems for Evaluating Computer Messages," Communications of the ACM, Mar. 1997, pp. 88-89.
Baker, R.H., The Computer Security Handbook, Tab Books, Inc., 1985.
Balbanovic, et al., Content-based, Collaborative Recommendation, Communications of the ACM, Mar. 1997, pp. 66-72.
Bartock, P.F., et al., "Guide to Securing Microsoft Windows NT Networks," National Security Agency, Sep. 18, 2001, pp. 1-132.
Bellare, M., "iKP-A Family of Secure Electronic Payment Protocols," Apr. 16, 1995, pp. 1-19.
Bell-Labs Secure Technologies, "Information Vending Encryption System (IVES)™," Lucent Technologies, May 31, 2002, pp. 1-16.
Bellovin, S.M., "Encrypted Key Exchange: Password-Based Protocols Secure Against Dictionary Attacks," Proceedings of the IEEE Symposium on Research in Security and Privacy, Oakland, California, May 1992, 13 pages.
Bellovin, S.M., "There Be Dragons," AT&T Bell Laboratories, Aug. 15, 1992, 16 pages.
Bender et al. "Techniques for Data Hiding," IBM Systems Journal, vol. 35, Nos. 3&4, 1996.
Berghal et al., "Protecting Ownership Rights Through Digital Watermarking," IEEE Computing, vol. 29, No. 7, Jul. 1996.
Berkovitz, S. et al., "Authentication of Mobile Agents," Mobile Agents and Security, Springer-Verlag, Giovanni Vigna, Ed., 1998, pp. 114-136.
Berners-Lee, T.J., et al., "Networked Information Services: The World-Wide Web," Computer Networks and ISDN Systems, 1992, pp. 454-459.
Bernstein et al., "Copyrights, Distribution Chains, Integrity, and Privacy: The Need for a Standards-Based Solution," Electronic Publishing Resources.
Bertino, Elisa, "Data Hiding and Security in Object-Oriented Databases," Dipartimento di Matematica, Universita di Genova, IEEE, 1992, pp. 338-347.
Bickel, R., et al., "Guide to Securing Microsoft Windows XP," National Security Agency, Oct. 30, 2002, pp. 1-129.
Birrell, Andrew, D., et al., "A Global Authentication Service Without Global Trust," Proceedings of the IEEE Symposium on Security and Privacy, Oakland, California, Apr. 1986, pp. 1-11.
Bishop, M., "Anatomy of a Proactive Password Changer," Department of Mathematics and Computer Science, Dartmouth College, (undated), 15 pages.
Bishop, M., "Privacy-Enhanced Electronic Mail," Privacy and Security research Group, IAB.
Blaze, Matt, et al., "The Architecture and Implementaiton of Network Layer Security Under Unix", Columbia University and AT&T Bell Laboratories, 1994.
Boisson, Jean-Francois, "1-Business Perspectives and Requirements, 2-The CITED Project: Keys and Knowledge," CITED 5469.
Boisson, Jean-Francois, "How to CITEDise Application: Guidelines and Examples," CITED 5469.
Boisson, Jean-Francois, "Management of Intellectual Property Rights in the Electronic Commerce: Textile Design Sales and Other Similar Initiatives," EURITIS.
Boisson, Jean-Francois, "Software Components; Deliverable Trial Offer," CITED 5469.
Boly, J.P., et al., "The ESPRIT Project CAFÉ: High Security Digital Payment Systems," ESCORICS 94, European Symposium on Research Computer Security, Springer-Verlas Berlin, 1994, pp. 217-230.
Boone, J.V., et al., "The Start of Digital Revolution: SIGSALY Secure Digital Voice Communications in World War II," Dec. 10, 2002.
Borenstein, N., "MIME Extensions for Mail-Enabled Applications: Application/Safe-Tel and Multipart/Enabled-Mail," Nov. 1993, 24 pages.
Born, E, et al., "Discretionary Access Control by Means of Usage Conditions," Computers & Security, vol. 13, No. 5, 1994, pp. 437-450.
Bos et al., "SmartCash: a Practical electronic payment System," Center for Mathematics and Computer Science, Report CS-R9035.
Brands, S., "Untraceable Off-line Cash in Wallets with Observers," CWI, (undated), 17 pages.
Brassil et al., "Electronic Marking and Identification Techniques to Discourage Document Copying," AT&T Bell Laboratories, Proc. Infocom 94, 1994.
Breon, R., et al., "Microsoft Office 97 Executable Content Security Risks and Countermeasures," National Security Agency, Dec. 20, 1999, pp. 1-44.
Brickell, E.F., et al., "The SKIPJACK Algorithm," Jul. 28, 1993, pp. 1-7.
Brin, Sergey, et al., "Copy Detection Mechanism for Digital Documents", Stanford University.
Brockschmidt, Kraig, "A Primer on Designing Custom Controls," Microsoft Systems Journal, Mar./Apr. 1992, pp. 87-101.
Brockschmidt, Kraig, "Implementing OLE 2.0, Part III: Uniform Data Transfer with Data Objects," Microsoft Systems Journal, Dec. 1993, pp. 47-77.
Brockschmidt, Kraig, "Introducing OLE 2.0, Part 1: Windows Objects and the Component Object Model," Microsoft Systems Journal, Aug. 1993, pp. 15-23.
Brockschmidt, Kraig, "OLE 2.0 Part II: Implementing a Simple Windows Object Using Either C or C++," Microsoft Systems Journal, Oct. 1993, pp. 45-62.
Brockschmidt, Kraig, Inside OLE 2, Microsoft Press Programming Series, 1994.
Brown, C.W., "Security for Minicomputers and Microcomputers," (undated), pp. 285-298.
Brown, Patrick W., "Digital Signatures: Can They Be Accepted as Legal Signatures in EDI?," 1st Conference on Computer and Communication Security, Nov. 1993, pp. 86-92.
Brumm, P., et al., 80386/80486 Assembly Language Programming, Windcrest/McGraw-Hill, 1993.
Brunnstein et al., "Intellectual Property Rights and new Technologies," Proceedings of the KnowRight '95 Conference, Aug. 1995.
Bureau Van Dijk, Management Report for Task 4.5: Feasibility Study of the Cited Agency, 1992-1993.
Bureau Van Dijk, Gestion Des Contrats; 497C.C.C.E.: CITED (SUITE), Feb. 1993.
Bureau Van Dijk, CITED: Preparation of the CITED Model Functional Requirements Specifications; Discussion Paper (Revision 1), Jan. 16, 1991.
Bureau Van Dijk, CITED: Preparation of the CITED Model Functional Requirements Specifications; Reports of the Interviews with Five CITED Partners, (Partners: Sagem, Telesystemes, NTE, Elsevier, Oxford University Press), Apr. 5, 1991.
Byte.com, "Speaking the Same Language," May 1994, pp. 1-2.
Cabell, D., et al., "Software Protection," May 1985, pp. 35-37.
Calas, C., "Distributed File System Over a Multilevel Secure Architecture Problems and Solutions," Computer Security, ESCORICS 94, Brighton, United Kingdom, Nov. 7-9, 1994, pp. 281-297.
CardTech/SecurTech 94 Conference Proceedings, "Building Foundations for Innovation," CardTech/SecurTech, Inc., Apr. 1994, 1,031 pages.
Case, J., "A Simple Network Management Protocol (SNMP)," Network Working Group, May 1990, pp. 1-21.
Chase, Chevy, M.D., "DiscStore", Electronic Publishing Resources, 1991.
Chaum, David L., "Privacy and Social Protection in Electronic Payment Systems," Chapter 12, The Future of Money in the Information Age.

Chaum, David L., "Smart Card 2000," Selected Papers from the Second International Smart Card 2000 Conference, Oct. 4-6, 1989.
Chaum, David L., "Untraceable Electronic Cash," Extended Abstract, Center for Mathematics and Computer Science, 1988, pp. 319-327.
Chaum, David L., et al., "Implementing Capability-Based Protection Using Encryption," College of Engineering, University of California, Berkeley, Jul. 17, 1978, 12 pages.
Chess, D., "Security Issues in Mobile Code Systems," Mobile Agents and Security, Springer-Verlag, Giovanni Vigna, Ed., 1998, 14 pages.
Chor et al., "Tracing Traitors," Crypto 94, 1994, p. 257.
Choy, D.M., et al., "A Digital Library System for Periodicals Distribution", May 1996.
Cina Jr. et al., "ABYSS: A Basic Yorktown Security System PC Software Asset Protection Concepts," IBM Research Report No. RC 12401, IBM Thomas J. Watson Research Center, Dec. 18, 1986.
CITED: Copyright in Transmitted Electronic Documents, Special Interest Group, CITED Meeting, Heathrow, Sep. 22, 1993.
CITED: Final Report: A Guide to CITED Documentation, ESPIRIT, Project 5469, ISBN 0-7123-2115-2, The CITED Consortium, Sep. 1994.
Clark, Paul C., et al., "BITS: A Smartcard Protected Operating System," Communications of the ACM, vol. 37, No. 11, Nov. 1994, pp. 66-70 & 94.
Clarke et al., "Cryptography Issues in Plain Text," Privacy Law and Policy Reporter, 1996.
Coad, Peter, "Object-Oriented Patterns," Communications of the ACM, vol. 35, No. 9, Sep. 1992, pp. 152-159.
Cohen, F.B., Protection and Security on the Information Superhighway, John Wiley & Sons, Inc., 1995.
Competitive Analysis AT&T/a2b music, Jun. 16, 1998.
Constructing a High Assurance Mail Guard, Secure Computing, 1994, pp. 1-10.
Cook, S., "Net Results," PC World, Dec. 1985, pp. 270-328.
Copyright Ownership Projection in Computer-Assisted Training, COPICAT—8195, ESPRIT, Dec. 1993.
COPYSMART—20517: "CITED Based Multi-media IPR Management on Cost Effective Smart Device," European Inforamtion Technology for Information Science, start date Dec. 1, 1995.
CopySmart (CSM) suit, European Information technology for Information Science.
Corbato, F.J., et al., "Introduction and Overview of the Multics System," viewed on Nov. 13, 2001.
Cornish, Graham, "Copyright Management of Document Supply in an Electronic Age," The CITED™ Solution, Interlending & Document Supply, vol. 21, No. 2, 1993, pp. 13-20.
Cousins, Steve B. et al., "InterPay: Managing Multiple Payment Mechanisms in Digital Libraries.".
Coutrot, Francois, et al., "A Single FConditional Access System for Satellite-Cable and Terrestrial TV", IEEE Transactions on Consumer Electronics, vol. 35, No. 3, Aug. 1989.
Cox, B., "Superdistribution," Wired, Sep. 1994, 2 pages.
Cox, Benjamin et al., "NetBill Security and Transaction Protocol," Carnegie Mellon University.
CREANET—Creative Rights European Agency NETwork—Project Profile, Information Society Technologies, Feb. 18, 2000.
Crocker et al., "MIME Object Security Services," Network Working Group RFC 1848, Oct. 1995.
Cryptographic API Specification, Version 0.6, Microsoft, Mar. 1995.
Cryptolope Containers Technology: A White Paper, IBM InfoMarket Business Development Group.
Curry, D.A., UNIX System Security: A Guide for Users and System Administrators, Addison-Wesley Publishing Company, Inc., 1992.
Curry, David A., "Improving the Security of Your Unix System," Final Report Apr. 1990, pp. 1-74.
Custer, H., Inside the Windows NT File System, Microsoft Press, 1994.
Cybenko, G, et al., "Cognitive Hacking: A Battle for the Mind," Computer, Aug. 2002, 0018-9162/02a2002 IEEE, pp. 50-56.
Data Network and Open System Communications, Directory: Information Technology—Open Systems Interconnection—The Directory: Overview of Concepts, Models, and Services, ITU-T Recommendation X.500, International Telecommunication Union, Nov. 1993.
Data Widgets 2.0: Programmer's Guide, Sheridan Software Systems, Inc., 1993-1995.
Date, C.J., "An Introduction to Database Systems," 4th. Ed., vol. 1, Addison-Wesley Publishing Company, 1987.
Davin, J., et al., "SNMP Administrative Model," Network Working Group, Jul. 1992, pp. 1-22.
Davis, D., et al., "Network Security via Private-Key Certificates," MIT Project Athena, (undated), pp. 1-4.
DCE Technology at Work, Distributed Computing Environment, Nov. 7, 2000, pp. 1-3.
Deering, S.E., "Host Extensions for IP Multicasting," Network Working Group, RFC 1112, Aug. 1989.
Deliverable D3: Specification of the Infrastructure and Explanation of Trust and Confidence Building Solutions, Ver. 0.1, Telenet, Jul. 18, 2000.
Denning, A., OLE Controls Inside Out, Microsoft Press, 1995.
Denning, P.J., Computer Under Attack: Intruders, Worms, and Viruses, ACM Press, 1990.
Department of Defense Computer Security Center, "Department of Defense Password Management Guideline," Department of Defense Computer Security Center, Apr. 12, 1985, pp. 1-34.
Department of Defense Standard, "Department of Defense Trusted Computer System Evaluation Criteria," Dec. 1985, pp. 1-72.
Deutsch, P., "GZIP File Format Specification Version 4.3," Network Working Group, May 1996, pp. 12.
Diffie, Whitfield, "Authentication and Authenticated Key Exchanges", Sun Microsystems and Bell-Northern Research, Mar. 6, 1992.
Diffie, Whitfield, "The First Ten Years of Public-Key Cryptography", Proceedings of the IEEE, vol. 76, No. 5, May 1988.
Digital Broadband Delivery System, Phase 1.0, System Overview, Revision 1.0, Scientific Atlanta, 1997.
Digital Rights Enforcement and Management: SuperDistribution of Cryptolopes, IBM.
DiLascia, Paul, "OLE Made Almost Easy: Creating Containers and Servers Using MFC 2.5," Microsoft Systems Journal, Apr. 1994, pp. 13-33.
Doster et al., "Third-Party Authentication in the Institutional File System," Center for Information Technology Integration.
Dougherty, D., et al., The Mosaic Handbook for the X Window System, O'Reilly & Associates, 1994.
Downs, D.D., et al., "Issues in Discretionary Access Control," Proceedings of the 1985 Symposium on Security and Privacy, Apr. 22-24, 1985, Oakland, California, pp. 208-218.
Dukach, S., "SNPP: A Simple Network Payment Protocol," MIT Laboratory for Computer Science, (undated), 7 pages.
Eastlake III, D., "Physical Link Security Type of Service," Network Working Group RFC 1455, May 1993.
Eastlake III, D., et al., "Randomness Recommendations for Security," Network Working Group RFC 1750, Dec. 1994.
EFT Network Data Book; 1993 Edition, Bank Network News, vol. 11, No. 13, Nov. 1992.
Eizenberg, G., "Contribution of Information Technology Security to Intellectual Property Protection," CERT-DERI.
Electronic Reverse Copyright Management System (ERCOMS), International Institute for Electronic Library Research, website updated by Ramsden, Anne, Jul. 22, 1996.
Ellison, C. et al., "SPKI Certificate Theory," Internet Engineering Task Force (IETF) RFC 2693, Sep. 1999, 38 pages.
Email from Chris Drost-Hansen re press release: "AT&T Launches A2B Music Trial for Delivering Songs Over the Internet," Business Wire, Nov. 3, 1997.
Email from Edmond Kouka to Jean-Francois Boisson re TELENET TELEtraining platform—Bogdan Lutkiewicz, Poland, Gdansk, Mar. 4, 2001.
Enterprise Solutions Announces RSA Mail, RSA Security News, dated Jan. 12, 1994, pp. 1-2.

Epstein, J., "A Trusted X Window System Server for Trusted Mach," Usenix Association Proceedings, Mach Workshop, Oct. 4-5, 1990, Burlington, Vermont, pp. 141-155.
Erickson, John S., "A Copyright Management System for Networke Interactive Multimedia", Proceedings of the 1995 Dartmouth Institute for Advanced Graduate Studies, 1995.
Erickson, John S., "Rights Management Through Enhanced Attribution", Presented at INET 96 Proceedings, Jun. 1996.
ESPRIT Project 20517—Copysmart Cited based multi-media IPR management on cost effective smart device, Summaries of Projects (FP III/IV)—Part I, European Information technology for Information Science, Oct. 1998.
ESPRIT Project 20676—IMPRIMATUR—Intellectual Multimedia Property Rights Model and Terminology for Universal Reference, IMPRIMATUR Consortium, Oct. 1998.
ESPRIT Project 22226—MUSE—Developing Standardized Digital media Management, Signaling and encryption Systems for the European Music Sector, International Federation of the Phonographic Industry, Oct. 1998.
ESPRIT Project 24378—MENHIR European Multimedia Network of High Quality Image Registration, Museums On Line, Feb. 1, 1997.
ESPRIT Project: 5469: Contract Amendment No. 2; Commission of the European Communities, Sep. 16, 1993.
Europe and The Global Information Society Recommendations to the European Council, Bamgemann Report, www.medicif.org web pages, Global Information Society, May 1994.
Everett, David B., "Smart Card Tutorial-Part 1," Sep. 1992.
Farmer, D., "The COPS Security Checker System," Jul. 10, 1992.
Federal Criteria for Information Technology Security, vol. II, Version 1.0, National Institute of Standards and Technology and National Security Agency, Dec. 1992, 270 pages.
Feistel, H. "Cryptographic Coding for Data-Bank Privacy," IBM document RC 2827, Mar. 18, 1970.
Ferraiolo, D., et al., "Role-Based Access Control," Reprinted from the Proceedings of the 15th National Computer Security Conference, 1992, pp. 1-11.
Financial Transaction Card Originated Messages—Interchange Message Specifications—Part 2: Application and registration Procedures for Institution Identification Codes (IIC), ISO 8583-2, Jul. 1, 1998.
Financial Transaction Card Originated Messages—Interchange Message Specifications—Part 3: Maintenance Procedures for Codes, ISO 8583-3, Jul. 1, 1998.
Fine, T., et al, "Assuring Distributed Trusted Mach," Secure Computing Corporation, 1993, 13 pages.
Finin et al., "A Language and Protocol to Support Intelligent Agent Interoperability," Proceedings of the CE & CALS, Washington '92 Conference, Apr. 1992.
Forcht, K.A., Computer Security Management, Boyd & Fraser Publishing Company, 1994.
Forum on Risks to the Public in Computers and Related Systems, The Risks Digest, vol. 15; Issue 39, Jan. 21, 1994, pp. 1-12.
Forum on Technology-Based Intellectual Property Management—Electronic Commerce for Content, IMA INtellectual Property Proceedings, vol. 2, Jun. 1996.
Franklin, M., et al., "An Overview of Secure Distribution Computing," Mar. 24, 1992, pp. 1-46.
Franz, M., "Technological Steps Toward a Software Component Industry," Institut fur Computersysteme, Zurich, Switzerland, (undated), 23 pages.
Frederick, Keith P., "Certification and Accreditation Approach", Air Force Cryptologic Support Center (OL-FP).
FreeBSD System Manager's Manual "LDCONFIG", Oct. 3, 1993.
Fuchsberger et al., "Public-key Cryptography on Smart Cards," Information Security Group.
Fugini, M.G., et al., "Authorization and Access Control in the Office-Net System," Computer Security in the Age of Information, 1989, pp. 147-162.
Fugini, M.G., et al., "Security Management in Office Information Systems," Computer Security: A Global Challenge, 1984, pp. 487-498.
Galvin, J., et al., "Security Protocols for version 2 of the Simple Network Management Protocol (SNMPv2)," Network Working Group RFC 1446, Apr. 1993.
Galvin, J., et al., "SNMP Security Protocols," Network Working Group, Jul. 1992, pp. 1-26.
Gamble, Todd, "Implementing Execution Controls in Unix," Usenix Association, Proceedings of the Seventh Systems Administration Conference, Nov. 1-5, 1993, Monterey, California, pp. 237-242.
Garfinkel, Simson, et al., Practical UNIX Security, O'Reilly & Associates, Inc., 1991.
Garfinkel, Simson, PGP: Pretty Good Privacy, O'Reilly & Associates, Inc., (undated).
Gasser, M., et al., "The Digital Distributed System Security Architecture," Reprint from the Proceedings of 1989 National Computer Security Conference, 1989, pp. 1-13.
Gaster, J. L., "Authors' Rights and Neighboring Rights in the Information Society," DG XV/E/4, European Commission.
Gemplus, MCOS: Multi Application Chip Operating System—Introduction, Gemplus Card International, 1990.
General Magic Picks RSA, RSA Security News, viewed at <http://rsasecurity.com/news/pr/940112-3.html.>, dated Jan. 12, 1994, pp. 1-2.
Gifford, D.K., "Cryptographic Sealing for Information Secrecy and Authentication," Communications of the ACM, vol. 25, No. 4, Apr. 1982, pp. 274-286.
Gifford, D.K., et al., "The Cirrus Banking Network," Communications of the ACM, vol. 28, No. 4, Aug. 1985, pp. 798-807.
Gilde, R., "DAT-Heads: Frequently Asked Questions," 1991, Release 3.1, Sep. 2, 1992.
Gircys, G.R., Understanding and Using COFF, O'Reilly & Associates, Inc., Nov. 1988.
Glatzer, H., "The Promise of LANs MIS Back in Control," Software News, Mar. 1985, pp. 51-58.
Gligor, V.D., et al., "Object Migration and Authentication," IEEE Transactions on Software Engineering, vol. SE-5, No. 6, Nov. 1979, pp. 607-611.
Gong, Li, "A Secure Identity-Based Capability System," University of Cambridge Computer Laboratory, Jan. 1989, pp. 1-15.
Gong, Li, et al., "Signing, Sealing and Guarding Java Objects," Mobile Agents and Security, G. Vigna, editor, Springer-Verlag, 1998, vol. 1419 of LNCS, pp. 206-216.
Gosler, James, "Software Protection: Myth or Reality", Lecture Notes in Computer Science, Advances in Cryptology—Crypto '85 Proceedings, 1985.
Gosling, J., "Oak Intermediate Bytecodes," 1995, 5pages.
Gozani et al., "GAFFES: The Design of a Globally Distributed File System," Report No. UCB/CSD 87/361; Computer Science Division (EECS), U.C. Berkley, Jun. 1997.
Greenwald et al., "The Distributed Compartment Model for resource management and Access Control," Technical report No. TR94-035, The University of Florida, Oct. 1994.
Griswold, Gary N., "A Method for Protecting Copyright on Networks", IMA Intellectual Property Proceedings, vol. 1, Issue 1, Jan. 1994.
Gruber, R., et al., "Disconnected Operation in the Thor Object-Oriented Database System," Laboratory of Computer Science, Massachusetts Institute of Technology, (undated), pp. 1-6.
Guide to the Secure Configuration and Administration of Microsoft Exchange 5.x®, National Security Agency, Jun. 20, 2002, pp. 1-58.
Halfhill, Tom R., et al., "Agents on the Loose," Byte.com, Feb. 1994, pp. 1-2.
Halfhill, Tom R., et al., "Just Like Magic?," Byte.com, Feb. 12, 1994, pp. 1-5.
Haller, N., "The S/KEY One-Time Password System," Network Working Group RFC 1760, Feb. 1995.
Handwritten note re: GVS and AJL, Mar. 2, 1994.
Hansen, S.E., et al., "Automated System Monitoring and Notification with Swatch," Proceedings of the 1993 LISA, Monterey, California, Nov. 1-5, 1993, pp. 101-108.
Hardjono, Thomas, "Record Encryption in Distributed Databases," Department of Computer Science, University of New South Wales, Jan. 1990, pp. 386-395.

Hardy, N., "The Keykos Architecture," Eighth Edition, Dec. 1990, pp. 1-8.
Harn, Lein, et al., "A Software Authentication System for the Prevention of Computer Viruses," ACM, 1992, pp. 447-.450.
Harris, J., et al., "Bento Specification," Apple Computer, Inc., Jul. 15, 1993, 106 pages.
Harty, K., et al., "Case Study: The VISA Transaction Processing System," May 30, 1988, pp. 1-23.
Hauser, Ralf C., et al., "LTTP Portection—A Pragmatic Approach to Licenseing", Institut fur Informatik, Universitat Zurich, Jan. 13, 1994.
Hauser, Ralf, "Control Information Distribution and Access," Dissertation Der Wirtschaftswissenschaftlichen Fakultat Der Universitat Zurich, May 31, 1995.
Hauser, Ralf, C., "Does Licensing Require New Access Control Techniques?," Institut fur Informatik, Universitat Zurich, Aug. 12, 1993, 9 pages.
Hawk, H.S., "RSA & General Magic," email to Good Guys, Jan. 6, 1994, 1 page.
Herzberg, Amir, et al., "On Software Protection", Proceedings of the 4th Jerusalem Conference on Information Technology (JCIT), IEE Computer Society Proes., Apr. 1984.
Hewlett-Packard Chooses RSA, RSA Security News, dated Jan. 12, 1994, pp. 1-2.
Hickman, Kipp, E.B., SSL 2.0 Protocol Specificatoin.
Hilgraeve Ships Secure Version of HyperACCESS/5, RSA Security News, dated Jan. 12, 1994, pp. 1-2.
Hill, William et al., "Edit Wear and Read Wear," Computer Graphics and Interactive Media Research Group, ACM; May 3-7, 1992.
Hill, William et al., "History-Enriched Digital Objects," Computer Graphics and Interactive Media Research Group; Bell Communications Research, 1993.
History of Computer Security: Early Computer Security Papers, Part 1, National Institute of Standards and Technology, Sep. 4, 2002, viewed at pp. 1-27.
Hoffman, L.J., Modern Methods for Computer Security and Privacy, Prentice-Hall, Inc., 1977.
Hohl, F., "Time Limited Blackbox Security: Protecting Mobile Agents from Malicious Hosts," Lecture Notes in Computer Science, vol. 1419: Mobile Agents and Security, Springer-Verlag, 1998, G. Vigna Ed., pp. 90-111.
Holsinger, E., How Music and Computers Work, Ziff-Davis Press, 1994.
Holzner, S., Heavy Metal OLE 2.0 Programming, IDG Books Worldwide, Inc., 1994.
Honeyman, P., "Digest of the First UNSENIX Workshop on Electronic Commerce (EC 95)," Jul. 1995.
Horster, P., Communications and Multimedia Security II, Chapman & Hall, 1996.
Hsiao, D., et al., Computer Security, Academic Press, Inc., 1979.
Hutt, A.E., et al., Computer Security Handbook Second Edition, Macmillan Publishing Company, 1988, pp. 201-217.
IBM Cryptolope Technology-Executive Summary, IBM, viewed on Mar. 13, 2002 pp. 1-3.
Identification Cards-Financial Transaction Cards, ISO 7813, 1987.
Imprimatur News, imprimatur, Dec. 1998.
Information Infrastructure Standards Panel: NII "The Information Superhighway," NationsBank—HGDeal—ASC X9, (undated), 15 pages.
Interchange Message Specification for Debit and Credit Card Message Exchange Among Financial Institutions, American National Standard, Accredited Standards Committee X9-Financial Services Committee, ANSI X9.2-1988, American Bankers Association, May 16, 11.
International Infrastructure Standards Panel, "IISP Need #31-Containers or Secure Packaging," Electronic Publishing Research, Sep. 18, 1995, pp. 1-3.
International Infrastructure Standards Panel, "IISP Need #32-Authentication of Content," Electronic Publishing Research, Sep. 18, 1995, pp. 1-3.
International Infrastructure Standards Panel, "IISP Need #33-Control Enforcement," Electronic Publishing Research, Sep. 18, 1995, pp. 1-3.
International Infrastructure Standards Panel, "IISP Need #34-Billing and Payment," Electronic Publishing Research, Sep. 18, 1995, pp. 1-3.
International Infrastructure Standards Panel, "IISP Need #35-Reporting," Electronic Publishing Research, Sep. 18, 1995, pp. 1-3.
International Standard ISO8583, "Bank Card Originated Messages—Interchange Message Specifications—Content for Financial Transactions," International Organization for Standardization, Aug. 15, 1987, pp. 1-33.
Internet Billing Server, Carnegie Mellon University, Prototype Scope Document, INI Tech Report, Oct. 14, 1993, pp. 1-29.
Introduction to Smart Cards v. 1.0, Gemplus Card Internatioal, Mar. 21, 1991.
iOpener, Registered Trademark of National Semiconductor Corporation, Registration date Oct. 4, 1994, 1 page.
iOpener, U.S. Patent and Trademark Prosecution History for National Semiconductor Corporation, Registration date, Oct. 4, 1994, 27 pages, TULIP Final Report.
iPower's Data Security Approach, RSA Security News, dated Jan. 12, 1994.
"iPower Technology," National Semiconductor, (undated), 11 pages.
Jaeger, T, et al., "Support for the File System Security Requirements of Computational E-Mail Systems," Nov. 1994, ACM 0-89791-732-4/94/0011, 9 pages.
Johnson, H.L., et al., "A Secure Distributed Capability Based System," ACM, 1985, pp. 392-402.
Johnson, R., "Info on Telescript," 1994 Software Agents List Archieve, Dec. 6, 1994, pp. 1-4.
Jones et al., "Credentials for Privacy and Interoperation," University of Illinois at Urbana-Champaign.
JUKEBOX-Music Across Borders, LIB-JUKEBOX/4-1049.
Kahn, D., The Codebreakers: The Story of Secret Writing, The Macmillan Company, 1967.
Kahn, R., et al., A Framework for Distgributed Digital Object Services, Corporation for National Research Initiatives, May 13, 1995.
Kaliski, Jr., et al. "A Layman's Guide to a Subset of ASN.1, BER, and DER", RSA Laborato4ries Technical Note, 1991, Revised Nov. 1, 1993.
Kamens, J.I., "Retrofitting Network Security to Third-Party Applications-The SecureBase Experience," Symposium Proceedings, Unix Security IV, Oct. 4-6, 1993, Santa Clara, California, pp. 41-57.
Kaner, Cem et al., Testing Computer Software, Second Edition, Van Nostrand Reinhold, 1988.
Kaplan, M., "IBM Cryptolopes, Super Distribution and Digital Rights Management," Dec. 30, 1996, pp. 1-10.
Karger, P.A., et al., "A VMM Security Kernel for the VAX Architecture," CH2884-5/90/0000/0002, IEEE 1990, pp. 2-19.
Karger, P.A., et al., "Multics Security Evaluation: Vulnerability Analysis," HQ Electronic Systems Division, Hanscom AFB, Technical Report 19, Jun. 1974, 14 pages.
Kastenholz, F., "The Definitions of Managed Objects for the Security Protocols of the Point-to-Point Protocol," Network Working Group RFC 1472, Jun. 1993.
Katzan, Harry, Jr., Computer Data Security, Litton Educational Publishing Company, 1973.
Keefe, T.F., et al., "Prototyping the SODA Security Model," Department of Computer Science, University of Minnesota, 1990, pp. 211-235.
Kelman, Alistair, "Electronic Copyright Management: Possibilities and Problems", Scientists for Labor Presentation, Nov. 14, 1996.
Kelter, U., "Discretionary Access Controls in a High-Performance Object Management System," 1991 IEEE Computer Society Symposium on Research in Security and Privacy, May 20-22, 1991, Oakland, California, pp. 288-299.
Kelter, U., et al., "Type Level Access Controls for Distributed Structurally Object-Oriented Database Systems," Computer Security, ESCORICS 92, Second European Symposium on Research in Computer Security, Toulouse, France, Nov. 23-25, 1992, pp. 21-40.
Kent, S., et al., "Privacy Enhancement for Internet Electronic Mail: Part II—Certificate-Based Key Management," Network Working Group, Aug. 1989, pp. 1-22.

Kent S.T., "U.S. Department of Defense Security Options for the Internet Protocol," Network Working Group RFC 1108, Nov. 1991.
Ketchpel, Steve P., et al. "Shopping Models: A Flexible Architecture for Information Commerce", Stanford University.
Key Cryptolope Components, IBM, viewed on Mar. 13, 2002 pp. 1-2.
Key Management (retail)—Part I: Introduction to Key Management; Part II: Key Management Techniques for Symmetric Ciphers, ISO 11568-1 and -2, Dec. 1, 1994.
Key Management Using ANSI X9.17, Federal Information Processing Standards Publication 171, U.S. Department of Commerce, Apr. 1992.
KeyKOS Principles of Operation, Key Logic document KL002-04, 1985, Fourth Edition, Jan. 1987.
Kim, G.H., et al. "Experiences with Tripwire: Using Integrity Checkers for Intrusion Detection," Purdue Technical Report CSD-TR-94-012, Feb. 21, 1994.
Kim, G.H., et al., "The Design and Implementation of Tripwire: A File System Integrity Checker," Nov. 19, 1993.
Kim, L., et al., "Novell Cuisine," Proceedings of the ACM SIGUCCS User Services Conference XIX, Nov. 3-6, 1991, Seattle, Washington, pp. 183-184.
Kim, W., et al., "Features of the ORION Object-Oriented Database System," 1989, pp. 251-282.
Kim, W., et al., "Object-Oriented Concepts, Databases, and Applications," ACM Press, 1989.
Klemond, P., "Investigating Object Linking and Embedding, Part II: Adding Server Support," Microsoft Systems Journal, May/Jun. 1992, pp. 87-94.
Klemond, P., "Taking the Bull by the Horns: Investigating Object Linking and Embedding, Part I," Microsoft Systems Journal, Mar./Apr. 1992, pp. 19-38.
Kluepfel, H.M., "Securing a Global Village and its Resources: Baseline Security for Interconnected Signaling System #7 Telecommunications Networks," 1993, pp. 195-212.
Koenig, A., "Automatic Software Distribution," Usenix Association Software Tools Users Group, Summer Conference, Salt Lake City, Jun. 12-15, 1984, pp. 312-322.
Kohl, J.T., et al., "The Evolution of the Kerberos Authentication Service," Digital Equipment Corporation, 1991, pp. 1-15.
Konheim, Alan, G., et al.,Cryptography: A Primer, John Wiley & Sons, Inc., 1981.
Krajewski, Jr., M., "Applicability of Smart Cards to Network User Authentication," Computing Systems, vol. 7, No. 1, Winter 1994, pp. 75-89.
Krajewski, Jr., M., "Smart Card Augmentation of Kerberos," The Mitre Corporation, (undated), 6 pages.
Krajewski, Jr., M., et al., "Concept for a Smart Card Kerberos," The Mitre Corporation, (undated), 7 pages.
Kramer, M., "Strength in Numbers," PC Week, Jul. 22, 1986, pp. 57-58.
Kreutzer, A.N., "An On-Line System for Controlling and Monitoring Software Usage in a Microcomputer Laboratory," SIGUCCS Newsletter, vol. 18, No. 2, 1988, pp. 29-32.
Krol, E., The Whole Internet User's Guide and Catalog, 2nd. Ed., O'Reilly & Associates, Inc., 1992.
Kurak, C., et al., "A Cautionary Note On Image Downgrading," Proceedings of the 1992 Computer Security Applications Conference, San Antonio, TX, Dec. 1992, 7 pages.
Lacy, Jack, et al., "Music on the Internet and the Intellectual Property Protection Problem".
Lagoze et al., "A Design for Inter-Operable Secure Object Stores (ISOS)," Cornell University, NCSA, CNRI, Nov. 1995.
Lagoze, Carl, "A Secure Repository Design for Digital Libraries", D-Lib Magazine, Dec. 1995.
LaLonde Wilf, R., et al., Inside Smalltalk: vol. 1, Prentice-Hall, Inc., 1990.
Lampson, B.W., "A Note on the Confinement Problem," Communications of the ACM, Oct. 1973, pp. 1-5.
Lampson, B.W., "Computer Security," Digital Equipment Corporation, 1991, pp. 1-54.
Lampson, Butler, et al., "Authentication in Distributed Systems: Theory and Practice," ACM Trans. Computer Systems, vol. 10, No. 4, Nov. 1992, 46 pages.
Landwehr, C.E, et al., "A Taxonomy of Computer Program Security Flaws," ACM Computer Surveys, vol. 26, No. 3, Sep. 1994, pp. 211-254.
Landwehr, C.E., "Formal Models for Computer Security," Computer Surveys, vol. 13, No. 3, Sep. 1981, pp. 247-278.
Langelaar, G.C. "Overview of Protection Methods in Existing TV and Storage Devices," SMS-TUD-609-1, Final Ver. 1,2, Feb. 26, 1996.
Leary, P., "Are There Ciphers in Shakespeare?," 1995, pp. 1-18.
Lehman, B., "Intellectual Property and the National Information Infrastructure, A Preliminary Draft of the Report of the Working Group on Intellectual Property Rights," Jul. 1994, 4 introductory pages and pp. 1-141.
Leiss, E., "On Authorization Systems with Grantor-Controlled Propagation on Privileges," Compcon 83, Feb. 28-Mar. 3, 1983, San Francisco, California, pp. 499-502.
Lesk, M., "Digital Libraries Meet Electronic Commerce: On-Screen Intellectual Property," Dec. 15, 1998.
Levine, P.H., et al., "Network License Server," Apollo, Oct. 1987, pp. 1-19.
Lewontin, S., et al., "The DCE Web Project: Providing Authorization and Other Distributed Services to the World Wide Web," Feb. 22, 2002.
Lin, P., "The Encapsulated Security Services Interface (ESSI)," Computer Security (A-37), 1993, pp. 119-135.
Linn, J., "Privacy Enhancement for Internet Electronic Mail: Part I—Message Encipherment and Authentication Procedures," Network Working Group, Aug. 1989, pp. 1-30.
Lipson, S., "Little Black Box 'Blocks' Illicit Software Copying," Stamford Advociate, Sep. 14, 1986, pp. E1-E2.
Lockhart, Jr., H.W., OSF DCE Guide to Developing Distributed Applications, McGraw-Hill, Inc., 1994.
Lord et al., "Access Management in Multi-Administration Networks," IEE 2nd International Conference on Secure Communication Systems, 1986.
Lunt, Teresa, "Multilevel Security for Object-Oriented Database Systems," SRI International Computer Science Laboratory, 1990, pp. 199-209.
Mach Books, Feb. 6, 2002, pp. 1-3.
Manager's Guide to MPE/iX Security, Hewlett-Packard Company, Apr. 1994.
Mann, C.C., "Homeland Insecurity," Sep. 2002.
Mathy, Laurent, "Features of the ACCOPI Multimedia Transport Service", Lecture Notes in Computer Science, No. 1045, Proc. of European Workshop IDMS' 96, Mar. 1996.
Maude, T., et al., "Hardware Protection Against Software Piracy," Communications of the ACM, vol. 27, No. 9, Sep. 1984, pp. 951-959.
McCloghrie, K., et al., "Definitions of Managed Objects for Administration of SNMP Parties," Network Working Group, Jul. 1992, pp. 1-17.
McCloghrie, K., et al., "Management Information Base for Network Management of TCP/IP-based Internets," Network Working Group, RFC 1156 (May 1990).
McCollum, C.J., et al., "Beyond the Pale of MAC and DAC-Defining New Forms of Access Control,", Unisys Defense Systems, 1990, pp. 190-200.
McGraw, G., et al., Java Security, John Wiley & Sons, Inc., 1997.
Medvinsky, G., et al., "NetCash: A Design for Practical Electronic Currency on the Internet," 1st Conference on Computer and Communication Security, Nov. 1993, pp. 102-106.
Merkle, Ralph C., "Protocols for Public Key Cryptosystems", IEEE, 1980.
Merkle, Ralph C., "Secure Communications Over Insecure Channels," Communications of the ACM, vol. 21, No. 4, Apr. 1978, pp. 294-296.
Meyer, C.H., et al., Cryptography: A New Dimension in Computer Data Security, John Wiley & Sons, Inc., 1982.
Microsoft Authenticode Technology, Microsoft Corporation, Oct. 1996.

Millen, J.K., et al., "Security for Object-Oriented Database Systems," Proceedings of the 1992 IEREE Computer Society Symposium on Research in Security and Privacy, May 4-6, 1992, Oakland, California, pp. 260-272.
Miller, S.P., et al., "Kerberos Authentication and Authorization System," Massachusetts Institute of Technology, Oct. 27, 1998, pp. 1-36.
Minear, S.E., "Providing Policy Control Over Object Operations in a Mach Based System," Secure Computing Corporation, Apr. 28, 1995, 15 pages.
Miscellaneous letter from Georges Van Slype at Bureau Van Dijik, Feb. 28, 1994.
Miscellaneous Letters from Georges Van Slype at Bureau Van Dijk, Apr. 19, 1994, Apr. 18, 1994, Apr. 11, 1994, Apr. 6, 1994.
Miscellaneous Letters from Georges Van Slype at Bureau Van Dijk, Feb. 13, 1995 and Nov. 2, 1994.
Miscellaneous Letters from Georges Van Slype at Bureau Van Dijk, Feb. 9, 1994, Jan. 27, 1994, Jan. 19, 1994, Jan. 12, 1994, Dec. 22, 1993, Nov. 30, 1993, Nov. 22, 1993, Dec. 6, 1993, Nov. 16, 1993, Oct. 15, 1993, Oct. 7, 1993, Oct. 4, 1993, Sep. 20, 1993.
Miscellaneous Letters from Georges Van Slype at Bureau Van Dijk, Mar. 30, 1994, Mar. 24, 1994, Feb. 10, 1994.
Miscellaneous Letters from Georges Van Slype at Bureau Van Dijk, Mar. 30, 1995.
Miscellaneous Letters from Georges Van Slype at Bureau Van Dijk, Sep. 12, 1994, May 11, 1994, May 10, 1994, May 6, 1994, May 4, 1994, Apr. 21, 1994, Apr. 20, 1994.
Moens, Jan, "Case of Application of the Generic CITED Model to the CITEDisation of a Directory Database on CD-ROM, Ver. 2.0," ESPIRIT II, Project 5469, The CITED Consortium, Nov. 30, 1992.
Moens, Jan, "Report on the Users Requirements, Ver. 1.0," ESPIRIT II, Project 5469, The CITED Consortium, Nov. 27, 1991.
Moffett, Jonathan D., "Delegation of Authority Using Domain-Based Access Rules," thesis Imperial College of Science, Technology & Medicine, University of London, Jul. 1990.
Moffett, Jonathan D., "Specification of Management Policies and Discretionary Access Control," Department of Computer Science, University of York, Jun. 28, 1994, pp. 1-28.
Moffett, Jonathan D., et al., "An Introduction to Security Distributed Systems," Department of Computer Science, University of York, England, Aug. 1993, pp. 1-14.
Moffett, Jonathan D., et al., "Policy Hierarchies for Distributed Systems Management," IEEE JSAC Special Issue on Network Management, vol. 11, No. 9, Dec. 1993, pp. 1-4.
Moffett, Jonathan D., et al., "Specifying Discretionary Access Control Policy for Distributed Systems," Computer Communications, vol. 13, No. 9, Nov. 1990, pp. 1-17.
Moffett, Jonathan D., et al., "The Representation of Policies as System Objects," Proceedings of the Conference on Organizational Computer Systems (COCS '91), Atlanta, Georgia, Nov. 5-8, 1991, 16 pages.
Montini, G, et al., "Access Control Models and Office Structures," Computer Security: A Global Challenge, 1984, pp. 473-485.
Motorola MC68030 Enhanced 32-bit Microprocessor User's Manual, 2nd Ed., Prentice-Hall, 1989.
MSDN-INF: LAN Manager 2.1 Server Autotuning (Part2), PSS ID No. 080078, Microsoft, Feb. 1993.
MSDN-Licence Service Application Programming Interface, API Specification v1.02, Micorsoft, Jan. 1993.
Muftic, Sead, Security Mechanisms for Computer Networks, Ellis Horwood Limited, 1989.
Mullender, S., Distributed Systems, ACM Press, 1989.
Multics, Home; viewed on Nov. 12, 2001 pp. 1-3.
Multimedia System Services Ver. 1.0, Hewlett-POackard, IBM, & SunSoft, 1993.
Needham, R.M., "Ading Capability Access to Conventional File Servers," Xerox Palo Alto Research Center, (undated), pp. 3-4.
Neuman B.C., et al. "Kerberos: An Authentication Service for Computer Networks," IEEE Communications magazine, Sep. 1994.
Neuman, B.C., "Proxy-Based Authorization and Accounting for Distributed Systems," Information Sciences Institute, University of Southern California, 1993, pp. 283-291.
Nguyen, Thanh et al., "Guidelines for Validation of a CITED System," CITED 5469, SA-21-40-003, Jul. 4, 1994.
NSA Korean War 1950-1953 Commemoration, History Papers, National Security Agency, pp. 1-2.
O'Connor, MaryAnn, "New Distribution Option for Electronic Publishers," Information Access Co., Mar. 1994, pp. 1-6.
OLE 2.0 Draft Content: Object Linking & embedding, Microsoft, Jun. 5, 1991.
Olivier, M.S. et al., "A Taxonomy for Secure Object-oriented Databases," ACM Transactions on Database Systems, vol. 19, No. 1, Mar. 1994, pp. 3-46.
Olivier, M.S., "A Multilevel Secure Federated Database," Database Security, VIII (A-60), 1994, pp. 183-198.
Olivier, M.S., et al., "Building a Secure Database using Self-protecting Objects," Computers & Security, vol. 11, No. 3, 259-271, 1992.
Olson, M.S., et al., "Concurrent Access Licensing," vol. 6, No. 9, Unix Review, 1988, pp. 67-74.
OMG Security Working Group, "OMG White Paper on Security," OMG Security Working Group, Apr. 1994, pp. 1-24.
OOPSLA 1993: Addendum to the Proceedings, "Security for Object-Oriented Systems," Sep. 26-Oct. 1, 1993, pp. 77-78.
Open Systems Interconnection: Security Architecture, ISO 7498/1, 1988.
Open Systems Interconnection: Security Architecture, ISO 7498/2, 1988.
OpenDoc vs. OLE 2.0: Superior by Design, IBM, Jan. 1994, pp. 1-4.
Orfali, R., et al., The Essential Distributed Objects Survival Guide, John Wiley & Sons, Inc., 1996.
Organick, E.I., The Multics System: An Examination of Its Structure, MIT Press, 1972.
OSF DCE Administration Guide-Core Components, Open Software Foundation, PTR Prentice Hall, 1993.
Paepcke, Andreas, "Summary of Stanford's Digital Library Testbed and Status," Stanford University, D-Lib Magazine, Jul. 1996.
Paradinas, Pierre et al., "New Directions for Integrated Circuit Cards Operating Systems.".
Park, J.S., AS/400 Security in a Client/Server Environment, John Wiley & Sons, Inc., 1995.
Payment Systems; Strategic Choices for the Future, Hitatchi Research Institute; Institute of Advanced Business Systems, Hitachi, Ltd., 1993.
Perlman, Bill, "A Working Anti-Taping System for Cable Pay-Per-View," IEEE Trans. On Consumer Electronics, vol. 35, No. 3, Aug. 1989.
Personal Identification Number (PIN) management and security—Part I: Basic Principles and Requirements for online PIN Handling in ATM and POS Systems; & -2 Approved Algorithm(s) for PIN Encipherment, ISO 9564-1 & -2, (Apr. 15, 2002 & Dec. 15, 1991.
Pethia et al., "Guidelines for the Secure Operation of the Internet," Network Working Group, RFC 1281, Nov. 1991.
Picciotto, J., et al., "Extended Labeling Policies for Enhanced Application Support," Computers & Security, vol. 13, No. 7, 1994, pp. 587-599.
Pietreck, M., Windows Internals: The Implementation of the Windows Opeartion Environment, Addison-Wesley, 1993.
Pijenborg, Mari F.J., "Auteursrecht En De Digitale Bibliotheek," 195 Open, Jan. 1995.
Pijnenborg, Mari F.J., "CITED Final Report," Elsevier Science B.V., Apr. 1994.
PKCS #1:RSA Encryption Standard, RSA Laboratories Technical Note, Ver. 1.5, revised Nov. 1, 1993.
PKCS #10: Certification Request Syntax Stanard, An RSA Laboratories Technical Note, Ver. 1.0, Nov. 1, 1993.
PKCS #11: Cryptographic Token Interface Standard, An RSA Laboratories Technical Note, Ver. 2.0, Apr. 15, 1997.
PKCS #12 v 1.0: Personal Information Exchange Syntax, RSA Laboratories, Jun. 24, 1999.
PKCS #13: Elliptic Curve Crytography Standard, RSA Security, Jan. 12, 1998.
PKCS #15 v 1.0: Cryptographic Token Information Format Standard, RSA Laboratories, Apr. 23, 1999.

PKCS #3: Duffie-Hellman key-Agreement Standard, RSA Laboratories Technical Note, Ver. 1.4, revised Nov. 1, 1993.
PKCS #5: Password-Based Encryption Standard, An RSA Laboratories Technical Note, Ver. 1.5, 1991-1993, Revised Nov. 1, 1993.
PKCS #6: Extended-Certificate Syntax Standard, RSA Laboratories Technical Note, Ver. 1.5, revised Nov. 1, 1993.
PKCS #8: Private-Key Information Syntax Standard, An RSA Laboratories Technical Note, Ver. 1.2, 1991-1993, Revised Nov. 1, 1993.
PKCS #9: Selected Attribute Types, RSA Laboratories Technical Note, Ver. 1.1, revised Nov. 1, 1993.
Polk, T.W., "Approximating Clark-Wilson "Access Triples" with Basic UNIX Controls," Symposium Proceedings, Unix Security IV, Oct. 4-6, 1993, Santa Clara, California, pp. 145-154.
Popek, Gerald, J., et al., "Encryption and Secure Computer Networks," Computing Surveys, vol. 11, No. 4, Dec. 1979, pp. 331-356.
Press, Jim, "Secure Transfer of Identity and Privilege Attributes in an Open Systems Environment," Computers & Security, vol. 10, No. 2, 1991, pp. 117-127.
Press, Jim, et al, "A New Approach to Cryptographic Facility Design", ICL Mid-Range Systems Division Reading, Berks, UK.
Privacy and the NII: Safeguarding Telecommunications—Related Personal Infrmation, U.S. Dept. of Commerce, Oct. 1995.
Purdy, G.B., et al., "A Software Protection Scheme," Proceedings of the 1982 Symposium on Security and Privacy, Apr. 26-28, 1982, Oakland California, pp. 99-103.
Rashid, R.F., CMU Computer Science: A 25th Anniversary Commemorative, Addison-Wesley Publishing Company, 1991.
Reali, Patti, "Copy Protection: The answer to pay per view's Prayers?," TVRO Dealer, Dec. 1994.
Reiher, et al., "Truffles—A Secure Service for Widespread File Sharing," UCLA, Trusted Information Systems.
Reiher, et al., "Truffles—Secure File Sharing With minimal system Administrator Intervention," UCLA, Trusted Information Systems.
Request for Technology: Multimedia System Services, Ver. 2.0, Interactive Multimedia Association Compatibility Project, Nov. 9, 1992.
Request for Technology: Multimedia System Services, Draft, Ver. 1.1, Interactive Multimedia Association Compatibility Project, Oct. 16, 1992.
Requirements for the Software License Management System, System Management Work Group, Rev. 3, Unix International, Jul. 23, 1992.
Rescorla, E., et al., "The Secure HyperText Transfer Protocol," Enterprise Integration Technologies, Jun. 1994, pp. 1-23.
Richardson, D.W., Electronic Money: Evolution of an Electronic Funds-Transfer System, The MIT Press, 1970.
Rindfrey J., "Security in the World Wide Web," Fraunhofer Institute for Computer Graphics, Dec. 1996.
Rindfrey, Jochen, "Towards an Equitable System for Access Control and Copyright Protection in Broadcast Image Services; The Equicrypt Approach," Fraunhofer Institute for Computer Graphics.
Rivest, Ronald L., "The MD5 Message-Digest Algorithm," Network Working Group, Apr. 1992, pp. 1-21.
Rivest, Ronald L., et al., "A Method for Obtaining Digital Signatures and Public-Key Cryptosystems," Communications of the ACM, vol. 21, No. 2, Feb. 1978, pp. 120-126b.
Rivest, Ronald L., et al., "SDSI—A Simple Distributed Security Infrastructure", MIT and Microsoft Corporation, Apr. 30, 1996.
Roberts, R., et al., Compute!'s Computer Security, Compute! Publications, Inc., 1989.
Robinson et al., "Encoding Header Field for Internet Messages," Network Working Group RPC 1154, Apr. 1990.
Rose et al., "Structure and Identification of management Information for TCP/IP-based Internets," Network Working Group RFC 1155, May 1990.
Rosenberry, W., et al., "Distributing Applications Across DCE and Windows NT," 1993.
Rosenberry, W., et al., Understanding DCE, O'Reilly & Associates, Inc., 1992.
Rosenthal, Doug, "EINet: A secure, Open Network for Electronic Commerce", IEEE, 1994.
Ross, P.E., "Cops versus robbers in cyberspace," Forbes, Sep. 9, 1996.
Rouaix, F., "A Web Navigator with Applets in Caml," INRIA.
Rozenblit, Moshe, "Secure Software Distribution", IEEE 0-7803-1811-0/94, 1994.
RSA Enters Wireless Arena, RSA Security News, dated Jan. 12, 1994, pp. 1-2.
RSA Security; News; dated Jan. 12, 1994, pp. 1-2.
RSA's Developer's Suite Electronic transactions (SET), S/PAY, RSA Data Security, Inc., 1997.
Rubin et al., "Formal Methods for he Analysis of Authentication Protocols CITI Technical Report 93-7," Center Information Technology Integration, Nov. 8, 1993.
Rubin et al., "Long Running Jobs in an Authenticated Environment," CITI Technical Report 93-1, Center for Information Technology Integration, Mar. 1993.
Rubin, A.D., "Trusted Distribution of Software Over the Internet," Bellcore, 1995, pp. 1-9.
Rucker, et al., "Personalized Navigation for the Web," Communications of the ACM, pp. 73-75, Mar. 1997.
Rushby, J.M., "Design and Verification of Secure Systems," ACM, 1981, pp. 12-21.
Russell, D., et al., Computer Security Basics, O' Reilly & Associates, Inc., 1991.
Russell, S., "Paradigms for Verification of Authorization at Source of Electronic Documents in an Integrated Environment," Computers & Security, vol. 12, No. 6, 1993, pp. 542-549.
Russell, S., "Planning for the EDI of Tomorrow Using Electronic Document Authorization," Computer Security (A-37), 1993, pp. 243-251.
Sammer et al., "New Tools for the Internet," Jeanneum Research, Graz University of Technology.
Sander, T. et al., "Protecting Mobile Agents Against Malicious Hosts," Mobile Agents and Security: Lecture Notes in Computer Science, Springer-Verlag, G. Vigna, Ed., vol. 1419, Nov. 11, 1997, 16 pages.
Sander, T. et al., "Towards Mobile Cryptography," IEEE Proceedings of Security and Privacy, May 1998, 10 pages.
Sandhu, Ravi S., "The Typed Access Matrix Model," Proceedings of the IEEE Symposium on Security and Privacy, Oakland California, May 4-6, 1992, pp. 122-136.
Sandhu, Ravi S., et al., "A Secure Kernelized Architecture for Multilevel Object-Oriented Databases," Proceedings of the IEEE Computer Security Foundations Workshop IV, Jun. 1991, Franconia, NH, pp. 139-152.
Sandhu, Ravi S., et al., "Data and Database Security and Controls," Handbook of Information Security Management, Auerbach Publishers, 1993, pp. 1-37.
Sandhu, Ravi, S., et al., "Implementation Considerations for the Typed Access Matrix Model in a Distributed Environment," Proceedings of the 15th NIST-SCSC National Computer Security Conference, Baltimore, Maryland, Oct. 1992, pp. 221-235.
Saydjari, O.S., et al., "LOCK Trek: Navigating Unchartered Space," National Computer security Center, 1989, pp. 167-175.
Schaumüller-Bichl, S., "IC-Cards in High-Security Applications," Voest-Alpine AG, (undated), pp. 177-199.
Schill, A.B., et al., "DC++: Distributed Object-Oriented System Support on top of OSF DCE," 1993.
Schill, A.B., et al., "DCE—The OSF Distributed Computing Environment Client Server Model and Beyond," Oct. 1993.
Schill, A.B., et al., "Mobility Aware Multimedia X. 400 e-mail: A Sample Application Based on a Support Platform for Distributed Mobile Computing," Dresden University of Technology, Faculty of Computer Science, (undated), pp. 1-7.
Schneier, B., "Description of New Variable-Length Key, 64-bit block cipher (Blowfish)," Fast Software Encryption, Cambridge Security Workshop Proceedings, 1994.
Schneier, Bruce, Applied Cryptography: Protocols, Algorithms, and Source Code in C, John Wiley & Sons, Inc., 1994.
Schulze, Dr. J., "Case of Application of the Generic CITED Model to the CITEDisation in the Software Distribution Process," ESPIRIT II, Project, Jan. 12, 1993.

Schutzer, D., "A Need for a Common Infrastructure: Digital Libraries and Electronic Commerce," Citibank, D-Lib Magazine, Apr. 1996.
Sebes, E.J., "Overview of the Architecture of Distributed Trusted Mach," (undated), pp.1-10.
Sebes, E.J., et al., "The Architecture of Triad: A Distributed, Real-Time, Trusted System," (undated), pp. 1-12.
Sebes, E.J., et al., "The Triad System: The Design of a Distributed, Real-Time, Trusted System," (undated), pp. 1-12.
Secure Cryptographic Devices (retail)—Part I: Concepts, Requirements and Evaluation Methods, ISO 13491-1, Jun. 15, 1998.
Security Enhanced LINUX, National Security Agency, http://www.nsa.gov/selinux/, pp. 1-2.
Security in KeyKOS.
Security Requirements for Cryptographic Modules, U.S. Department of Commerce (NIST), Jan. 11, 1994, pp. 1-53.
Shaffer, S.L., et al., Network Security, Academic Press, Inc., 1994.
Shirley, J., "Guide to Writing DCE Applications," 1st Ed. 1992.
Shirley, J., et al., "Guide to Writing DCE Applications," 2nd Ed. 1994.
Short, K.L., Microprocessors and Programmed Logic, Prentice-Hall, Inc., 1981.
Sibert, Olin, et al., "The Intel 80×86 Processor Architecture: Pitfalls for Secure Systems," (undated), 12 pages.
SIGSALY Secure Digital Voice Communications in World War II, National Security Agency, Oct. 13, 2000, pp. 1-2.
Simon et al., "Digital Images Protection Management in a Broadcast Framework: Overview/TALISMAN Solution," Thomson—CSF, RTBF,ART3000, UCL.
Sirbu et al., "NetBill: An Internet Commerce System Optimized for Network Delivered Services," Carnegie Mellon University.
Smart Card 1993 Conference Proceedings, "Day 1: Communications and Marketing Systems & Market Overview," Lowndes Exhibition Organisers, Ltd., 1993, pp. 1-79.
Smart Card Technology International: The Global Journal of Advanced Card Technology, Global Projects Group, undated, pp. 1-151.
Smith, Mary Grace, et al., "A New Set of Rules for Information Commerce: Rights-Protection Technologies and Personalized-Information Commerce Will Affect All Knowledge Workers", CommunicationsWeek, Nov. 6, 1995.
Solomon, A., PC Viruses: Detection, Analysis and Cure, Springer-Verlag, (undated).
Solomon, Daniel, J., "Processing Multilevel Secure Objects," Proceedings of the 1981 Symposium on Security and Privacy, Apr. 27-29, 1981, Oakland, California, pp. 56-61.
Specification for Financial Message Exchange Between Card Acceptor and Acquirer, X9.15, American National Standard, American Banker's Association, 1990.
SSL 2.0 Protocol Specification, Jan. 23, 2003.
St. Johns, M., "Draft Revised IP Security Option", Network Working Group, RFC, 1038, Jan. 1998.
Stallings, W., Cryptography and Network Security: Principles and Practice, Prentice-Hall, Inc., 1999.
STARFISH State of the Art Financial Services for the in Habitants of Isolated Areas—Project Profile, Information Society technologies, time schedule, Jan. 21, 2000-Jun. 30, 2002.
Stepney et. al., "Formal specification of an Access Control System," Software-Practice and Experience, vol. 17, No. 9, 1987.
Strack, Hermann, "Extended Access Control in UNIX System V-ACLs and Context," Usenix Association, Proceedings of the Unix Security II Workshop, Aug. 27-28, 1990, Portland, Oregon, pp. 87-101.
Stubblebine, S.G., "Security Services for Multimedia Conferencing," Proceedings of the 16th National Computer Security Conference, Baltimore, Maryland, Sep. 20-23, 1993, pp. 1-5.
Swedlow, Tracy, "2000: Interactive Enhanced Television: A Historical and Critical Perspective," Interactive TV Today.
TALISMAN: Tracing Authors' Rights by Labeling Image Services and Monitoring Access Network, ACTS, Swiss Participation in European Research Programs, Sep. 1, 1995, Aug. 31, 1998.
Tanenbaum, A.S., et al., "Amoeba System," Communications of the ACM, vol. 33, No. 12, Dec. 1990.
Tanenbaum, A.S., et al., "Distributed Operating Systems," Computing Surveys, vol. 17, No. 4, Dec. 1985, pp. 419-470.
Tanenbaum, A.S., et al., "Experiences with the Amoeba Distributed Operating System," Vrije Universiteit and Centrum voor Wiskunde en Informatica, 1990.
Tanenbaum, A.S., et al., "The Amoeba Distributed Operating System," 1990.
Tanenbaum, A.S., et al., "The Amoeba Distributed Operating System-A Status Report," 1991.
Tanenbaum, A.S., et al., "Using Sparse Capabilities in a Distributed Operating System," Vrije Universiteit and Centre for Mathematics and Computer Science.
Tanenbaum, A.S., Modern Operating Systems, Prentice-Hall, Inc. 1992.
Tanenbaum, A.S., Operating Systems: Design and Implementation, Prentice-Hall, Inc. 1987.
Tardo et al., "Mobile Agent Security and Telescript," General Magic, Inc.
Technical Description: Pay-Per-View Copy Protection, Macrovision, Jun. 1994.
Technical Rationale Behind CSC-STD-003-85: Computer Security Requirements, Jun. 25, 1985, pp. 1-40.
Technical Strategies for Protecting Intellectual Property in the Networked Multimedia Environment, IMA Intellectual Property Proceedings, vol. I, Issue 1, Jan. 1994.
TELENET TELEtraining Platform (on NETworks)—Project Profile, Information Society Technologies time schedule Mar. 6, 2000-Mar. 30, 2000.
The Armide Products, web page.
The First USENIX Workshop on Electronic Commerce Proceedings, New York, New York, Jul. 11-12, 1995, Usenix Association.
The Future of Cited: A Feasibility Study, ESPIRIT II, Project 5469, CITED Project Review, Apr. 15, 1994.
The PowerTV White Paper, powertv.com website, Oct. 11, 1996.
The Risks Digest, "Forum on Risks to the Public in Computers and Related Systems," vol. 15; Issue 39, Jan. 21, 1994, pp. 1-12.
The Risks Digest, "Forum on Risks to the Public in Computers and Related Systems," vol. 15; Issue 47, Feb. 9, 1994, pp. 1-12.
The Standard Business:Time for Change, European Commision DG111 Espirit Project 5th Consensus Forum, Nov. 3-4, 1998.
Think C: Object-Oriented Programming Manual, Symantec Corporation, 1989.
THINK Pascal: The Fastest Way to Finished Software, Symantec Corporation, 1990, pp. 93-123.
Thomas, R.K., et al., "Implementing the Message Filter Object-Oriented Security Model without Trusted Subjects," Proceedings of the IFIP Workshop on Database Security, Aug. 19-21, 1992, Vancouver, Canada, 21 pages.
Thompson, Victoria P., et al., "A Concept for Certification of an Army MLS Management Information System", Proceedings of the 16th National Computer Security Conference, Sep. 20-23, 1993.
Thor, "A Distributed Object-Oriented Database System," MIT.
Thuraisingham, M.B., "Mandatory Security in Object-Oriented Database Systems," OOPSLA '89 Proceedings, Oct. 1-6, 1989, pp. 203-210.
Thuraisingham, M.B., et al., "Parallel Processing and Trusted Database Management Systems," ACM, 1993.
Ting, T.C., et al., "Requirements, Capabilities and Functionalities of User Role Based Security for an Object-Oriented Design Model," Database Security, V: Status and Prospectus, 1992, pp. 275-297.
Tirkel, A.Z. et al., "Electronic Water Mark," (undated), 5 pages.
Toohey, J., Using OLE 2.X in Application Development, Que Corporation, 1994.
Townsend, J.E., "NIST on Internet Security," Mar. 22, 1994, pp. 1-15.
Trusted Unix Working Group (TRUSIX) Rationale for Selecting Access Control List Features for the UNIX (R) System, National Computer Security Center, Aug. 18, 1989.
Tuck, Bill, "Electronic Copyright Management Systems: Final Report of a Scoping Study for Elib," Jul. 1996.
TULIP Final Report, ISBN 0-444-82540-1, 1991, revised Sep. 18, 1996.

Uhler, Stephen A., "PhoneStation, Moving the Telephone onto the Virtual Desktop," 1993 Winter USENIX, San Diego, California, Jan. 25-29, 1993, pp. 131-140.
UniverCD: The InterActive, Online Library of Product Information From Cisco Systems, Cisco Systems 1993.
Unix System v. Release 3.2. Programmer's Guide. vol. II, AT&T, Prentice Hall, 1989.
van Gilluwe, F., The Undocumented PC: A Programmer's Guide to I/O, Cpus, and Fixed Memory Areas, Addison-Wesley Publishing Company, 1994.
van Schyndel, R.G., et al., "A Digital Watermark," (undated), 3 pages.
Van Slype, Georges et al, "The Future of CITED; a Feasibility Study," ESPRIT II, Project 5469, The Cited Consortium, Nov. 15, 1993.
Van Slype, Georges et al., "Natural Language Version of the Generic CITED Model, Ver. 4.2, vol. I: Presentation of the Generic Model," ESPRIT II, Project 5469, The CITED Consortium, May 8, 1995.
Van Slype, Georges et al., "The Future of CITED: A Feasibility Study, Ver. 1.0, vol. II: Full Report," ESPRIT II, Project 5469, The CITED Consortium, Feb. 28, 1994.
Van Slype, Georges, "Draft CITED Interchange Formats, Ver. 1.0", ESPRIT II, Project 5469, the CITED Consortium, Jan. 28, 1994.
Van Slype, Georges, "Knowledge Economy; Future Trends," CITED 5469.
Van Slype, Georges, "Natural Language Version of the generic CITED model vol. I: Presentation of the generic model, ver. 3.0", and "vol. II: CITED usage monitoring system design for computer based applications, ver. 1.0" Project 54659, The CITED Consortium.
Van Slype, Georges, "Natural Language Version of the Generic CITED Model, Ver. 2.1, vol. II ECMS (Electric Copyright Management System) Design for Computer Based Applications," ESPIRIT II, Project 5469, The CITED Consortium, May 8, 1995.
Van Slype, Georges, "PL4 RACE/ACCOPI Workshop on Conditional Access and Copyright Protection," ESPRIT II, Project 5469, Presentation of the CITED, Nov. 9, 1994.
Van Slype, Georges, "PL4 RACE/ACCOPI Workshop on Conditional Access and Copyright Protection," ESPRIT II, Project 5469, The CITED Consortium, Nov. 9, 1994.
Van Slype, Georges, "The CITED Approach, Ver. 4.0," ESPRIT II, Project 5469, The CITED Consortium, Apr. 20, 1994.
Van Slype, Georges, "The Future of CITED: A Feasibility Study, Ver. 1.0, vol. I: Summary Report and and Recommendations," ESPRIT II, Project 5469, The CITED Consortium, Feb. 28, 1994.
Van Slype, Georges, "The Future of CITED: A Feasibility Study, Ver. 1.1, vol. I: Summary Report and Recommendations," ESPRIT II, Project 5469, The CITED Consortium, Mar. 28, 1994.
Van Slype, Georges, "The Future of CITED: A Feasibility Study, Ver. 1.1, vol. III: Draft CITED Interchange Formats," ESPRIT II, Project 5469, The CITED Consortium, Feb. 28, 1994.
Vickers Benzel, T.C., et al., "Identification of Subjects and Objects in a Trusted Extensible Client Server Architecture," (undated), pp. 1-17.
Vittal, J., "Active Message Processing: Messages as Messengers," Bolt, Beranek and Newman, Inc., 1980, pp. 175-195.
Voydock, V.L., et al., "Security Mechanisms in High-Level Network Protocols," Computing Surveys, vol. 15, No. 2, Jun. 1983, pp. 135-171.
Wagner, N. "Fingerprinting," Drexel University, IEEE Symp. On Info. and Privacy, Apr. 1993.
Walker, Bruce, J., et al., Computer Security and Protection Structures, Dowden, Hutchinson, & Ross, Inc., 1977.
Walker, S., "Notes from RSA Data Security Conference," Jan. 18, 1994. pp. 1-3.
Ware, W., Chairman RAND Corporation "Panel: The InterTrust Commerce Architecture," 1997, 6 pages.
Wayner, P., "Agents Away," Byte.com, May 1994, pp. 1-9.
Wayner, Peter, Digital Copyright Protection, Academic Press, 1997.
Weadon, P.D., "The SIGSALY Story," Dec. 10, 2002.
Wells, Rob, Odyssey of Plastic Purchase; 20-Second Round Trip, Associated Press, Dec. 1993.
White, James E., "Telescript: The Foundation for the Electronic Marketplace", Ver. 5.0, General Magic, Inc., Nov. 30, 1993, pp. 1-13.
White, Steve R., et al., "ABYSS: An Architecture for Software Protection", IEEE Transactions on Software Engineering, vol. 16, No. 6, Jun. 1990.
Willett, S., "Metered PCs: Is Your System Watching You?, Wave Systems Beta Tests New Technology," IDG Communications, Inc., May 2, 1994, pp. 1-6.
Williams, S., "An MSJ Interview with Microsoft's Chief Architect of OLE, Tony Williams," Microsoft Systems Journal, Oct. 1993, pp. 55-66.
Williams, Tony, "Microsoft Object Strategy", Microsoft PowerPoint Presentation, 1990.
Winslet et al., "Formal Query Languages for Secure Relational Databases," ACM Transactions on Database Systems, vol. 19, No. 4, Dec. 1994.
Wong, R., et al., "The SIDOS System: A Secure Distributed Operating System Prototype," Odyssey Research Associates, Oct. 1989, pp. 172-183.
Woo, Thomas, Y.C., et al., "A Framework for Distributed Authorization," Proceedings of the 1st Conference Computer and Communication Security, Nov. 1993, pp. 112-118.
Wood, P.H., et al., UNIX System Security, Pipline Associates, Inc., 1985.
Working with Windows Objects, Microsoft Press, OLE 2 Programmer's Reference; vol. 1, 1994.
Yee, B., et al., "Secure Coprocessors in Electronic Commerce Applications," Proceedings of the First Usenix Workshop on Electornic Commerce, New York, New York, Jul. 1995, 16 pages.
Young, W.D., "Verifiable Computer Security and Hardware: Issues," Technical Report, Computational Logic Inc., Sep. 1991, 43 pages.
Zeleznick, M.P., "Security Design in Distributed Computing Applications," Department of Computer Science, University of Utah, Dec. 1993, 16 pages.
Zelnick, Nate, "Keeping Business Safe on the Internet," PC Magazine, Apr. 25, 1995, pp. 1-2.
Zurko, M.E., "Panels at the 1997 IEEE Symposium on Security and Privacy," Oakland, CA, May 1997, 12 pages.
"Information Society Facing a Turning Point, Information Flood, How to Stand Against Flood of Copies," *Nikkei Byte*, 92:316-319, 1991.
Garrett et al., "Toward an electronic Copyright Management System," *J. of the Amer. Soc. for Info.*, 44(8):468-473, 1993.
Kozuka et al., "Electronic Magazine Editing Software for 3DO," *National Technical Report, Matsushita Electric Industrial Co., Ltd.*, 40(6):88-97, 1994.
Rozenblit, Moshe, "Secure Software Distribution," *IEEE Network Operations and Management Symposium*, 2:486-496, 1994.
Seki et al., "A Proposal for New Software Distribution System Using a Secret Code," *Research Report of Information Processing Societies*, 93(64):19-28, 1993.
Terada, Minoru, "Exhausting Software," *bit, Kyoritsu Shuppan Co., Ltd.*, 26(10):12-18, 1994.
Torii et al., "System Architecture for Super Distribution," *Technical Research Report of Institute of Electronics, Information and Communication Engineers*, 94(240):59-66, 1994.
Ueki et al., "Accounting Processing in Right Management Mechanism for Super Distribution," *Study Report of Information Processing Societies*, 90(1):1-10, 1990.
Exhibit A: Patent Interference No. 105,142, Benson vs. Ginter, "Decision on Motions," mailed Nov. 17, 2004, 24 pages.
Exhibit B: Patent Interference No. 105,142, Ginter vs. Benson, "Decision on Priority," mailed Dec. 28, 2005, 156 pages.
Exhibit C: Patent Interference No. 105,142, Ginter vs. Benson, "Judgment—Bd. Rule 127," mailed Jan. 6, 2006, 5 pages.
Exhibit D: Patent Interference No. 105,142, Ginter vs. Benson, "Judgment—Bd. Rule 127," mailed Jun. 8, 2005, 4 pages.

* cited by examiner

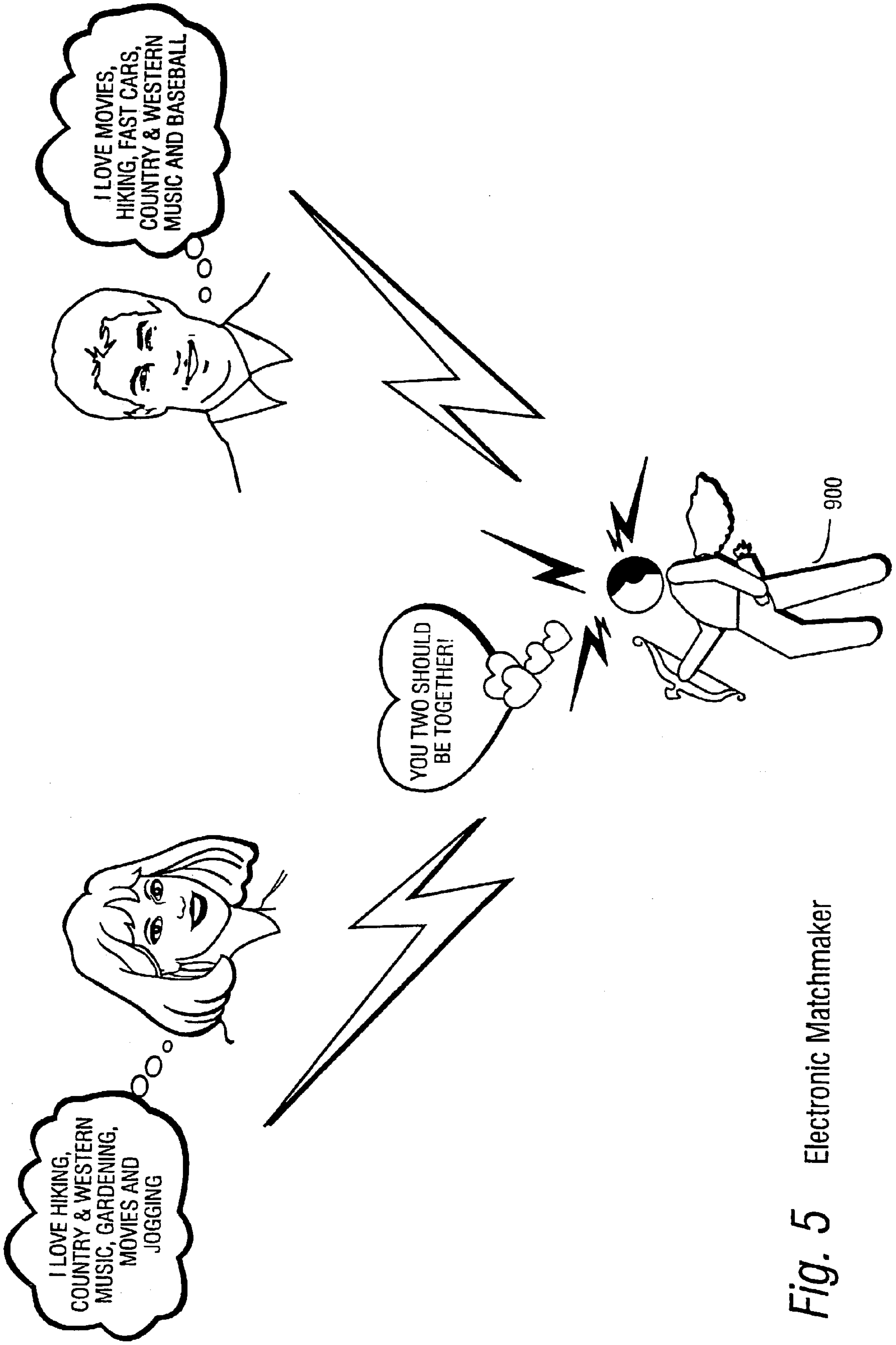
*Fig. 5* Electronic Matchmaker

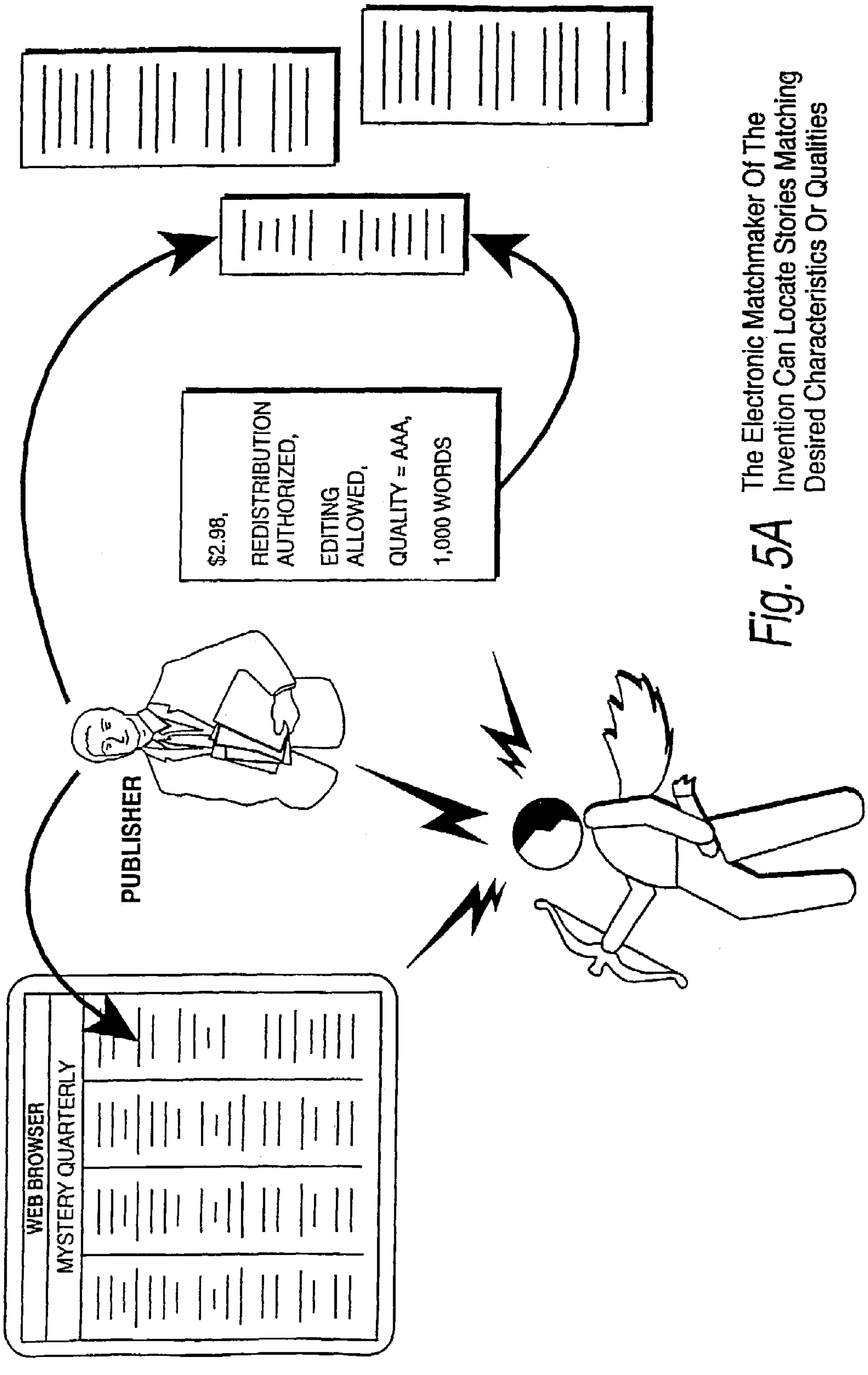
*Fig. 5A* The Electronic Matchmaker Of The Invention Can Locate Stories Matching Desired Characteristics Or Qualities

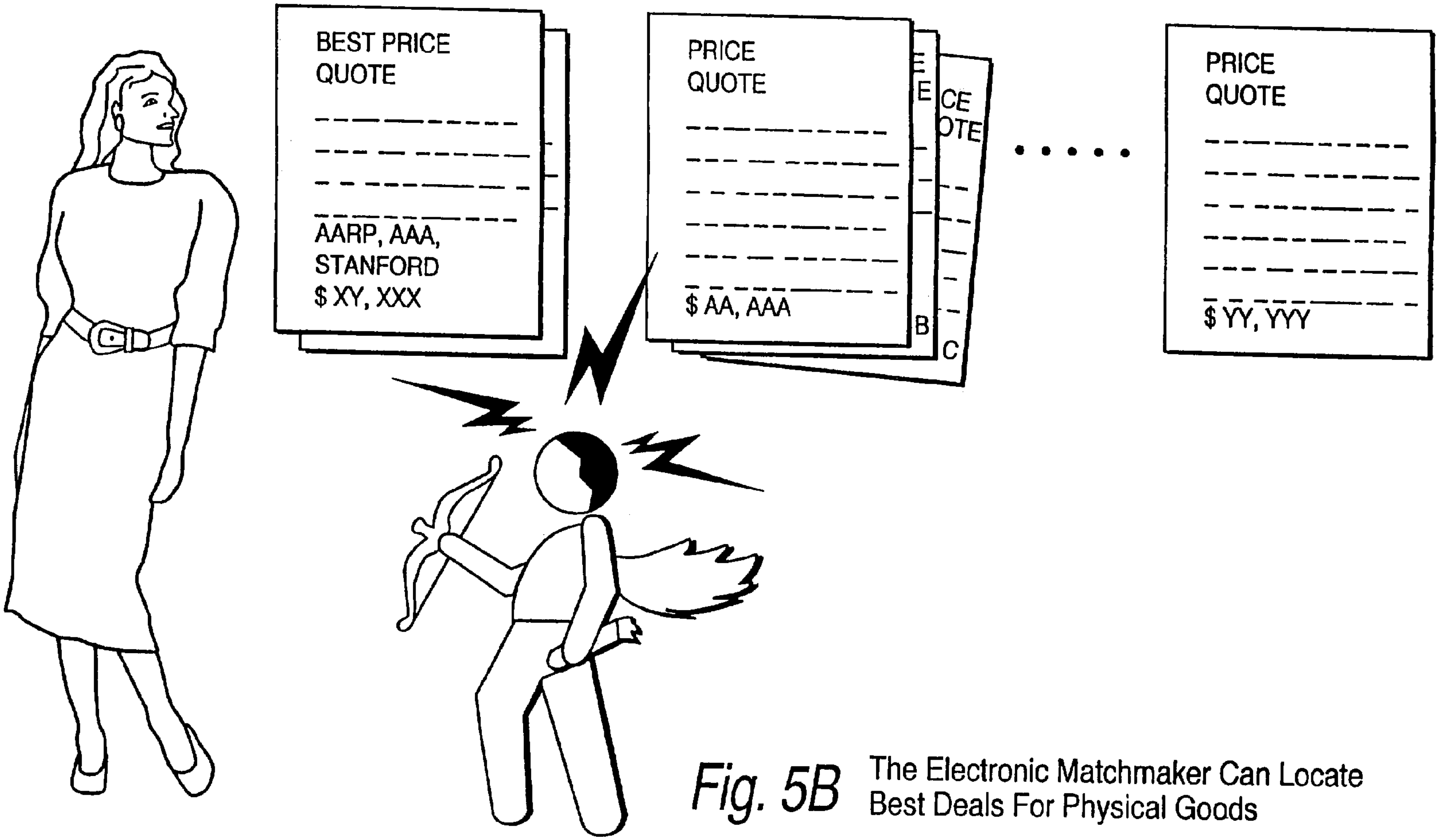
*Fig. 5B* The Electronic Matchmaker Can Locate Best Deals For Physical Goods Electronic Matchmaker Can Match People With Information Fig. 7 Electronic Matchmaker Can Match Different Kinds Of Content

*Fig. 8* Electronic Matchmaker Can Be Used For Matching Any Kinds of Things

The Electronic Matchmaker Can Get User Preferences By Asking Questions And/Or Watching Behavior Example Electronic Matchmaking Process Example User Rights Management Information
By Electronic Matchmaker Fig. 12 Example Process Of Collecting Rights Management Information Example Matching and Classification Commerce Utility System 900

Hierarchy of Commerce Utility Systems

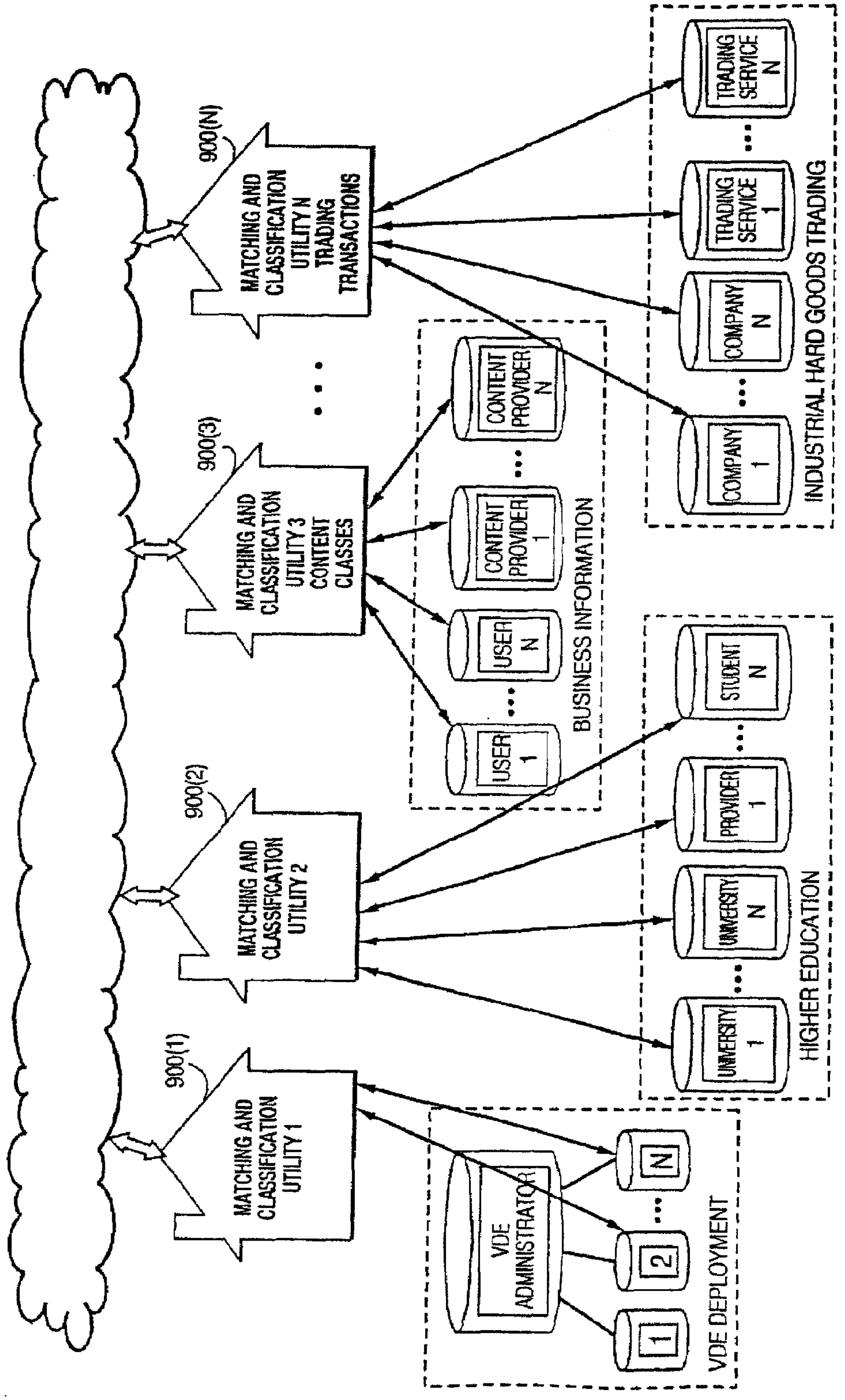
Fig.16B Matching & Classification Utilities Provide Services To Classes Of Nodes, Users, Content Services, Transaction Services.

Matching and Classification Utility Systems

Example Steps to Categorize Objects

Example Steps to Categorize Users/Appliances

Example Composite Record-Input To Classification Process

Example Cluster Analysis Process

| Variables | Typical Class 1-Profile | Typical Class 2-Profile |
|---|---|---|
| City | Washington, DC | Knoxville, TN |
| Av. price of content purchased last 30 days | $8.79 | $1.95 |
| Number of trips abroad in last 2 years | 3 | 0 |
| Type of content most frequently purchased | National and international news | Sports |
| 2nd most frequently purchased | Business information | Religious |
| Third most frequently purchased | Travel information | Movies |
| Pay per view | No | Yes |
| Add new controls to content | Yes | No |
| Stated religious affiliation | None | Methodist |
| SRI internet lifestyle category | Surfer | Worker |
| Modification rights purchased | 20% of text items | 5% of text items |

*Fig. 22* Example Classification Output Illustrating Different Classes Based Upon Differing Profiles

| Variables | Factor 1 Loadings | Factor 2 Loadings |
|---|---|---|
| Region of US | .82 | .11 |
| Family income | .90 | -.09 |
| Av. price of content purchased last 30 days | .72 | .15 |
| Number of trips abroad in last 2 years | .91 | .09 |
| Percent news, business | .79 | -.12 |
| Percent entertainment | -.69 | .21 |
| Add new controls to content | .88 | .19 |
| Religiosity | -.60 | -.22 |
| Participates in sports | -.21 | .87 |
| Watches team/individual sports on TV | -.11 | .62 |
| Owns a sports utility vehicle | .12 | .72 |
| Consumes beer/wine | -.18 | .83 |
| Male/female | .21 | .92 |
| Education beyond college | .45 | -.45 |
| Buys pay per view sports events | -.25 | .77 |
| Number of TVs in house | -.11 | .66 |

*Fig. 23* Example Classification Output Illustrating Principal Components Analysis On Parameter Data And Categories Data Example Steps for Collecting Appliance Attribute Data Example Create Appliance Attribute Data Method steps Fig. 26(A) Example Appliance Attribute Record Fig. 26(C) Example Appliance Attribute Record

| Appliance ID | Attr1 | Attr2 | Attr3 | Attr4 | Attr5 | Attr6 | Attr7 | Attr8 | Attr9 | ... | Attr N |
|---|---|---|---|---|---|---|---|---|---|---|---|

| Appliance ID | Operating system | Country | State | VDE Adm. Org. | VDE version | VDE maintenance level |
|---|---|---|---|---|---|---|
| 128.1.4.132 | WIN95 | USA | CA | VDEADM | 1.5 | 02 |

1535-2

| Appliance ID | Operating system | Country | State | VDE Adm. Org. | VDE version | VDE maintenance level |
|---|---|---|---|---|---|---|
| 128.1.4.132 | 1 | 1 | 8 | 23 | 1.5 | 2 |

1535-3

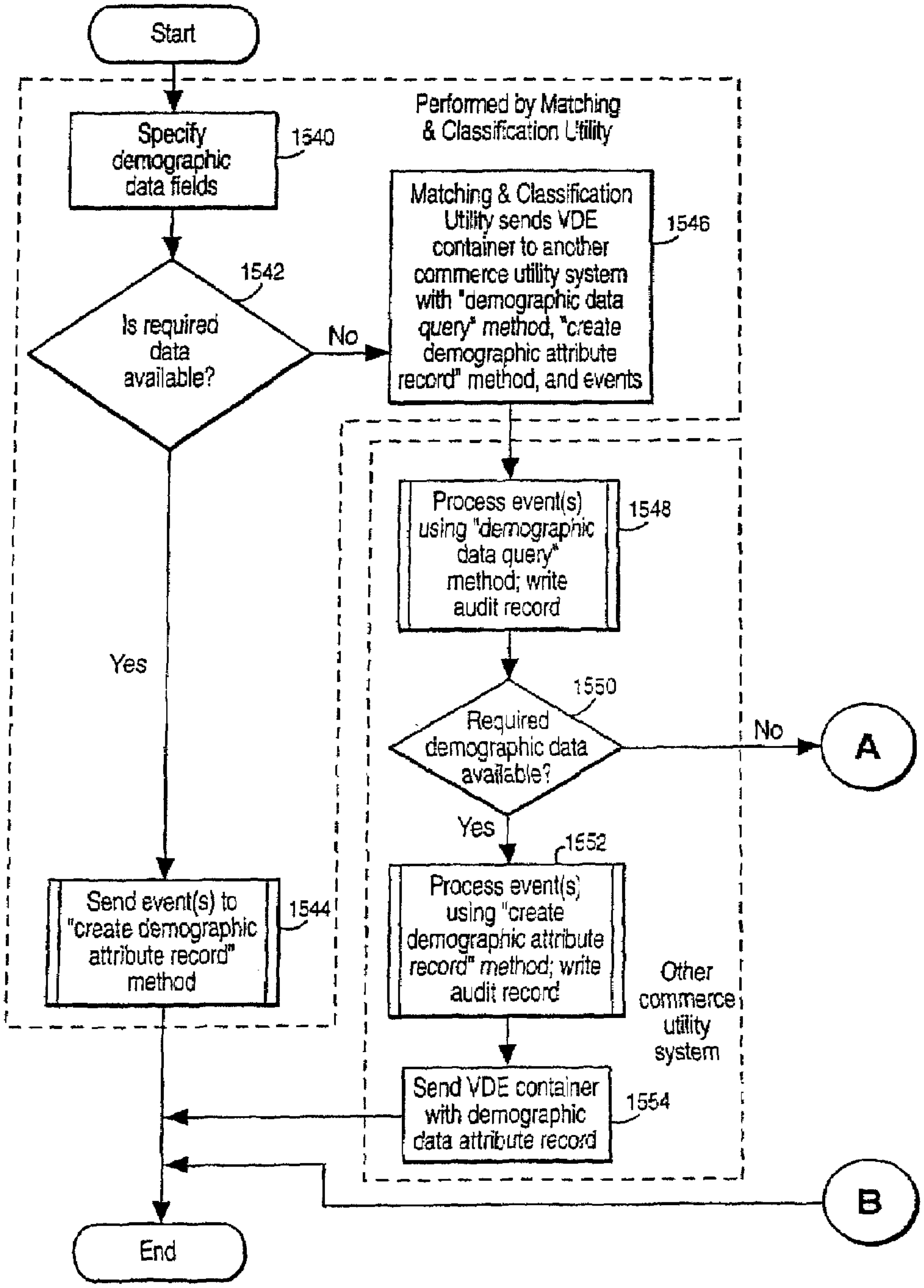
Fig. 27(A) Example Steps for Collecting Demographic Data

Demographic Information Questionnaire

Name: ______________________________

Address: ______________________________

Address: ______________________________

City: ______________ State: _____ Zip: _____ - _____

Gender (M/F) _____ Date of birth: _____ / _____ / _____

Education:

- [ ] Have not graduated high school
- [ ] High school graduate
- [ ] Some college
- [ ] College degree
- [ ] Some graduate school
- [ ] Advanced degree All Information Will Be Treated As Confidential

*Fig. 28* Example Demographic Questionnaire "Pop-Up" Screen

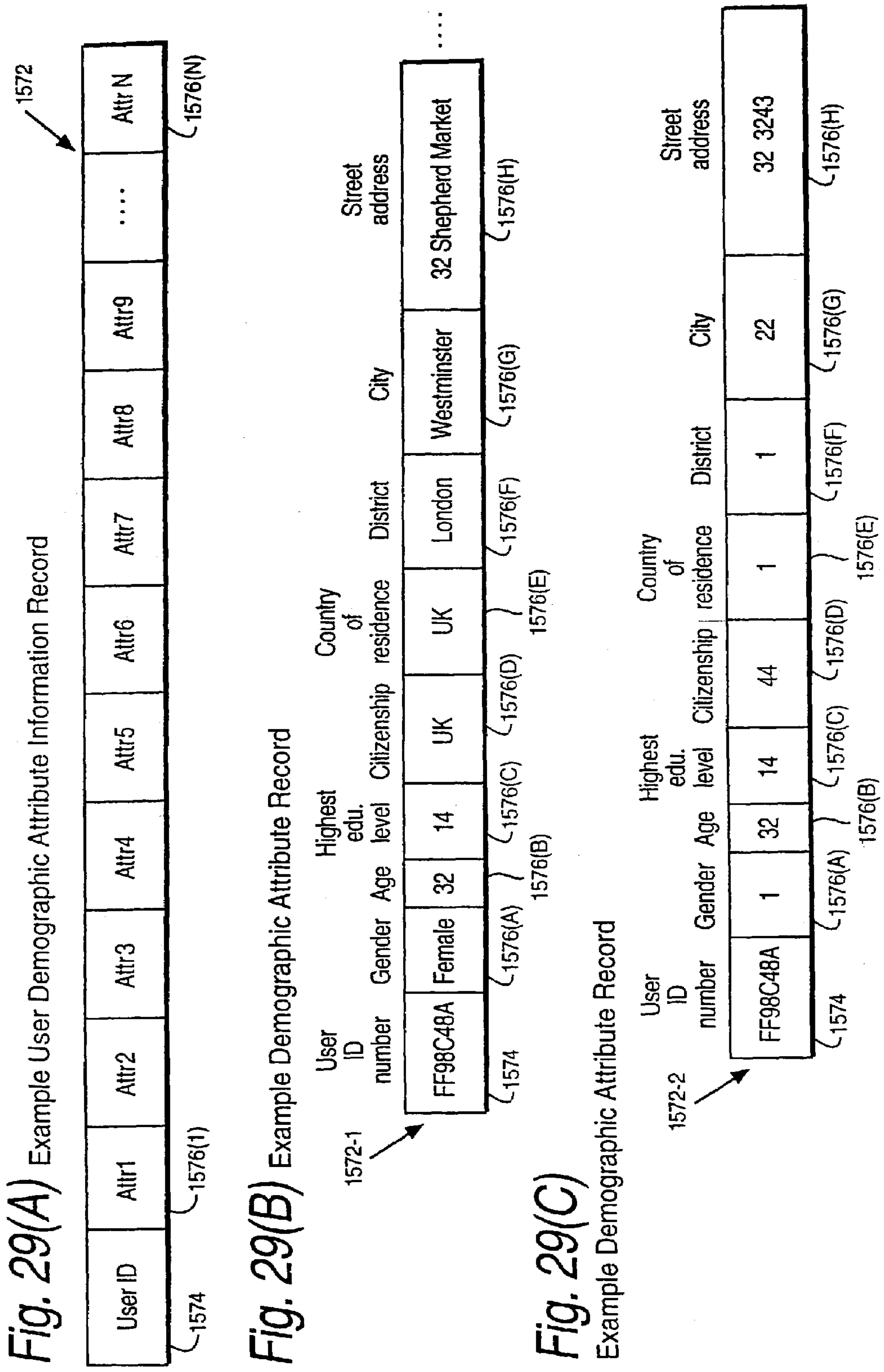
Fig. 29(A) Example User Demographic Attribute Information Record
Fig. 29(B) Example Demographic Attribute Record
Fig. 29(C) Example Demographic Attribute Record

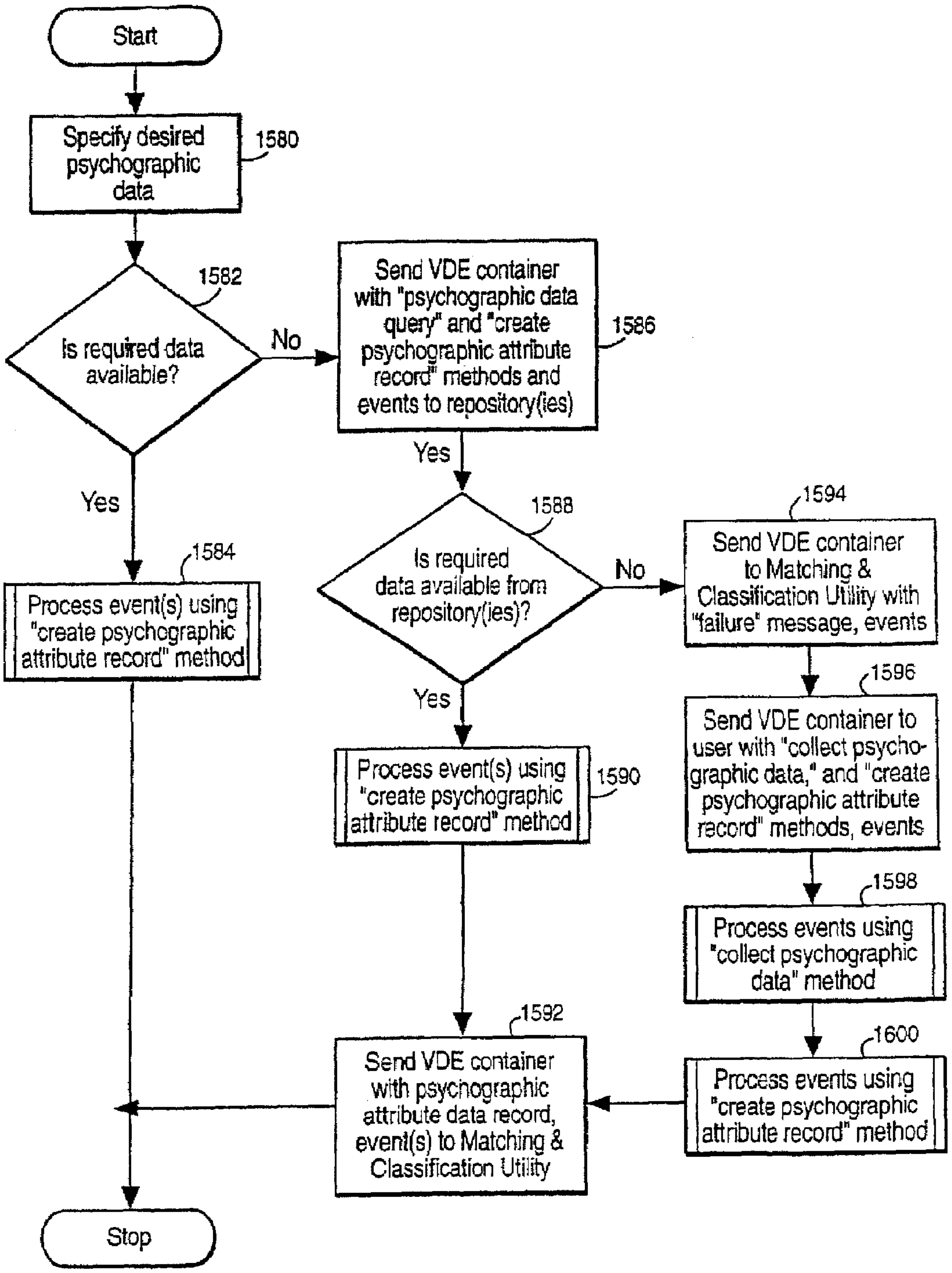
*Fig. 30* Example Steps for Collecting Psychographic Data

Figure 31:
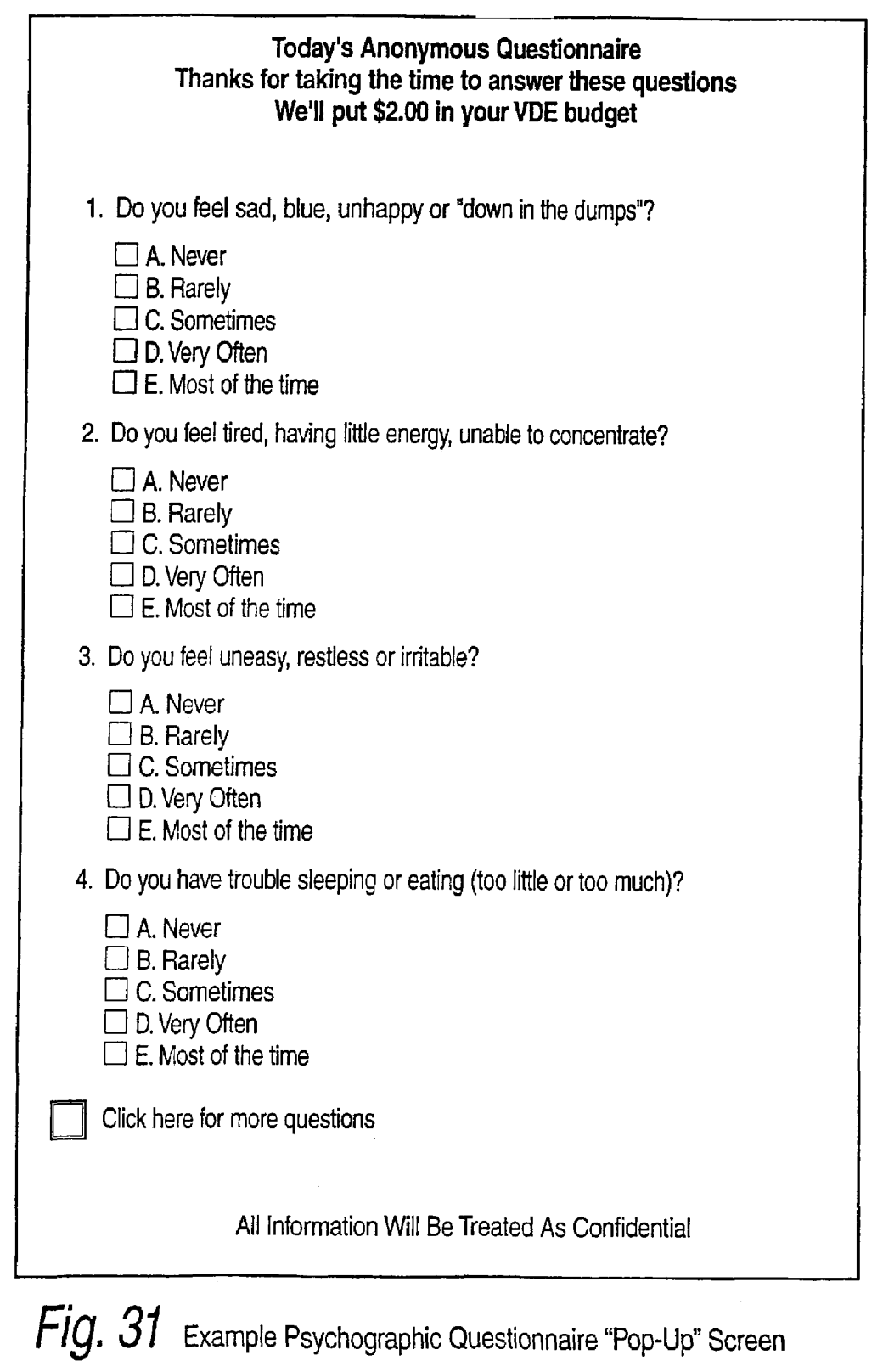

Today's Anonymous Questionnaire
Thanks for taking the time to answer these questions
We'll put $2.00 in your VDE budget

1. Do you feel sad, blue, unhappy or "down in the dumps"?
   - ☐ A. Never
   - ☐ B. Rarely
   - ☐ C. Sometimes
   - ☐ D. Very Often
   - ☐ E. Most of the time
2. Do you feel tired, having little energy, unable to concentrate?
   - ☐ A. Never
   - ☐ B. Rarely
   - ☐ C. Sometimes
   - ☐ D. Very Often
   - ☐ E. Most of the time
3. Do you feel uneasy, restless or irritable?
   - ☐ A. Never
   - ☐ B. Rarely
   - ☐ C. Sometimes
   - ☐ D. Very Often
   - ☐ E. Most of the time
4. Do you have trouble sleeping or eating (too little or too much)?
   - ☐ A. Never
   - ☐ B. Rarely
   - ☐ C. Sometimes
   - ☐ D. Very Often
   - ☐ E. Most of the time ☐ Click here for more questions All Information Will Be Treated As Confidential

*Fig. 31* Example Psychographic Questionnaire "Pop-Up" Screen

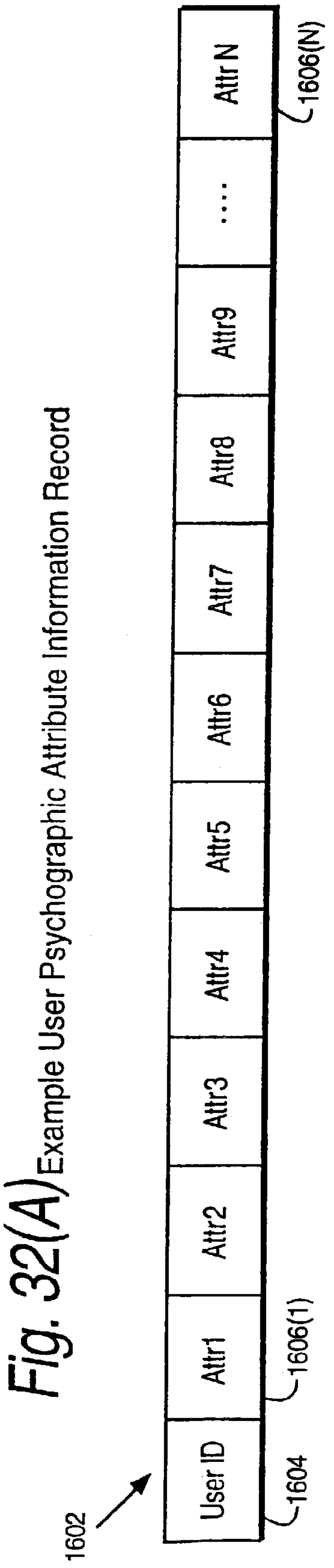
Fig. 32(A) Example User Psychographic Attribute Information Record
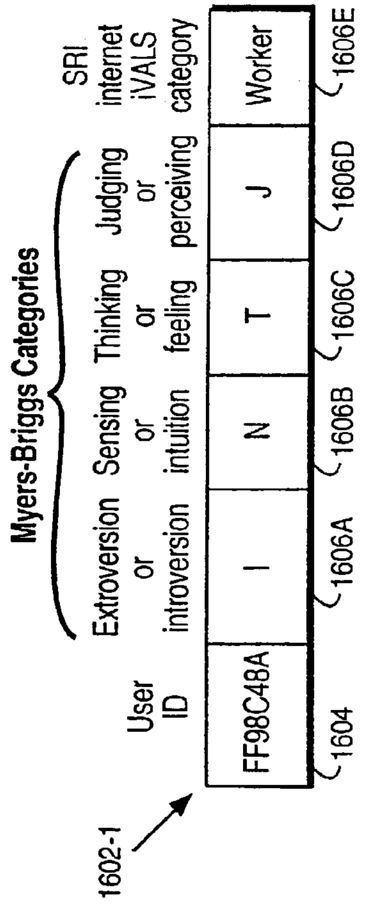
Fig. 32(B) Example User Psychographic Attribute Record

*Fig. 32(C)* Example Psychographic Attribute Record 1602-2

| | Myers-Briggs Categories | | | | SRI Internet iVALS Categories | | | | | | | | | |
|---|---|---|---|---|---|---|---|---|---|---|---|---|---|---|
| User ID | Extroversion or introversion | Sensing or intuition | Thinking or feeling | Judging or perceiving | Wizard | Pioneer | Worker | Seeker | Surfer | Immigrant | Sociable | Socialite | Up-streamer | Main-streamer |
| FF98C48A | 1 | 0 | 1 | 1 | 0 | 0 | 1 | 0 | 0 | 0 | 0 | 0 | 0 | 0 |
| 1604 | 1606A | 1606B | 1606C | 1606D | 1606E | | | | | | | | | |

Example Steps For Determining Attributes Based On Available Rules And Consequences Example Steps For Determining Attributes Based On Available Rules And Consequences Construct Attribute Records From PERC Records Example Method Construct Attribute Records From PERC Records Example Method Check Permissions Record Example Steps Fig. 37(A) Example Rights Attribute Record From PERCs
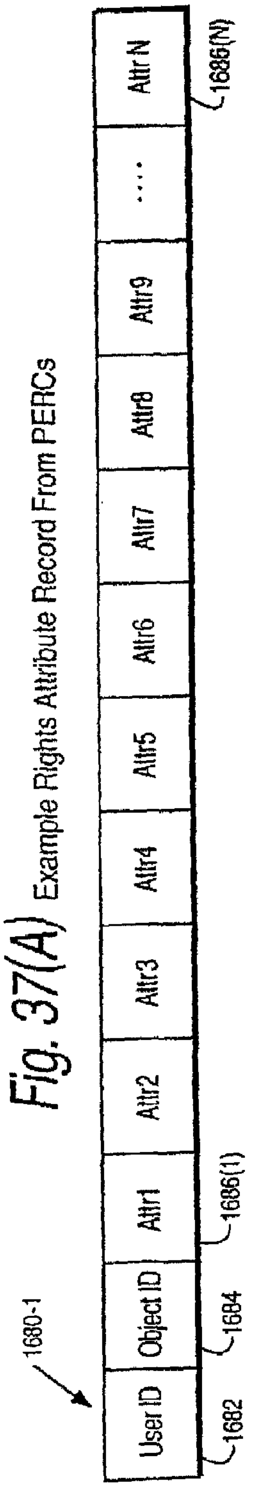
Fig. 37(B) Example Attribute Record
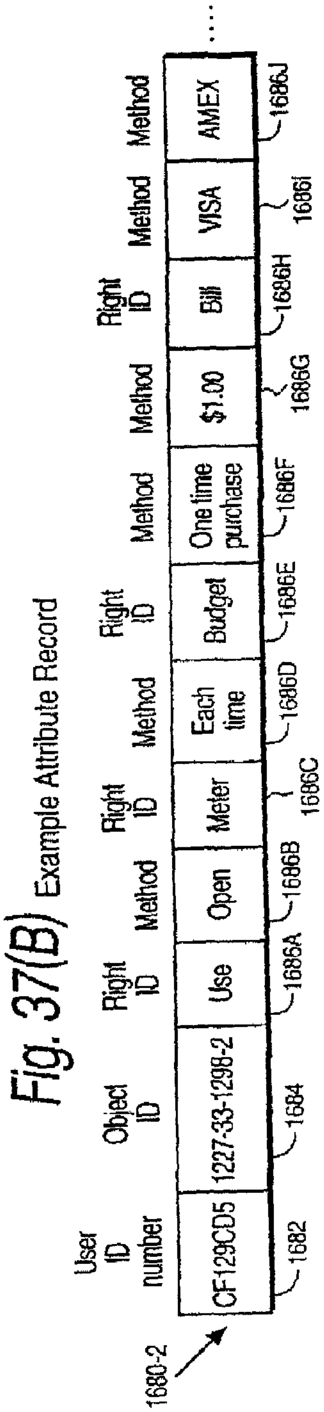
Fig. 37(C) Example Attribute Records From PERC Record
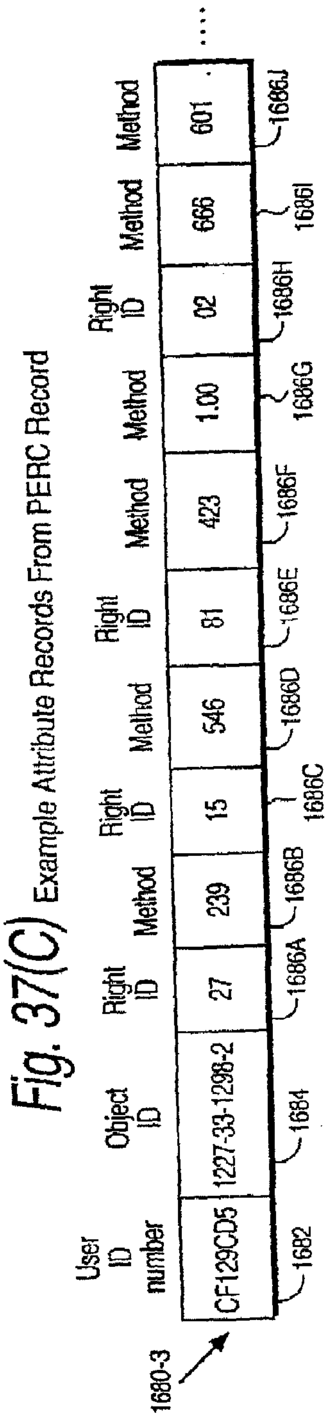

Example Steps For Assembling Attribute Records Based On Rules and Consequences

Example Steps To Check On Attribute Record From A User Rights Table

Contruct attribute records from PERC records method example

Fig. 42(A) Example Rights Attribute Record From URT

Fig. 42(B) Example Rights Attribute Record From URT

Fig. 42(C) Example User Choice Attribute Records (From URT)

Example steps for assembling usage audit records

Example steps for assembling usage audit records

Example steps to create audit attribute records

Example steps to create audit attribute records

Fig. 46(A) Example Usage Attribute Record From UDE Audit Record
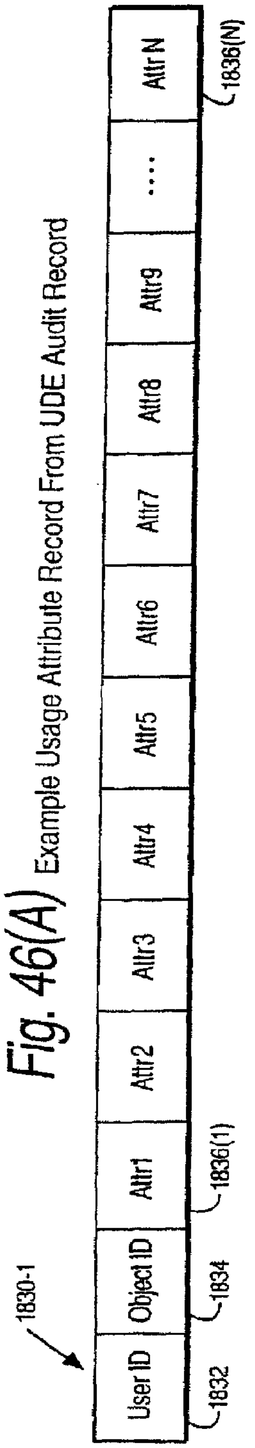
Fig. 46(B) Example Usage Attribute/Statistics Records From UDE Audit Records
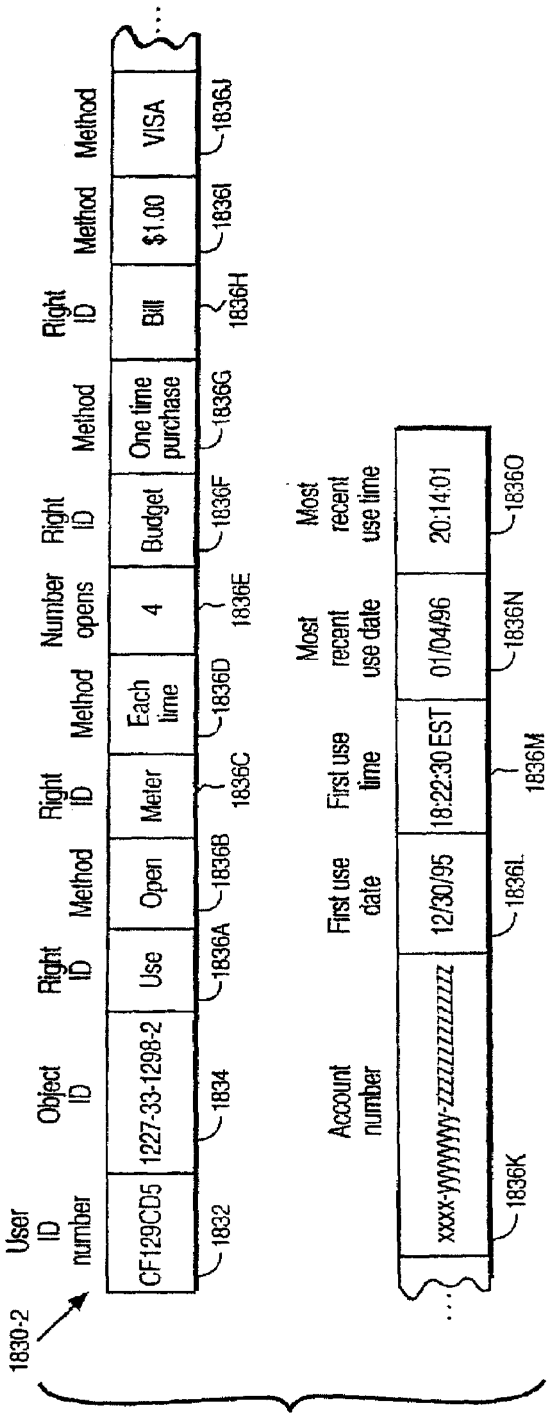

Example "Information Push"

Example Web Digital Broadcasting Network

*Fig. 49* Example "Consumer Pull"

Enterprise Matching and Classification Utility Example

Classification And Chain Of Handling And Control

Classification And Chain Of Handling And Control With Utility Services

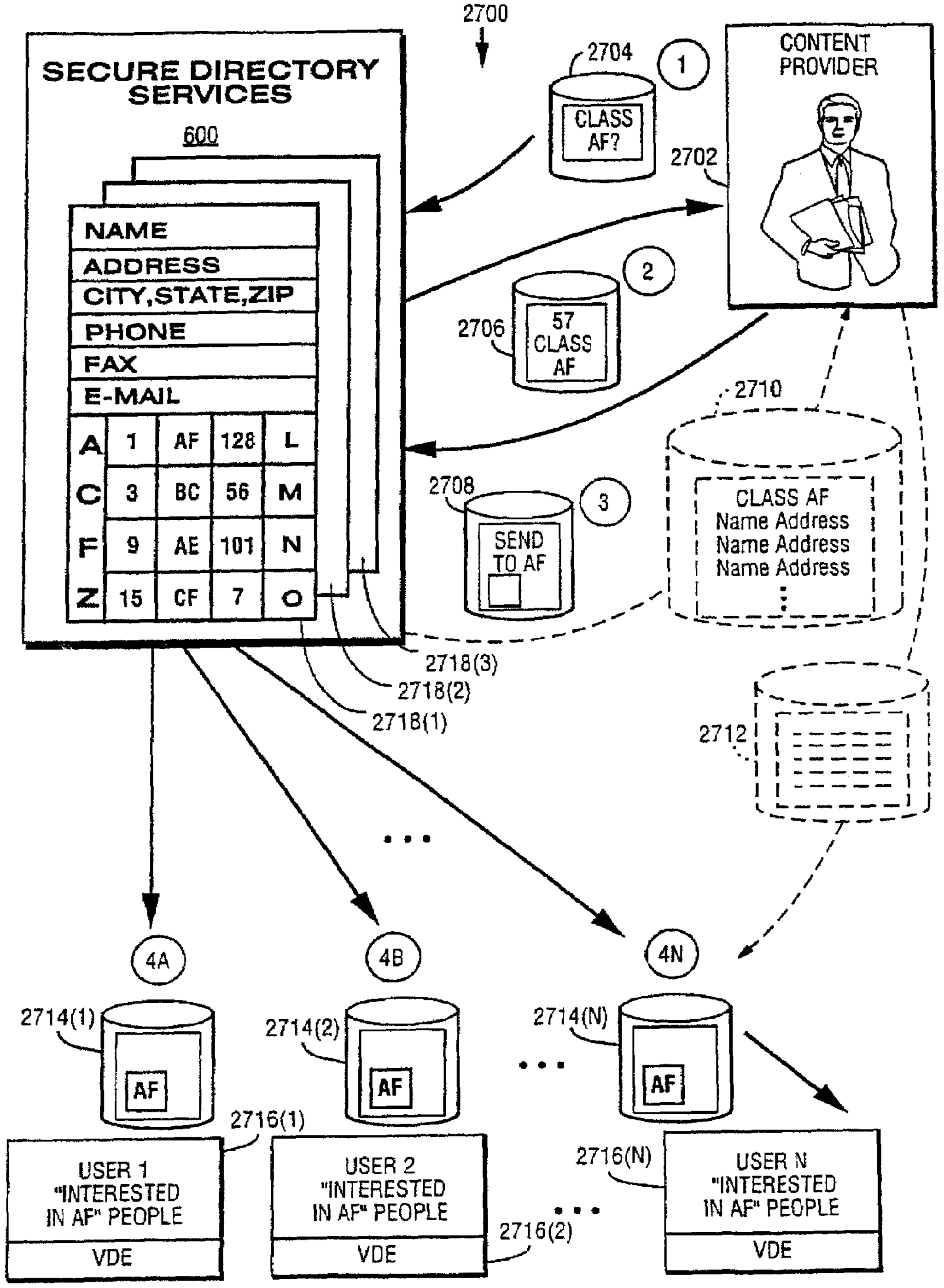
*Fig. 52* Secure Directory Services

*Fig. 53* Classification Based Microsegmented Merchandising
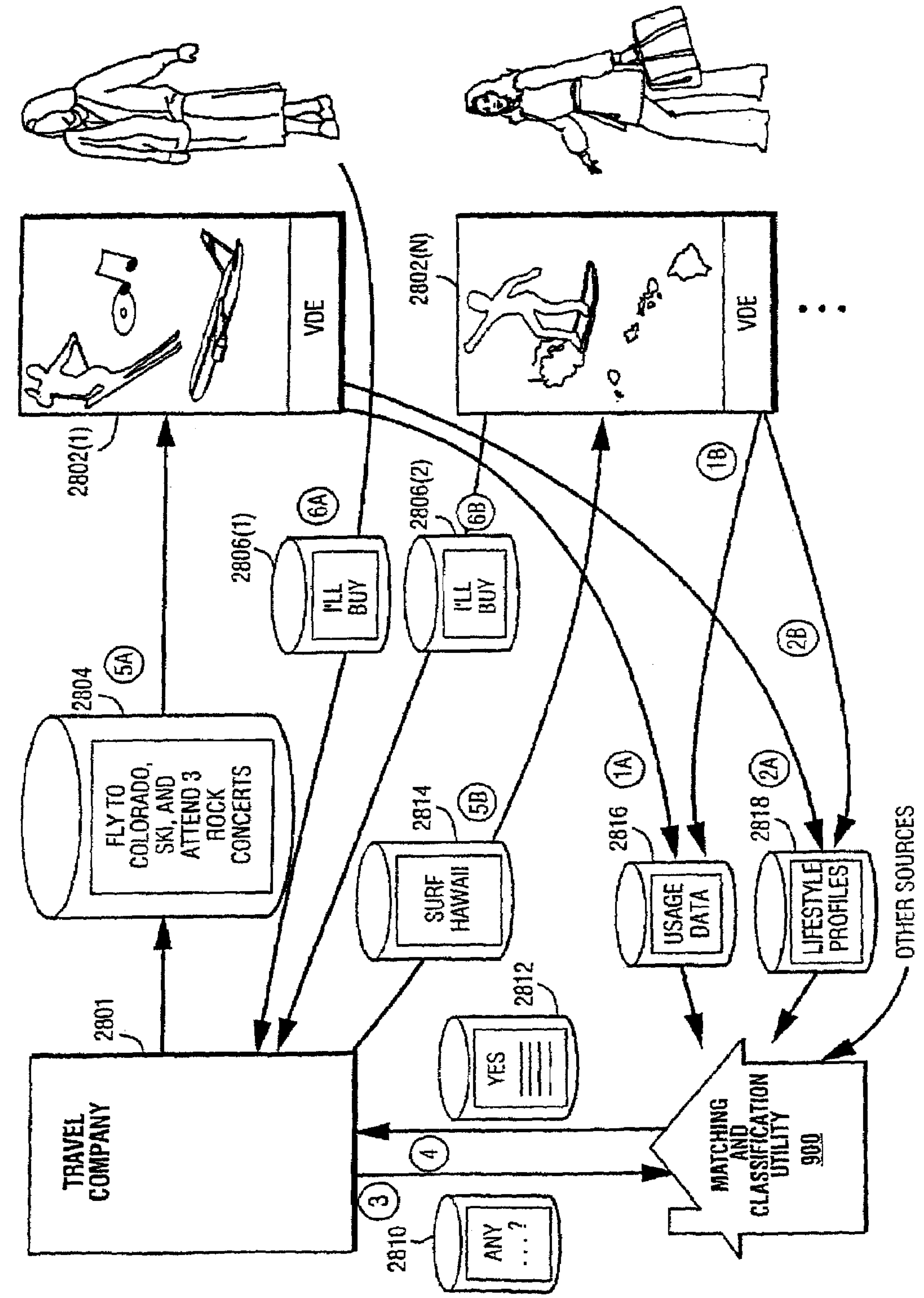

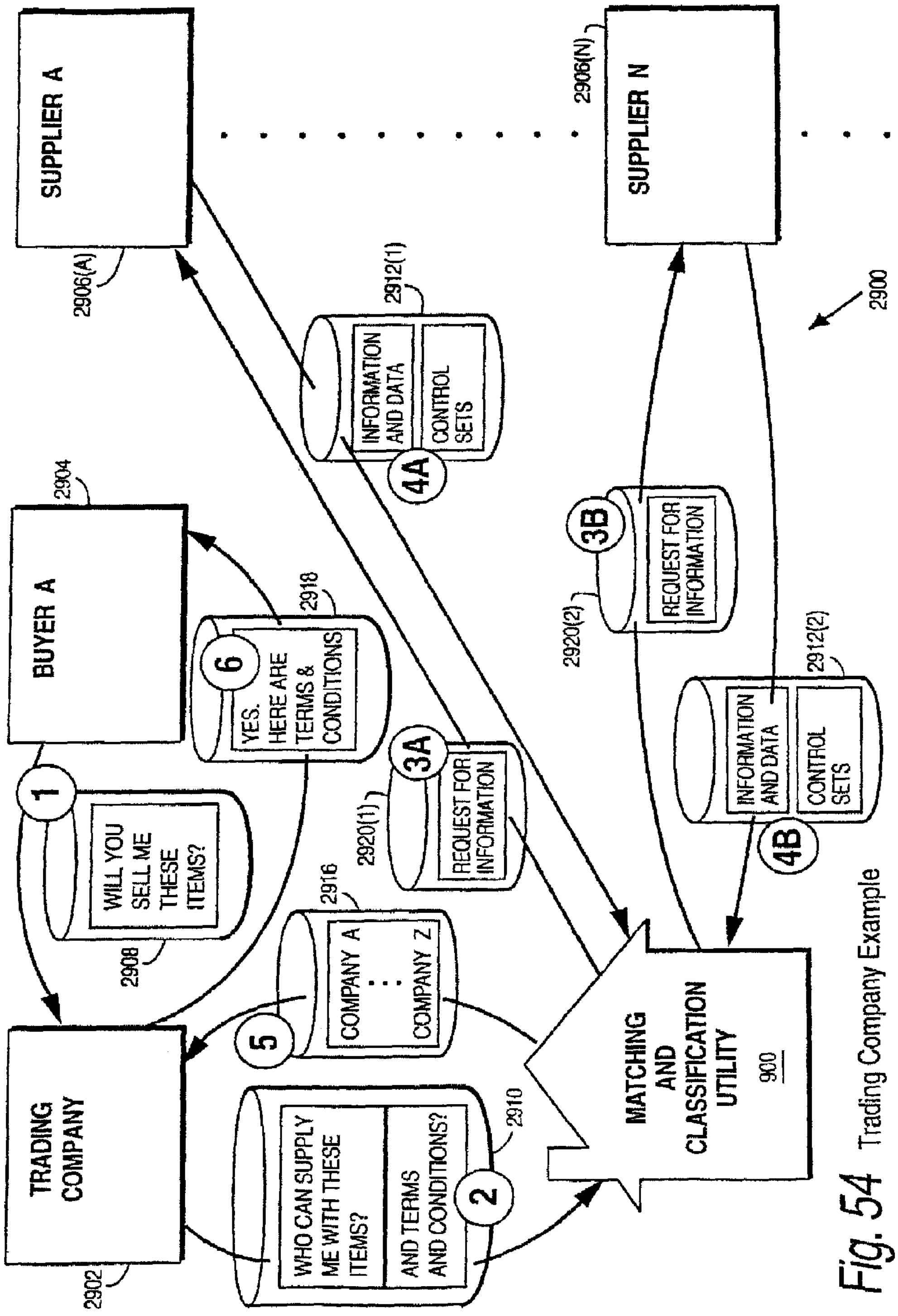
*Fig. 54* Trading Company Example

Stock Trading Example

Currency Trading Example

Consumer Banking Example Locating Services In A Class!

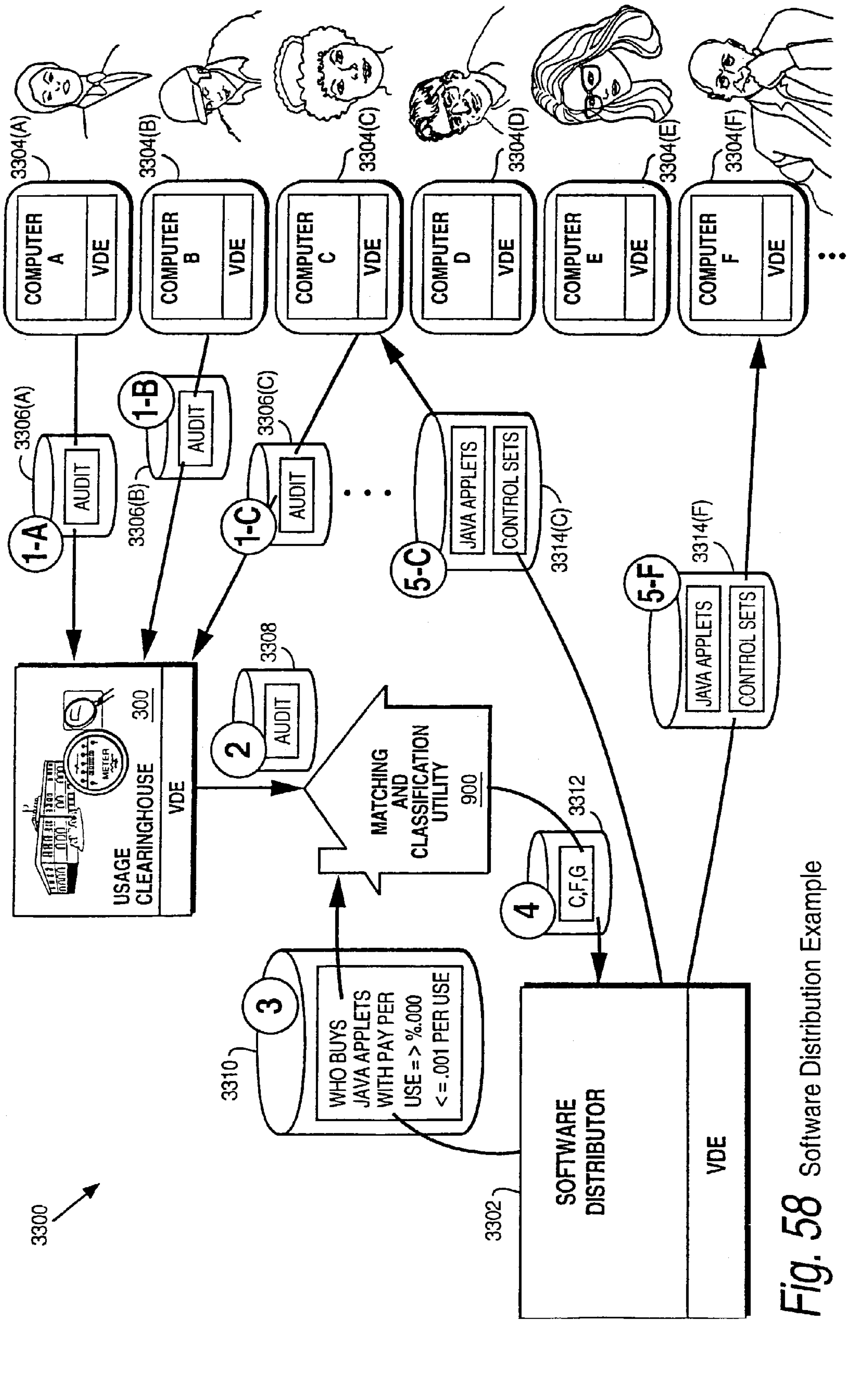
Fig. 58 Software Distribution Example

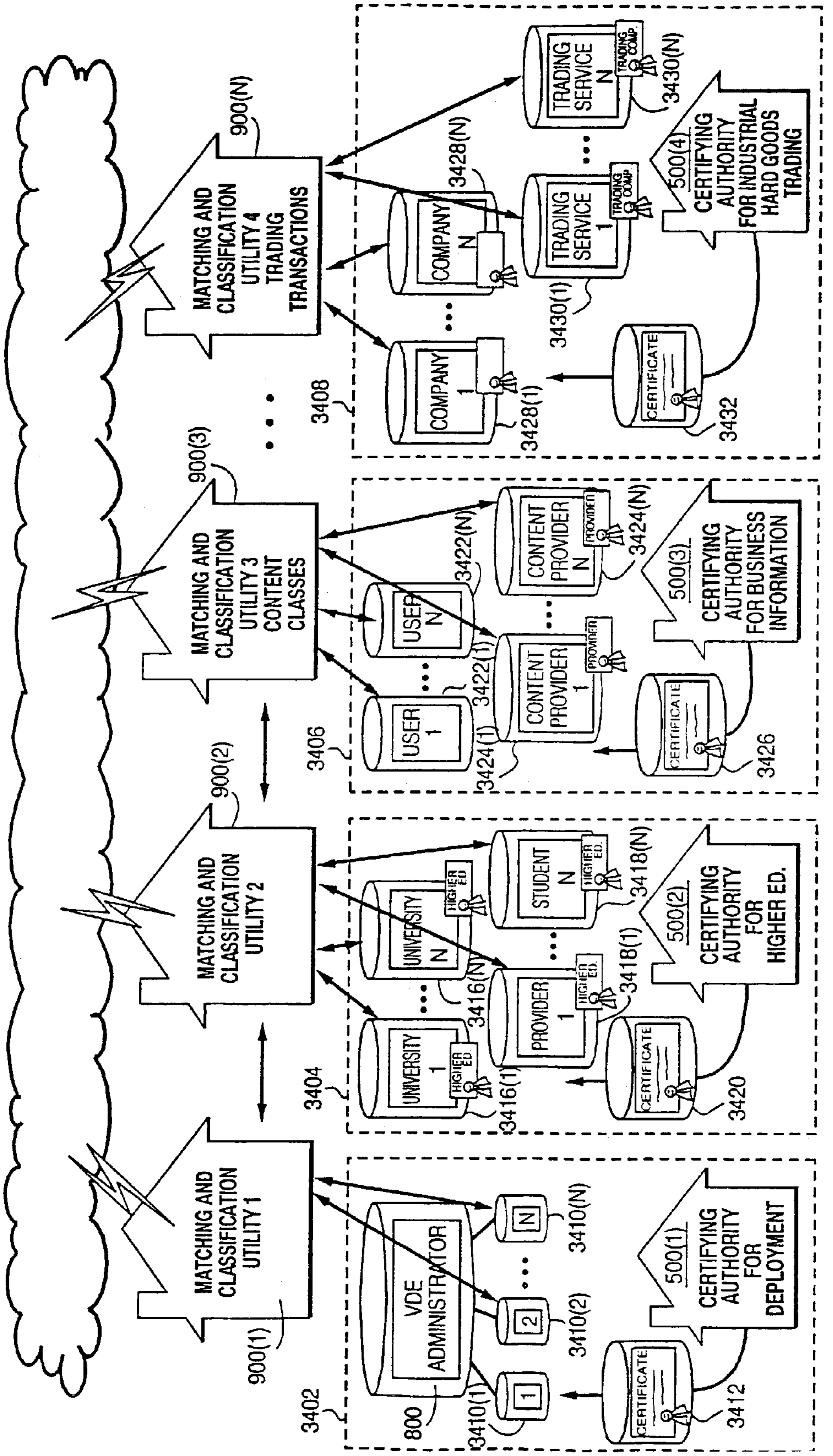
Fig. 59 Matching & Classification Utilities Provide Services To Authenticated Classes Of Nodes, Users, Content Services, Transaction Services.

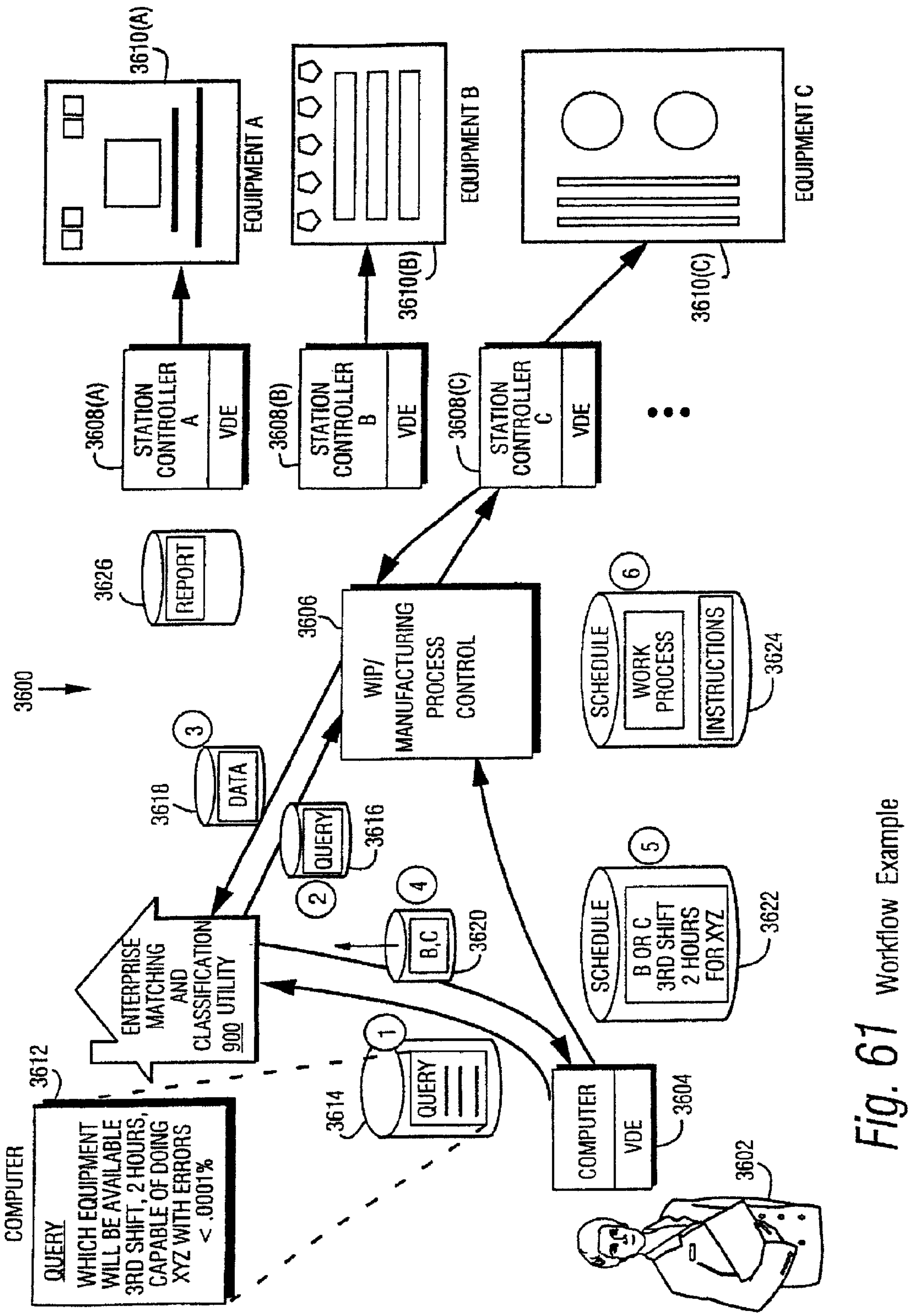
*Fig. 61* Workflow Example

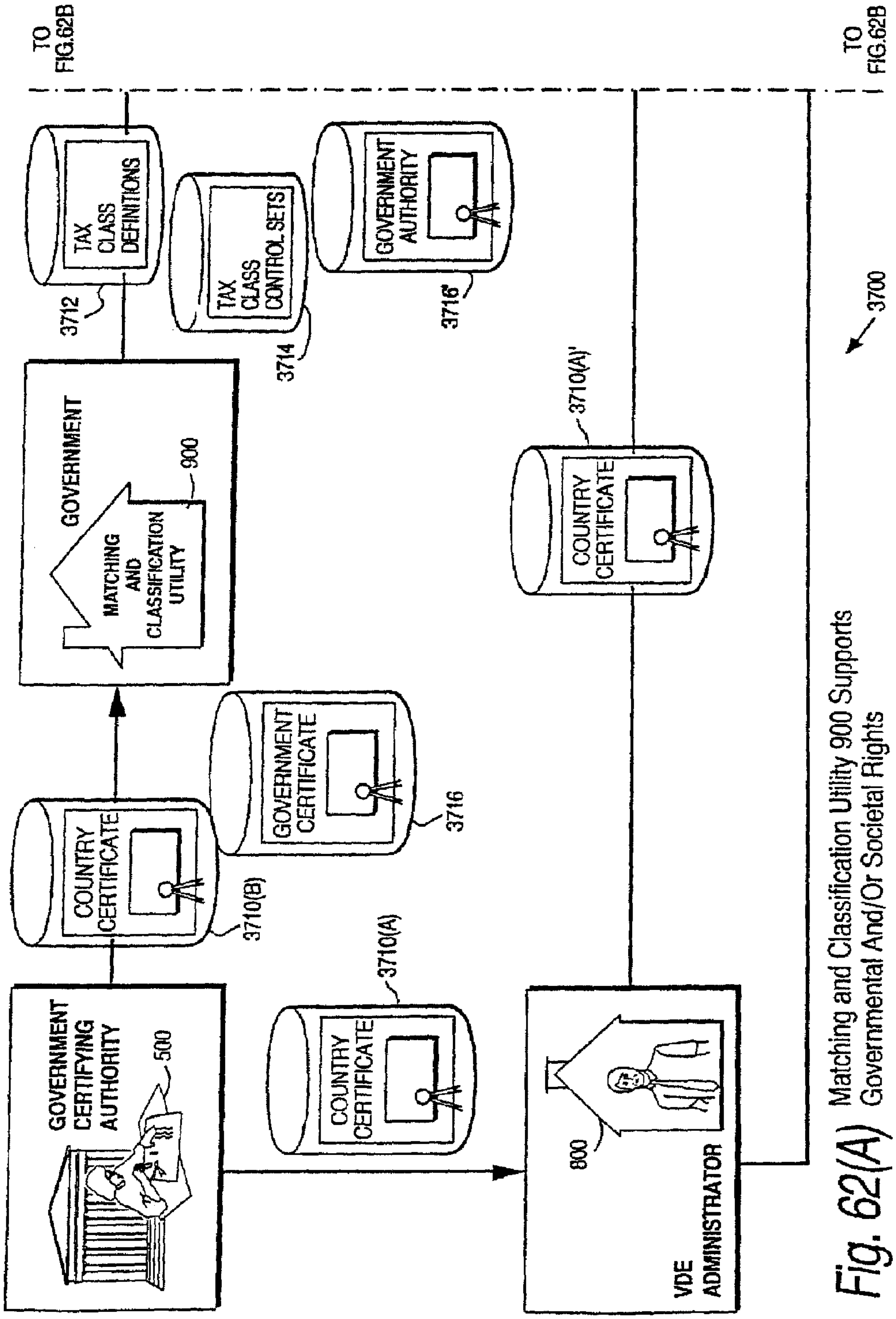
Fig. 62(A) Matching and Classification Utility 900 Supports Governmental And/Or Societal Rights

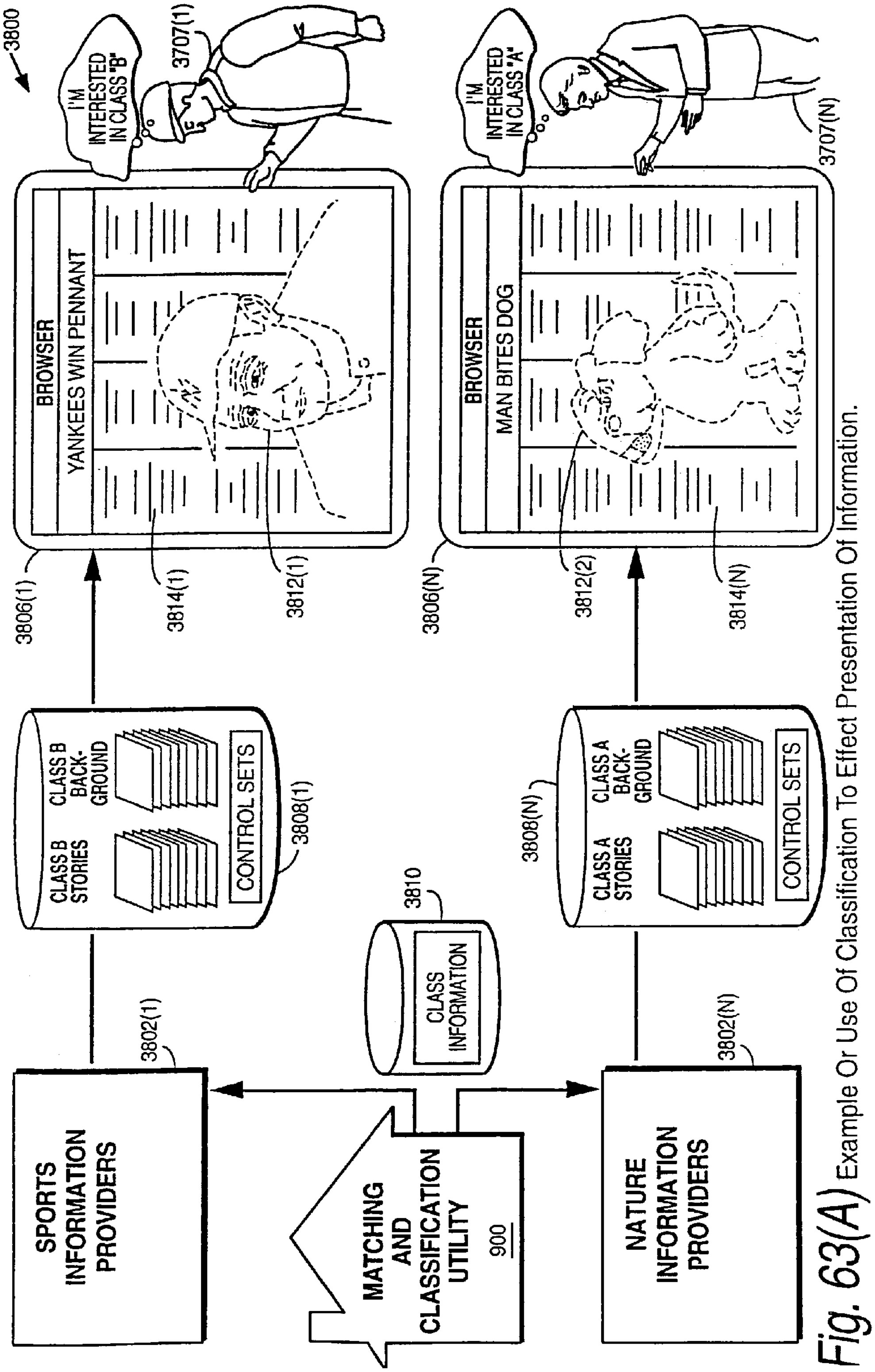
Fig. 63(A) Example Or Use Of Classification To Effect Presentation Of Information.

Classification Based On Difficulty

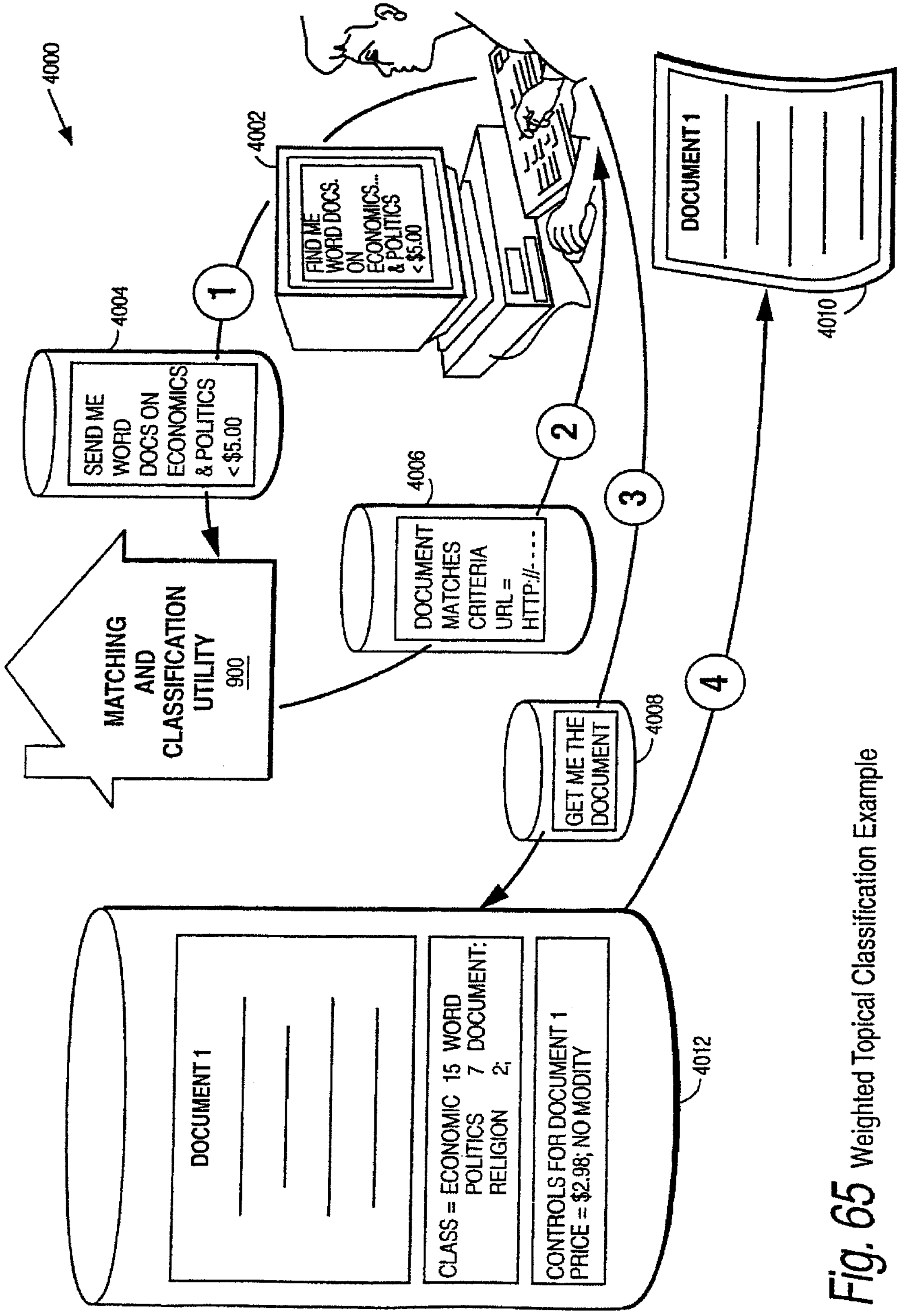
*Fig. 65* Weighted Topical Classification Example

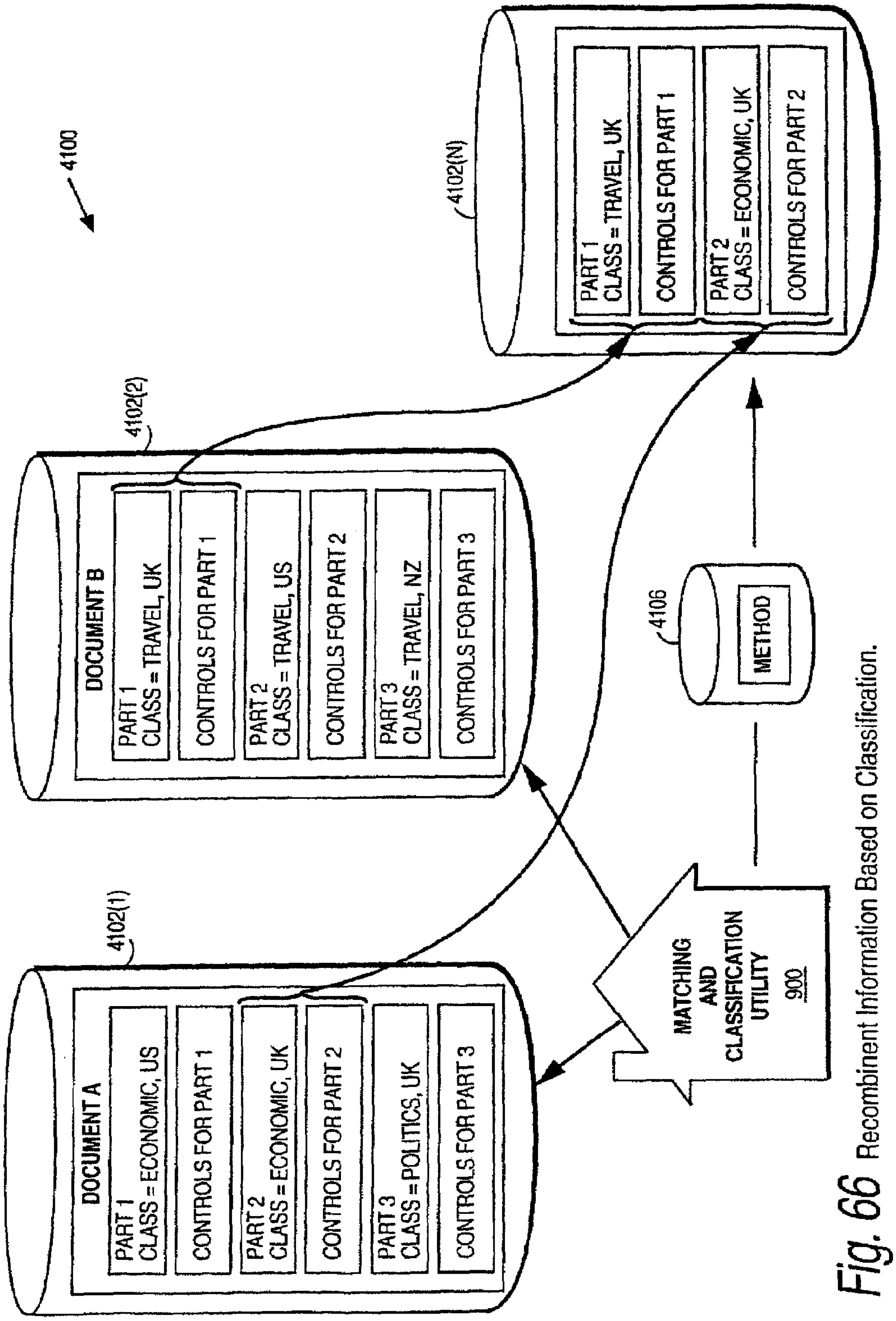
Fig. 66 Recombinent Information Based on Classification.

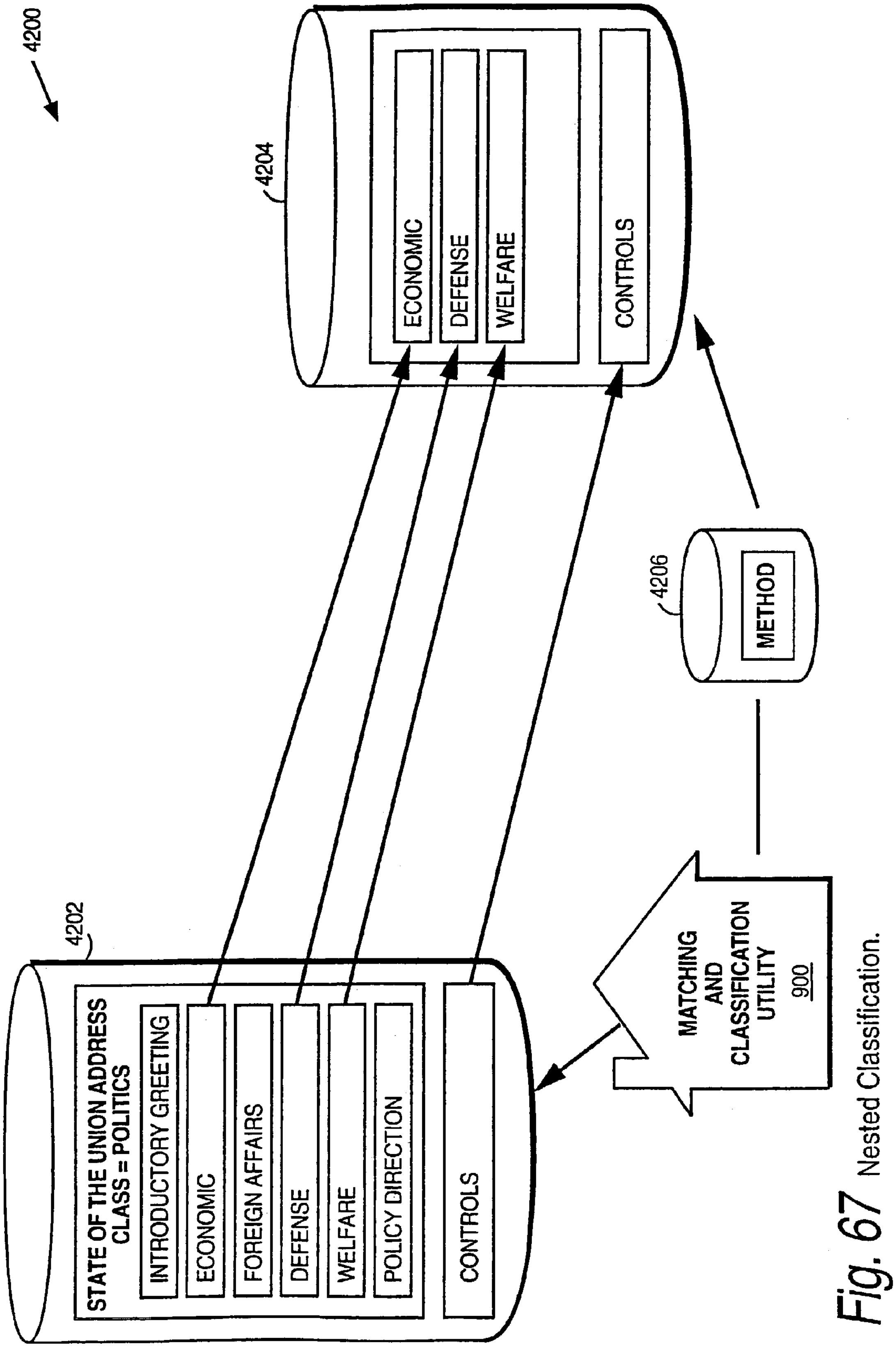
*Fig. 67* Nested Classification.

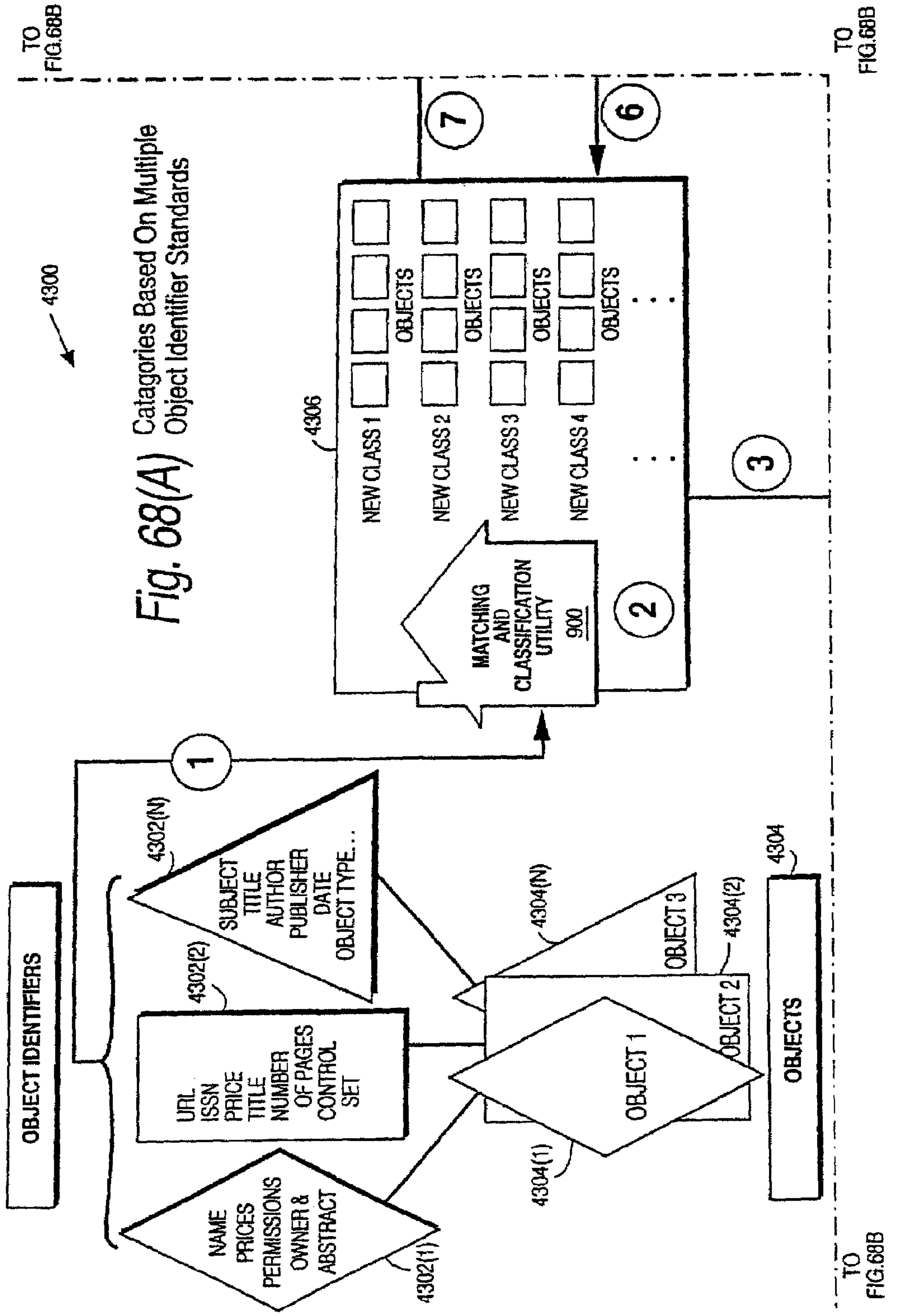
Fig. 68(A) Catagories Based On Multiple Object Identifier Standards

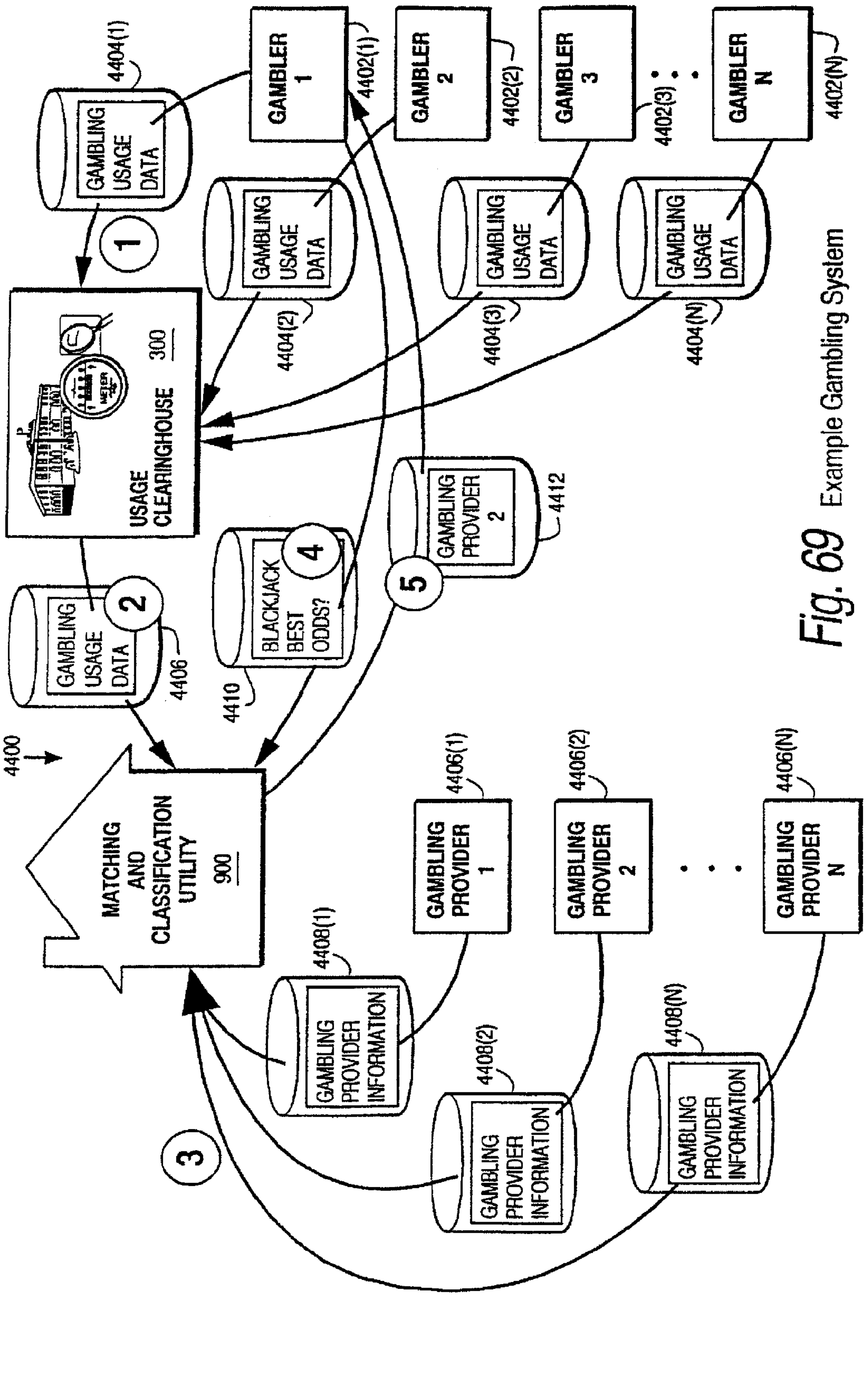
*Fig. 69* Example Gambling System

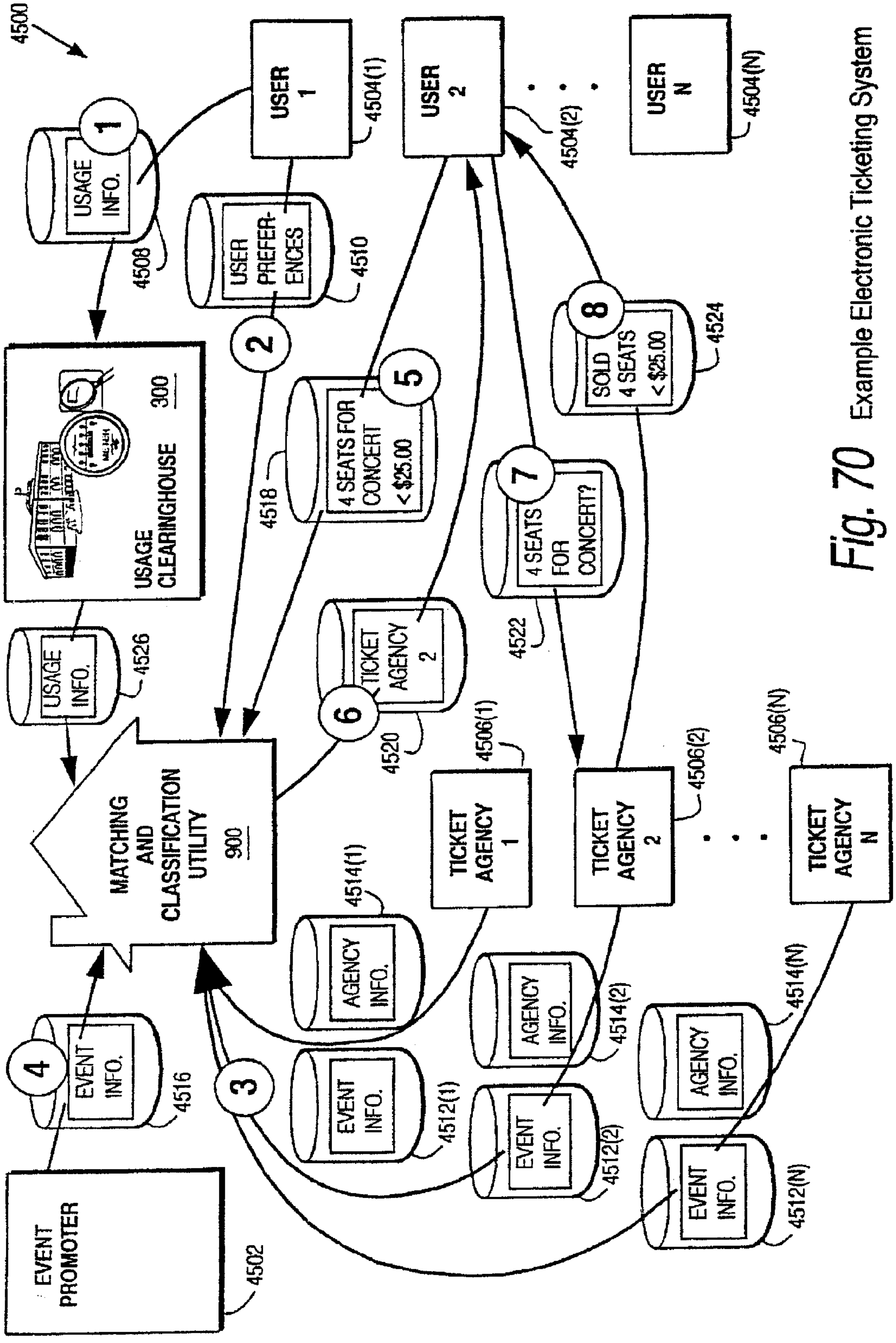
*Fig. 70* Example Electronic Ticketing System

SYSTEMS AND METHODS FOR MATCHING, SELECTING, NARROWCASTING, AND/OR CLASSIFYING BASED ON RIGHTS MANAGEMENT AND/OR OTHER INFORMATION

This application is a divisional of U.S. application Ser. No. 09/498,369, filed Feb. 4, 2000, which is a continuation of U.S. application Ser. No. 08/965,185, filed Nov. 6, 1997, now U.S. Pat. No. 6,112,181, both of which are incorporated herein by reference.

FIELDS OF THE INVENTIONS

The inventions relate to electronic rights and transaction management. More particularly, the inventions relate to automated systems, methods and techniques for efficiently matching, selecting, narrowcasting, categorizing and/or classifying in a distributed electronic rights and/or other event and/or transaction management environment. For example, the inventions provide electronic computer based systems, methods and techniques for matching, classifying, narrowcasting, and/or selecting digital information describing people and/or other things. This matching, classifying, narrowcasting, and/or selecting can be based, at least in part, on elements of rights management information and/or one or more other categories of information—wherein such information is used for efficient, trusted event management assuring the execution of one or more controls related to, including, for example, consequences of processing such digital information describing people and/or other things. The present inventions also provide systems and methods for efficiently determining class hierarchies, classification schemes, categories, and/or category schemes and/or the assignment of objects, persons and/or things to said class hierarchies, classification schemes, categories, and/or category schemes using at least some rights management information.

BACKGROUND AND SUMMARY OF THE INVENTIONS

The modern world gives us a tremendous variety and range of options and choices. Cable and satellite television delivers hundreds of different television channels each carrying a different program. The radio dial is crowded with different radio stations offering all kinds of music, news, talk, and anything else one may care to listen to. The corner convenience store carries newspapers from around the country, and a well stocked newsstand allows you to choose between hundreds of magazines and publications about nearly every subject you can think of. Merchandise from all corners of the world is readily available at the shopping mall or by mail order. You can pay by check, in cash, or using any number of different kinds of credit cards and ATM cards.

This tremendous variety is good, but it also presents problems. Sometimes, it is hard or inefficient for us to find what we want and need because there are too many things to evaluate and choose from, and they are often located in too many places. We can waste a lot of time searching for the things we need or want at the right price, with the rights features, and at a particular time.

Sometimes, we never find things that satisfy what we feel we need or want. This happens when we don't know what to look for, how to look for it, or don't have the necessary assistance or tools to search successfully. For example, we may not know the best way of looking for something.

Sometimes, we know what we are looking for but can't express or articulate it in ways that help us look. And sometimes, we don't even know what we are looking for. You may know you need something, know its missing, but never really know how to communicate to others what you are looking for. For example, someone who speaks only English may never find resources using Japanese or Spanish. In general, we often don't have the time or resources to look for all the things that would give us the most benefit or make us the most satisfied.

It's Hard to Find Mass Media Things You Want or Need.

FIG. 1A shows, as one example, how frustrating it can be to find anything to watch on the hundreds of television channels that may be available. The man in FIG. 1A spends a lot of time "channel surfing," trying to find something he is interested in watching. He may be moderately interested in golf, but may not like the particular golf tournament or golf players being broadcast at 7 o'clock on a particular channel. After flipping through other channels, he might think an action movie looks interesting only to find out after watching it for a while that he isn't really interested in it after all. A documentary on horses also seems interesting at first, but he finds it boring after watching it awhile because it doesn't give him the kind of information he is interested in. The whole process can be frustrating and he may feel he wasted a lot of time. FIG. 1B shows the man getting so frustrated at the wasted time and energy that he thinks that maybe watching television is just not worth it. What the man really needs is a powerful yet efficient way to find those things that most satisfy his desires—that is, match his needs and/or his interests.

Our Mail Overloads Us with Things We Don't Want or Need

The same thing can happen with information sent to us in the mail. It can be fun to receive some kinds of mail, such as personal letters, or magazines and catalogs on topics of personal interest. Certain other mail, such as bills, may not be fun but are usually important. Unfortunately, our mailboxes are typically overflowing with yet another kind of mail commonly referred to as "junk mail." The person in FIG. 2 finds his mailbox stuffed to the overflowing point with mail he never asked for and has absolutely no interest in. Most of this junk mail ends up unread and in the trash. However, it can take a long time to sort through all this mail to be sure you are only throwing out only the junk mail and not the good mail you are interested in or need. For example, it's sometimes hard to distinguish credit card bills from offers for new credit cards you don't need or want. Wouldn't it be useful if your mail could be automatically "cleaned" of the mail you had no interest in and you received only the mail you wanted or needed?

Sorting through things to identify things you might want, then selecting what you actually want, can be a frustrating and time consuming experience. For example, it wastes the time of the person who receives the junk mail, and it also wastes the time, money and effort of the people who spend their money to send mail to people hoping that they will buy their products.

As frustrating as finding and selecting may be to consumers, they often create even greater problems for businesses and people who want to locate or provide information, goods and services. It is often said, that in the world of business, "Information is Power" and "efficiency is the key to success." To find or sell the most relevant or useful information and to provide the ability to most efficiently allow business to operate at its best, we need easy-to-use tools that can help us navigate, locate, and select what matches our interests. In the modern world, it is often difficult to find out what different people like, and to supply people with the opportunity to select the best or most satisfying choices.

Past attempts outside the computer world to match up people with information, goods and/or services have had limited success. For example, attempts to "target" mass mailings may increase the chance that they will go to people who are interested in them, but the entire process is still very wasteful and inefficient. It is considered a good success rate to match the interests of only a few percent of the recipients of "junk" mail. Telemarketing campaigns that use the telephone to reach potential consumers can be very expensive, very annoying to consumers who are not interested in the products being marketed, and very costly and inefficient. A much more ideal situation for all concerned is enabling businesses to send information only to individual consumers likely to find the information interesting, desirable, convincing, and/or otherwise useful. That way, businesses save time and money and consumers aren't unproductively hassled by information, phone calls, junk mail, junk e-mail and the like. However, right now it is extremely difficult to accomplish this goal, and so businesses continue to annoy consumers while wasting their own time, money, and effort.

Because of the Vast Amount of Information Available, Even Systems that Provide a High Degree of Organization May be Difficult to Use or Access You can find yourself wasting a lot of time finding things—even in places where finding things is supposed to be easy. For example, a library is a place where you can find all sorts of useful information but can also waste a lot of time trying to find what you are looking for. Modern libraries can be huge, containing tens or even hundreds of thousands or millions of different books, magazines, newspapers, video tapes, audio tapes, disks, and other publications. Most libraries have an electronic or manual card catalog that classifies and indexes all of those books and other materials. This classification system is useful, but it often has significant limitations.

For example, normally a card catalog will classify materials based only on a few characteristics (for example, general subject, author and title). The boy in FIG. 3 is looking for information on American League baseball teams during World War II for a high school report. The card catalog led to the general subject of baseball and other sports, but, looking at the catalog, he can't identify any books that seem to provide the specific information he wants to see, so he must rely on books classified as "histories of sports" or "histories of baseball." He can spend lots of time looking through the books on the shelves, going back to the card catalog, and going back to the shelves before he finds a reference that's reasonably helpful. He may need to go ask an expert (the librarian) who is familiar with the books the library has on sports and may know where to look for the information. Even then, the boy may need to flip through many different books and magazines, and look in many different places within the library before he finds the information he is looking for.

Finding Products You Want or Need can be Very Difficult and Time Consuming

The same kind of frustrating experience can happen when you shop for a particular kind of item. While some people enjoy shopping, and have fun seeing what is in various stores, many people dislike spending time shopping, searching for the best or most affordable item. And sometimes even people who like to shop don't have the time to shop for a specific item.

For example, the man in FIG. 4 goes into a shopping mall looking for a tie to fit very tall people. He didn't wear a tie to work that day, but, at the last minute, an important meeting was scheduled for later that day and he needs to dress up. The shopping mall has a large variety of stores, each selling a range of merchandise. But the man may only have a short time to look. For example, he may be on his lunch break, and needs to get back to work soon. He can't spend a lot of time shopping. He may therefore need to rely on tools to help him identify where he wants to buy the tie. Perhaps he uses a mall directory that classifies the different stores in terms of what kinds of merchandise they sell (for example, clothing, books, housewares, etc.). Perhaps he asks at the malls help desk staffed by "experts" who know what is available in the shopping mall. But even these resources may not tell him where to buy Italian silk ties that are discounted and cost $20. So he does the best he can with the available resources.

These Problems are Worse in the Digital World

The electronic or digital world offers a rapidly growing, vast array of electronically published products and services. For example, computer superstores have a dizzying array of different software products. Furthermore, music is now published primarily in digital form on optical disks, and video will soon be published that way too. And, of particular interest related to certain of the inventions described by this document, the Internet now has millions of home pages with an overwhelmingly variety and quantity of digital information, and, these millions of home pages, in turn, point or "link" to millions of other web pages as well.

Today, for example, you can use the Internet to:

- read electronic newspapers, books and magazines and see them on your computer screen;
- get music in electronic form and play it using your computer;
- send and receive electronic mail all over the world;
- download reports and other information compiled by governments, companies, industries, universities, and individuals;
- watch videos and animations;
- play games with "cyber-friends" located around the world;
- chat with individuals and groups who share at least some interests in common;
- participate in "virtual reality" worlds, games, and/or experiences;
- (offer to) buy, and/or (offer to) sell nearly anything; and
- conduct electronic transactions and commerce.

Today on the Internet and you can also find nearly anything and everything you can possibly imagine, although finding exactly what you really want may be time consuming and frustrating. This is because the Internet and World Wide Web provide perhaps the best example of an environment that is particularly hard to navigate. There are an overwhelming number of choices—too many to easily relate to or understand—and many of which are terribly hard to find, even using the various Web searching "engines." The Internet is particularly exciting because it has the potential to provide to nearly everyone access to nearly every kind of information. Information can also come from an almost limitless variety of sources. But today, so much information on the Internet is superficial or useless, and too many choices can be more a curse than a blessing if you don't have meaningful, easy ways to eliminate all but a relatively few choices. And the situation will only become much worse as more Web sites appear, and as digital information is distributed in "objects" or "containers" providing enhanced security and privacy but possibly more difficult access and identifiability.

As time passes, more and more valuable and desirable information will be available in digital containers. However, unless tools are developed to solve the problem, there will be no efficient or satisfying means to sort through the potentially trillions of digital containers available on tens of millions of Web pages, to find containers satisfying a search or fulfilling an information need. Furthermore, existing information searching mechanisms typically Provide no way to readily perform a search that matches against underlying commercial requirements of providers and users.

It Will be Difficult to Find Rights Management Scenarios Matching Your Requirements If, for example, you have an auto repair newsletter and you want to create an article containing information on auto repair of Ford Bronco vehicles, you may wish to look for detailed, three dimensional, step-by-step "blow-up" mechanical images of Ford Bronco internal components. Perhaps these are available from hundreds of sources (including from private individuals using new, sophisticated rendering graphics programs, as well as from engineering graphics firms). Given the nature of your newsletter, you have decided that your use of such images should cost you no more than one penny to redistribute per copy in quantities of several thousand—this low cost being particularly important since you will have numerous other costs per issue for acquiring rights to other useful digital information products which you reuse and, for example, enhance in preparing a particular issue. You therefore wish to search and match against rights management rules associated with such products—non-limiting examples of which include:

- cost ceilings,
- redistribution rights (e.g., limits on the quantity that may be redistributed),
- modification rights,
- class related usage rights,
- category related usage rights,
- sovereignty based licensing and taxation fees,
- import and export regulations, and
- reporting and/or privacy rights (you don't want to report back to the product provider the actual identity of your end users and/or customers.

If you can't match against your commercial requirements, you may be forced to waste enormous amounts of time sifting through all of the available products matching Ford Bronco internal components—or you may settle for a product that is far less than the best available (settling on the first adequate product that you review).

Computers Don't Necessarily Make it Easier to Find Things

Anyone who has ever used the Internet or the World Wide Web knows that networks, computers and electronics, when used together, do not necessarily make the overall task of finding information easier. In fact, computers can make the process seem much worse. Most Internet users will probably agree that trying to find things you are interested on the Internet can be a huge time drain. And the results can be very unsatisfactory. The rapid growth rate of information available on the Web is continually making this process of finding desired information even harder. You can spend many hours looking for information on a subject that interests you. In most cases, you will eventually find some information of value—but even using today's advanced computer search tools and on-line directories, it can take hours or days. With the advent of the technology advances developed by InterTrust Technologies Corp. and others, publishers will find it far more appealing to make their valuable digital information assets available on-line and to allow extractions and modifications of copyrighted materials that will vastly expand the total number of information objects. This will enormously worsen the problem, as the availability of valuable information products greatly expands.

It is Usually Hard to Find Things on the Internet

There are many reasons why it is difficult to find what you want on the Internet. One key reason is that, unlike a public library, for example, there is no universal system to classify or organize electronic information to provide information for matching with what's important to the person who is searching. Unlike a library, it is difficult on the Internet to efficiently browse over many items since the number of possible choices may be much larger than the number of books on a library shelves and since electronic classification systems typically do not provide much in the way of physical cues. For example, when browsing library shelves, the size of a book, the number of pictures in the book, or pictures on magazine covers may also help you find what you are interested in. Such physical cue information may be key to identifying desired selections from library resources. Unfortunately, most digital experiences typically do not provide such cues without actually loading and viewing the work in digital form.

Thus, another reason why the electronic or digital world can make it even harder to find information than ever before has to do with the physical format of the information. The digital information may provide few or no outward cues or other physical characteristics that could help you to even find out what it is—let alone determine whether or not you are interested in it, unless such cues are provided through special purpose informational (for example, graphical) displays. On the Internet, everyone can be an electronic publisher, and everyone can organize their offerings differently—using visual cues of their own distinctive design (e.g., location on a web page, organization by their own system for guiding choices). As one example, one publisher might use a special purpose graphical representation such as the video kiosk to support an electronic video store. Other publishers may use different graphical representations altogether.

Historically, there has been no particular need for consistent selection standards in conventional, non-electronic store based businesses. Indeed, it is often the unique display and choice selection support for customers' decision processes that make the difference between a successful store and a failure. But in the electronic world—where your choice is not among a few stores but rather is a choice among potentially thousands or even millions of possibly useful web sites and truly vast numbers of digital containers—the lack of a consistent system for describing commercially significant variables that in the "real" world may normally be provided by the display context and/or customized information guidance resource (catalog book, location of goods by size, etc.) seriously undermines the ability of digital information consumers to identify their most desirable choices.

Adding to this absence of conventional cues, the enormity of available choices made available in cyberspace means that the digital information revolution, in order to be practical, must provide profoundly more powerful tools to filter potentially desirable opportunities from the over abundance of choices. In sum, the absence of the ability to efficiently filter from a dimensionally growing array of choices, can completely undermine the value of having such a great array of choices.

In the "real" world, commercial choices are based on going to the right "store" and using the overall arrays of available information to identify one's selection. However, as information in digital and electronic form becomes more and more important, the problem of relating to the vast stores of information will become a nightmare. For example, picture yourself in a store where each shopping aisle is miles long, and each item on the shelf is packaged in the same size and color container. In an actual store, the product manufacturers put their products into brightly colored and distinctively shaped packages to make sure the consumer can readily find and select their product. These visual cues distinguish, for example, between a house brand and a specific name brand, between low fat and regular foods, and between family size and small size containers.

On the Internet, a digital "store" is likely to be many stores with vast resources integrating products from many parties. If you were limited to conventional classification and matching mechanisms, you would be unable to sift through all the material to identify the commercially acceptable, i.e., an item representing the right information, at the right price, providing license rights that match your interests. Certainly, if each digital package looks the same, you are at a loss in making reasonable decisions. You can't tell one from another just by looking at it.

While information written on the "outside" of a digital package may be useful, you simply don't have the time to read all the packages, and anyway, each packager may use different words to describe the same thing and the descriptions may be difficult to understand. Some people may write a lot of information on the outside of their package, and others may write little or nothing on the outside of the package. If there is no universal system agreed upon by everyone for defining what information should be written on the outside of the package and how it should be formatted, using such a store would be painfully difficult even if you could limit the number of choices you were evaluating.

There is a Need For Efficient and Effective Selection Based, at Least in Part, on Rights Management Information Unlike a real store where all breakfast cereals are shelved together and all soft drinks are in the same aisle, there may be no single, universal way to display the organization of all of the information in a "digital store" since, by its nature, digital information frequently has many implications and associated rules. For example, there now exist highly developed rights management systems such as described in U.S. patent application Ser. No. 08/388,107 of Ginter et al., filed Feb. 13, 1995, for "Systems And Methods For Secure Transaction Management And Electronic Rights Protection (hereafter "Ginter et al")—the entire disclosure (including the drawings) of which is expressly incorporated into this application as if expressly set forth herein. Many rules associated with any given piece of digital information may, combinatorially, given rise to many, very different, commercial contexts that will influence the use decisions of different potential users in many different ways (e.g., cost, auditing, re-use, redistribution, regulatory requirements, etc.).

No readily available systems developed for the digital information arena provide similarly satisfying means that describe the many commercial rules and parameters found in individual custom catalogs, merchandise displays, product specifications, and license agreements. Further, no readily available mechanisms allow "surfing" across vast choice opportunities where electronic matching can single out those few preferred items.

As one example, picking an appropriate image may involve any or all of the following:

- price,
- republishing (redistribution) rights,
- rights to extract portions,
- certified usable in certain sovereignties (e.g., pornographic content not allowed in Saudi. Arabia),
- size,
- format, etc.,
- use and reuse administrative requirements (e.g., which clearinghouses are acceptable to rightsholders, what is the requirement for reporting usage information—is the name of your customer required, or only the use class(es) or none—is advertising embedded), and
- other features.

No previously readily available technology allows one to efficiently make selections based on such criteria.

By their nature, and using the present inventions in combination with, amongst other things, "Ginter et al", the packages in a digital store may be "virtual" in nature—that is, they may be all mixed up to create many, differing products that can be displayed to a prospective customer organized in many different ways. This display may be a "narrowcasting" to a customer based upon his matching priorities, available digital information resources (e.g., repository, property, etc.) and associated, available classification information. In the absence of an effective classification and matching system designed to handle such information, digital information of a particular kind might be just about anywhere in the store, and very difficult to find since the organization of the stores digital information resources have not been "dynamically" shaped to the matching interests of the potential customer.

These Inventions Solve These Problems

The present inventions can help to solve these problems. It can give you or help you to find the things you like, need or want. For example, it can deliver to you, (including narrowcasting to you), or help you to find:

- things that match your interests;
- things that match your lifestyle;
- things that match your habits;
- things that match your personality;
- things you can afford and/or accept your preferred payment method;
- things that help you in your work;
- things that help you in your play;
- things that help you to help others;
- things that other people who are similar to you have found helpful,
- things that fulfill the commercial objective or requirements of your business activities; and
- things that will make you happy and fulfilled.

The present inventions can expand your horizons by helping you to find interesting or important things, things that you enjoy, things that optimize your business efficiency, and things that help you make the best digital products or services you can—even if you didn't know precisely what or how to look for what you may need. It can also help you by allowing things you didn't know existed or know enough to look for—but that you may be interested in, want or need—to find you.

The Present Inventions can Use "Metaclasses" to Take Multiple Classifications into Account In some areas, multiple classifications may already exist and thus it is important for a consumer to be able to find what he or she is looking for while taking into account not only that there may be multiple classifications, but also that some classifications may be more authoritative than others. For example, Consumer Reports may be more authoritative on certain topics than more casual reviews published, for example, in the local weekly newspapers.

As another example, consider a book that rates restaurants according several factors, including, for example, quality, price, type of food, atmosphere, and location. In some locations there may be many guides, but they may review different sets of restaurants. One guide may rate a particular restaurant highly while one or more others may consider it average or even poor. Guides or other sources of ratings, opinions, evaluations, recommendations, and/or value may not be equally authoritative, accurate, and/or useful in differing circumstances. One consumer may consider a guide written by a particular renowned expert to be more authoritative, accurate, and/or useful than a guide reflecting consumer polls or ballots. However, another consumer may prefer the latter because the second consumer may perceive the tastes of those contributing opinions to be closer to his or her own tastes than those of the experts.

In accordance with the present inventions, a person may be able to find a restaurant that meets specified criteria—for example, the highest quality, moderately priced Cantonese and/or Hunan Chinese food located in Boston or Atlanta—while weighting the results of the search in favor of reviews from travel books rather than from the local newspapers. As this example indicates, the searching may be according to class of authoritative source (and/or classes sources considered authoritative by the consumer) instead of weighting individual reviewers or sources. Thus in accordance with the present inventions, search may be performed at least in part based on classes of classes, or "metaclasses."

The Present Inventions can Make Choices Easier

One simple way to look at some examples of the present inventions is as a highly sensitive electronic "matchmaker" that matches people or organizations with their best choices, or even selects choices automatically. The present inventions can match people and/or organizations with things and/or services, things with other things and/or services, and/or even people with other people. For example, the matching can be based on profiles that are a composite of preference profiles of one or more specific users, one or more user groups, and/or organizations—where the contribution of any given specific profile to the composite profile may be weighted according to the specific match circumstances such as the type and/or purpose of a given match activity.

FIG. 5 shows a simplified example of an electronic matchmaker that can match up two people with like interests. Sarah loves hiking, country and western music, gardening, movies and jogging. Mark loves movies, hiking, fast cars, country and western music, and baseball. The electronic matchmaker can look at the interests, personalities and/or other characteristics of these two people and determine that they are compatible and should be together—while maintaining, if desired, the confidentiality of personal information. That is, unlike conventional matchmaking services, the present inventions can keep personal information hidden from the service provider and all other parties and perform matching within a protected processing environment through the use of encryption and protected processing environment-based matching analysis.

For example, certain matching of facts that are maintained for authenticity may be first performed to narrow the search universe. Then, certain other matching of facts that are maintained for secrecy can be performed. For example, matching might be based on shared concerns such as where two parties who have a given disability (such as cancer or HIV infection) that is certified by an authority such as a physician who is certified to perform such certification; or the same income level and/or bank account (as certified by an employer and/or financial authority such as a bank). Some or all of such secret information may or may not be released to matched parties, as they may have authorized and/or as may have been required by law when a match is achieved (which itself may be automatically managed within a protected processing environment through the use of controls contributed by a governmental authority).

FIG. 5A shows an electronic matchmaker that matches an electronic publisher with mystery stories for his quarterly electronic mystery anthology, where the matching is based on price, redistribution rights, editing rights, attribution requirements (attributing authorship to the author), third party rating of the writers quality, length of story, and/or the topical focus of the story (for example). Here, rule managed business requirements of publisher and writers are matched allowing for great efficiency in matching, coordination of interests, and automation of electronic business processes and value chain activities.

The convenience of the "electronic matchmaker" provided in accordance with the present inventions extends to commerce in physical goods as well as illustrated in FIG. 5*b*. In this non-limiting example, the electronic matchmaker is communicating to the consumer via the Internet and World Wide Web. The matchmaker has found the lowest quoted price for a Jeep sports utility model given, in this one example, a multitude of factors including:

- model,
- color,
- options package,
- availability, and
- discounts resulting from the consumer's membership in certain classes (such as membership in the American Association of Retired Persons, membership in the American Automobile Association, and being a graduate of Stanford University).

Membership in these associations and alumni status may be conveyed or indicated by possession of a special electronic document called a "digital certificate," "membership card," and/or other digital credential that warrants or attests to some fact or facts.

Thus, the electronic matchmaker provided in accordance with these inventions can also match people with things. FIG. 6 shows two people, Harry and Tim. Harry loves sports most of all, but also wants to know a little about what is going on in the business world. The business world is most important to Tim, but he likes to keep up with the baseball scores. The electronic matchmaker in accordance with these inventions can learn about what Harry and Tim each like, and can provide information to a publisher so the publisher can narrowcast a newspaper or other publication customized for each of them. A newspaper company can narrowcast to Harry lots of sports information in his newspaper, and it can narrowcast to Tim mostly business information in his newspaper. In another example, Harry's newspaper may be uniquely created for him, differing from all other customized newspapers that emphasize sports over business information. But information that Harry and Tim respectively want to maintain as authentic or secret can be managed as such.

The electronic matchmaker can also match things with other things. FIG. 7 shows how the electronic matchmaker can help a student put together a school project about big cats. The electronic matchmaker can help the student locate and select articles and other material about various kinds of big cats. The electronic matchmaker can, for example, determine that different articles about tigers, lions and cheetahs are all about big cats—but that articles about elephants and giraffes are not about big cats. If there is a charge for certain items, the electronic matchmaker can find only those items that the student can afford, and can make sure the student has the right to print pictures of the big cats. The electronic matchmaker can help the student to collect this information together so the student can make a colorful poster about big cats.

The electronic matchmaker can match up all sorts of different kinds of things. FIG. 8 shows the electronic matchmaker looking at three different objects. The matchmaker can determine that even though objects A and C are not identical, they are sufficiently similar that they should be grouped together for a certain purpose. The electronic matchmaker can determine that for this purpose, object B is too different and should not be grouped with objects A and C. For a different purpose, the electronic matchmaker may determine that objects A, B and C ought to be grouped together.

The Present Inventions can Make Use of Rights Management Information

How does the electronic matchmaker find out the information it needs to match or classify people and things? In accordance with a feature provided by these inventions, the electronic matchmaker gets information about people and things by using automated, computerized processes. Those processes can use a special kind of information sometimes known as rights management information. Rights management information may include electronic rules and/or their consequences. The electronic matchmaker can also use information other than rights management information.

An example of rights management information includes certain records about what a computer does and how it does it. In one simple example, records may give permission to read a particular news article if that the customer is willing to pay a nickel to purchase the article and that the nickel may be paid using a budget provided by a credit card company or with electronic cash. A customer might, for example, seek only news articles from providers that take electronic cash and/or process information with a certain information clearinghouse as described in U.S. patent application Ser. No. 08/699,712 to Shear et al., filed Aug. 12, 1996, for "Trusted Infrastructure Support Systems, Methods And Techniques For Secure Electronic Commerce Electronic Transactions And Rights Management" (hereafter "Shear et al")—the entire disclosure (including the drawings) of which is expressly incorporated into this application as if expressly set forth herein.

The Present Inventions can Maintain Privacy

FIG. 9 shows one way in which the electronic matchmaker can get information about a person. In this example, the electronic matchmaker asks Jill to fill out a computer questionnaire about what she likes. The questionnaire can also ask Jill what information she wishes to be maintained as authentic, and what information (e.g., encrypted by the system) may be used for secure matching only within a protected processing environment and can not be released to another party, or only to certain specified parties. The questionnaire answering process may be directly managed by a protected processing environment to ensure integrity and secrecy, as appropriate.

For example, the questionnaire may ask Jill whether she likes baseball and whether she is interested in volcanoes. The electronic matchmaker can also ask Jill if it is okay to look at records her computer maintains about what she has used her computer for in the past. These computer records (which the computer can maintain securely so that no one can get to them without Jill's permission) can keep a history of everything Jill has looked at using her computer over the past month and/or other time period—this process being managed, for example, through the use of a system such as described in the "Ginter et al."

Looking at FIG. 10, Jill may have used her computer last week to look at information about baseball, volcanoes and Jeeps. With Jill's permission, the electronic matchmaker can employ a protected processing environment 154 (schematically shown here as a tamper-resistant "chip" within the computer—but it can be hardware-based, software-based, or a combination of hardware and software) to look at the computer's history records and use them to help match Jill up with other kinds of things she is or may be interested in. For example, the electronic matchmaker can let an electronic publisher or other provider or information gatherer (e.g., market survey conductor, etc.) know that Jill is interested in team sports, geology and sports utility vehicles with or without more revealing detail—as managed by Jill's choices and/or rights management rules and controls executing in her computer's protected processing environment 154. The provider can send information to Jill—either automatically or at Jill's request—about other, related things that Jill may be interested in.

FIG. 11 shows an example of how rights management and other information Jill's computer maintains about her past usage can be useful in matching Jill up with things she may need or want. The computer history records can, for example, show that Jill looked at hockey information for three hours and football information for five hours during the past week. They can indicate that Jill uses a Discover credit card to pay for things, usually spends less that $10 per item, averages $40 per month in such expenses, and almost never buys new programs for her computer.

The electronic matchmaker can, with and subject to Jill's permission, look at and analyze this information. As one example, the electronic matchmaker can analyze relevant rules and controls provided by third parties who have rights in such information—where such rules are controlled, for example, by Jill's computer's protected processing environment 154. It can also look at and analyze Jill's response to computer questionnaires indicating that she likes baseball and football. The electronic matchmaker can, based on all of this information, automatically select and obtain videos and/or other publications for Jill about team sports and that cost less than $10 and that accept payment using a Discover card, so that Jill can preview and select those in which she may have a particular interest and desire to acquire.

FIG. 12 shows that the electronic matchmaker can take into account computer history records for lots of different people. The electronic matchmaker can work with other rights management related computer systems such as "usage clearinghouses" (non-limiting examples of which are described in each of "Ginter et al" and "Shear et al") to efficiently collect rights management related information. The ability to collect history records from many different people can be very useful. For example, this can allow the electronic matchmaker to distinguish between things that are very popular and things that are not so popular.

The present inventions provide great increases in efficiency and convenience. It can save you a lot of time and effort. It can allow computers to do a lot of the work so you don't have to. It can allow you to compete with larger businesses—and allow large business to function more efficiently—by allowing the location of resources particularly appropriate for certain business activities. You can delegate certain complex tasks to a computer, freeing you to be more productive and satisfied with electronic activities. These automated processes can be "smart" without being intrusive. For example, they can learn about your behavior, preferences, changing interests, and even your personality, and can then predict your future interests based on your past behavior and interest expressions. These processes can ensure confidentiality and privacy—so that no one can find out detailed information about you without your consent. Across the full range of personal and business activities, the present inventions allow a degree of basic efficiency, including automation and optimization of previously very time consuming activities, so that interests and possible resources are truly best matched.

The present inventions handle many kinds of important issues and addresses the widest range of information and rights and automation possibilities. For example, the present inventions are capable of handling (but are not limited to):

consumer information;
computer information;
business information;
entertainment information;
other content information;
information about physical products;
all other kinds of information.

It can reflect and employ all kinds of rights to optimize matching processes, including:

content rights;
privacy rights;
governmental and societal rights;
provider rights;
distributor rights;
consumer rights;
workflow rights;
other value chain participant rights;
work flow rights;
business and personal rights and processes of all kinds.

It can employ all kinds of parameter information, including:

budget,
pricing
redistribution
location (of party, item, etc.)
privacy
identity authenticity and/or specificity
any other parameter information.

Pricing (for example the price of a specific item) can be used in matching based upon price per unit and/or total price for a volume purchase, price for renting, right to redistribute, cost for redistributing items, etc.

Privacy can be used for establishing matching contingent upon usage reporting requirements for viewing, printing, extracting, dedistributing, listening, payment, and/or requiring the reporting of other information such as personal demographics such as credit worthiness, stored value information, age, sex, marital status, race, religion, and/or usage based generated profiling information based materially upon, for example, a users history of usage of electronic content and/or commercial transactions, etc.

Identity can be used for matching based upon, for example, such as the presence of one or more specific, class, and/or classes of certificates, including, for example, specific participant and/or group of participant, including value chain certificates as described in "Shear et al".

With the inventions described herein, commercial requirement attributes embodied in rules (controls and control parameter data) are employed in classification structures that are referenced by search mechanisms, either, for example, directly through reading rule information maintained in readable (not encrypted) but authentic (protected for integrity) form, through reading rule information maintained securely, through processes employing a protected processing environment 154 of a VDE node, and/or through the creation of one or more indexes and/or like purpose structures, that, directly, and/or through processes employing a protected processing environment 154, automatically compile commercial and other relevant (e.g., societal regulatory information such as a given jurisdiction's copyright, content access and/or taxation regulations) for classification/matching purposes.

The present inventions can employ computer and communication capabilities to identify information, including:

topical classification such as described by conventional library classification systems, commercial characterizations—including commercial parameter data such as pricing, size, quality, specific redistribution rights, etc., creator (e.g., a publisher or manufacturer), distributor, societal, user, and other participant interests information, information generated by automated profiling of any and all of such parties or collections of parties, matching (including electronically negotiating a match) between the interests of any of such parties, where appropriate, the use of statistical procedures, expert systems, and artificial intelligence tools for profiling creation and/or analysis, matching, and/or negotiation.

The present inventions thus provide for optimal user, provider, and societal use of electronic cyberspace resources (for example, digital information objects available across the Internet, sent by direct broadcast satellite, transmitted over a cable TV system, and/or distributed on optical disk).

Of particular importance is the notion of classes of content, classes of users, and classes of providers. For example, the present inventions can make use of any/all of the following:

topical identification, for example, such as information represented in typical library subject and/or author and/or catalog and/or keyword search and retrieval information systems;

any commercial requirements, associated with the use of electronic information (and/or to products, including non-electronic products, and/or to any service), including information embodied in encrypted rules (controls and/or parameter data) governing rights in electronic value chain and electronic interaction contexts, and further including information guaranteed for integrity;

any information descriptive of an available resource (which may include any information, product, and/or service, whether available in electronic and/or physical forms) such as: the quality of a digital product as evaluated and ranked and/or otherwise specified by one or more third parties and/or independent third parties (e.g., Consumer Reports, a trusted friend, and/or a professional advisor), the size of a product, length in time in business of a service or in the market of a product, a product's or service's market share, and/or subject governmentally and/or other societally imposed rules and/or integrity guaranteed descriptions, including any associated regulatory requirements, such as societal requirements granting and/or reporting access to information, for example, information on how to create a nuclear bomb to a confidential government auditing agency (this allowing free access to information while protecting societal rights);

any information descriptive of a user and/or department and/or organization and/or class of users and/or departments and/or organizations (including, for example, such descriptive information encrypted and/or guaranteed for integrity) wherein such information may include, for example, name, physical and/or network and/or cyber-wide logical network location, organizational and/or departmental memberships, demographic information, credit and/or trustworthiness information, and profile preference and usage history information, including any generated profile information reflecting underlying preferences, and/or classes based on said descriptive information and/or profiles.

Some of the Advantageous Features and Characteristics Provided by the Present Inventions The classification, matching, narrowcasting, analysis, profiling, negotiation, and selection capabilities of the present inventions include the following capabilities (listed items are not mutually exclusive of each other but exemplary samples):

Enables highly efficient provision of classes of information, entertainment, and/or services to classes of individuals and/or entities that have (and/or may obtain) the right(s) to such information and are likely to find identified information interesting, useful, and/or entertaining.

The present inventions also provide systems and methods for efficiently determining class hierarchies, classification schemes, categories, and/or category schemes and/or the assignment of objects, persons and/or things to said class hierarchies, classification schemes, categories, and/or category schemes using at least some rights management information.

Helps systems, groups, and/or individuals classify, locate, and/or obtain specific information and/or classes of information made available through so-called "publish and subscribe" systems and methods using, among other things, subject-based addressing and/or messaging-based protocol layers.

Provides fundamentally important commercial and societal rules based filtering to identify desired electronic information and/or electronic information containers through the use of classification structures, profiling technology, and matching mechanisms that harness the vast information opportunities in cyberspace by matching the information needs of users against commercial and/or societal rules related to the use of available information resources, including, for example, commercial and/or societal consequences of digital information use imposed as provider requirements and specified through the use of, and enforced by the use of, a trusted rights management system such as described in "Ginter et al".

Enables content creators and/or distributors to efficiently "stock the shelves" of retail electronic content outlets and similar merchanisers (both electronic and hard goods) with products and/or services most likely to be purchased and/or used by the customers of such merchanisers. This includes both identifying and "stocking" the most desirable products and/or other user desired resources and optimally presenting such products and/or other resources in a manner optimized for specific users and/or user classes.

Matching may be based on history of matching, that is, matching derived at least in part from previous matching, one non-exhaustive example of which includes learned matching for increasing efficiency.

Enables matching for value chains where the matching is against a plurality of co-participating value chain parties requirements and/or profiles against match opportunities, and/or matching by matches comprised of match input and/or aggregation of match rule sets of providers used to "dock" with one or more user needs, interests, requirements match sets.

Helps match persons and/or things using fuzzy matching, artificial intelligence (e.g., expert systems), and other methods that that match using plural match sets from providers and/or receivers.

Makes search easier by using smart agents that match at least in part using at least one class.

Helps bring buyers and sellers together through cross matching, where both parties offer to provide and/or receive content and/or physical goods for consideration, including barter matching and negotiated barter and other kinds of matching.

Helps potential customers find those members (e.g., objects such as digital information containers) of any one or more classes of content most useful, entertaining, and/or interesting to them.

Facilitates organizations securely and efficiently acquiring and distributing for internal use certain classes of content available from external providers and/or more securely and/or efficiently managing classes of their own content, including being able to authorize certain classes of employees to use specified classes of internal and/or external content.

Efficiently supporting matching between users and digital information where participants in a chain of handling and control have specified rules and usage consequences for such digital information that may depend on class membership, for example, on class(es) of content and/or class(es) of value chain participants and/or classes of electronic events, wherein such participants include, for example, users and/or participants contributing rules and consequences.

Enables first individuals and/or organzations to locate efficiently other individuals, organizations, products, and/or services who have certain characteristics that corresponds to such first individuals' and/or organizations' interests, including interests generated by profiling information locally gathered through local event auditing at a VDE installation.

Facilitates businesses informing a customer about things of special interest to her or him, such as classes of goods, services, and/or content, including directing such information to a customer at least in part based on profiling information locally gathered at a VDE installation through local event auditing at a VDE installation.

Allows trading companies to match suppliers of certain classes of goods and/or services with those who desire to purchase and/or use those classes of goods and/or services, wherein such matches may include fulling a commercial business interaction and may further include one or more sequences of matches and/or nested matches (a sequence and/or grouping of matches within a given organization or group, wherein such matches may be required to occur in a certain order and/or participate along with other matches in a group of matches before a given match is fulfilled).

Enhances equity portfolio management by making easier for traders to identify those equities having certain desired characteristics, such as belonging to the class of equities that will have the greatest positive effect on the value of the trader's portfolio given certain classes of information and assumptions. Such matches may take into account information external to the fulfilment of a given trade, for example, one or more certain other market or specific variable thresholds must be met before an equity is traded, such as a certain rise in the an index stock value of, and/or revenue of, certain one or more network hardware suppliers before a certain quantity of equity is purchased at a certain price for stock of a certain network hardware supplier raw network component manufacturer, and wherein, for example, such determinations can be performed highly efficiently at a user VDE installation as the point of control, where such node receives such trusted information in, for example, VDE containers, as is necessary for a control decision to occur to purchase such equity of such network hardware supplier raw component manufacturer.

Makes easier automated foreign currency exchange by enabling currency traders to identify members of the class of possible trades and/or conversions that are likely to produce the best returns and/or minimize losses.

Helps consumers and organizations manage their affairs more efficiently and effectively and helps providers of services by automatically matching users with services that meet certain specified criteria, such as, for example, U.S. and Swiss banks offering the highest interest rates on certain time based classes of bank deposit instruments.

Enables distributers of software and other content to identify one or more classes of users who are most likely to be interested in purchasing or otherwise using certain classes of software.

Enables rightsholders to employ rules and/or usage consequences dependent on membership in one or more classes where class membership may be indicated by posession of a special digital document called a "certificate."

Enables rightsholders to employ rules and/or usage consequences at least partially dependent on roles and responsibilities within an organization, where those roles and responsibilities may be indicated by posession of a digital certificate, digital membeship card, and/or other digital credential.

Facilitates more efficient automation of manufacturing and other workflow processes by, for example, matching certain manufacturing steps and/or processes with performance parameter data associated with available classes of equipment capable of performing those steps and/or processes.

Makes easier the administration and enforcement of government and/or societal rights by, for example, providing matching means for automatically applying certain classes of tax rules to appropriate classes of sales and other transactions.

Enables altering the presentation of information and/or other content depending on the matching between preferences of the user and one or more classes of content being presented.

Enables processing or altering (narrowcasting) of an event (e.g., the presentation of information and/or other content), for example, dynamically adjusting the content of an event, in response to a matching among the preferences and/or reactions of a user and/or user group, one or more classes of content being processed through one or more events, one or more classes of one or more users participating in and/or otherwise employing the one or more events, and/or event controls (i.e., rules and/or parameter data).

Allows the rules and usage consequences and the presentation of information to vary according to the difficulty of the information, including, for example, adjusting the difficulty of an electronic game so that it is neither too frustratingly difficult nor too easy to use.

Enables a user to efficiently locate content in one or more particular classes, where class is defined at least in part by weighted topical classification, where, for example, a document or other object is classified in one or more categories where at least one category reflects the absolute or relative attention given to that class in the object being classified.

Facilitates users' creation of a new document from parts of two or more documents, where at least one of such parts is identified and/or retrieved based upon matching the part's membership in one or more classes identified by trusted, commercial controls employed through the use of a rights management system.

Enables users to search for, locate, and use only those parts of a document that belong to one or more specified classes, including those parts having certain commercial controls, for example, reflecting acceptable usage restrictions and/or pricing.

Enhances search and retrieval by creating new classes of content discriptors that incorporate various dispirate standards for content description and/or location.

Allows consumers to easily locate services having certain specified characteristics, for example, gambling services offering the most favorable odds and/or specified rules for a particular game or games.

Helps consumers obtain certain classes of tickets to certain classes of events.

The above capabilities, and others described in this application, are often ideally managed by distributed commerce nodes of a distributed, rights management environment embedded in or otherwise connected to the operating system clients of a distributed computing environment such as described in "Ginter et al" and further described in "Shear et al", and employing, for example, rules, integrity management, container, negotiation, clearinghouse services, and trusted processing capabilities described in "Ginter et al" and "Shear et al".

The Present Inventions Make Use of Many Kinds of Information and/or Data

As discussed above, these inventions provide, among other things, matching, classification, narrowcasting, and/or selection based on rights management and other information. In particular preferred examples, these matching, classification, narrowcasting, and/or selection processes and/or techniques may be based at least in part on rights management information. The rights management information may be an input to the process, it may be an output from the process, and/or the process can be controlled at least in part by rights management information. Information in addition to, or other than, rights management information may also be an input, an output, and/or a basis for controlling, the process and/or techniques.

Rights management information may be directly or indirectly inputted to the matching, classification and/or selection process. For example, rights management controls, rules and/or their consequences may be an input. Examples of such controls and/or rules include object registration related control set data, user related control set data and/or computer related control set data. In addition or alternatively, information provided based on control sets or rules and their consequences may be inputted. The following are examples of such information that may be provided based, for example, on rules and consequences:

- information exhaust;
- user questionnaires,
- audit trail related information;
- aggregated usage data;
- information measuring or otherwise related to user behavior;
- information measuring or otherwise related to user preferences;
- information measuring or otherwise related to user personality;
- information measuring or otherwise related to group behavior;
- information measuring or otherwise related to group preferences;
- information measuring or otherwise related to group culture
- information measuring or otherwise related to organizational behavior;
- information measuring or otherwise related to organizational preferences;
- information measuring or otherwise related to organizational culture;
- information measuring or otherwise related to institutional behavior;
- information measuring or otherwise related to institutional preferences;
- information measuring or otherwise related to institutional culture;
- information measuring or otherwise related to governmental behavior;
- information measuring or otherwise related to governmental preferences;
- information measuring or otherwise related to governmental culture;
- information measuring or otherwise related to societal behavior;
- information measuring or otherwise related to societal preferences;
- information measuring or otherwise related to societal culture;
- object history related information;
- other types of information;
- any combinations of information including, some, all or none of the information set forth above.

The processes, techniques and/or systems provided in accordance with these inventions may output rights management related information such as, for example:

- one or more control sets;
- various rules and/or consequences;
- information used by control sets;
- certificates;
- other rights management information.

In accordance with various preferred embodiments provided by these inventions, information other than rights management information may also be used, at least in part, as an input, output and/or to control the matching, classification, narrowcasting, and/or selection processes, systems and/or techniques. Examples of such information include:

- content object information;
  - full text
  - portions of objects
  - portions of sub-objects
  - abstracts
  - metadata
  - other content object related information
- user information
  - census information
  - purchasing habits
  - credit and financial transaction related information
  - governmental records
  - responses to questionnaires
  - survey results
  - other user information
- computer related information
  - identification information
  - configuration information
  - other computer related information
- combinations of information.

Matching/Classifying/Selection

Systems, methods and techniques provided in accordance with these inventions can classify a variety of types of things including, for example:

- people
- computers
- content
- events
- transactions
- objects of all types
- combinations of things;
- combinations of people and things.

The matching, classifying and/or selecting processes provided in accordance with these inventions are very flexible and useful. For example, they may be used to associate people with information, information with other information, people with other people, appliances with people, appliances with information, and appliances with other appliances. The present inventions in their preferred examples can associate any kind of information, object or thing with any other kind of information, object or thing.

Different Associations Between Classes and Rights

The processes, systems and/or techniques provided in accordance with these inventions can provide and/or take into account many different kinds of associations between classes and rights. For example, they can look at what rights are available to a user, computer, data structure or any other object. They can also look to rights selected by an object (for example, the subset of rights a user has chosen or otherwise identified). Alternatively or in addition, they can look to rights that have been exercised by a user or in conjunction with an object or other thing, and they can look to the consequences of exercising such a right(s).

Embodiments in Accordance with the Present Inventions can be Used to Define Classes Based on Uni-Dimensional and/or Multi-Dimensional Attributes and/or Characteristics Example processes, systems and/or techniques provided in accordance with these inventions can be used to define classes based on uni-dimensional and/or multi-dimensional attributes and/or characteristics. Any one or more attributes can be used. The attributes and/or characteristics can be flexibly defined. They may define groups or classes containing elements sharing certain attributes in common. There can, for example, be a spectrum of classification that takes into account gray areas as to whether a particular person or thing possesses a certain one or a number of particular attributes and/or characteristics. Or classification may have a higher degree of certainty or definition. For example, a process can test to determine whether particular people or things are inside or outside of particular classes or groups based on one or a number of attributes or characteristics (for example, whether you live in Denver, are under the age of 25 and are single). In accordance with additional specific features provided by these inventions, there may be a minimum number of different classes set up to "cover" a particular situation—with every person or thing either being within or outside of a given, disjoint class or group.

Preferred Examples in Accordance with the Present Inventions are Extensible to Accommodate Changing Conditions The systems, methods and/or techniques provided by these inventions are extensible to accommodate changing conditions. For example, they can be made to readily adapt to changes in rules, consequences, topics, areas and/or subjects pertaining to groups such as, for example categories, and any other variable. Furthermore, partially and/or entirely new variables may be introduced to one or more existing sets of variables—for example, to extend or otherwise modify a model to account for additional variables, to apply a new strategy, to adapt to new network and/or installation circumstances, to adapt to new user factors, to change analysis and/or other processing characteristics, and so on.

Preferred Examples in Accordance with the Present Inventions are Compatible with Pre-Existing or Any New Classification Techniques or Arrangements The example systems, methods and/or techniques provided by these inventions can be made fully compatible with any classification and/or categorization means, method, process, system, technique, algorithm, program, and/or procedure, presently known or unknown, for determining class and/or category structures, definitions, and/or hierarchies, and/or the assignment of at least one object, person, thing, and/or member to at least one class and/or category, that without limitation may be:

- implemented by computer and/or other means; and/or
- based upon discrete and/or continous mathematics; and/or
- using nominal, ordinal, interval, ratio and/or any other measurement scale and/or measurement mode; and/or
- including parameter data; and/or
- entail linear and/or non-linear estimation methods; and/or
- any other methods.

For example, classification can be performed using any or all of the following example classification techniques:

- Statistical techniques that identify one or more clusters of cases sharing similar profiles and/or features, including any of the family of cluster analysis methods, for example, those described in Hartigan (Hartigan, J. A., Clustering Algorithms, New York: Wiley, 1975);
- Methods for numerical taxonomy, for example, as described, for example, by Sneath and Sokal (Sneath, Peter H. A. and Robert R. Sokal, Numerical Taxonomy: The Principals and Practice of Numerical Classification, San Francisco: W. H. Freeman, 1973);
- Any of the methods for cluster analysis, factor analysis, components analysis, and other similar data reduction/classifiction methods, for example, those implemented in popular statistical and data analysis systems known to those skilled in the arts, for example, SAS and/or SPSS;
- Pattern classification techniques, including components analysis and neural approaches, for example, those described by, for example, Schurmann (Schurmann, Jurgen, Pattern Classification: A Unified View of Statistical and Neural Approaches, New York: John Wiley & Sons, 1966);
- Statistical techniques that identify one or more underlying dimensions of qualities, traits, features, characteristics, etc., and assign parameter data indicating the extent to which a given case has, possesses, and/or may be characterized by the underlying dimension, factor, class, etc. and/or result in the definition of at least one class and/or the assignment of at least one case to at least one class, for example, as described by Harman (Harman, Harry H., Modern Factor Analysis, 3rd ed. rev., Chicago: University of Chicago Press), and/or as implemented by SAS and/or SPSS and/or other statistical analysis programs.
- Statistical methods that employ fuzzy logic and/or fuzzy measurement and/or whose assignment to at least one class entails probabilities different from 1 or zero.
- Baysian statistical classification techniques that use estimates of prior probabilities in determining class definitions and/or the assignment of at least one case to at least one class;
- Any statistical and/or graphical classification and/or data reduction method that uses rotation of reference axes, regardless of whether orthogonal or oblique rotations are used, for example, as described in Harman, and as implemented in SAS and/or SPSS and/or other statistical programs;
- Statistical methods for two and three way multidimensional scaling, for example, the methods described by Kruskal and Wish (Krusgal Joseph B. and Myron Wish, Multidimensional Scaling, Beverly Hills, Calif.: Sage Publications, 1978), and/or by Shepard, et al. (Shepard, Roger N., A. Kimball Romney, and Sara Beth Nerlove, Multidimensional Scaling: Theory and Applications in the Behavioral Sciences, New York: Seminar Press, 1972);
- Knowedge based approaches to classification, for example, as described by, for example, Stefik (Stefik, Mark, "Introduction to Knowledge Systems," San Francisco: Morgan Kauffnan, 1995); and
- any other classification techniques or arrangements pre-existing or yet to be developed.

Preferred Examples in Accordance with the Present Inventions are Fully Compatible with a Wide Array of Technologies Including the Distributed Commerce Utility System and the Virtual Distribution Environment Systems, methods and/or techniques provided in accordance with these inventions build upon and can work with the arrangements disclosed in "Ginter et al"; "Shear et al"; and other technology related to transaction and/or rights management, security, privacy and/or electronic commerce.

For example, the present inventions can make particular use of the security, efficiency, privacy, and other features and advantages provided by the Virtual Distribution Environment described in "Ginter et al".

As another example, a matching and classification arrangement can be constructed as a distributed commerce utility system as described in "Shear et al". The present inventions can work with other distributed commerce utility systems, and can enhance or be a part of other commerce utility systems.

By way of non-exhaustive, more specific examples, the present inventions can be used in combination with (and/or make use of) any or all of the following broad array of electronic commerce technologies that enable secure, distributed, peer-to-peer electronic rights, event, and/or transaction management capabilities:

- a "VDE" ("virtual distribution environment") providing, for example, a family of technologies by which applications can be created, modified, and/or reused;
- a standardized control and container environment which facilitates interoperability of electronic appliances and efficient creation of electronic commerce applications and models;
- a programmable, secure electronic transaction management foundation having reusable and extensible executable components;
- seamless integration into host operating environments of electronic appliances or direct employment of such technologies in electronic commerce applications;
- cyberspace digital content rights and transaction management control systems that may operate in whole or in part over Internets, Intranets, optical media and/or over other digital communications media;
- support of an electronic "world" within which most forms of electronic transaction such as content usage, distribution, auditing, reporting, and payment activities can be managed;
- Transaction Operating Systems (operating systems that have integrated secure, distributed, and programmable transaction and/or event management capabilities);
- Rights Operating Systems (operating systems that have integrated, distributed, and programmable rights management capabilities);
- secure content container management;
- clearinghouse functions related to content usage;
- overall electronic commerce architectures that provide electronic commerce automation through the use of secure, distributed digital events management;
- the general enablement of traditional commerce behavior in the digital commerce world;
- enhanced inherent, distributed efficiencies of conventional commerce practices with powerful, reliable electronic security, and with the programmability and electronic automation efficiencies made possible by modern computing;
- trusted operation of a freely configurable, highly efficient, general purpose digital marketplace in which parties "come together" to establish commercial relationships;
- support of "real" commerce in an electronic form (that is, the progressive creation of commercial relationships that form, over time, a network of interrelated agreements representing a value chain business model);
- enabling content control information to develop through the interaction of (and/or negotiation between) securely created and independently submitted sets of content and/or appliance control information;
- interconnection of appliances providing a foundation for much greater electronic interaction and the evolution of electronic commerce;
- a variety of capabilities for implementing an electronic commerce environment;
- a neutral, general purpose platform for commerce;
- an architecture that avoids reflecting specific distribution biases, administrative and control perspectives, and content types;
- a broad-spectrum, fundamentally configurable and portable, electronic transaction control, distributing, usage, auditing, reporting, and payment operating environment;
- systems and methods that uniquely enable electronic commerce participants to protect their interests during the sequence of activities comprising an electronic commerce model;
- ability of commerce participants to assure protection by specifying rules and controls that monitor and enforce their interests during the processing of remote commerce events;
- permitting commerce participants to efficiently participate in, and manage, the distributed electronic activities of a digital value chain;
- allowing commerce model participants to, for example, securely and cooperatively govern and automate the distributed electronic activities comprising their collective electronic business models;
- allowing commerce model participants to securely contribute electronic rules and controls that represent their "electronic" interests;
- rules and controls that extend a "Virtual Presence™" through which the commerce participants govern remote value chain activities according to their respective, mutually agreed to rights;
- a Virtual Presence taking the form of participant specified electronic conditions (rules and controls) that must be satisfied before an electronic event may occur;
- rules and controls that enforce the party's rights during "downstream" electronic commerce activities;
- control information delivered by, and/or otherwise available for use with, the VDE content containers constituting one or more "proposed" electronic agreements which manage the use and/or consequences of the use of such content and which can enact the terms and conditions of agreements involving multiple parties and their various rights and obligations;
- rules and controls from multiple parties forming aggregate control sets ("Cooperative Virtual Presence™") that ensure that electronic commerce activities will be consistent with the agreements amongst value chain participants;
- control sets defining the conditions which govern interaction with protected digital content (disseminated digital content, appliance control information, etc.);
- conditions used to control not only digital information use itself, but also the consequences of such use to protect the individual interests of commerce participants and form cooperative, efficient, and flexible electronic commerce business models;
- true, efficient electronic cooperative governance of value chain activities;
- empowering each commerce model participant to securely deliver, and persistently maintain control over, the rules and controls they contributed specifying constraints on, and consequences of, electronic conduct;

extending Cooperative Virtual Presence over time and involving the execution of controls, and the use of content, at physically dispersed locations, such as Internet user sites;

a chain of handling and control in which dispersed locations are bound together through the use of secure communication techniques and unique, secure digital container technology;

ability to preserve the rights of parties through a series of transactions which may occur at different times and different locations;

extending the ability of electronic content providers to control the use of proprietary information;

allowing content providers to limit use to authorized activities and amounts;

allowing participants (e.g., actors, directors, script and other writers, musicians, studios, publishers, distributors, retailers, advertisers, credit card services, content end-users, and others) involved in a business model to have the ability to embody their range of agreements and requirements, including use limitations, into an "extended" agreement comprising an overall electronic business model;

representing such an extended agreement by electronic content control information which can automatically enforce agreed upon rights and obligations;

a competitive, general purpose electronic commerce architecture supporting the distributed, secure "unmanned" electronic interaction;

distributing such capabilities across networks and involving the sequence (or web) of distributed activities underlying electronic value chains;

cooperative electronic governance of distributed electronic commerce processes that optimizes electronic commerce value propositions;

the capability of electronically, remotely representing the interests of commerce participants to support efficient, flexible, commerce model automation;

enabling rules and controls that are independently contributed by multiple parties to securely merge together and form the collective rules and controls sets that reflect the electronic commerce agreements between parties;

using rules and controls sets to collectively, automatically, govern remote electronic conduct;

securely managing the integration of control information provided by two or more parties;

constructing electronic agreements between VDE participants that represents a "negotiation" between the control requirements of two or more parties and enacts the terms and conditions of a resulting agreement;

ensuring and/or enforcing the rights of each party to an electronic agreement regarding a wide range of electronic activities related to electronic information and/or appliance usage;

the ability to broadly support electronic commerce by securely managing independently delivered VDE component objects containing control information (normally in the form of method, data, or load module VDE objects);

using independently delivered control information to negotiate with senior and other pre-existing content control information to securely form derived control information;

ensuring that all requirements specified by derived control information are satisfied before VDE controlled content is accessed or otherwise used;

ensuring that all load modules and any mediating data which are listed by the derived control information as required are available and perform their required function;

use of independently delivered control components to allow electronic commerce participants to freely stipulate their business requirements and trade offs;

allowing electronic commerce, through the various control requirements stipulated by VDE participants, to evolve into forms of business which are the most efficient, competitive and useful—much as with traditional, non-electronic commerce;

providing commerce participants with the ability to freely fashion the chains of handling and control pathways that protect data and processes and the freedom to shape the models within which their Virtual Presence operates—allowing commerce participants to optimally formulate their electronic commerce value propositions;

VDEs configured to support the various underlying agreements between parties that define important electronic commerce pathways of handling for electronic content, content and/or appliance control information, content and/or appliance usage information and payment and/or credit;

allowing content creators and other providers to specify the pathways that, partially or fully, must be used to disseminate commercially distributed property content, content control information, payment administrative content, and/or associated usage reporting information;

empowering commerce participants, subject to the rules and controls previously set in a value chain, to freely fashion control models implementing their Virtual Presence by using GUI templates or rights programming languages employing commerce/rights management components;

component based control methods that allow the present inventions to efficiently operate as a highly configurable content control system;

content control models that can be iteratively and asynchronously shaped, modified, and otherwise updated to accommodate the needs of VDE participants;

iterative and/or concurrent multiple participant processes through the submission and use of secure, control information components (e.g., executable code such as load modules and/or methods, and/or associated data);

control information for Virtual Presence employed in protected processing environment nodes located at user sites to ensure that digital events are governed in accordance with the collective rights of commerce model participants;

digital events that launch or require other digital events;

digital events that may include, for example, content use consequences such as collection of audit information, secure communication of such information, payment for content use, or satisfaction of any other electronically stated condition;

events that occur within either the secure setting of a local node, or more widely within the secure environment of a distributed system of nodes;

the association of Virtual Presence rules and controls with protected information enclosed within one or more electronic content containers to achieve a high order of configurability for Virtual Presence chains of handling and control;

distribution using VDE that may package both the electronic content and control information into the same VDE container, and/or may involve the delivery to an end-user site of different pieces of the same VDE managed property from plural separate remote locations and/or in plural separate VDE content containers and/or employing plural different delivery means;

content control information that is partially or fully delivered separately from its associated content to a user VDE installation in one or more VDE administrative objects;

delivery of portions of said control information from one or more sources;

making control information available for use by access from a user's VDE installation secure sub-system to one or more remote VDE secure sub-systems and/or VDE compatible, certified secure remote locations;

use of delivery means that may include electronic data storage means such as optical disks for delivering one portion of said information and broadcasting and/or telecommunicating means for other portions of said information;

allowing a content provider to deliver different business rules to a large corporate customer, compared with rules delivered to "retail" customers;

supporting separation of content and Virtual Presence controls to allow a provider to associate different control sets with the same content—and not requiring the provider to create one set of content controls that apply to all types of customers;

allowing content provider modification over time of rules and controls to reflect sales, new pricing, special discounts, etc.—while limiting this right by rules and controls provided by other parties having more senior rights;

employing secure object container technology to efficiently implement Virtual Presence chains of handling and control;

use of software container technology to significantly facilitate the organized dissemination of digital content, including the specialized form of digital content constituting rights control information;

employing object software technology and using object technology to form containers for delivery of at least in part encrypted or otherwise secured information;

using containers that contain electronic content products or other electronic information and some or all of their associated permissions (control) information;

distributing container objects along pathways involving content providers and/or content users;

securely moving containers between nodes of a VDE arrangement, which nodes operate VDE foundation software and execute control methods to enact electronic information usage control and/or administration models;

employing delivered containers both for distributing VDE control instructions (information) and/or to encapsulate and electronically distribute content which has been at least partially secured;

supporting the essential needs of electronic commerce value propositions by uniting fundamental configurability with secure Virtual Presence;

virtual presence across virtual networks in accordance with the underlying agreement amongst commerce model participants to allow each participant to enjoy secure, reliable electronic automation of commerce models;

allowing each rights holder's Virtual Presence at a remote site to possess the sole authority to administer or delegate the participant's electronic rights;

capabilities that contribute to establishing an environment of trusted cooperative governance;

practical enhancements relating to the establishment of secure event management and the maintenance of secure audit, encryption, budget, and other relevant information;

control structures for an overall, distributed, secure rights/event administration environment;

processes for interaction between independently delivered rules and controls, including electronic negotiation;

creating distributed rights operating systems;

integrating control processes into host operating environments;

secure semiconductors to support protected processing environments;

a secure, programmable, digital event management component architecture in which components are fully assembleable and reusable;

differing assemblages of components formed to reflect an exhaustive array of commerce model functional capabilities, overall model implementations, and ad hoc event management scenarios;

support for the full range of digital content types, delivery modes, and reporting and other administrative activities;

traveling objects;

smart agents;

"atomic" load module operation to support "sparse space," cost-effective, secure processing semiconductors;

smart card and other traveling client nodes;

creating rights management software container technologies, including extraction, embedding, and other secure container content management processes;

Chain of Handling and Control generation of secure objects (containers) and associated control information;

audit reconciliation and usage pattern evaluation processes;

specialized cryptographic implementations;

use of a specialized electronic rights and commerce language, unique applications for fingerprinting and/or watermarking technologies, secure control structures, the formulation of new types of metering technologies, reciprocal event management (employing dispersed user sites) for automating web-like commerce models, and many other designs and capabilities;

mechanisms to persistently maintain trusted content usage and reporting control information through both a sufficiently secure chain of handling of content and content control information and through various forms of usage of electronic information;

rights management technology supporting persistent, distributed controls;

means enabling continuing Virtual Presence through Chains of Handling and Control;

persistency of control as a unique and fundamentally important attribute underlying Virtual Presence and Chain of Handling and Control for enabling true commerce behavior in cyberspace including ad hoc relationships and activities, distributed processes, and reliable enforcement of agreements between parties;

Persistent Virtual Presence controls that continue to be enforced—to the extent required by the controls themselves—as protected digital content is, for example, used and reused, copied and further distributed, extracted and embedded, audited and reported;

persistency responsive to rules and controls associated with electronic events, that causes new secure content containers to be created automatically by systems and methods supplying the procession of secure transport vehicles required by Chain of Handling and Control for conveying disseminated content, associated rules and controls, and audit information and payment;

container creation to carry extracted content, payment tokens, control information, audit information, and the like;

securely generated containers carrying with them rules and controls stipulated by rules and controls associated with one or more triggered electronic events;

capabilities for persistency and independent secure delivery and merging of rules and controls that provide technical means for ensuring that dynamic user behavior can be encouraged, rather than discouraged;

dynamic user behavior encouraged as a critical link in building ad hoc relationships and cost-effectively distributing content, while simultaneously ensuring that rights holders are protected and retain control over their business models;

enabling ad hoc behavior that frees users from constraints on their conduct resulting from inflexible, first generation technologies;

support for enterprising behavior that is characteristic of traditional commerce resulting in more efficient and more satisfying electronic commerce experiences;

general purpose character electronic commerce technologies provided by a combination of important capabilities including component, object oriented, programmable control language; secure specialized container technology; independent delivery of secure control information mechanisms; Chain of Handling and Control persistency of control mechanisms; event driven operating system functions; and the advanced security architecture—allowing multiple simultaneous models to evolve, and practically and efficiently operate;

general purpose rights and event management architecture that is intrinsically reusable for many simultaneous models—providing enormous competitive economic advantages over technologies that are essentially single model by design;

commerce architecture client nodes that are basic pieces of reusable cyberspace infrastructure;

generalized configurability resulting, in part, from decomposition of generalized requirements for supporting electronic commerce and data security into a broad range of constituent "atomic" and higher level components (such as load modules, data elements, and methods) that may be variously aggregated together to form control methods for commercial electronic agreements and data security arrangements;

a secure operating environment employing VDE foundation elements along with securely deliverable VDE components that enable electronic commerce models and relationships to develop;

the unfolding of distribution models in which content providers, over time, can expressly agree to, or allow, subsequent content providers and/or users to participate in shaping the controls for, and consequences of, use of electronic content and/or appliances;

a very broad range of the functional attributes important for supporting simple to very complex electronic commerce and data security activities;

electronic information and/or appliance usage control (including distribution), security, usage auditing, reporting, other administration, and payment arrangements;

capabilities that rationalize the support of electronic commerce and electronic transaction management stemming from the reusability of control structures and user interfaces for a wide variety of transaction management related activities;

content usage control, data security, information auditing, and electronic financial activities that can be supported with tools that are reusable, convenient, consistent, and familiar;

a general purpose Rights Operating System employing a reusable kernel and rights language components that provides the capabilities and integration needed for the advanced commerce operating systems of the future;

a general purpose, reusable electronic commerce capabilities that all participants can rely on will become as important as any other capability of operating systems;

such a rights operating system providing rights and auditing operating system functions and other operating system functions—the rights and auditing operating system functions securely handling tasks that relate to virtual distribution environment;

secure processing units and/or protected processing environments that provide and/or support many of the security functions of the rights and auditing operating system functions;

an overall operating system designed from the beginning to include the rights and auditing operating system functions plus the other operating system functions—or incorporation of the rights and auditing operating system functions as an add-on to a preexisting operating system providing the other operating system functions;

operating system integration and the distributed operating systems; and a rational approach—a transaction/distribution control standard—allowing all participants in VDE the same foundation set of hardware control and security, authoring, administration, and management tools, for widely varying types of information, business market model and/or personal objectives;

Any or all of these features may be used in combination with the inventions disclosed herein.

BRIEF DESCRIPTION OF THE DRAWINGS

These and other features and advantages will be better and completely understood by referring to the following detailed description of presently preferred example embodiments in accordance with the drawings, of which:

FIGS. 1A–14 show "prior art" examples of how it is hard to find things you need or want;

FIGS. 5–12 are simplified examples of what example systems, methods and techniques in accordance with these inventions can do;

FIGS. 13, 14 and 14A show an example matching and classification utility system architecture;

FIGS. 16A–16C show examples of distributed matching and classification utility system organizations;

FIGS. 18–46(B) show example steps that may be performed by the example matching and classification utility system; and FIGS. 47–70 show some example matching and classification utility system applications.

DETAILED DESCRIPTION OF PRESENTLY PREFERRED EXAMPLE EMBODIMENTS

FIGS. 5–12 and the discussion above provide an introduction to the following detailed description of presently preferred embodiments in accordance with these inventions. The "electronic matchmaker" shown in FIGS. 5–12 is implemented in these more detailed embodiments by a matching and classification utility system 900.

Example Matching and Classification Utility

Figure 13:
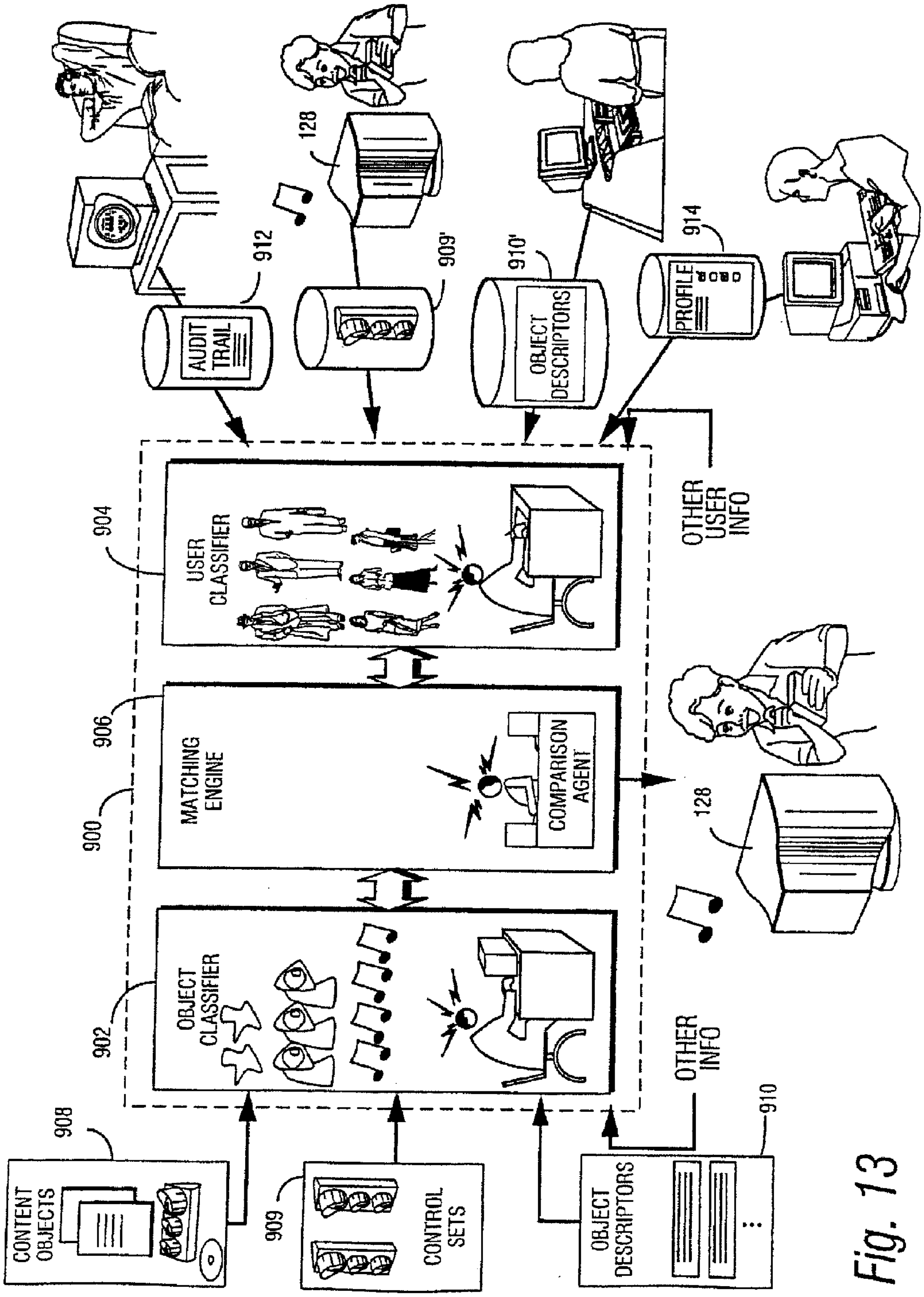

FIG. 13 shows an example matching and classification utility system 900 as including:

- an object classifier 902;
- a user (people) classifier 904; and
- a matching engine 906.

Object classifier 902 classifies things. User classifier 904 classes people. Matching engine 906 matches things with other things, things with people, and/or people with other people.

In more detail, object classifier 902 receives information about objects and uses that information to classify those objects into groups based on the qualities or characteristics of the objects. For example, the object classifier 902 may classify objects of the type described in in "Ginter et al". Such objects may comprise information and/or associated rules for using the information. For example, object classifier 902 may receive as inputs:

- rights management information 909 such as rules and/or associated consequences;
- things 908 controlled or affected by such rights management information including, for example content objects or other information subject to such rules;
- items 910 such as metadata, abstracts or the like that describe the things 908; and/or
- other information of any type.

Object classifier 902 classifies and/or selects things based at least in part on these inputs.

In this example, user classifier 904 is a type of object classifier that is specially adapted to classify people. User classifier 904 can classify people based, for example, on:

- audit trails 912 indicating how people have used their computers and other electronic appliances;
- profiles 914 developed by asking users questions about their preferences;
- controls 909' that are associated, at least in part, with the user or things the user uses;
- object descriptors 910' that describe objects used by the user; and/or
- other information about and/or relating to the user.

User classifier 904 classifies and/or selects people based at least in part on these inputs.

Matching engine 906 receives, as inputs, the classifications and/or selections made by the object classifier 902 and/or the user classifier 904. Matching engine 906 matches things with things, things with people and/or people with people (or any combination of these) based on these selection and/or classification inputs.

Example More Detailed Architecture

Figure 14:
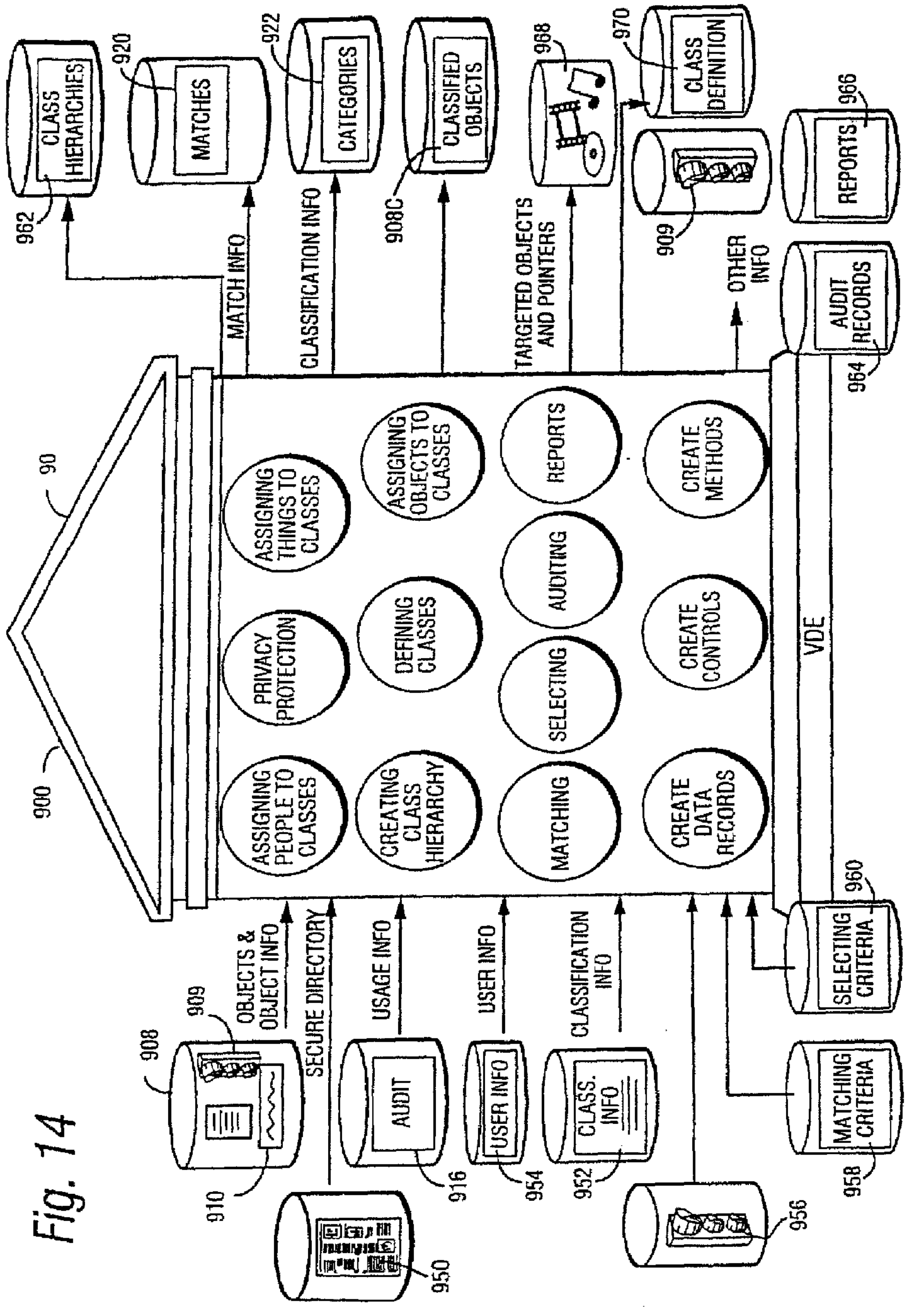

FIG. 14 shows a more detailed architectural diagram of matching and classification utility 900. In this example, matching and classification utility 900 receives a variety of inputs including, for example, some or all of the following:

- objects 908 and/or information about objects including controls 909 and/or object descriptors 910;
- content 950;
- audit trail information 916;
- user information such as profiles 914;
- class information 952;
- user information 954;
- other rights management information 956;
- matching criteria 958;
- selection criteria 960; and/or
- other information.

Matching and classification utility 900 in this example can provide a variety of different outputs including, for example, some or all of the following:

- matching information 920;
- class hierarchies 962;
- category definitions 922 and class definitions 970;
- classified objects 908C;
- audit records 964 indicating the results of classification, matching, and or selecting processes;
- reports 966 indicating the results of classification, matching, and/or selecting processes;
- targeted objects and/or pointers 968;
- controls 909;
- other rights management information; and
- other classification, matching and/or selection related information.

A Preferred Embodiment Matching and Classification Utility 900 is a VDE-Aware Commerce Utility System In the preferred embodiment, matching and classification utility 900 is constructed as a commerce utility system 90 as described in "Shear et al", and may comprise one or more processes securely distributed over one or more secure electronic appliances within a "Virtual Distribution Environment" as described in "Ginter et al". Furthermore, the present inventions can be used in combination with and/or make use of a wide array of distributed electronic administrative and support services that may be referred to as the "Distributed Commerce Utility." Such a Distributed Commerce Utility may be, among other things, an integrated, modular array of administrative and support services for electronic commerce and electronic rights and transaction management. The Distributed Commerce Utility provides, among other advantages, comprehensive, integrated administrative and support services for secure electronic commerce and other forms of electronic interaction. These administrative and support services can be used to supply a secure foundation for conducting financial management, rights management, certificate authority, rules clearing, usage clearing, secure directory services, and other transaction related capabilities functioning over a vast electronic network such as the Internet and/or over organization internal Intranets, or even in-home networks of electronic appliances. Such electronic interactions supported by the Distributed Commerce Utility may, for example, entail the broadest range of appliances and distribution media, non-limiting examples of which include networks and other communications channels, consumer appliances, computers, convergent devices such as WebTV, and optical media such as CD-ROM and DVD in all their current and future forms.

These administrative and support services can, for example, be adapted to the specific needs of electronic commerce value chains in any number of vertical markets, including a wide variety of entertainment applications. Electronic commerce participants can, for example, use these administrative and support services to support their interests, and/or they can shape and reuse these services in response to competitive business realities. Non-exhaustive examples of electronic commerce participants include individual creators, film and music studios, distributors, program aggregators, broadcasters, and cable and satellite operators.

The Distributed Commerce Utility can, for example, make optimally efficient use of commerce administration resources, and can, in at least some embodiments, scale in a practical fashion to optimally accommodate the demands of electronic commerce growth. The Distributed Commerce Utility may, for example, comprise a number of Commerce Utility Systems. These Commerce Utility Systems can provide a web of infrastructure support available to, and reusable by, the entire electronic community and/or many or all of its participants. Different support functions can, for example, be collected together in hierarchical and/or in networked relationships to suit various business models and/or other objectives. Modular support functions can, for example, be combined in different arrays to form different Commerce Utility Systems for different design implementations and purposes. These Commerce Utility Systems can, for example, be distributed across a large number of electronic appliances with varying degrees of distribution.

Such a "Distributed Commerce Utility" provides numerous additional capabilities and benefits that can be used in conjunction with the particular embodiments shown in the drawings of this application, non-exhaustive examples of which include:

- Enables practical and efficient electronic commerce and rights management.
- Provides services that securely administer and support electronic interactions and consequences.
- Provides infrastructure for electronic commerce and other forms of human electronic interaction and relationships.
- Optimally applies the efficiencies of modern distributed computing and networking.
- Provides electronic automation and distributed processing.
- Supports electronic commerce and communications infrastructure that is modular, programmable, distributed and optimally computerized.
- Provides a comprehensive array of capabilities that can be combined to support services that perform various administrative and support roles.
- Maximizes benefits from electronic automation and distributed processing to produce optimal allocation and use of resources across a system or network.
- Is efficient, flexible, cost effective, configurable, reusable, modifiable, and generalizable.
- Can economically reflect users' business and privacy requirements.
- Can optimally distribute processes—allowing commerce models to be flexible, scaled to demand and to match user requirements.
- Can efficiently handle a full range of activities and service volumes.
- Can be fashioned and operated for each business model, as a mixture of distributed and centralized processes.
- Provides a blend of local, centralized and networked capabilities that can be uniquely shaped and reshaped to meet changing conditions.
- Supports general purpose resources and is reusable for many different models; in place infrastructure can be reused by different value chains having different requirements.
- Can support any number of commerce and communications models.
- Efficiently applies local, centralized and networked resources to match each value chain's requirements.
- Sharing of common resources spreads out costs and maximizes efficiency.
- Supports mixed, distributed, peer-to-peer and centralized networked capabilities.
- Can operate locally, remotely and/or centrally.
- Can operate synchronously, asynchronously, or support both modes of operation.
- Adapts easily and flexibly to the rapidly changing sea of commercial opportunities, relationships and constraints of "Cyberspace."

Any or all of these features may be used in combination with the inventions disclosed herein.

Figure 14A:
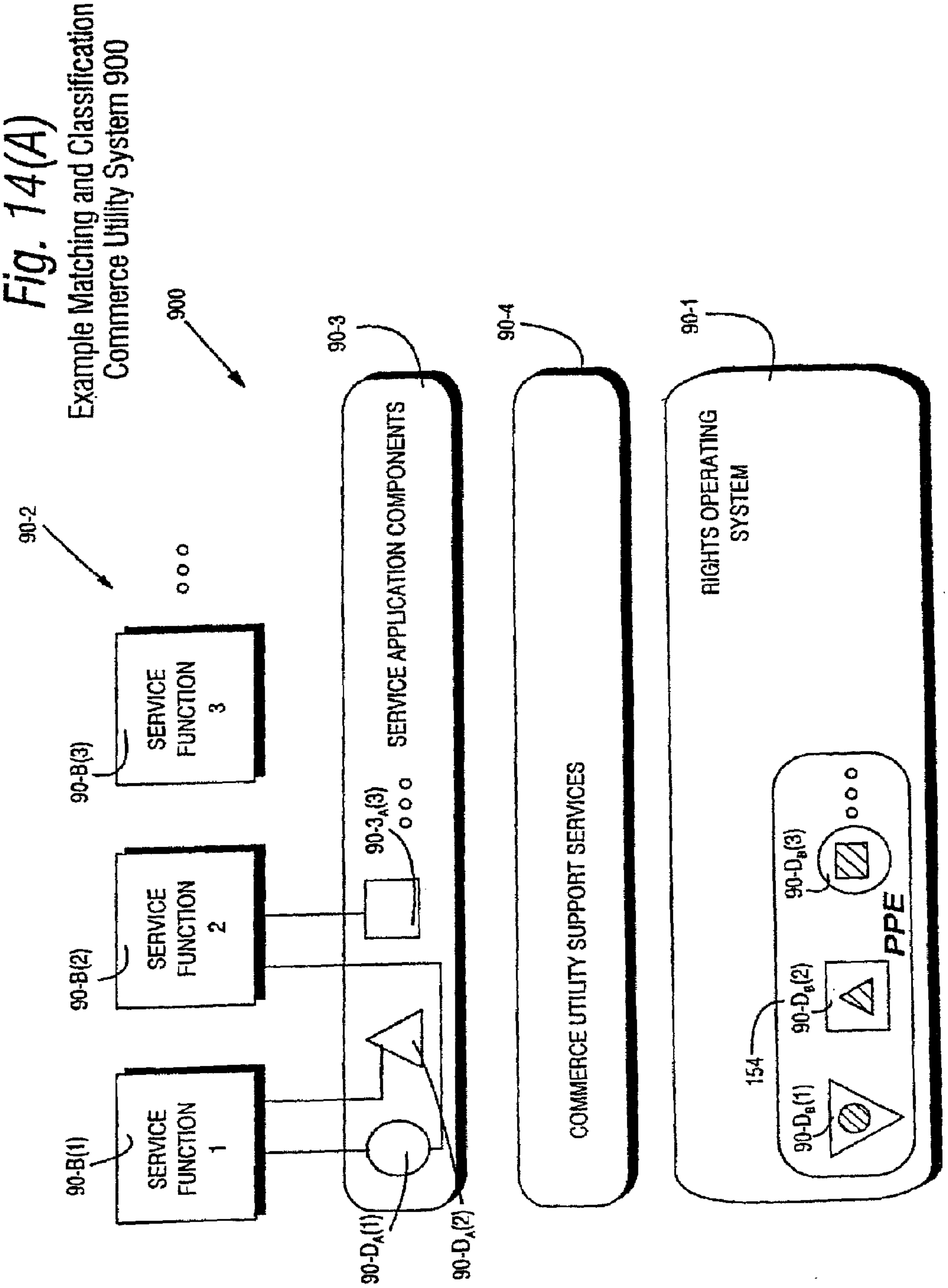

In more detail, as shown in FIG. 14A, matching and classification utility 900 may include one or more rights operating system layers 90-1; one or more commerce utility support service layers 90-4; one or more service application connect layers 90-3; and one or more service functions 90-B. One or more protected processing environments 154 may be used to support secure functions 90-D. Matching and classification utility 900 may be controlled, at least in part, by rights management information such as for example:

- VDE-compatible controls 909;
- rules and/or their consequences; and/or
- other rights management information.

Figure 15:
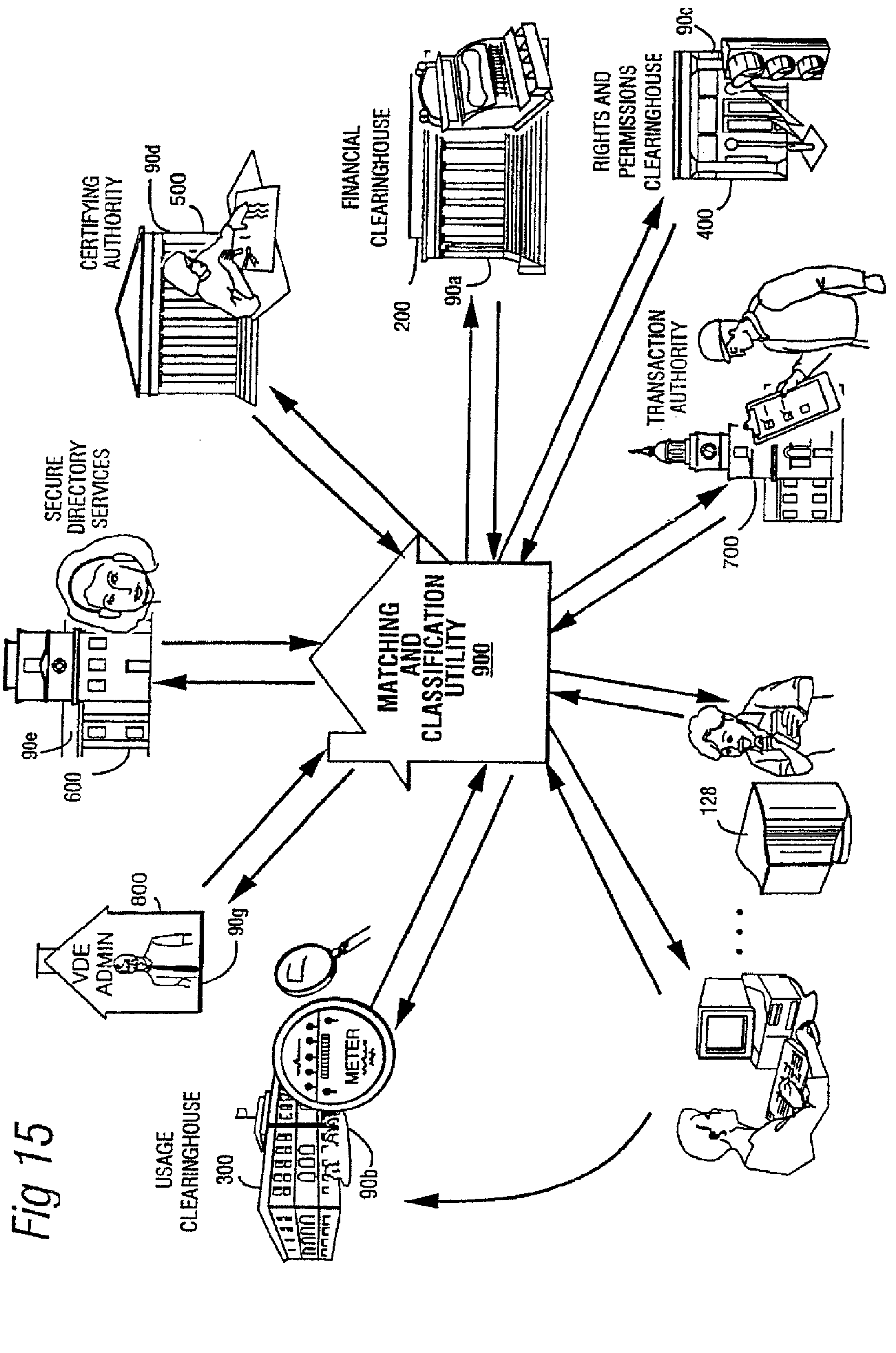
FIGS. 15–15G show examples of how a matching and classification utility system can interact with other commerce utility systems.

Matching and Classification Utility can Interact with Other Commerce Utility Systems FIG. 15 shows that matching and classification utility 900 can interact and interrelate with other commerce utility systems described in "Shear et al" including for example:

- financial clearinghouses 200,
- usage clearinghouses 300,
- rights and permissions clearinghouses 400,
- certifying authorities 500,
- secure directory services 600,
- transaction authorities 700,
- VDE administrators 800, and/or
- other commerce utility systems 90.

FIGS. 15A–15G show example detailed interactions between matching and classification utility 900 and these various other commerce utility systems 90.

Figure 15A:
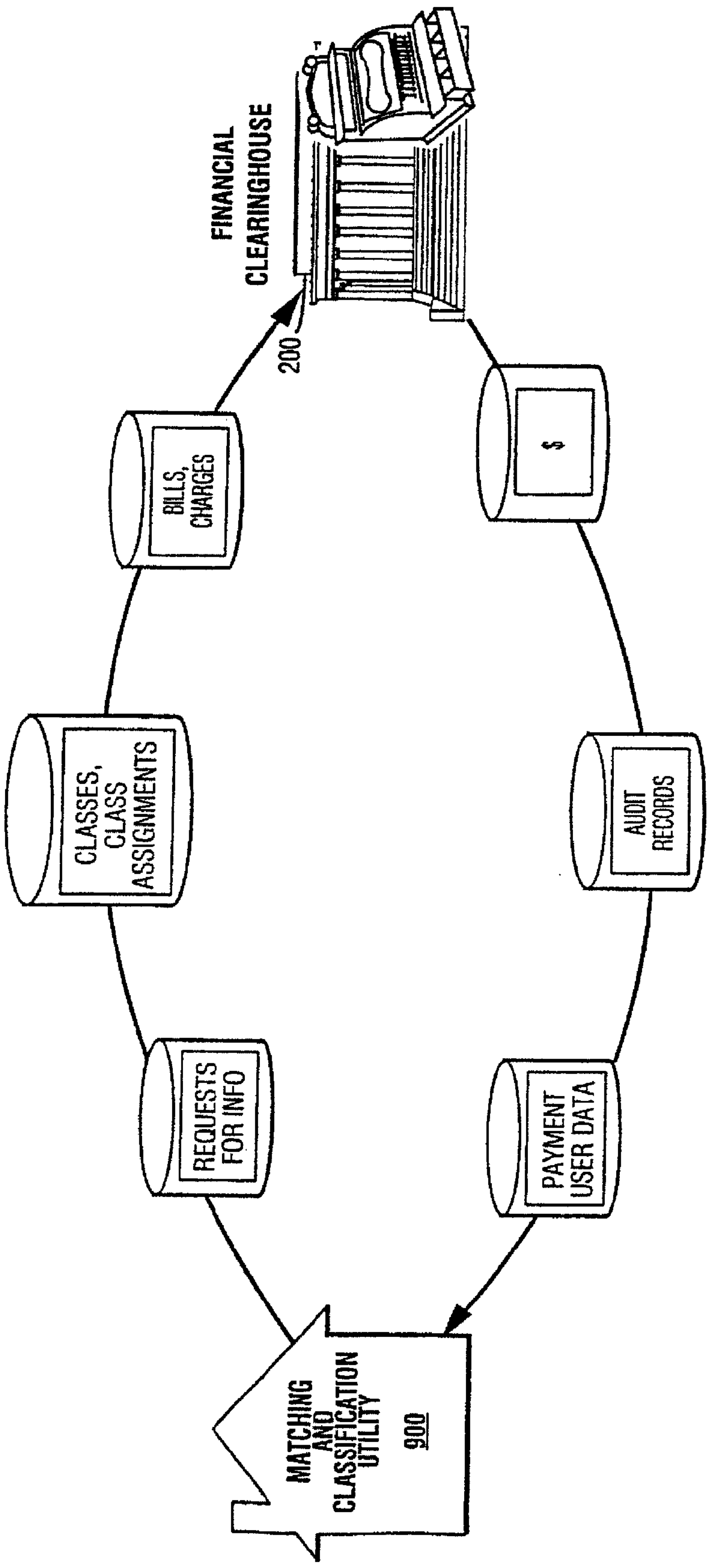

FIG. 15A shows interactions between matching and classification utility 900 and a financial clearinghouse 200. For example, matching and classification utility 900 may send the financial clearinghouse 200:

- requests for information,
- class information such as classes and/or class assignments,
- bills and charges, and/or
- other information.

Financial clearinghouse 200 may send matching and classification utility 900:

- money,
- audit records,
- payment data,
- user data, and/or
- other information.

Figure 15B:
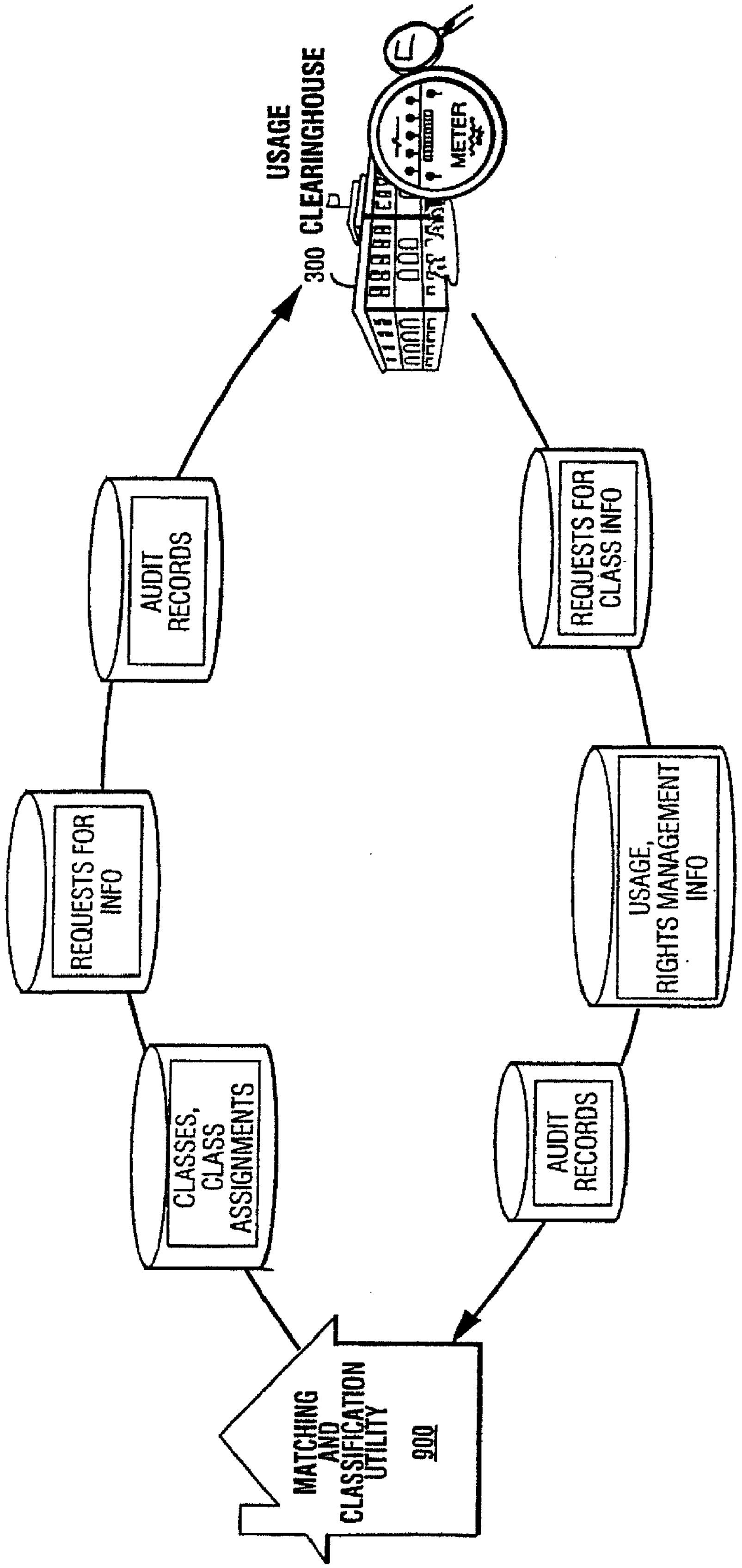

FIG. 15B shows example interactions between matching and classification utility 900 and usage clearinghouse 300. Matching and classification utility 900 may send the usage clearinghouse 300:

requests for information,
class information such as classes and/o class assignments,
audit information, and/or
other information.

Matching and classification utility 900 may receive from usage clearinghouse 300:

requests for class information,
usage and/or rights management information,
audit records, and/or
other information.

Figure 15C:
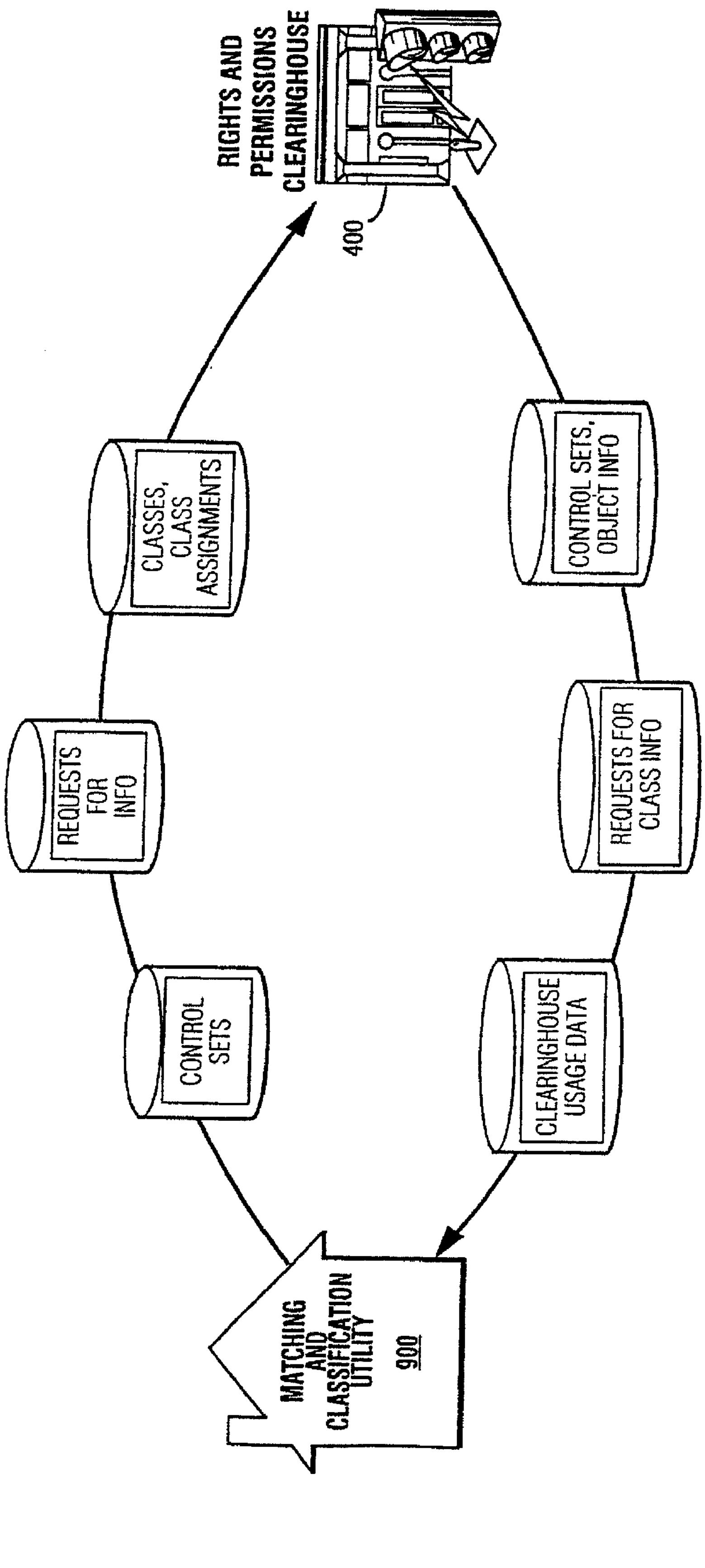

FIG. 15C shows example interaction between matching and classification utility 900 and rights and permissions clearinghouse 400. In this example, rights and permissions clearinghouse 400 sends matching and classification authority 900:

controls sets and/or object information;
requests for class information;
clearinghouse usage data; and/or other information.

In this example, matching and classification utility 900 sends the rights and permissions clearinghouse 400:

rights management information such as control sets,
requests for information,
class related information such as classes and/or class assignments, and/or
other information.

Figure 15D:
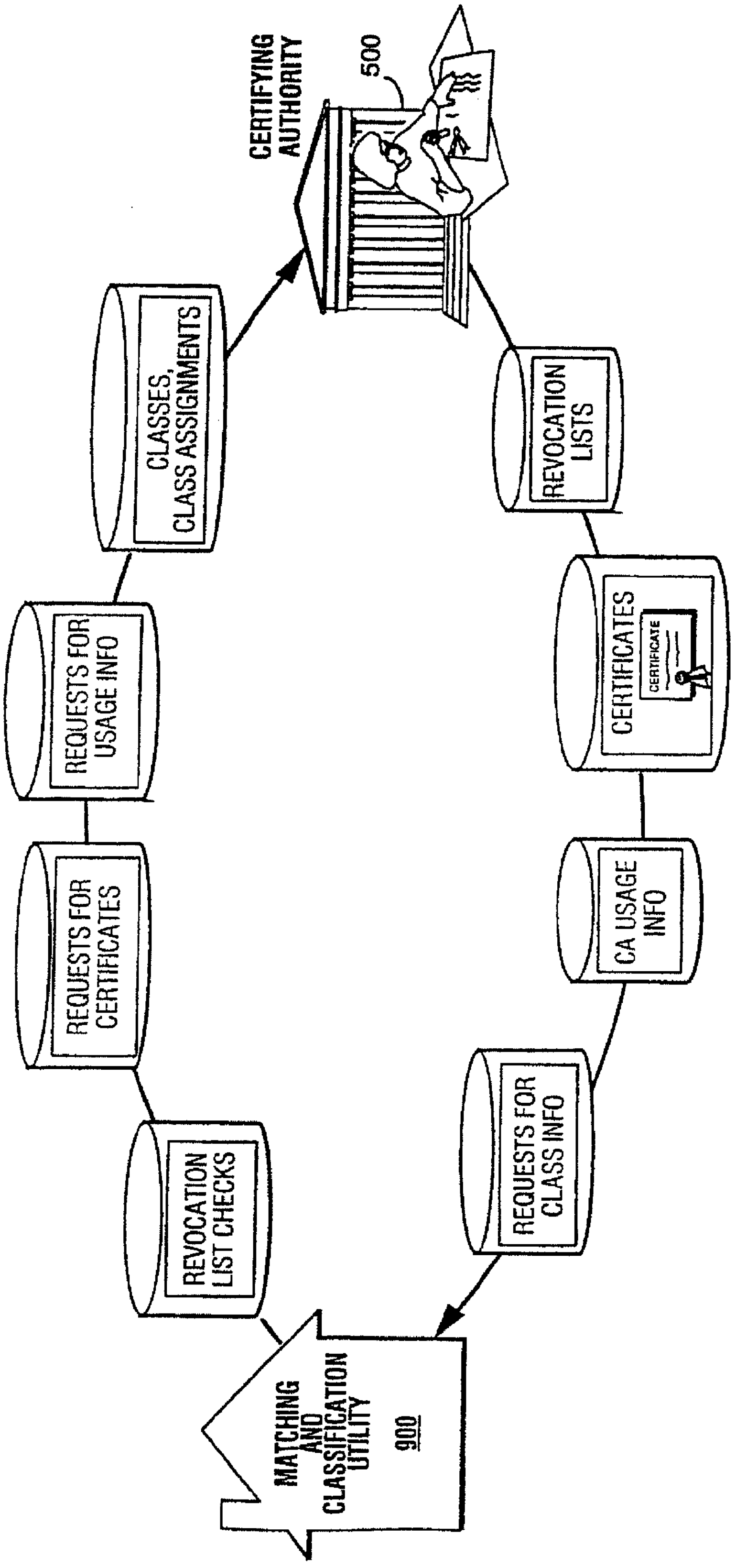

FIG. 15D shows example interaction between matching and classification utility 900 and certifying authority 500. In this example, certifying authority 500 sends matching and classification utility 900:

revocation lists,
certificates,
certifying authority usage information,
requests for classification information, and/or
other information.

In this example, the matching and classification utility 900 sends the certifying authority 500:

revocation list checks,
requests for certificates,
requests for usage information,
classification related information such as classes and/or class assignments, and/or
other information.

Figure 15E:
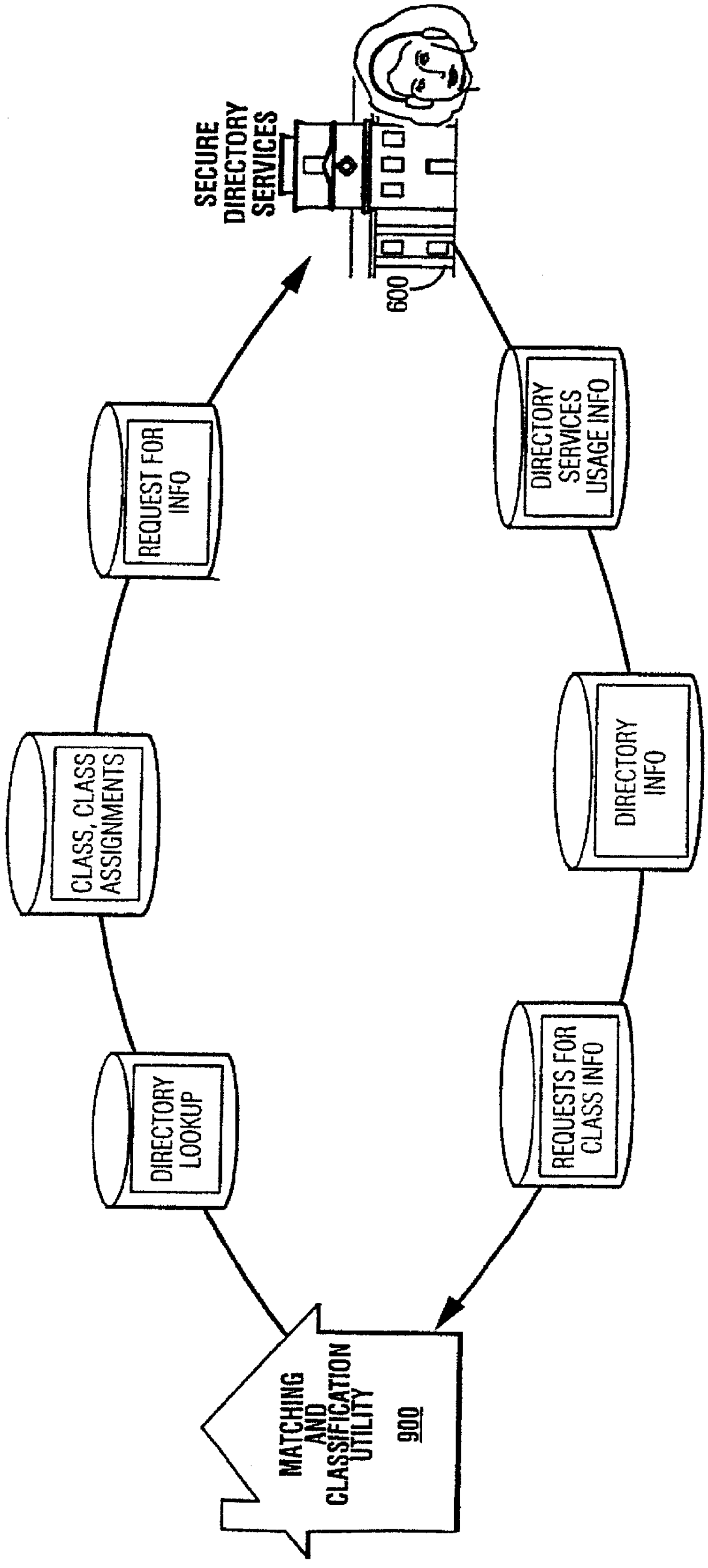

FIG. 15E shows an example interaction between the matching and classification utility 900 and a secure directory services 600. In this example, the matching and classification utility 900 sends the secure directory services 600:

directory lookup information,
class related information such as classes and/or class assignments,
requests for information, and/or
other information.

In this example, the secure directory services 600 sends the matching and classification utility 900:

directory services usage information,
directory information,
requests for classification information, and/or
other information.

Figure 15F:
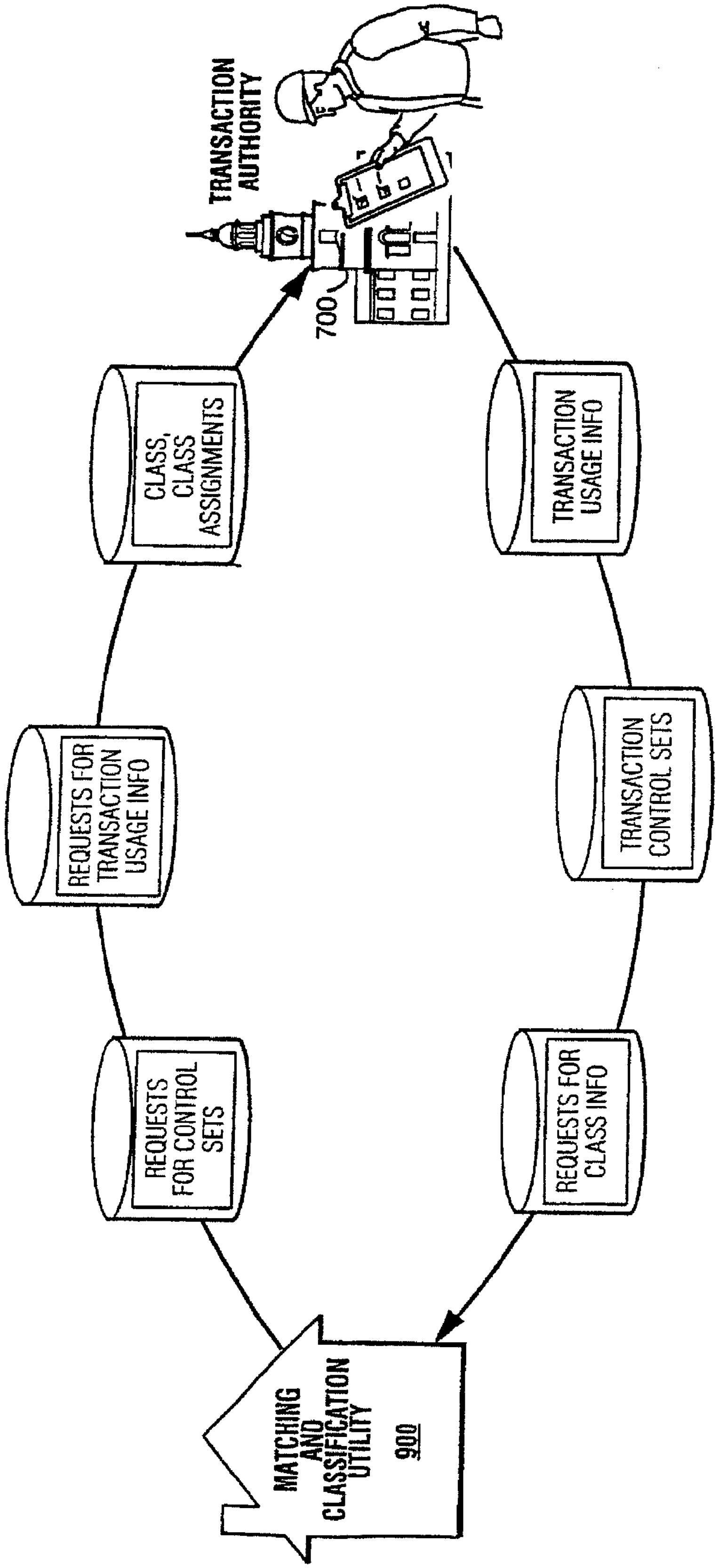

FIG. 15F shows an example interaction between the matching and classification utility 900 and a transaction authority 700. In this example, the matching and classification utility 900 sends the transaction authority 700:

class related information such as classes and/or class assignments,
requests for transaction usage information,
requests for control sets, and/or
other information.

In this example, the transaction authority 700 sends the matching and classification utility 900:

transaction usage information,
transaction control sets,
requests for classification information, and/or
other information.

Figure 15G:
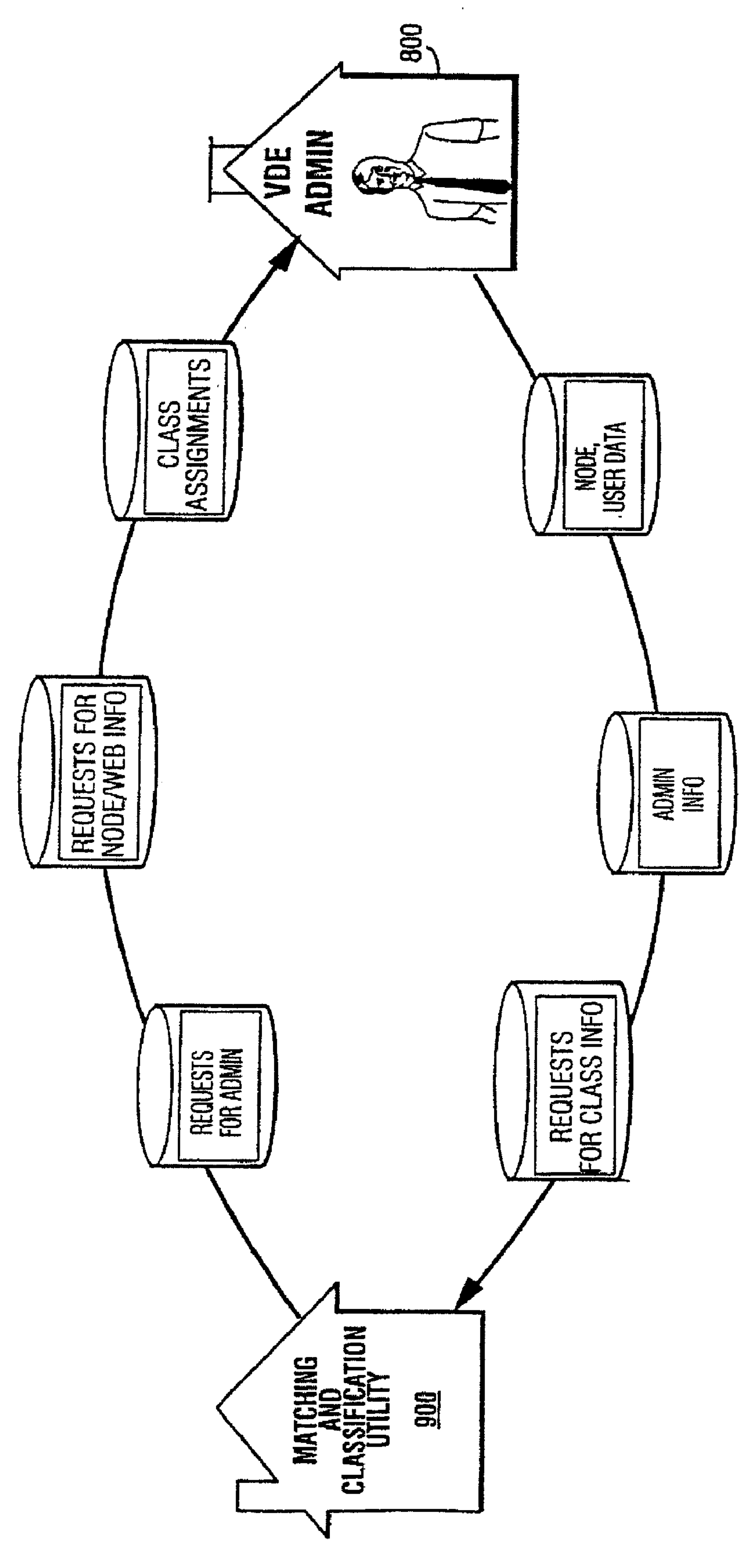

FIG. 15G shows an example interaction between the matching and classification utility 900 and a VDE administrator 800. In this example, the matching and classification utility 900 sends the VDE administrator 800:

requests for administration,
class related information such as classes and/or class assignments,
requests for node and/or web information, and/or
other information.

In this example, the VDE administrator 600 sends the matching and classification utility 900:

requests for classification information,
administrative information,
node and/or user data, and/or
other information.

Figure 16A:
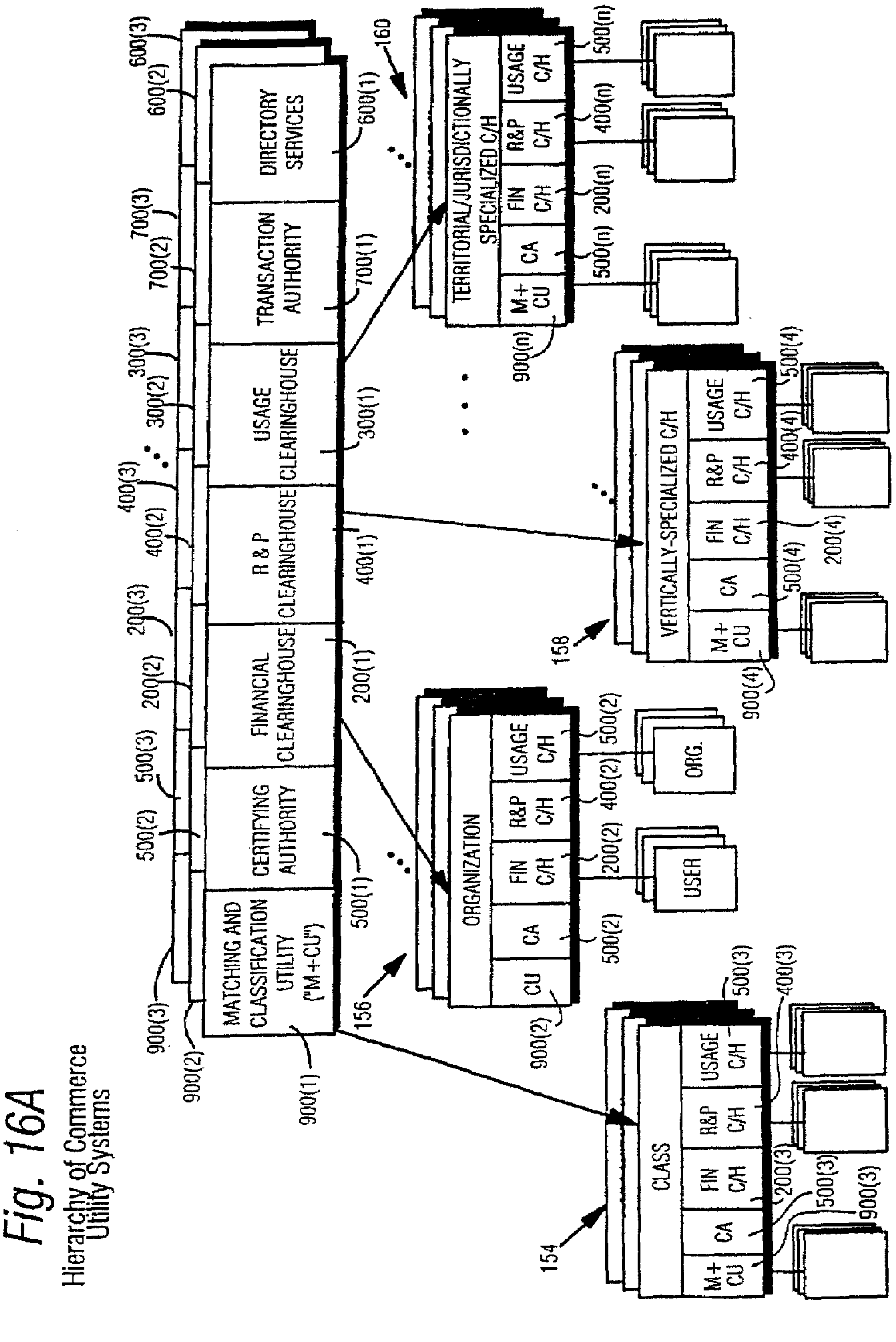

Matching and Classification Utility System Can Be In a Hierarchy of Commerce Utility Systems FIG. 16A shows an example of an administrative and support service hierarchy including matching and classification utility system(s) 900. In this example, a number of centralized overall matching and classification utility systems 900 and/or other Commerce Utility Systems 90 delegate some or all of their work responsibilities to other Commerce Utility Systems 90. In the particular example shown, Commerce Utility Systems 154 may provide services to one or more members of one or more classes, for example, to members of the class "manufacturing companies in the Pacific rim." Organizations, such as companies, non-profit groups or the like may have their own Commerce Utility Systems 156. Certain electronic commerce or other activities (the entertainment industry, for example) might have their own vertically-specialized Commerce Utility Systems 158. Certain geographical, territorial or jurisdictional groups (e.g., Commerce Utility Systems services provided with a particular nation or state within nation, one example of which might be all purchasers of particular products within the state of Wisconsin) may have their own territorial/jurisdictional specialized Commerce Utility Systems 160. Commerce Utility Systems 154, 156, 158, 160 lower in the hierarchy may, in turn, further delegate authorities or responsibilities to particular consumers, organizations or other entities.

In one example arrangement, the Commerce Utility Systems 90 to which authority has been delegated may perform substantially all of the actual support work, but may keep the delegating Commerce Utility Systems 90 informed through reporting or other means. In another arrangement, the delegating Commerce Utility Systems 90 have no involvement whatsoever with day to day activities of the Commerce Utility Systems to whom they have delegated work. In still another example arrangement, the more specialized Commerce Utility Systems do some of the work and the more overarching Commerce Utility Systems do other parts of the work. The particular division of work and authority used in a particular scenario may largely depend on factors such as efficiency, trustedness, resource availability, the kinds of transactions being managed, and a variety of other factors.

Delegation of clearing authority may be partial (e.g., delegate usage aggregation but not financial or rights management responsibilities), and may be consistent with peer-to-peer processing (e.g., by placing some functions within consumers' electronic appliances while keeping some other functions centralized).

Matching and Classification Utilities can Provide Services to Classes of Nodes, Users, Content Services and/or Transaction Services FIG. 16B shows an example of how Matching and Classification Utilities 900 can provide services to classes of nodes, users, content services and/or transaction services. In this example, matching and classification utility systems 900(1), . . . 900(N) provide horizontally specialized matching and/or classification services for different purposes. For example, matching and classification utility 900(1) serves VDE administrative type functions by classifying VDE deployment related information and associated objects. Matching and classification utility 900(2) specializes in higher education classification tasks. Matching and classification utility 900(3) specializes in business information related tasks, and matching and classification authority 900(N) specializes in trading transactions. Any of these specialties can be combined together, so that a single utility system 900 can perform multiple functions or portions of functions.

Figure 16C:
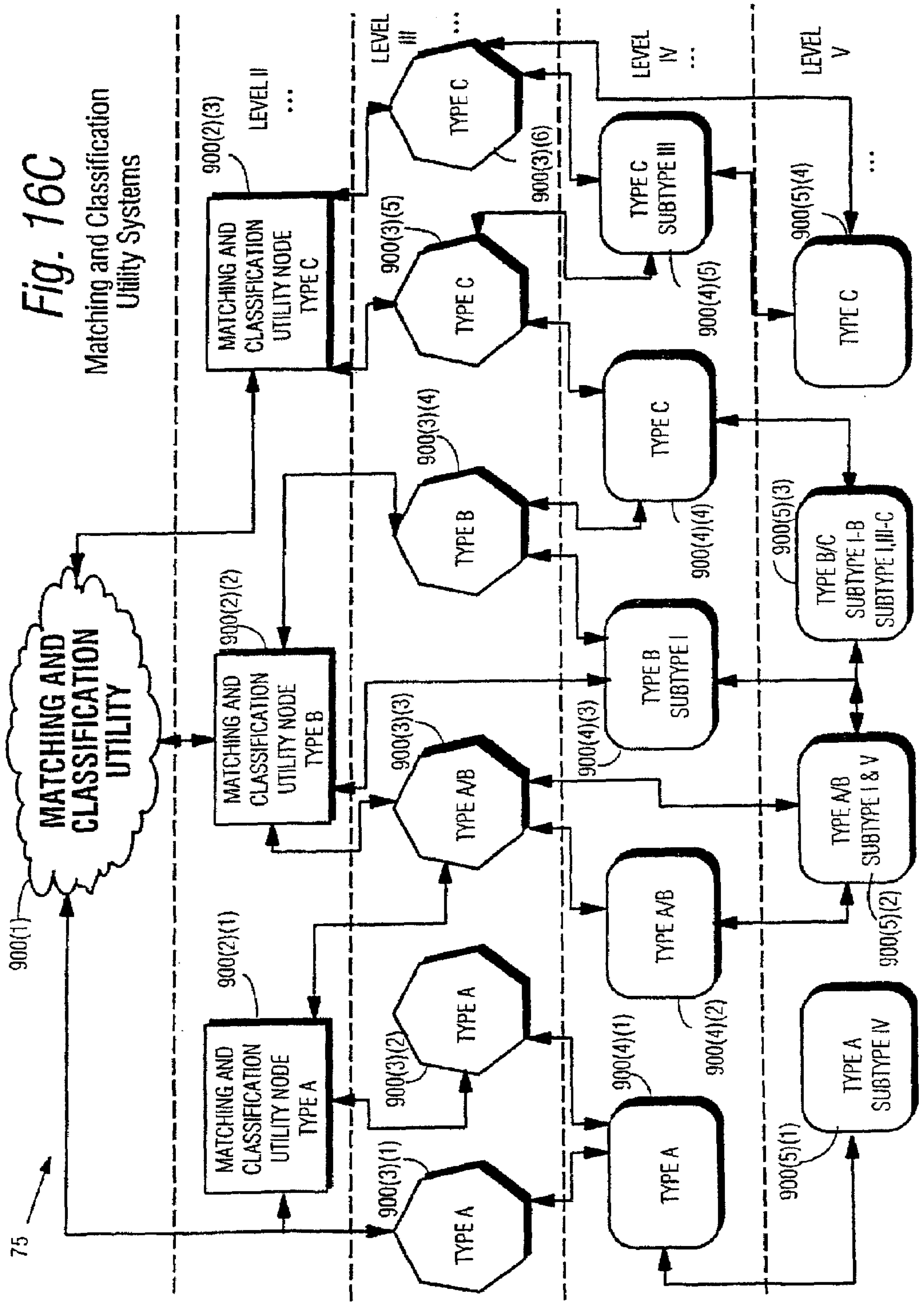

Multi-Function Commerce Utility Systems Can Be Organized Hierarchically or Peer-to-Peer FIG. 16C shows a still different, more complex Matching and Classification Commerce Utility System 900 environment including elements of both a hierarchical chain of command and a high degree of cooperation in the horizontal direction between different multifunction matching and classification utility systems 900. In this example, there are five different levels of responsibility with a master or overarching matching and classification utility system 900(1) on level 1 having the most authority and with additional matching and classification utility systems on levels 2, 3, 4, and 5 having successively less power, authority, control, scope and/or responsibility. FIG. 16C also shows that different matching and classification utility systems 900 on the same level may have different functions, scopes and/or areas of responsibility. For example:

a Matching and classification utility system 900(2)(1) may be a "type A" Matching and classification utility system, Matching and classification utility system 900(2)(2) might be a "type B" Matching and classification utility system, and Matching and classification utility system 900(2)(3) might be a "type C" Matching and classification utility system.

On the next level down, Matching and classification utility systems might be type A Matching and classification utility system (such as, 900(3)(1) and 900(3)(2)), they might be type B Matching and classification utility systems (such as, 900(3)(4)), they might be type C Matching and classification utility systems (such as, 900(3)(5), 900(3)(6)), or they might be hybrids—such as, Matching and classification utility system 900(3)(3) which is a hybrid having type A and type B functions. FIG. 16C also shows that additional clearinghouses on levels 4 and 5 might have sub-types as well as types.

A matching and classification utility 900 might break out along content classes (e.g., movies; scientific, technical and medical; and software). Subtype A might include first run movies, oldies, and art films; subtype B might handle journals and textbooks; and type C might be responsible for games, office, educational content. Peer-to-peer communications between clearinghouses could involve differing classes of consumers, differing jurisdictional classes, differing payment methods classes, and/or any other class distinction.

Figure 17:
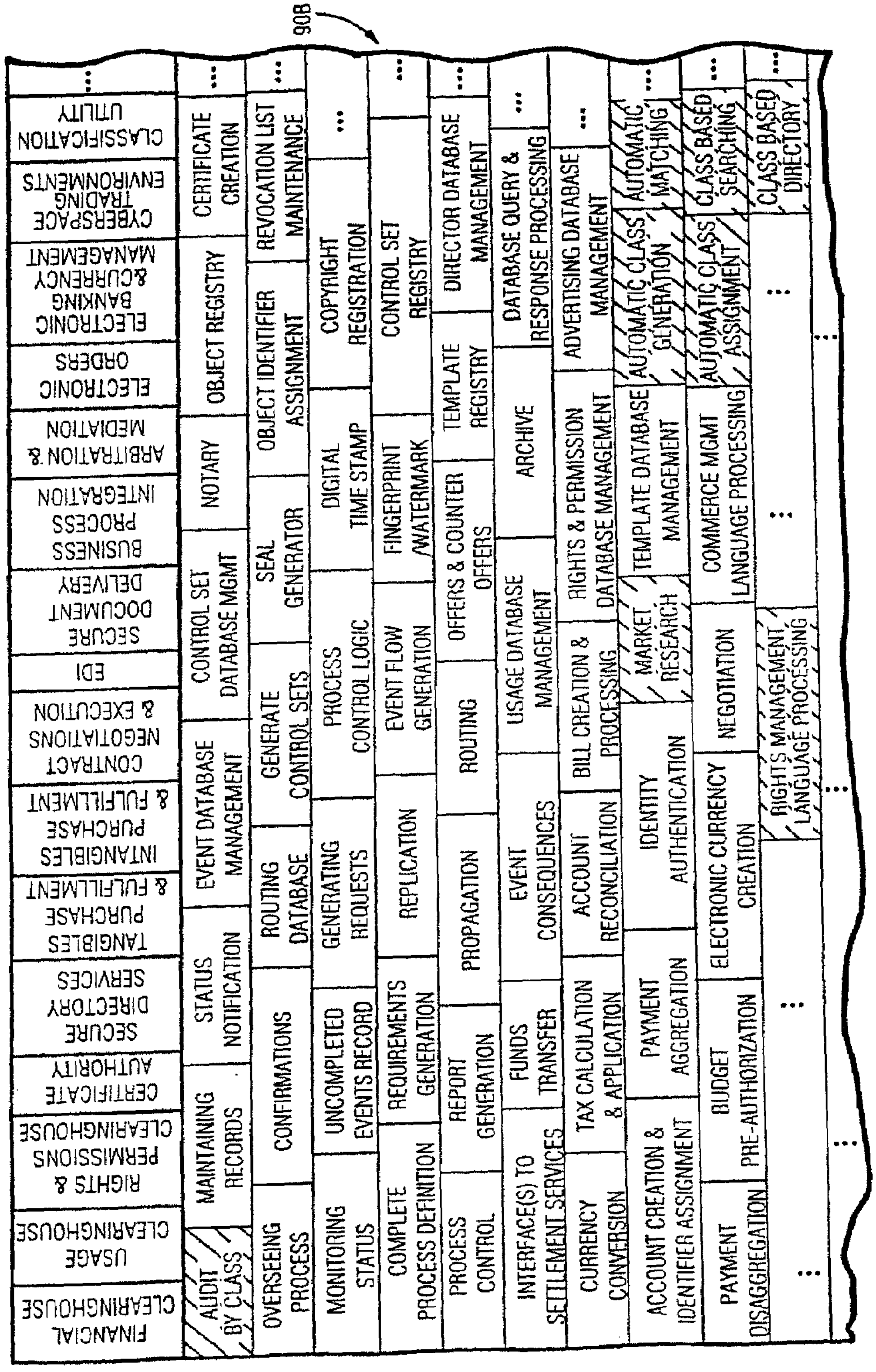
FIG. 17 shows example matching and classification utility system functionality definitions.

Matching and Classification Utility System Can Be Constructed from Object-Oriented Service Functions FIG. 14A shows Matching and Classification Utility 900 can be constructed from service functions. FIG. 17 shows in more detail how a matching and classification utility system 900 can be constructed based on service functions such as for example:

- automatic class generation,
- automatic matching,
- automatic class assignment,
- class based searching,
- class based directory,
- audit by class,
- market research,
- rights management language processing,
- other service functions.

Example Detailed Steps Carried Out by Matching and Classification Utility System 900

The next section of the specification describes some example steps performed by the matching and classification utility 900.

Example Steps to Categorize Objects and/or Users and/or Appliances

Figure 18:
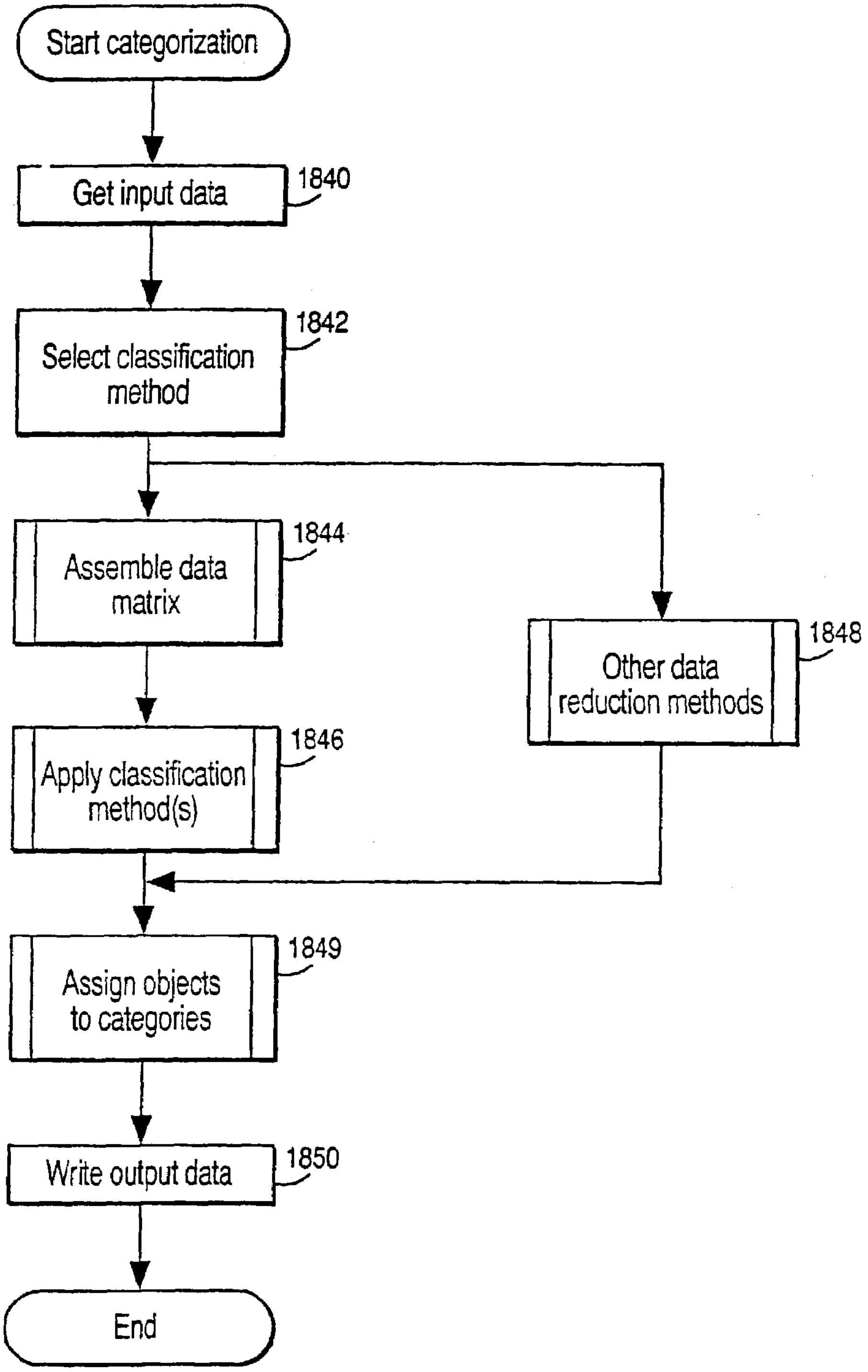
Figure 19:
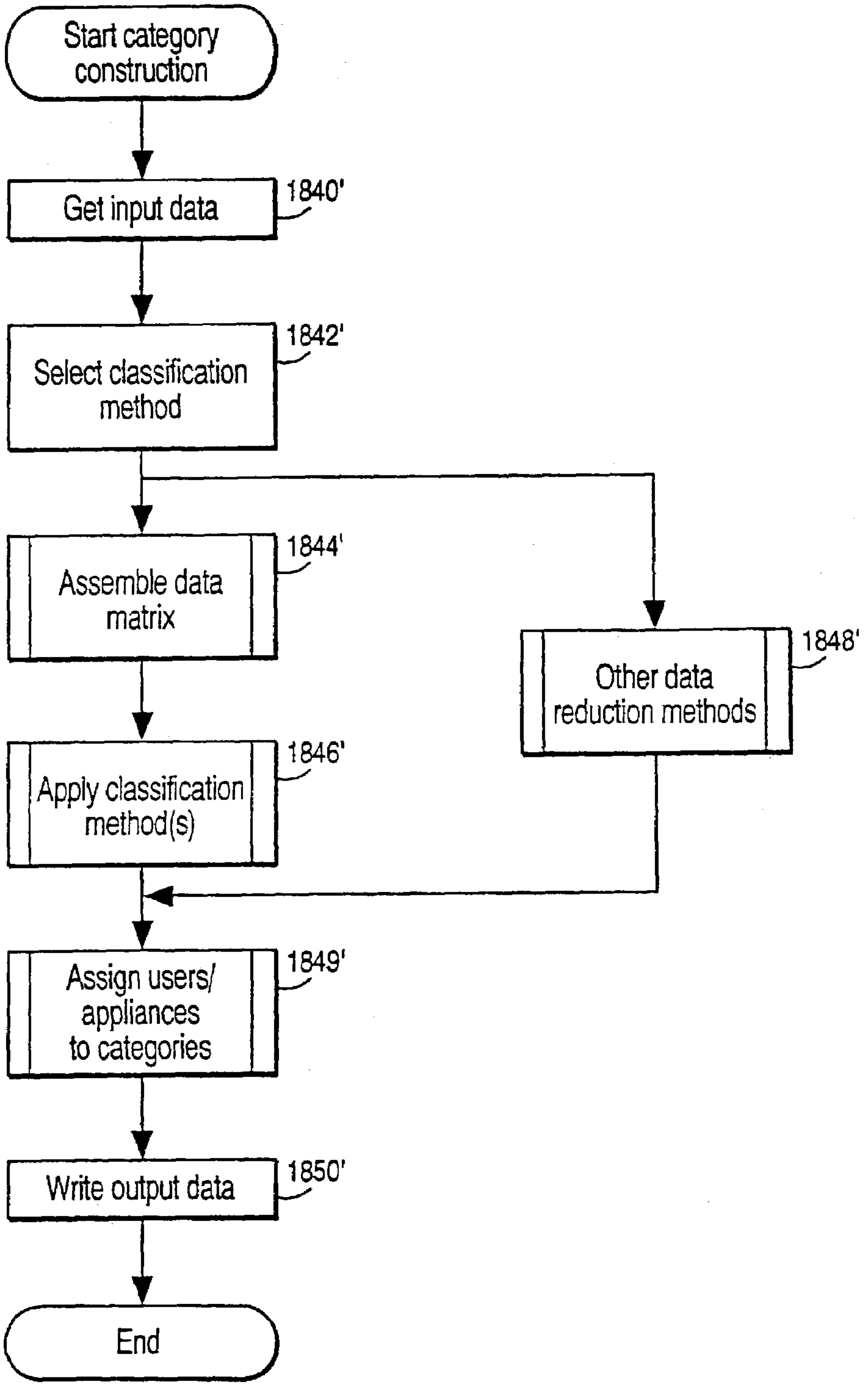

FIG. 18 shows example steps to categorize objects, and FIG. 19 shows example steps to categorize users 95 and/or appliances 100. The overall categorization steps in these examples are—at this level—similar to one another. The processes begin by getting input data (FIG. 18, block 1840, FIG. 19, block 1840'). Next, a classification and/or categorization method is selected (FIGS. 18, block 1842; FIG. 19, block 1842'). The process then assembles a data matrix and applies the selected classification method to the data matrix (FIG. 18, blocks 1844, 1846; FIG. 19, blocks 1844', 1846'). In addition or alternatively, other data reduction methods may be used (FIG. 18, block 1848; FIG. 19, block 1848'). Next, the process assigns objects and/or users and/or appliances to the categories developed by the classification method that has been applied (FIG. 18, block 1849; FIG. 19, block 1849'). Finally, the process stores the results in electronic and/or non-electronic storage in the "write output data" step (FIG. 18, block 1850; FIG. 19, block 1850').

The "get input data" step 1840, 1840' may involve obtaining attribute and/or parameter data from various sources including, for example:

- electronic appliance related attribute data;
- user demographic data;
- user psychographic data;
- available rights management rules and/or consequences (e.g., permissions records);
- exercised rights management rules and/or consequences (e.g., permissions records);
- rights management and/or other audit and/or usage records;
- any third party source of any information, including rights management, usage, audit, statistical, personal, organizational, political, economic, social, religious, business, government, medical, research, academic, literary, military, and/or information and/or data in any format known or unknown concerning any and all other topics that may contribute to the definition of at least one class and/or the assignment of at least one object to a class.

Detailed example steps for harvesting this data are detailed below in connection with FIGS. 24–46B. This resulting attribute data may be accumulated and aggregated together to form a composite record used as the input to the classification process.

Figure 20:
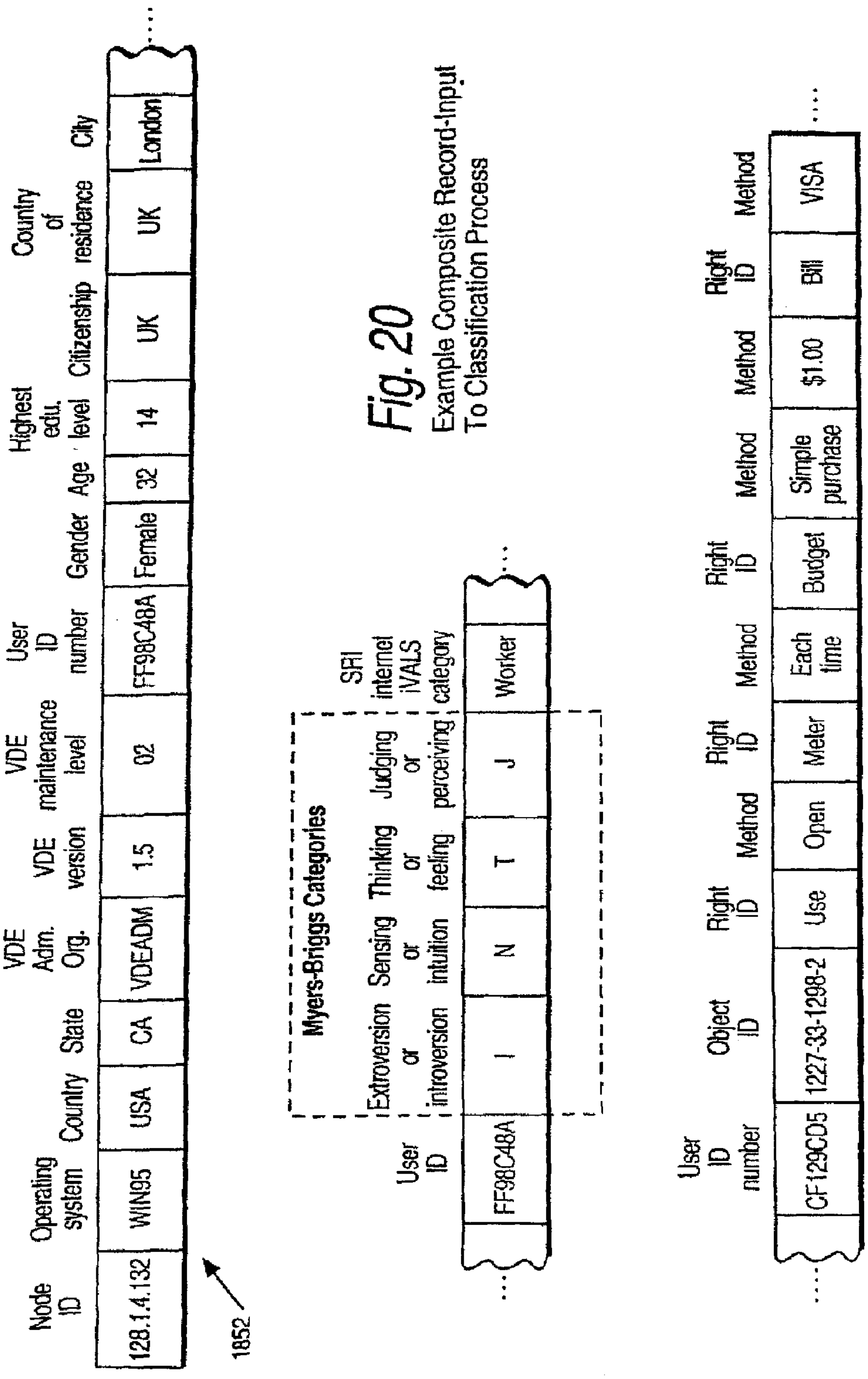

FIG. 20 shows an example composite record 1852. This composite classification record may contain attributes derived from any or all of a variety of rights management and/or other data "harvesting" processes. For example, composite record 1852 may include demographic and/or psychographic data obtained by querying the user 95. It may contain usage data obtained by monitoring audit information produced by various usage transactions. It may contain information reflecting user choices concerning rights management information, the rights management information available to particular users and/or objects, and rights management processes actually performed with respect to particular users and/or particular objects. The information may be analyzed first to provide statistical and/or other summary information, or individual, more granular information may be provided. The composite record 1852 may also contain attributes of particular electronic appliance 100 installations. The particular example composite record 1852 shown in FIG. 20 is one non-limiting example composite attribute record containing attributes obtained through a number of different "harvesting" processes. The composite record 1852 may be organized in a way to allow easy and efficient selection of desired attributes in the course of a database lookup, for example, and to allow easy and efficient selection and/or coding as input to any aspect of a classification and/or the assignment of one or more objects to at least one or more classes.

Figure 21:
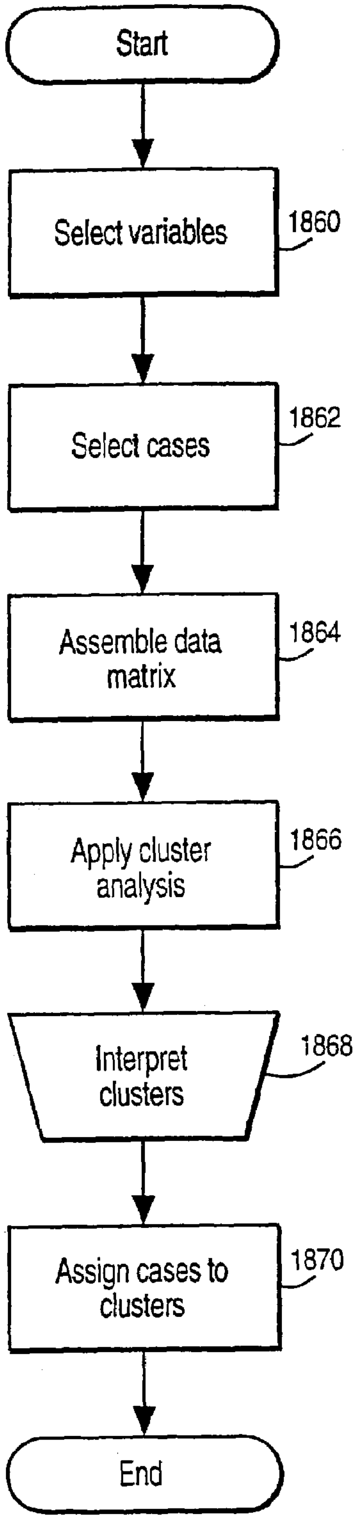

The FIG. 21 example cluster analysis process is one example of steps that may be performed as part of the "apply classification method(s)" block 1846, 1846' of FIGS. 18, 19. (A classification method, or any other method described in these processes, may be utilized as part of a "knowbot", "agent", "traveling agent", and/or "smart agent", a non-limiting example of which is described in "Ginter et al", for example, FIG. 73.) In this particular example, the process selects variables and cases (blocks 1860, 1862, FIG. 21), and then assembles an appropriate data matrix (block 1864). A conventional cluster analysis is then applied (block 1866, FIG. 21). The clusters may be interpreted to determine what they mean (FIG. 21, block 1868), or they may be compared with previous results and if sufficiently similar, they may be assumed to reflect the same classes as the earlier classification procedure thus minimizing the need for additional interpretation of the clustering results. Step 1868 may be performed automatically or manually, or a combination of automatic and manual processing may be used. Finally, individual cases may be assigned to individual clusters to complete the classification process (FIG. 21, block 1870).

FIGS. 22, 23 show two examples of classification outputs produced by the FIG. 21 process. In the FIG. 22 example, information from several individuals has been used to create two example categories that reflect differing use profiles. More classes may have been defined than those example classes shown here. Users assigned to the same class have many more features, behavior, and/or other attributes in common than each of them does with members assigned to other classes.

In example FIG. 22, members of class 1 tend to spend more per content item purchased, travel abroad more frequently, are more interested in national and international news, business and travel information, and generally do not participate in "pay per view" events and/or content consumption. Members of class 1 also tend to add new rights and/or modify existing rights management controls for content, for instance, to add a markup and redistribute the content in one example, may be less likely to express a religious preference and/or affiliation, and tend to use the Internet as an area for "surfing" and exploration.

Members of class 2 tend to pay less for content purchased, seldom travel abroad, tend to be interested in sports, religious content and events, and are more often consumers of movies than are members of class 1. Members of class 2 are more likely to "pay per view" than are members of class 1, and are much less likely to add new controls to content and/or modify rights acquired. Members of class 2 are more likely to express a religious preference and among those that do, Protestant denominations are more frequently mentioned. Members of class 2 may use the Internet, but tend to do so as part of their work role and responsibilities rather than as entertainment, hobbies, and other leisure-time pursuits.

Some methods of classification produce parameter data rather than assignment of objects to more discrete (or fuzzy or other kinds of) classes. Instead, this parameter data may indicate the extent to which an object possesses one or more traits, attributes, or class characteristics. For instance, a person may have been assigned to class 1 (call it "the cosmopolitan class") or class 2 (call it "the parochial class") as shown in FIG. 22; however, using other procedures the same example persons may be assigned parameter data reflecting the extent or degree to which they are "cosmopolitan" or "parochial" or some of each.

In the example process that generates the information shown in FIG. 23A, data for several individuals has been arranged in a case (row) by variable (column) matrix and using means known to those skilled in the arts, subjected to principal components analysis with subsequent Varimax axis rotation. Components with eigenvalues >1.0 were retained for subsequent rotation and use. After rotation, each case was assigned a score on each retained (and rotated) component. Each score indicates the extent to which the case has the characteristic represented by the component.

The hypothetical data in FIG. 23A shows how strongly each variable (the column of the input matrix) is correlated with the underlying characteristic or component. For example, "region of the US" and "Family income" are highly correlated while "owns a sports utility vehicle" is not.

Using results such as these plus the input data matrix, a score is assigned to each case indicating the extent to which they posses the trait, attribute, characteristic indicated by each factor or component. The hypothetical data in FIG. 23B shows how strongly each case—a person or thing—is a member of the class, and/or possesses the underlying variable represented by each component. A higher score shows that example case 1 has more of the underlying component 1 than does example case 3, whose score is close to zero. Components (factors) may be bipolar with a zero point and cases whose scores may be positive, negative or zero. Hypothetical example case 5 has a negative score on this component.

This component score information may be used by the matching and classification utility 900 to define certain other classes, such as "the class consisting of the top 5% of those who are cosmopolitan," that is, the 5% with the highest scores on example component 1. The original scores and/or derivative class assignments may be included on attribute records with attribute and/or class information harvested from other sources and/or through other processes.

Data Harvesting

Example Steps for Collecting Appliance Related Data

Figure 24:
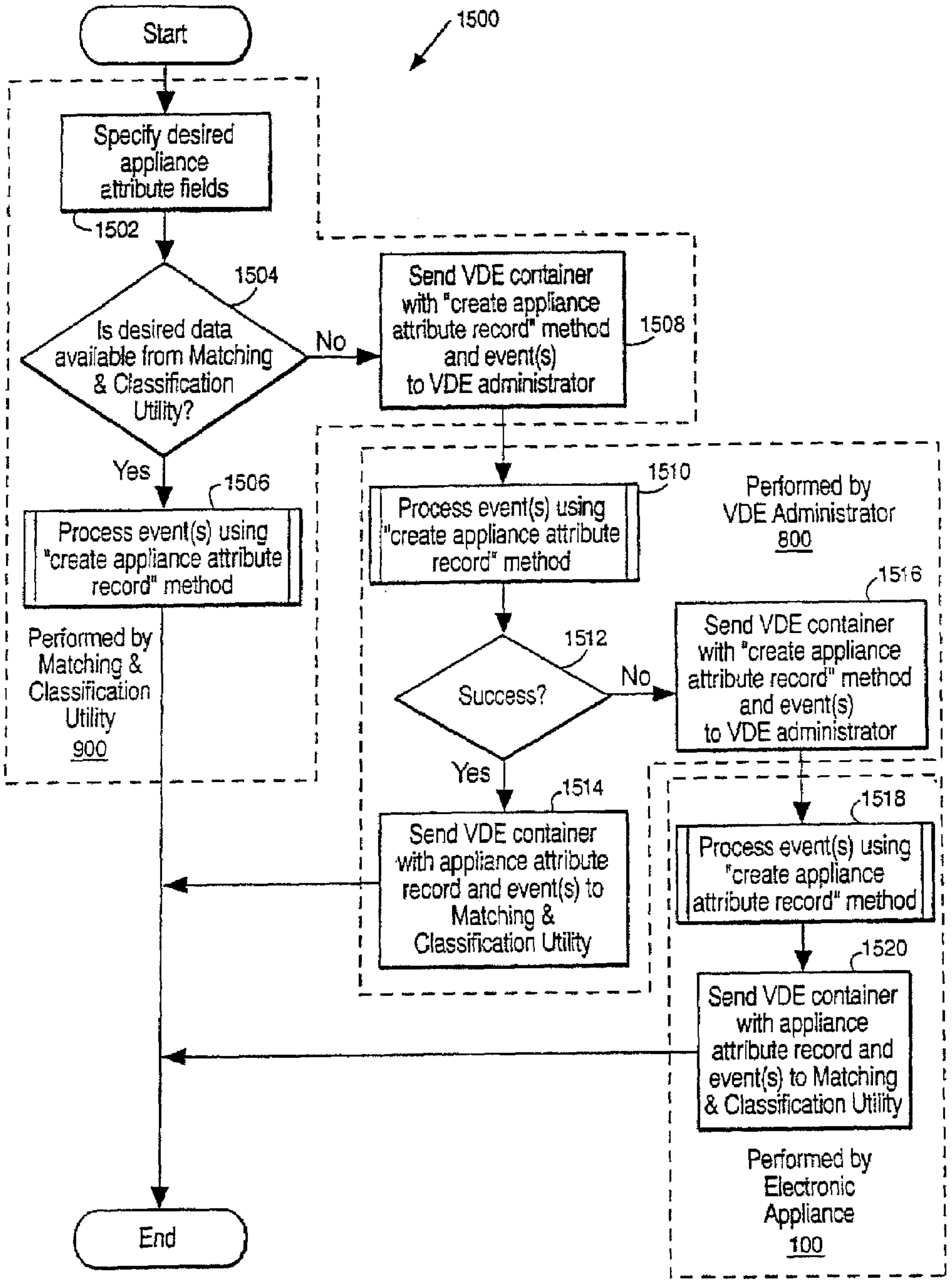

FIG. 24 shows example steps performed by the matching and classification utility 900 to collect appliance attribute data. In this example, an electronic appliance 100 may have certain information associated with it. For example, a VDE administrator 800 may initialize appliance 100 with certain information upon appliance installation. In this example, the matching and classification utility 900 can collect this appliance attribute data and use it as part of a matching and/or classification and/or selection process. As shown in FIG. 24, the matching and classification utility 900 may initially specify desired appliance attribute fields or other information characteristics the utility is going to collect (FIG. 24, block 1502). The information to be collected depends upon the purpose and use to which the matching and classification utility 900 is to put the information to. The matching and classification utility 900 may use a data dictionary or other mechanism for specifying the desired types of appliance information it is going to collect.

The matching and classification utility 900 next determines whether it already possesses the desired information for this particular appliance 100 (FIG. 24, block 1504). For example, the information may have been previously gathered as part of a prior process. If the information is already available, the matching and classification utility 900 sends one or more events to a "create appliance attribute record" method to process the previously gathered data (FIG. 24, block 1506). (In all these processes, if the appropriate method is has been sent previously to a VDE installation, only the associated administrative events necessary to activate the method need to be sent in the VDE container.) Alternatively, if the desired data is not already available ("no" exit to decision block 1504, FIG. 24), the matching and classification utility 900 performs the other steps shown in FIG. 24 to collect the appliance attribute data.

These collecting steps shown in FIG. 24 may include sending a VDE container 152 with a "create appliance attribute record" method, and one or more associated administrative events to activate the method, to the VDE administrator 800 (FIG. 24, block 1508). The next step (FIG. 24, block 1510) may be performed by the VDE administrator 800 processing the administrative event(s) using the "create appliance attribute record" method to determine whether the administrator already has the desired information for the particular electronic appliance 100. If the operation is successful ("yes" exit to decision block 1512, FIG. 24), the VDE administrator 800 may send, to the matching and classification utility 900, a VDE container 152 containing one or more administrative events and the appliance attribute record (FIG. 24, block 1514). If the operation is not successful ("no" exit to decision block 1512, FIG. 24), the "create appliance attribute record" method operating at VDE administrator 800 may, in this example, collect the data directly from the electronic appliance 100 by sending a VDE container to the appliance, the container containing a "create appliance attribute record" method and one or more associated administrative events (FIG. 24, block 1516). The appliance 100 may itself process the administrative event(s) using the "create appliance attribute record" method (FIG. 24, block 1518) to produce the required appliance attribute record. Appliance 100 may then send a VDE container 152 containing the appropriate administrative event(s) and the appliance attribute record to the matching and classification utility 900 (FIG. 24, block 1520).

In another example, blocks 1508–1514 may be bypassed entirely, and the matching and classification utility 900 may (assuming appropriate authorizations are in place) perform block 1516 to send a container 152 with one or more administrative events and the "create appliance attribute record" method directly to the electronic appliance 100.

Figure 25A:
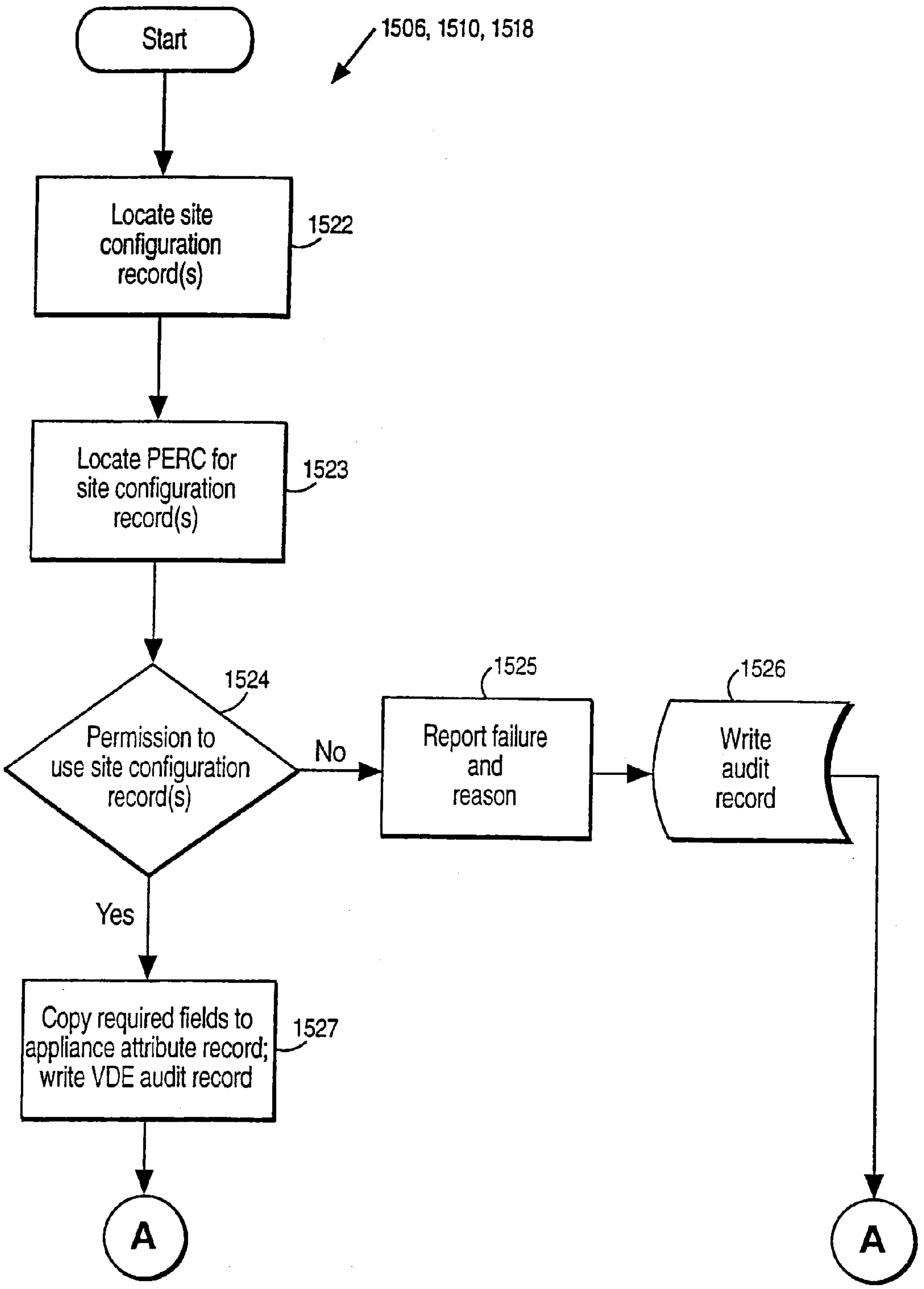
Figure 25B:
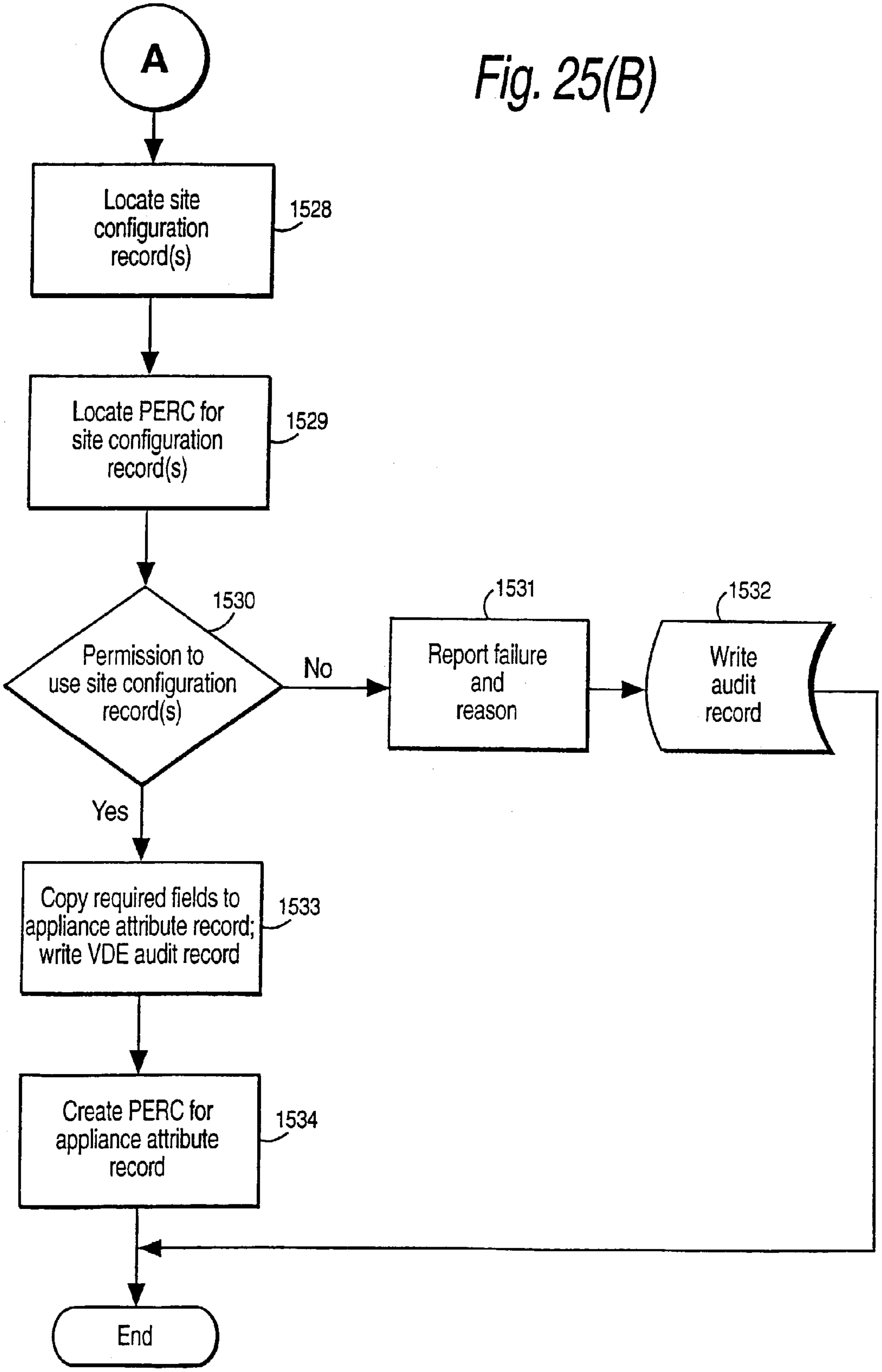

FIGS. 25(A) and 25(B) together show example steps performed by the "create appliance attribute data" method shown in FIG. 24, blocks 1506, 1510 and 1518. As disclosed in "Ginter et al", the actual processing steps are performed by one or more load modules associated with the method. This example method (which, as explained above, may be performed by the matching and classification utility 900, the VDE administrator 800, the electronic appliance 100, any other electronic appliance, or a combination of any or all of these) first locates the site configuration record(s) corresponding to the electronic appliance for which appliance attribute data is to be collected (FIG. 24A, block 1522). This site configuration record(s) may, for example, be stored in the electronic appliance secure database. The method next locates the permissions record for the site configuration record(s) (FIG. 24A, block 1523). The SPE next determines, based upon the permission record(s), whether the method has permission to access and/or use the site configuration record(s) (FIG. 25A, block 1524). If the method does not have the appropriate permission ("no" exit to decision block 1524, FIG. 25A), the protected processing environment 154 reports the failure and reason for the failure, and the method writes an associated audit record (FIG. 25A, block 1525, 1526) and goes on to process a user configuration record(s). On the other hand, if the method does have permission to use the site configuration record(s) ("yes" exit to decision block 1524, FIG. 25A), the method copies the required fields from the site configuration record(s) to create an appliance attribute record, and may then write an appropriate audit record (FIG. 25A, block 1527).

After completing processing of site configuration records, the method then locates the user configuration record(s) corresponding to the electronic appliance for which appliance attribute data is to be collected (FIG. 25B, block 1528). This user configuration record(s) may, for example, be stored in the electronic appliance secure database. The protected processing environment 154 next locates the permissions record for the user configuration record(s) (FIG. 25B, block 1529). The protected processing environment 154 determines next, based upon the permission record(s), whether it has permission to access and/or use the user configuration record(s) (FIG. 25B, block 1530). If the method does not have the appropriate permission ("no" exit to decision block 1530, FIG. 25B), the protected processing environment 154 reports the failure and reason for the failure, and the method writes an associated audit record (FIG. 25B, block 1531, 1532) and exits the process. On the other hand, if the method does have permission to use the user configuration record(s) ("yes" exit to decision block 1530, FIG. 25B), the method copies the required fields from the user configuration record(s) to create an appliance attribute record, and may then write an appropriate audit record (FIG. 25B, block 1533). The method may then, if desired, create a new permissions record corresponding to the appliance attribute record (FIG. 25B, block 1534). If a new permissions record is desired, the method may include appropriate "shared secrets," expiration interval(s), and/or other data in an associated MDE to, for example, provide a basis for controlling access, use, and modification of the permissions record.

Figure 26B:
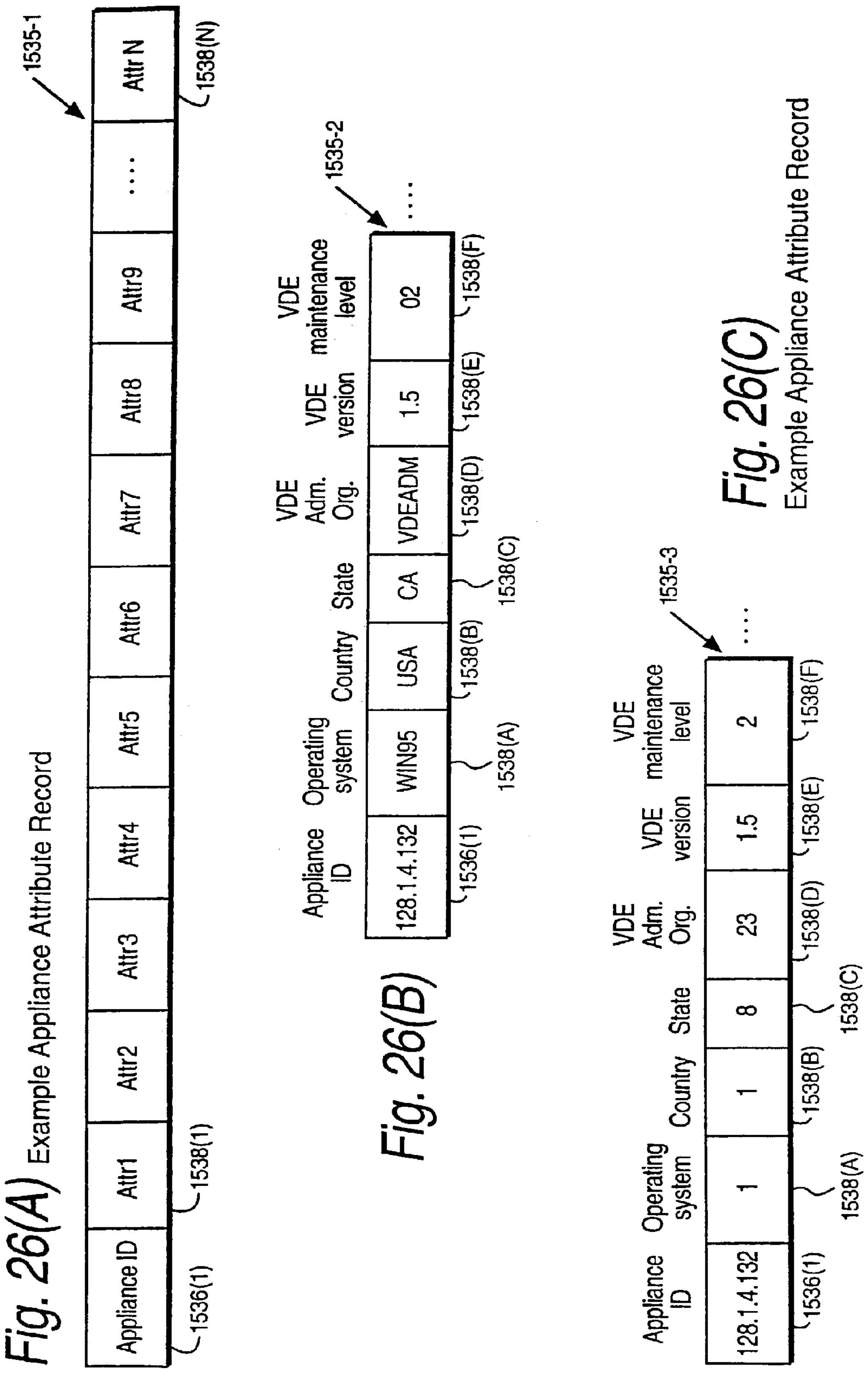

FIGS. 26A–26C show examples of appliance attribute records created by FIG. 25B, block 1532. FIG. 26A shows an example appliance attribute record that may include, for example, an appliance identification field 1536(1) and any number of attribute fields 1538(1) . . . 1538(n). FIG. 26B shows a more specific appliance attribute record example including an appliance ID field 1536(1), an operating system field 1538(A), a country field 1538(B), a state field 1538(C), a VDE administrator organization field 1538(D), a VDE version field 1538(E), and a VDE maintenance level field 1538(F). FIG. 26C shows that different encodings may be used for any/all of the various attribute fields 1538.

Example Steps for Collecting Demographic Data

Figure 27B:
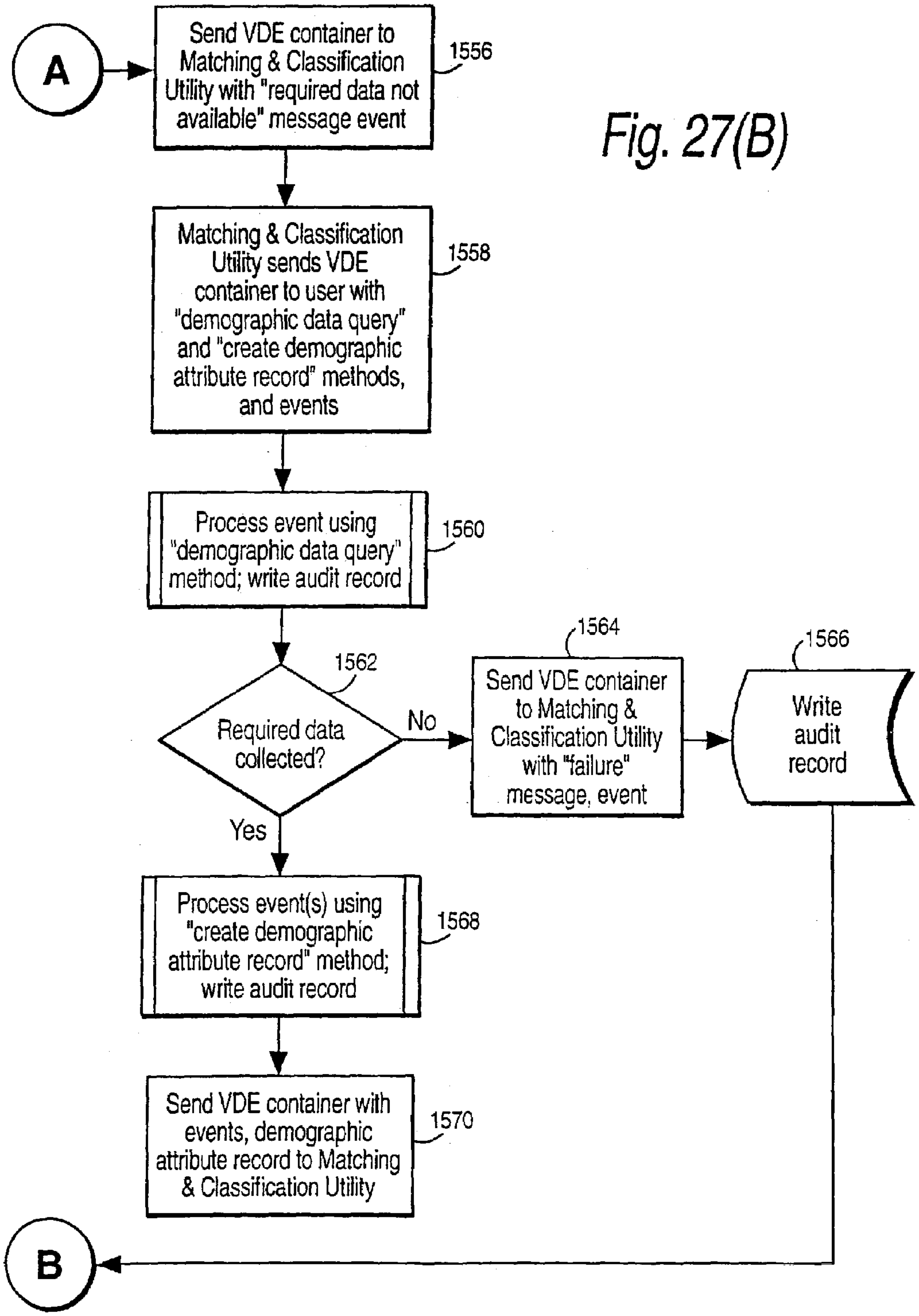

FIGS. 27A, 27B show example steps for collecting demographic data. In this example, the matching and classification utility 900 initially specifies demographic data fields it is interested in (FIG. 27A, block 1540). The matching and classification utility 900 next determines whether the required data is already available to it (e.g., based on previous inquiries responded to by the user 95) (block 1542, FIG. 27A). If the required data is already available ("yes" exit to decision block 1542, FIG. 27A), the matching and classification utility 900 may send one or more events to a "create demographic attribute record" method to process the data (block 1544, FIG. 27A).

On the other hand, if the required data is not available to the matching and classification utility ("no" exit to decision block 1542, FIG. 27A), the matching and classification utility may send a container 152 to another commerce utility system 90, the container including one or more administrative events associated with a "demographic data query" method and a "create demographic attribute record" method (FIG. 27A, block 1546). The other commerce utility system 90 may then process the one or more events using the "demographic data query" method, and write an associated audit record (FIG. 27A, block 1548). It may determine whether the required demographic data is available (FIG. 27A, block 1550). If the information is available ("yes" exit to decision block 1550, FIG. 27A), the commerce utility system 90 may process one or more events using a "create demographic attribute record" method in order to analyze the available demographic data, and write a corresponding UDE audit record (FIG. 27A, block 1552). The other commerce utility system 90 may then send appropriate one or more administrative events and the demographic data attribute record within a container 152 to the matching and classification utility 900 (FIG. 27A, block 1554)).

If the required demographic data is not available ("no" exit to decision block 1550, FIG. 27A), the commerce utility system 90 may send an administrative event to the matching and classification utility system 900 within a container 152 informing the matching and classification utility that the required data is not available (FIG. 27B, block 1556). The matching and classification utility 900 may then send a "demographic data query" method and a "create demographic attribute record" method within a container 152 (along with appropriate administrative events to activate such methods) directly to the user 95 about which demographic information is to be collected (FIG. 27B, block 1558). The user's electronic appliance 100 may, in response, process the one or more events using the "demographic data query" method, which may write an associated audit record (FIG. 27B, block 1560). If the required data is not collected ("no" exit to decision block 1562, FIG. 27B, the user's appliance 100 may send a "failure" message associated with the appropriate administrative event to the matching and classification utility 900, and write an associated audit record (FIG. 27B, block 1564, 1566). If the required demographic data is successfully collected ("yes" exit to decision block 1562, FIG. 27B), the user's electronic appliance may process one or more events using the "create demographic record" method supplied by step 1558, which may write an associated audit record (FIG. 27B, block 1568). The electronic appliance may then send appropriate administrative events and the demographic attribute record to the matching and classification utility within one or more containers 152 (FIG. 27B, block 1570).

FIG. 28 shows an example questionnaire "pop-up" screen that may be displayed by the user's appliance 100 as a result of processing events using the "demographic data query" method of block 1548, FIG. 27A, and/or block 1560, FIG. 27B. In this example, information is collected directly from a user 95 by displaying a questionnaire on a display device that is part of the user's appliance 100. The questionnaire may ask for various demographic information such as:

- name
- address
- city
- state
- zip code
- gender
- date of birth
- education level
- marital status
- number of children
- age of first child
- gender of first child
- other information The user is requested to provide the information by filling in the various fields within the questionnaire. The questionnaire may assure the user that all information the user provides will be treated as confidential, by, for example, disclosing the rules that will be associated with access to and use of the information.

Steps similar to those shown in FIG. 25A, 25B may be performed to create a demographic attribute record based on the results of a demographic data query. FIGS. 29A–29C show examples of different user demographic attribute information records resulting from this process. FIG. 29A shows an example demographic attribute record 1572 including a user ID field 1574 and any number of attribute fields 1576(1), . . . 1576(n). FIG. 29B shows a more specific example of a demographic attribute record including, for example, a user ID number 1574, a gender attribute field 1576(A), an age field 1576(B), a highest educational level field 1576(C), a citizenship field 1576(D), a country of residence field 1576(E), a district field 1576(F), a city field 1576(G), and a street address field 1576(H). FIG. 29C shows a different detailed encoding example for demographic attribute record 1572-1.

Example Steps for Collecting Psychographic Data

FIG. 20 shows example steps that may be performed to collect user psychographic data. In this particular example, the matching and classification utility 900 initially specifies desired psychographic data it requires in order to perform a particular classification/matching process (FIG. 30, block 1580). The matching and classification utility 900 determines if the required data is already available to it (FIG. 30, block 1582). If the required data is already available ("yes"

exit to decision block 1582, FIG. 30), the matching and classification utility 900 sends one or more events to a "create psychographic attribute record" method in order to analyze the available data and provide appropriate psychographic attributes (FIG. 30, block 1584). If, on the other hand, the required data is not available to the matching and classification utility 900 ("no" exit to decision block 1582, FIG. 30), appropriate steps are performed to collect the required data. In this example, the matching and classification utility 900 may send a "psychographic data query" method and a "create psychographic attribute record" method within one or more containers 152 (along with appropriate administrative events to activate such methods), to appropriate repositories that may contain the required data (FIG. 30, block 1586). If the required data is available from the repositories ("yes" exit to decision block 1588, FIG. 30), then an electronic appliance at the repository (in this example) processes one or more events using the "create psychographic attribute record" method supplied by block 1586 in order to generate an appropriate attribute record(s) containing the attribute information the matching and classification utility 900 is interested in (FIG. 30, block 1590). This information, and associated one or more events, may be sent to the matching and classification utility 900 within one or more containers 152 (FIG. 30, block 1592).

If the required data is not available from the repository ("no" exit to decision block 1588, FIG. 30), then the repository may send a "failure" message associated with one or more administrative events to the matching and classification utility 900 within a container 152 (FIG. 30, block 1594). The matching and classification utility 900 may, in response, send one or more administrative events, a "collect psychographic data" and "create psychographic attribute record" method directly to the user's electronic appliance 100 within one or more containers 152 (FIG. 30, block 1596). The user's electronic appliance 100 may, in turn, process the events using the "collect psychographic data" and "create psychographic attribute record" methods (FIG. 30, block 1598, 1600), and send the resulting attribute data record(s) to the matching and classification utility (FIG. 30, block 1592).

FIG. 31 shows an example psychographic questionnaire "pop-up" screen that may be displayed to the user 95 upon performance of FIG. 30, block 1598. This questionnaire may collect various psychographic information from the user, including for example:

- mood information
- emotion information
- habit information
- behavioral information
- cognitive information
- medical information
- physical information
- patient information
- counseling information
- aptitude information
- testing information
- other information
- combinations of types of information.

The questionnaire may inform the user that all information collected will be treated as "confidential," and may also, if desired, indicate that the user will be compensated for providing the information.

FIGS. 32A–32C show some example user psychographic attribute information records 1602 that may be created by FIG. 30, block 1584, 1590 and/or 1600. FIG. 32A shows that a psychographic attribute record 1602 may include a user ID field 1604 and any number of attribute fields 1606(1), . . . 1606(n). FIG. 32B shows a more detailed user psychographic attribute record 1602 example including a user ID field 1604, a field 1606*a* indicating whether the user is introverted or extroverted, a field 1606*b* indicating whether the user is a sensing or intuitive person, a field 1606*c* indicating whether the user is primarily a thinking person or a feeling person, a field 1606(*d*) indicating whether the user is primarily a judging person or a perceiving person, and a field 1606(*e*) indicating an overall psychographic/behavioral profile such as, for example, the iVALS standard provided by SRI. FIG. 32C shows a different kind of encoding (in this case, binary) for the various attributes 1606.

Figure 33:
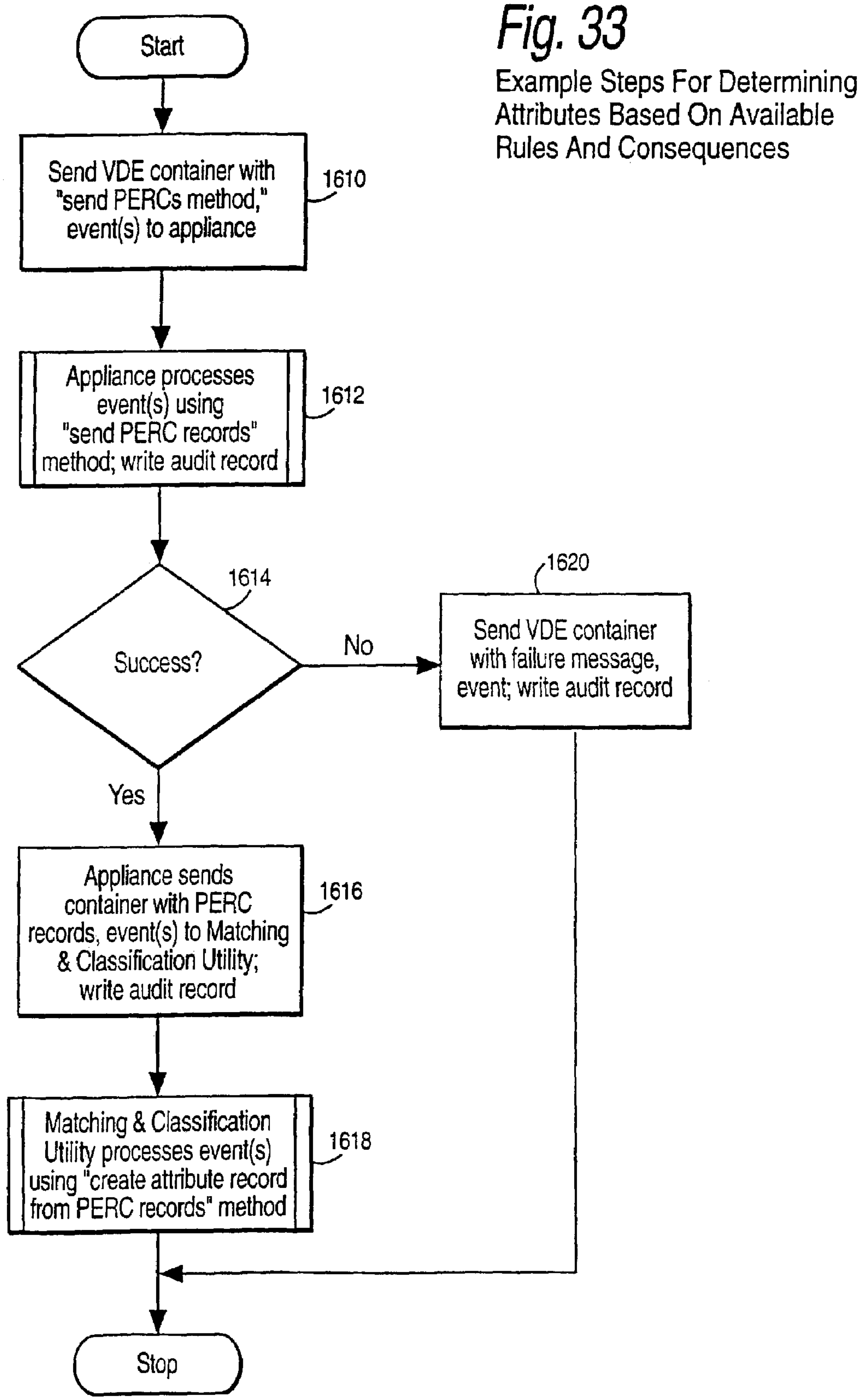

Example Method for Determining Attributes Based on Available Rules and Consequences FIG. 33 shows an example method for determining attributes based on available rules and consequences. The matching and classification utility 900 may first send one or more administrative events and a "send permission records" method request to an electronic appliance 100 within one or more containers 152 (FIG. 33, block 1610). In response, the appliance may process the events using the method, which may write an associated audit record (FIG. 33, block 1612). If this step is performed successfully ("yes" exit to FIG. 33, decision block 1614), the appliance sends appropriate administrative events and the requested permission records to the matching and classification utility 900 within one or more containers 152, and the method writes an associated audit record indicating it has performed this transaction (FIG. 33, block 1616). The matching and classification utility may process events using a corresponding "create attribute record from permission records" method to obtain attributes from these provided permission records (FIG. 33, block 1618). If the step of block 1612 failed (as indicated by the "no" exit to decision block 1614, FIG. 33), the method may send a "failure" message to the matching and classification utility 900, and write an associated audit record (FIG. 33, block 1620).

Figure 34:
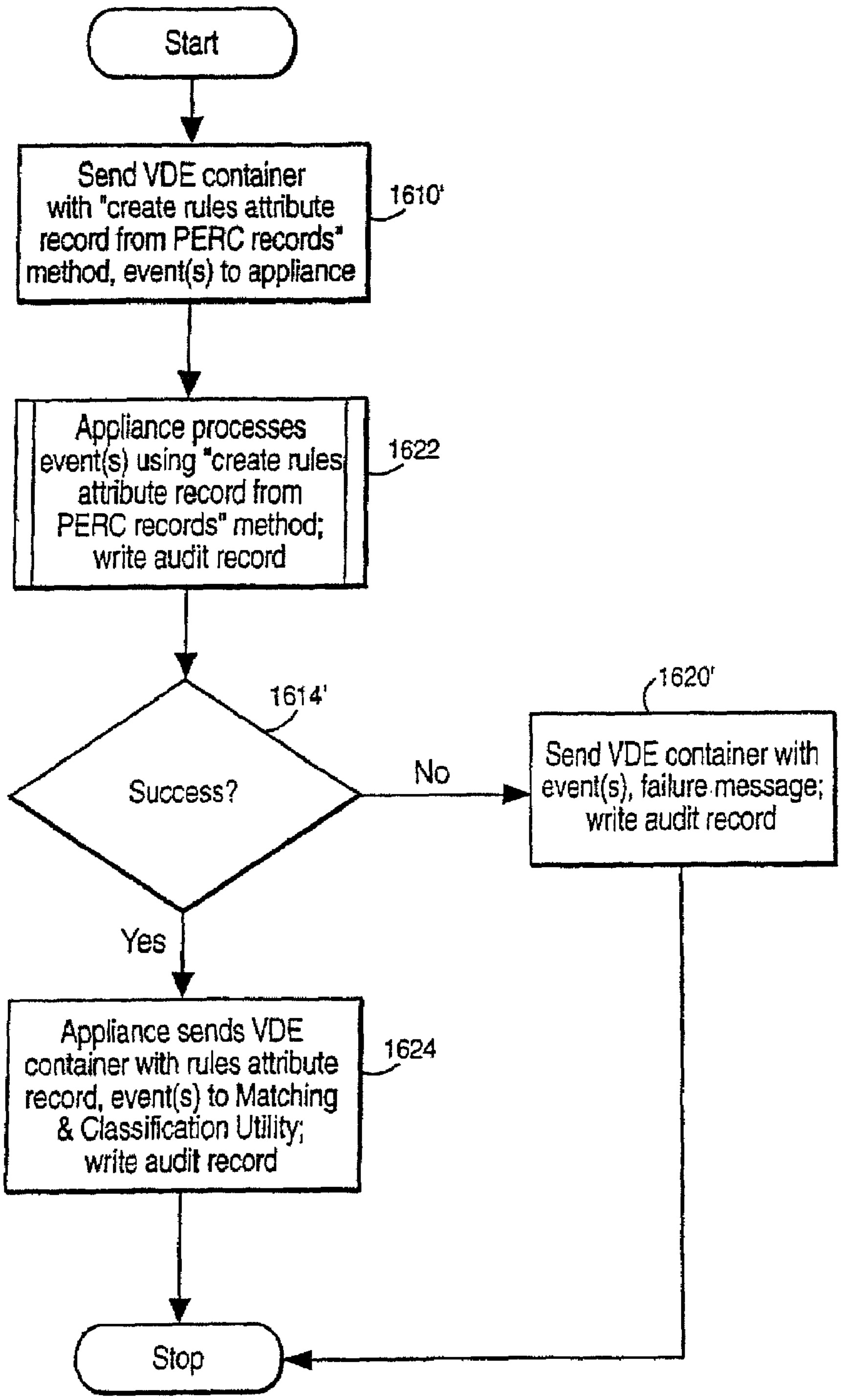

FIG. 34 shows a variation on the FIG. 33 example in which the appliance 100 rather than the matching and classification utility 900 creates the rules attribute record based on a "create rules attribute record from permissions records" method supplied by the matching and classification utility, and then sends the rules attribute record to the matching and classification utility (see FIG. 34, blocks 1622, 1624).

Example Method to Construct Attribute Records from Permissions Records

Figure 35A:
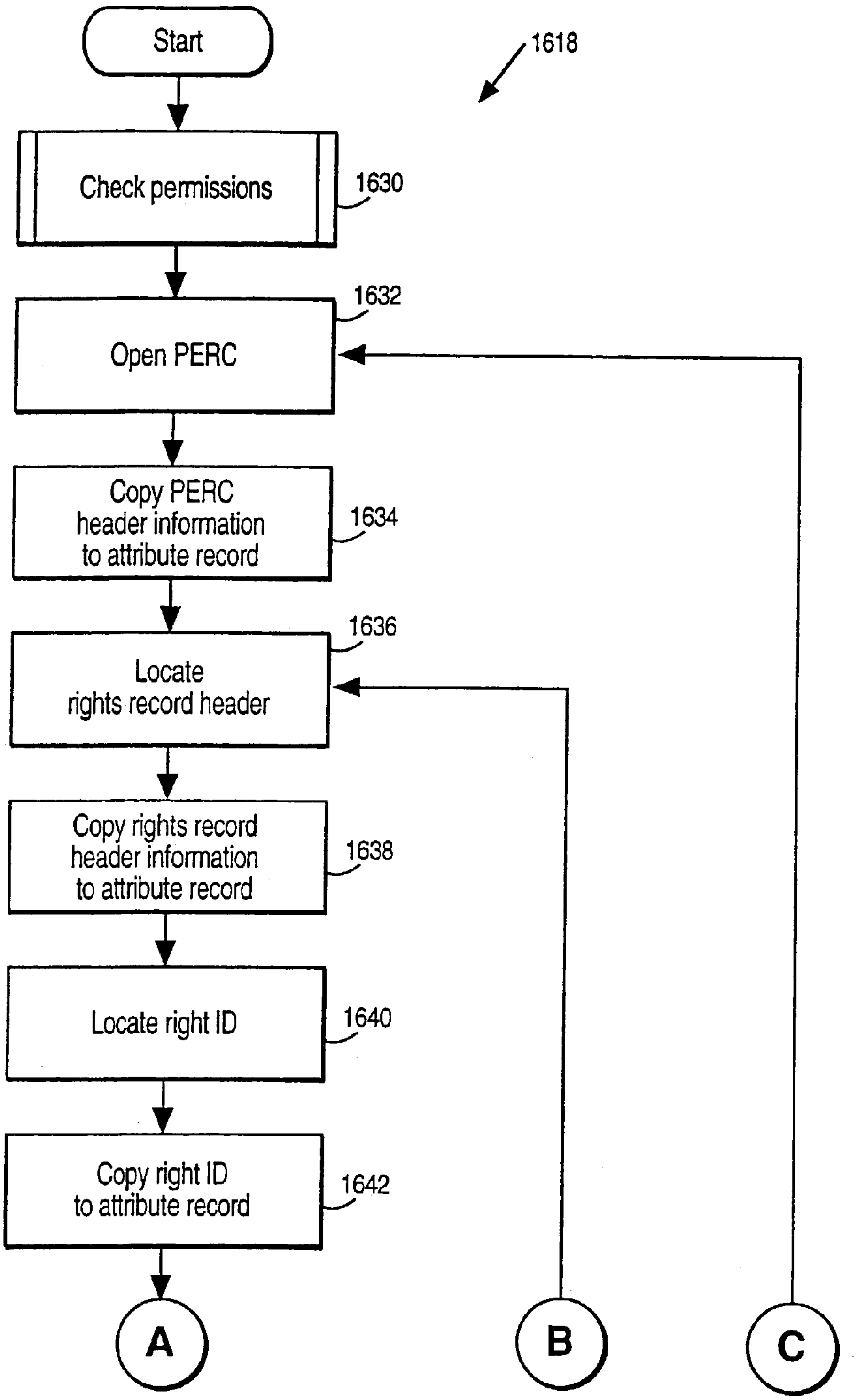
Figure 35B:
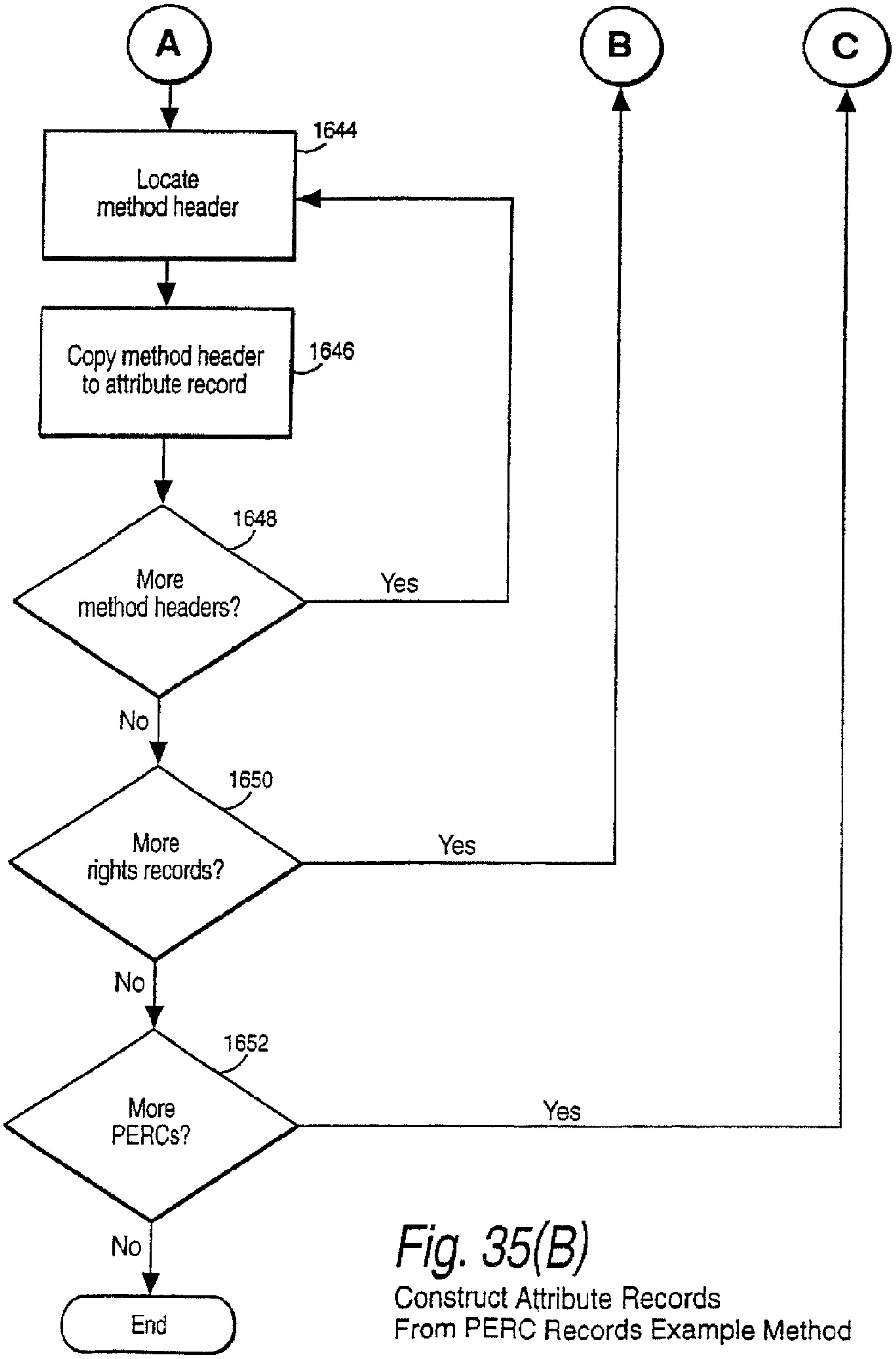

FIGS. 35A, 35B show example steps for constructing attribute records from permissions records. The steps shown in FIG. 35A, 35B may, for example, be performed as part of the method shown in block 1618 of FIG. 33.

In this example method 1618, the matching and classification utility 900 may first check relevant permissions to ensure that it has the authority to perform the desired transactions (FIG. 35A, block 1630). For example, the matching and classification utility 900 may examine a permissions record about the permissions records it has collected, this permissions record it is examining indicating what entities have authority to perform operations with respect to the permissions record to be analyzed. Presuming the matching and classification utility 900 has the appropriate permission, it opens a permissions to be analyzed (FIG. 35A, block 1632), and performs a sequence of steps 1634–1650 to extract relevant information from the permissions record. For example, information from the permissions record header can be copied into the attribute record (FIG. 35A, block 1634), and then the method may locate the rights record header (block 1636, FIG. 35A). Information from the rights record header may be copied into the attribute record (block 1638, FIG. 35A), along with the identifier for the corresponding right(s) (blocks 1640, 1642, FIG. 35A). The process may then recursively locate and harvest data from each method header contained within the rights record (blocks 1644, 1646, 1648, FIG. 35B). The process may recursively repeat steps 1638–1648 for each rights record within the permissions record (as tested for by decision block 1650, FIG. 35B). Finally, the entire process of steps 1632–1652 may be performed recursively for multiple permissions records to harvest the appropriate rules and consequences information from each of a number of permissions records (see decision block 1652, FIG. 35B).

Figure 36:
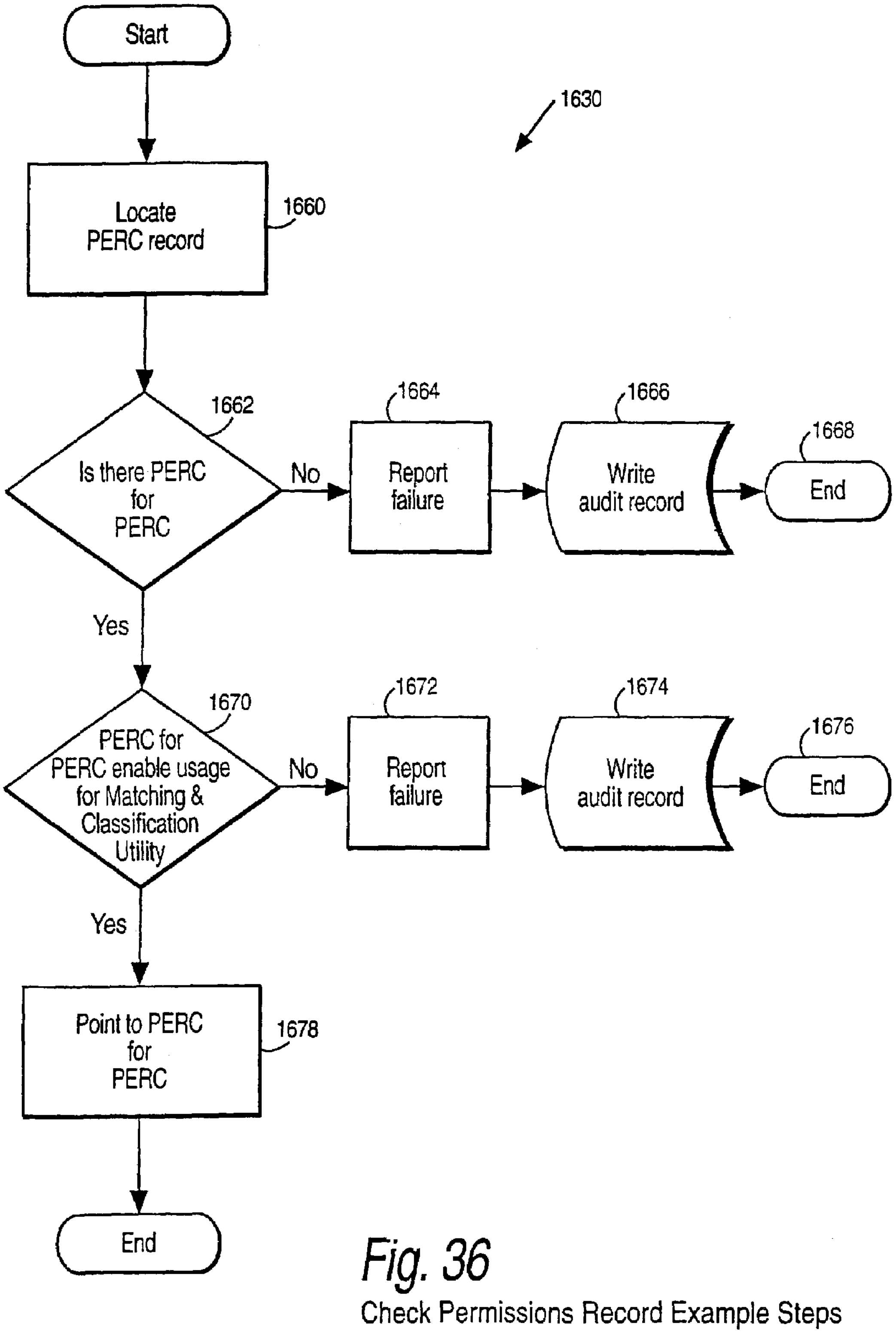

FIG. 36 shows example steps to perform the "check permissions" operation shown in FIG. 35A, block 1630. In this example, the process locates the permissions record from which information is desired to be harvested (FIG. 36, block 1660), and then determines whether there is a permissions record for that permissions record (FIG. 36, decision block 1662). If there is no permissions record that controls that permissions record (and assuming that authorization or additional permission is required to access the permissions record from which information is to be harvested) (FIG. 36, "no" exit to decision block 1662), the process reports failure, writes an audit record, and ends (FIG. 36, blocks 1664, 1666, 1668). On the other hand, if there is a permissions record that controls access to the permissions record from which information is to be harvested ("yes" exit to decision block 1662, FIG. 36), the process determines whether that permissions record for the permissions record enables usage by the matching and classification utility 900 (FIG. 36, decision block 1670). If the matching and classification utility 900 does not have permission ("no" exit to decision block 1670, FIG. 36), the process reports failure, writes an audit record to that effect, and ends (blocks 1672, 1674, 1676, FIG. 36)). On the other hand, if the matching and classification utility 900 is granted permission ("yes" exit to decision block 1670, FIG. 36), the process accesses and uses the permissions record for the permissions record from which information is to be harvested (FIG. 36, block 1678).

FIGS. 37A–37C show examples of attribute records containing information harvested from permissions records. Attribute record 1680-1 shown in FIG. 37A includes a user identification field 1682, an object identification field 1684, and any number of attribute fields 1686(1), . . . , 1686(n). The attribute record 1680-2 shown in FIG. 37B includes, as a more detailed example, a user ID number field 1682, an object ID field 1684, a right ID field 1686*a*, a method identifier field 1686*b*, another right ID field 1686*c*, and corresponding method type fields 1686(*d*), a further right ID field 1686*e* and two corresponding method attribute fields 1686*f*, 1686*g*, a further right ID field 1686*h* and corresponding method attribute fields 1686*i*, 1686*j*.

FIG. 37C shows a different example in coding for the FIG. 37B example attribute record.

Example Steps for Assembling Rules and Consequences

Figure 38:
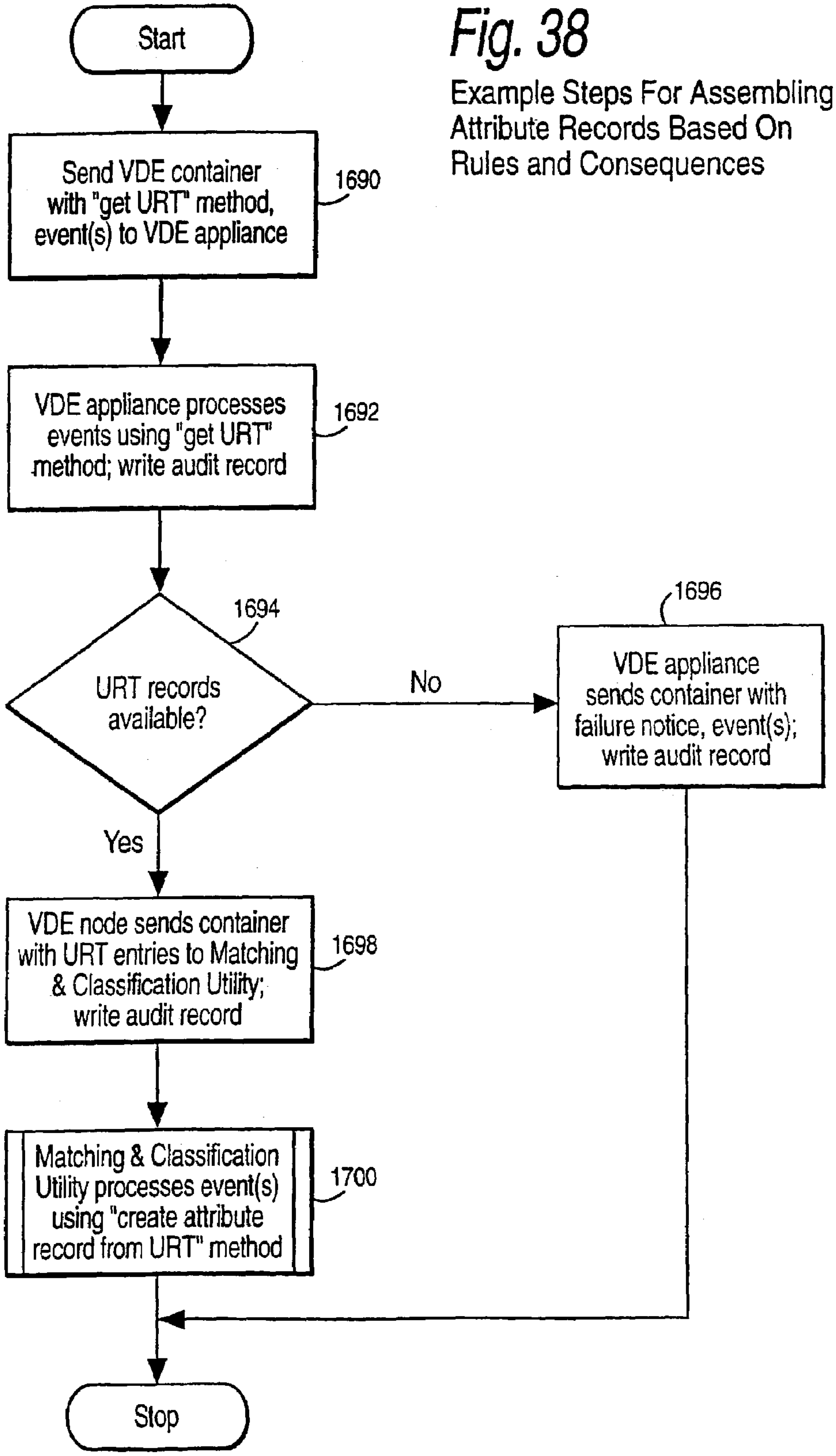

FIG. 38 shows example steps for assembling rules and consequences. In this example, the matching and classification utility 900 may send one or more administrative events and a "get user rights table" method within a container 152 to an electronic appliance (FIG. 38, block 1690). The electronic appliance 100 processes the one or more events using the "get URT" method, which may writes an associated audit record (FIG. 38, block 1692). The method then determines whether the associated URT records are available (FIG. 38, decision block 1694). If the records are not available ("no" exit to decision block 1694, FIG. 38), the method sends a failure notice to the matching and classification utility 900, and writes an associated audit record (block 1696, FIG. 38). If, on the other hand, the URT records are available ("yes" exit to decision block 1694, FIG. 38), the method packages the URT records and associated one or more administrative events into a container 152, and sends the container to the matching and classification utility 900 (FIG. 38, block 1698). The matching and classification utility 900 may then process the administrative events using a "create attribute record from URT" method in order to extract or harvest the information from the URT(s) (FIG. 38, block 1700).

Figure 39:
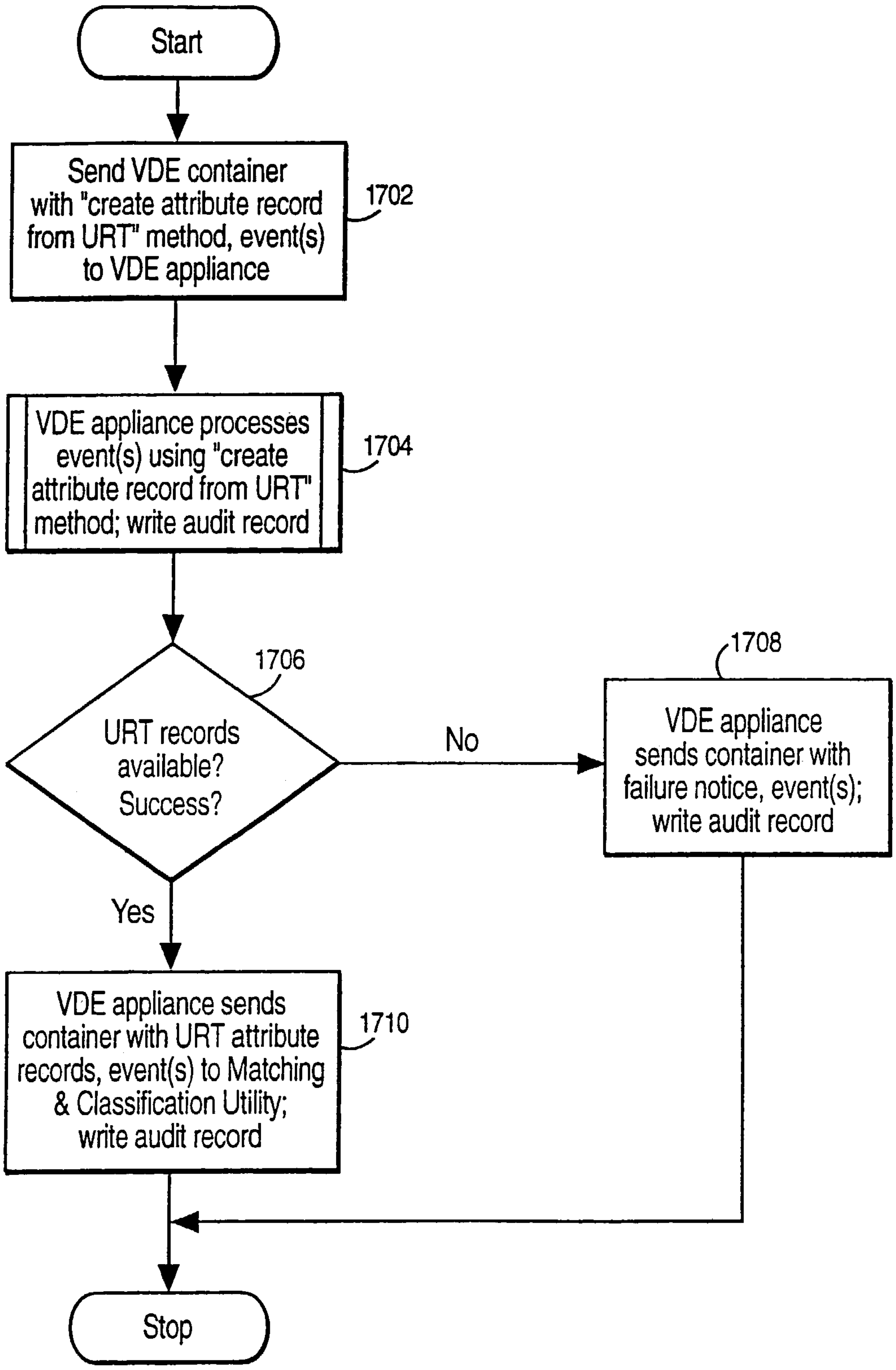

FIG. 39 shows another example sequence of steps for assembling rules and consequences. In this example, the matching and classification utility 900 sends one or more administrative events and a "create attribute record from URT" method to the electronic appliance 100 that stores or has access to the user rights table information (FIG. 39, block 1702). The appliance then processes the events using the method sent to it, and the method writes associated audit information as it processes (FIG. 39, block 1704). If the URT records are available and the step completes successfully ("yes" exit to decision block 1706, FIG. 39), the method sends the resulting URT attribute record(s) and one or more administrative events to the matching and classification utility within a container 152, and writes corresponding audit information to an audit trail (FIG. 39, block 1710). On the other hand, if an error condition arises either because the URT records are not available or because the method for some other reason cannot complete successfully, the method sends a failure notice within a container 152, and writes an associated audit record ("no" exit to decision block 1706, FIG. 39, block 1708).

Figure 40A:
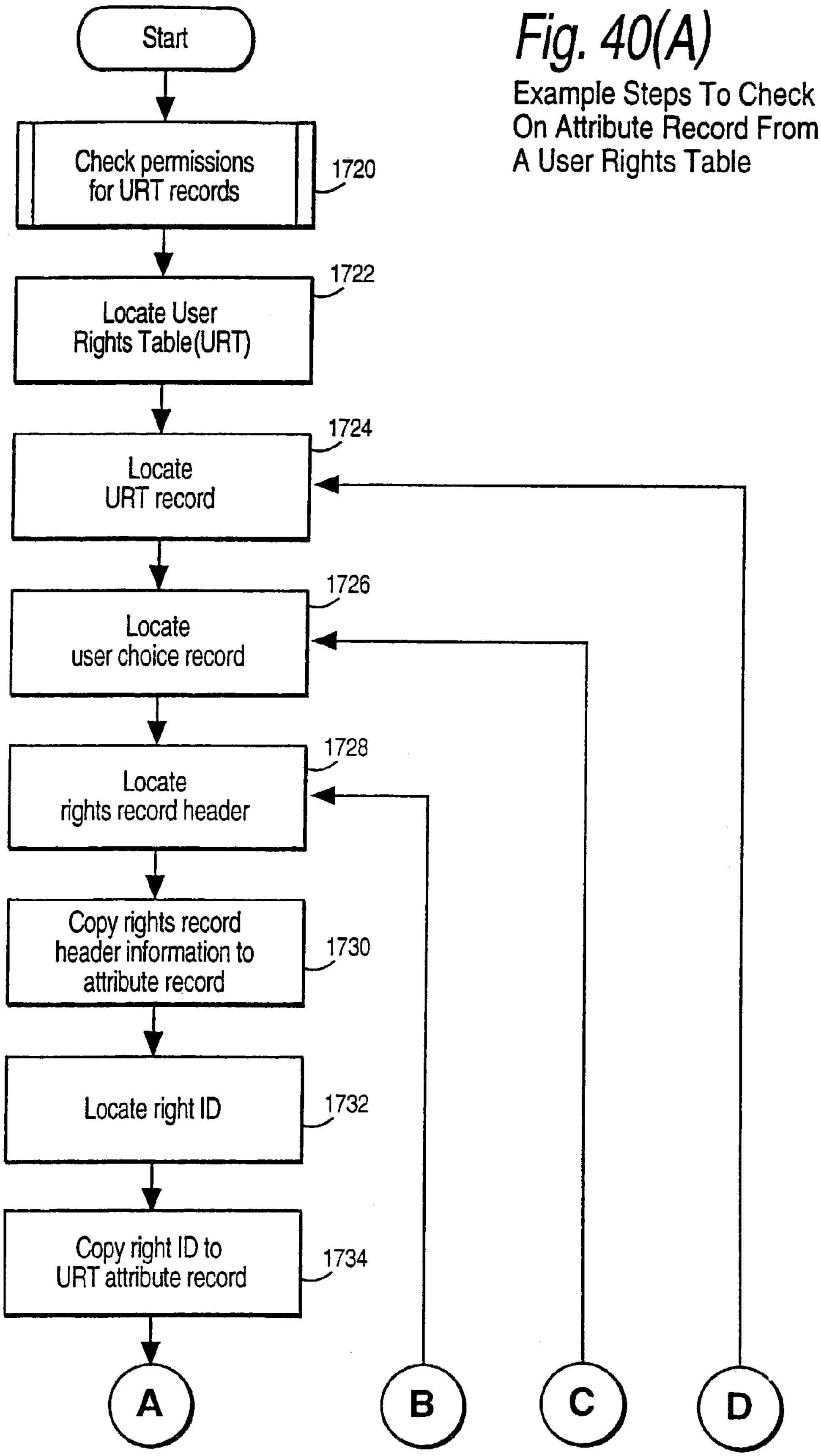
Figure 40B:
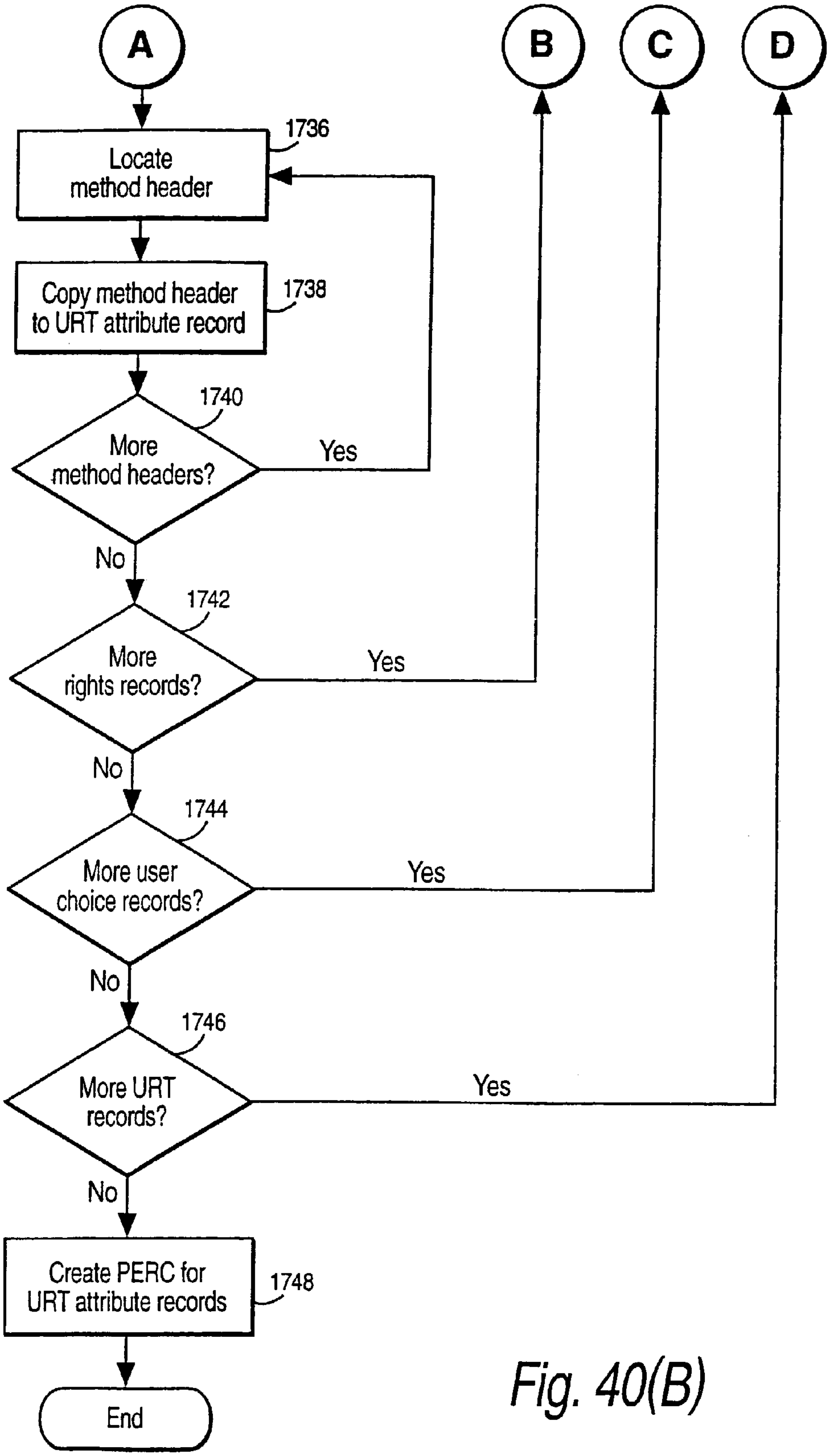

FIGS. 40A, 40B show example steps performed by blocks 1700, 1704 to "create attribute record from user rights table." The method begins by checking associated permissions for the user rights table records (FIG. 40A, block 1720). Assuming that appropriate user and/or group permission is available, the method next locates the user rights table (FIG. 40A, block 1722), and then begins recursively analyzing the user rights table information to harvest desired attribute information from it (FIG. 40A, blocks 1724 and following). In this particular example, the method locates the user rights table record (block 1724, FIG. 40A, and then locates the first rights record header within the first user choice record within the URT record (blocks 1726, 1728, FIG. 40A). The method copies rights record header information to the attribute record (block 1730), and then locates the right identifier and copies that to the attribute record (blocks 1732, 1734). The method then recursively locates each method header within the user rights table right record, and copies corresponding attribute information to the attribute record (blocks 1736, 1738, 1740, FIG. 40B). Steps 1728–1740 are performed recursively for each rights record within the user choice record (see FIG. 40B), decision block 1742), and the above steps are performed recursively for each user choice record within the user rights table (see decision block 1744, FIG. 40B). Additionally, steps 1724–1744 are performed recursively for each user rights table record within the user rights table (see FIG. 40B, decision block 1746). As a last example step, the method creates a permissions record that controls access and use of the attribute record it has created (FIG. 40B, block 1748).

Figure 41:
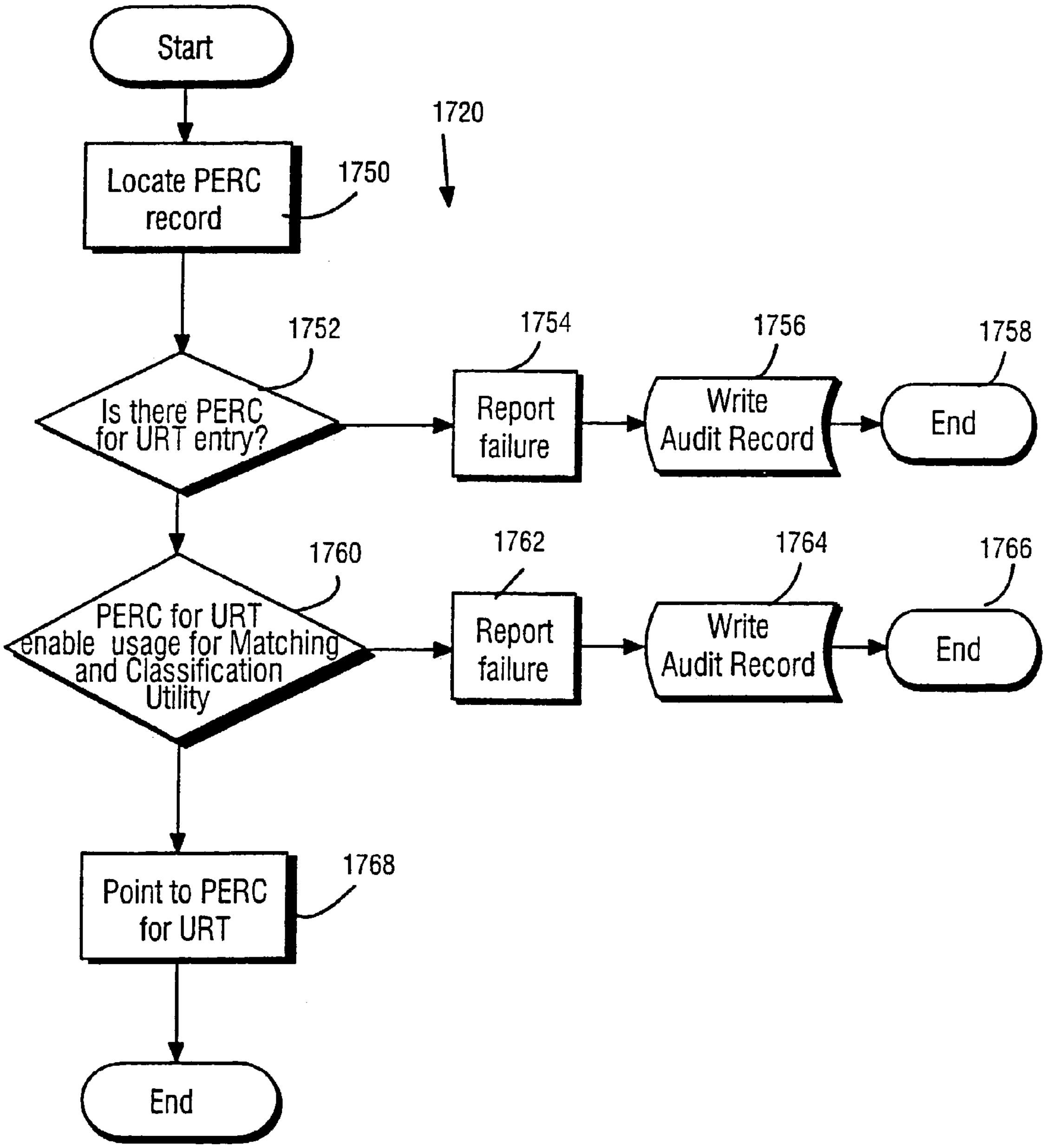
Figure 42:
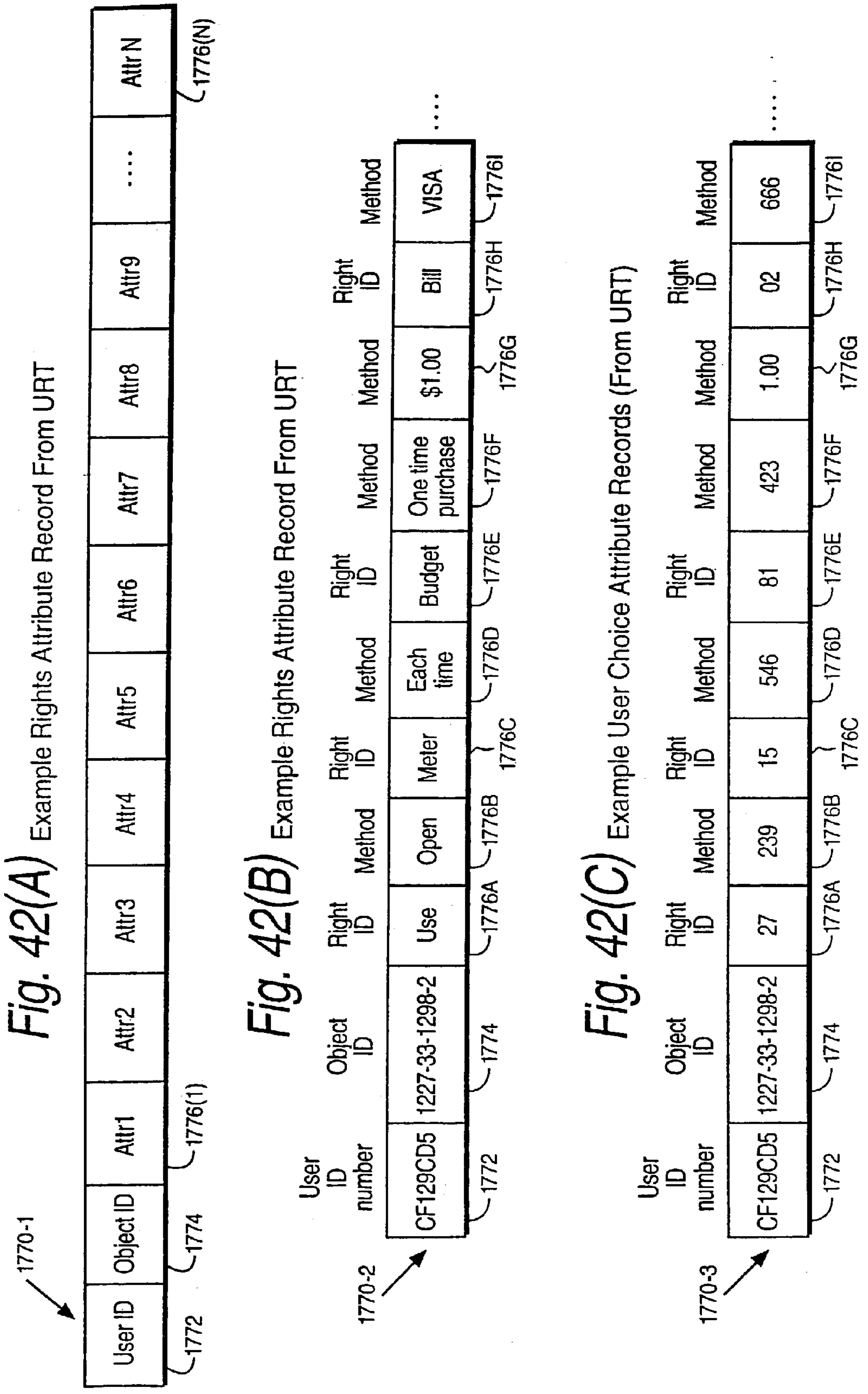

FIG. 41 shows example steps performed by the check permissions block 1720 shown in FIG. 40A. For example, the sequence of steps may begin by locating a corresponding permissions record (FIG. 41, block 1750) and then determining whether there is a permission record corresponding to the corresponding user rights table entry (FIG. 41, decision block 1752). If there is no such entry ("no" exit to decision block 1752), the method may report failure, write an audit record, and end (blocks 1754, 1756, 1758, FIG. 41). If there is a corresponding permissions record ("yes" exit to decision block 1752, FIG. 41), then the permissions record may be examined whether it enables usage for the matching and classification utility 900 (decision block 1760, FIG. 41). If the permissions record does not enable usage by the matching and classification utility 900 ("no" exit to decision block 1760, FIG. 41), the method may report a failure, write an audit record, and end (blocks 1762, 1764, 1766, FIG. 41). On the other hand, if the matching and classification utility 900 does have the required permissions to enable usage ("yes" exit to decision block 1760, FIG. 41), the method may access the permissions record (if any) for the user rights table for use in controlling access to the user rights table itself (block 1768, FIG. 41).

FIGS. 42A–42C show example rights attributes records 1770 that may be obtained from the processes above. The FIG. 42A example rights attribute record 1770-1 includes a user or group ID field 1772, an object ID field 1774, and any number of attribute fields 1776(1), . . . , 1776(n). The more detailed example rights attribute record 1770-2 shown in FIG. 42B includes a user ID number field 1772, an object ID field 1774, a right ID field 1776*a* and corresponding method attribute field 1776*b*, another right ID field 1776*c* and corresponding method attribute field 1776*d*, a right ID field 1776*e* and corresponding method attribute fields 1776*f*, 1776*g*, and another right ID field 1776*h* and corresponding method attribute field 1776*i*.

FIG. 42C shows how the rights attribute record 1770 can be encoded numerically as opposed to using characters, as one example.

Example Steps for Assembling Usage Audit Records

Figure 43:
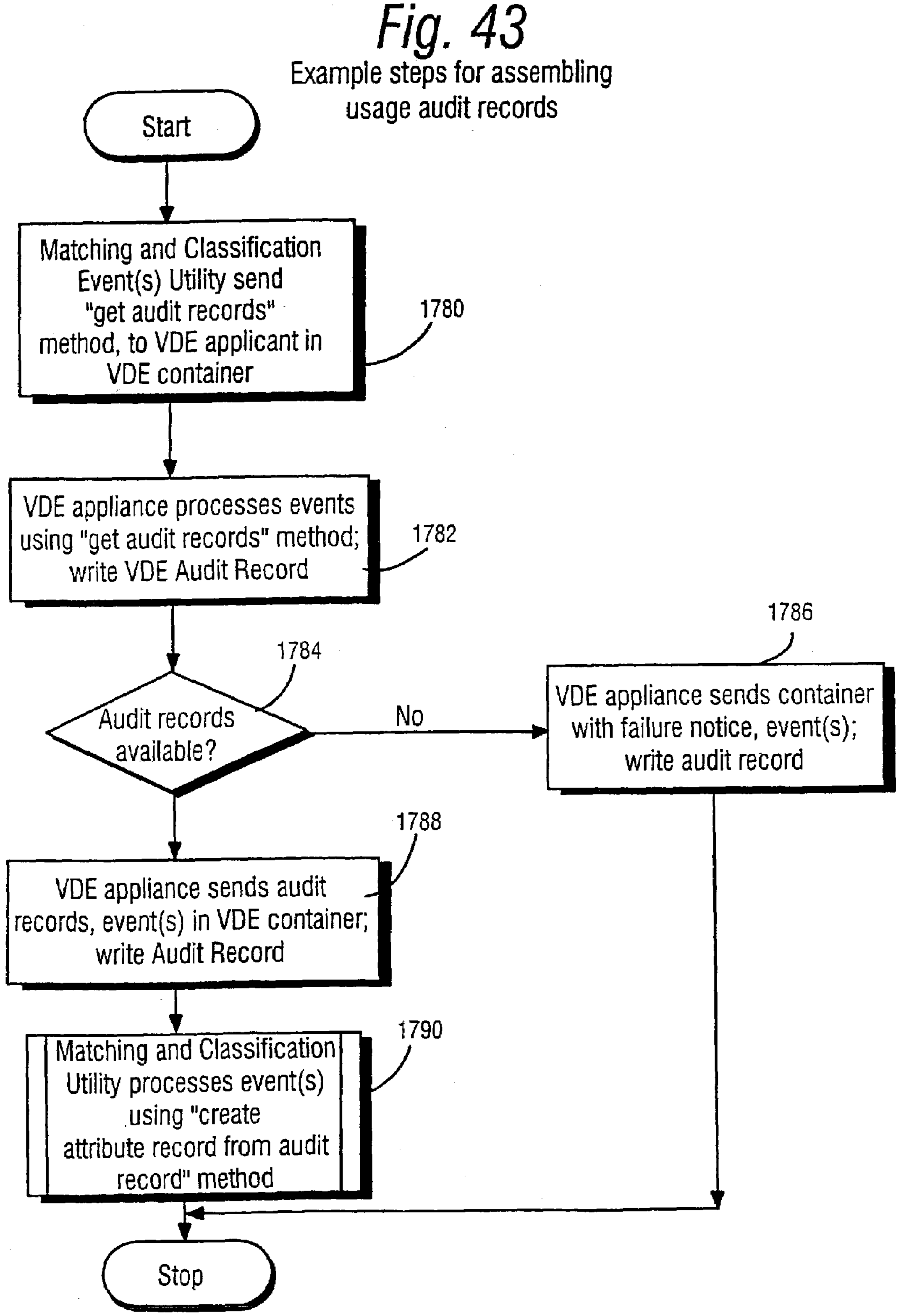

FIG. 43 shows example steps for assembling usage audit records for purposes of matching and/or classification. In this example, the matching and classification utility 900 may send one or more administrative events and a "get audit records" method to a VDE appliance 100 within a container 152 (FIG. 43, block 1780). The appliance 100 may process the one or more events using the "get audit records" method, which may write an associated audit record (block 1782, FIG. 43). If the audit records are not available ("no" exit to decision block 1784, FIG. 43), the method may send a failure notice within a container to the matching and classification utility 900, and may then write an associated audit record (FIG. 43, block 1786). On the other hand, if the audit records are available ("yes" exit to decision block 1784), the method may send one or more administrative events and the audit records within a container 152 to the matching and classification utility 900, and write an associated audit record (block 1788, FIG. 43). The matching and classification utility 900 may then process the one or more administrative events using a "create attribute record from audit record" method in order to extract or harvest the information from the audit record it will use to perform matching and/or classification (block 1790, FIG. 43).

Figure 44:
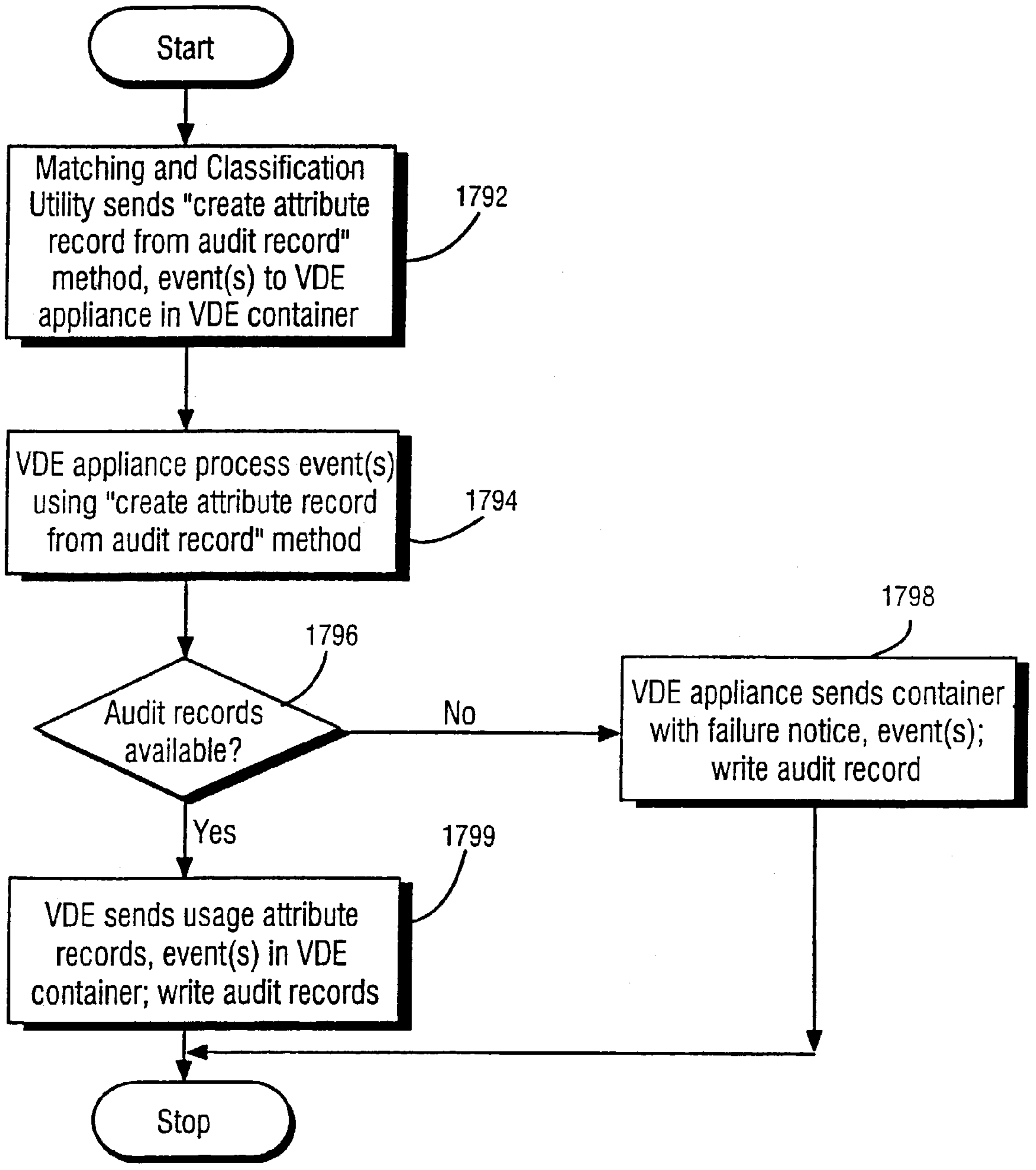

FIG. 44 shows another sequence of example steps that may be used to assemble usage audit records for purposes of matching and/or classification. In the FIG. 44 example, the matching and classification utility 900 sends one or more administrative events and a "create attribute record from audit record" method to an electronic appliance 100 within one or more containers 152 (FIG. 44, block 1792). The appliance 100 may then process the one or more administrative events using the "create attribute record from audit record" method, which may write an associated audit record (block 1794, FIG. 44). The method may determine, in this process, whether audit records are available (FIG. 44, decision block 1796). If no audit records are available ("no" exit to decision block 1796), the method may send a failure notice to the matching and classification utility 900 (FIG. 44, block 1798). On the other hand, if audit records are available, the method may create the corresponding usage attribute records and associated administrative event(s), package them into a container 152, send the container to the matching and classification utility 900, and write corresponding audit records (FIG. 44, block 1799).

Figure 45A:
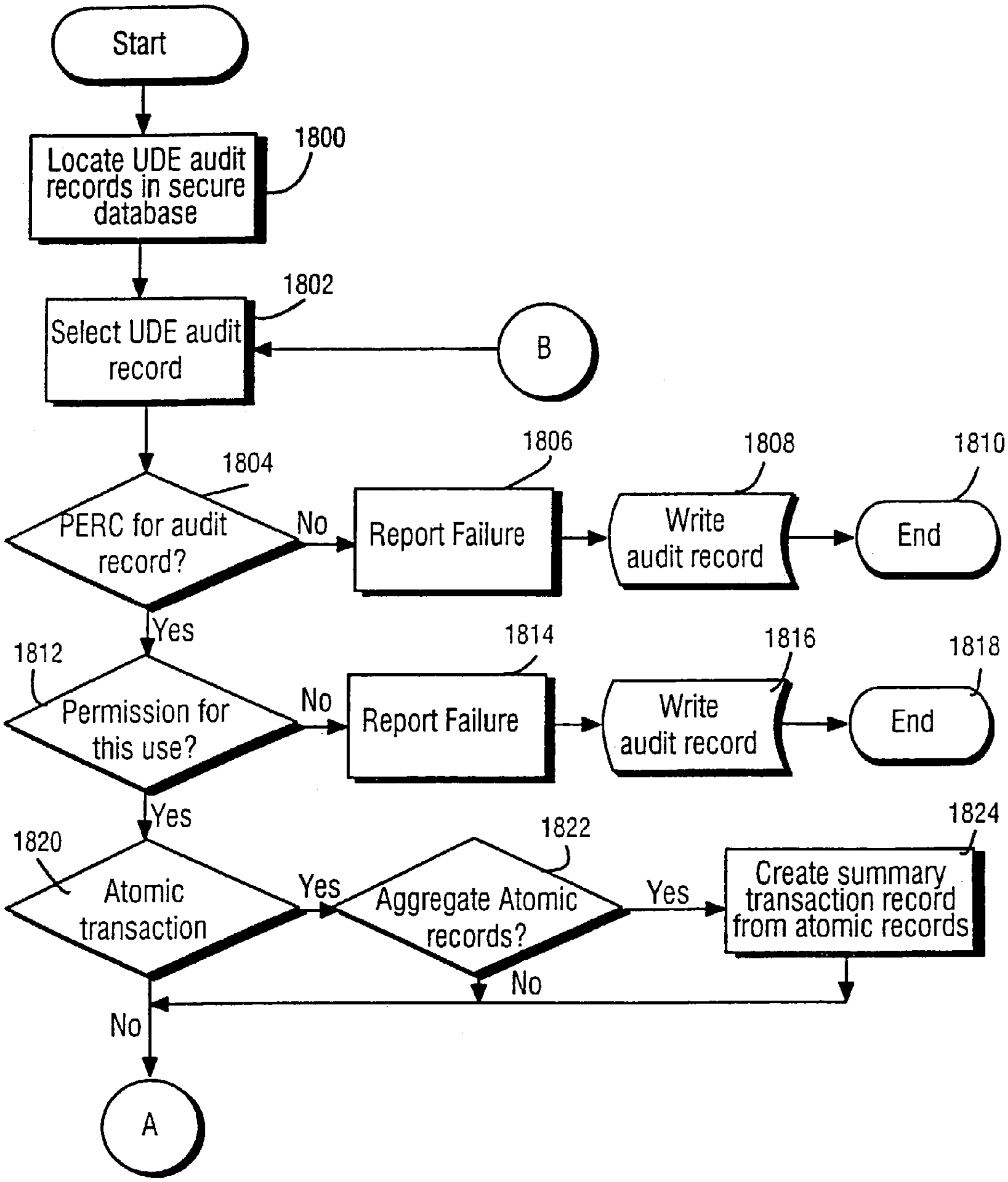
Figure 45B:
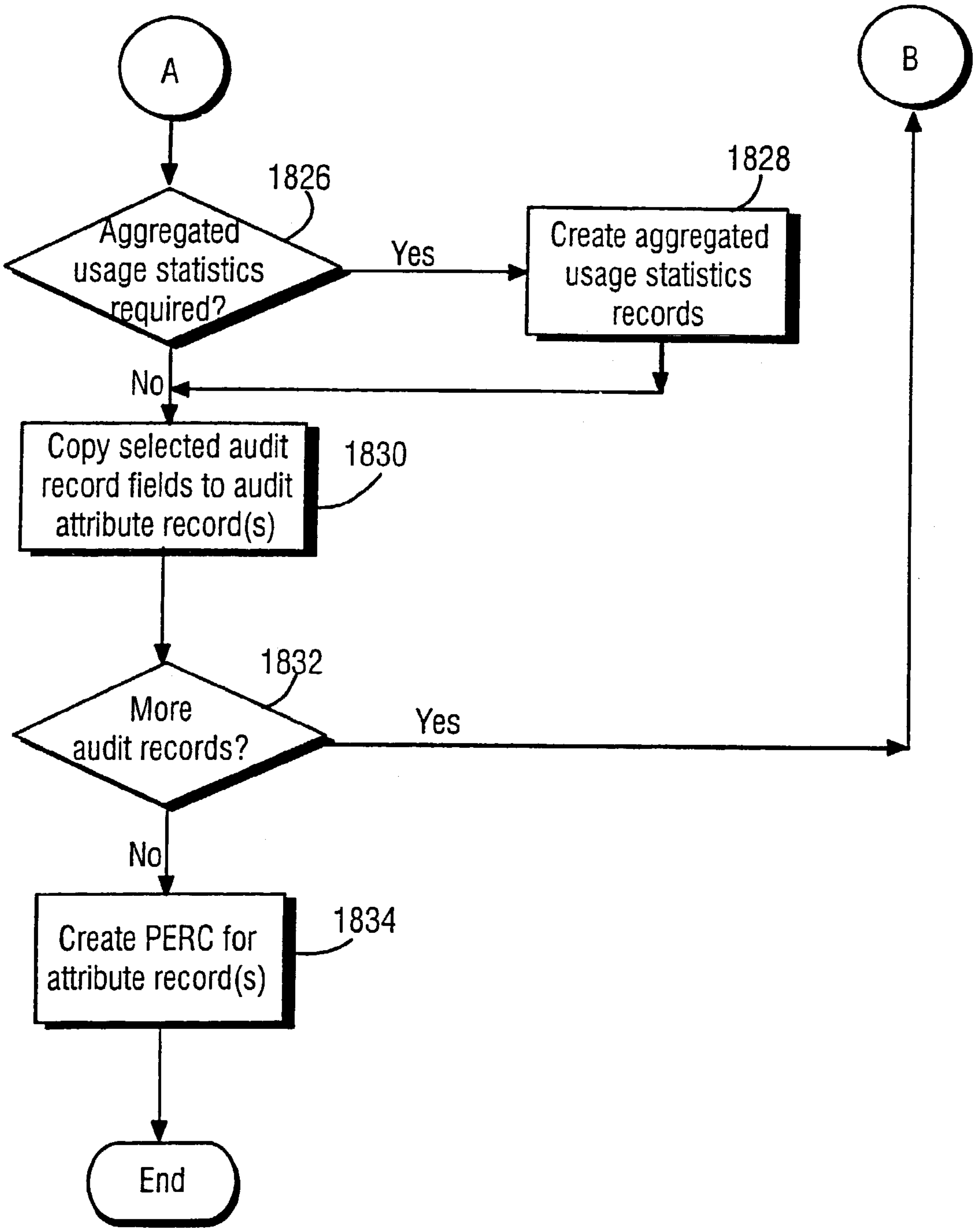

FIGS. 45A, 45B show example steps for performing the method (shown in FIG. 44, block 1794, for example) of creating attribute record(s) from audit records. In this example, the method first locates the audit records in a secure database or other storage facility (FIG. 45(A), block 1800). The method next selects an appropriate UDE audit record to analyze (FIG. 45(A), block 1802), and determines whether a permission record is available that applies to this particular audit record (FIG. 45(A), decision block 1804). If a permissions record is required and is not available, the process reports failure, writes an associated audit record, and ends (FIG. 45 blocks 1806, 1808, 1810). If, on the other hand, a required permissions record is available ("yes" exit to decision block 1804, FIG. 45), the process determines whether the permissions record grants the device or process permission to use the audit record(s) for this particular purpose (decision block 1812, FIG. 45). If such permission is not available ("no" exit to decision block 1812, FIG. 45A), the process reports failure, writes an associated audit record, and terminates (FIG. 45A, blocks 1814, 1816, 1818).

If any applicable permissions record is available and grants permission to the matching and classification utility 900 ("yes" exit to decision block 1812), the process determines multiple audit records need to be analyzed together as an overall event (FIG. 45A, decision block 1820). For example, an "atomic transaction" in which multiple steps are performed to achieve an overall result may have multiple audit records (e.g., from multiple appliances 100) that may need to be analyzed together in order to make sense out of the overall transaction. As another example, an object may have subparts (e.g., sub-objects) on which operations can be performed—but it may be important for matching and/or classification purposes to analyze the results of such multiple operations together in order to determine appropriate attribute(s) for matching and/or classification. If it is necessary to aggregate multiple audit records together for analysis (decision blocks 1820, 1822, FIG. 45A), then the process proceeds to analyze those audit records together and create corresponding summary transaction information (FIG. 45A, block 1824).

The process next determines whether it needs to produce aggregated audit statistics in order to perform the associated matching and/or classification operation (FIGS. 45A, 45B, decision block 1826). For example, multiple operations may be performed on a certain object. It may be important to know statistics about such operations (e.g., the number of times the object was opened on a certain day, the number of users who opened the object in a certain time period, etc.). If such aggregated statistics are required ("yes" exit to decision block 1826, FIG. 45B), the process proceeds to create such aggregated statistics (block 1828, FIG. 45B).

The process next copies selected audit record information to an audit attribute record (FIG. 45B, block 1830). The process then determines whether it needs to process more audit records (decision block 1832, FIG. 45B). If more audit records are required to be processed ("yes" exit to decision block 1832, FIG. 45B), control returns to FIG. 45A, block 1802 to select the next audit record. Otherwise ("no" exit to decision block 1832, FIG. 45B), the process creates a permissions record associated with the newly created attribute record(s) (FIG. 45B, block 1834), and completes.

FIGS. 46A, 46B show example usage attributes/statistic records that the FIG. 45A-B process may create. The FIG. 46A attribute record 1830-1 may include, for example, a user ID 1832, an object ID 1834, and any number of attribute fields 1836(1), . . . , 1836(n). The more detailed FIG. 46B example attribute record 1830-2 includes a user ID number 1832, an object ID 1834, a right ID 1836*a* and associated method characteristic 1836*b*, another right ID 1836*c* and associated method 1836*d* and associated statistic 1836*e*, a further right ID 1836*f* and associated method attribute 1836*g*, another right ID 1836*h* and associated methods 1836*i*, 1836*j*, and associated additional attributes 1836*k*–1836*o*. The characteristics shown in fields 1836*k*–1836*o* could, for example, be derived from an aggregate of any number of individual audit records recording individual transactions associated with the object identified in field 1834.

EXAMPLES

The following are some non-limiting examples of how Matching and Classification Utility 900 may be useful in certain applications.

EXAMPLE

Matching and Classification Utility 900 can Support Narrowcasting or "Push" Distribution Models Based on Classes Interactions with content, transactions, and other events on the World Wide Web are mainly driven today by following chains of hypertext links, using various search engines, and/or indexes, to say nothing of just plain luck and persistence, to find interesting and/or useful content and/or services. Time consuming and generally inefficient, these search activities share in common the feature that each consumer must intentionally "pull" desired content from a Web site to their computer after successfully identifying specific content or services of interest at that time. The present inventions also support "pull" models—a topic to be addressed shortly. However, the present inventions also support narrowcasting or "push" models of content distribution as well.

Figure 47:
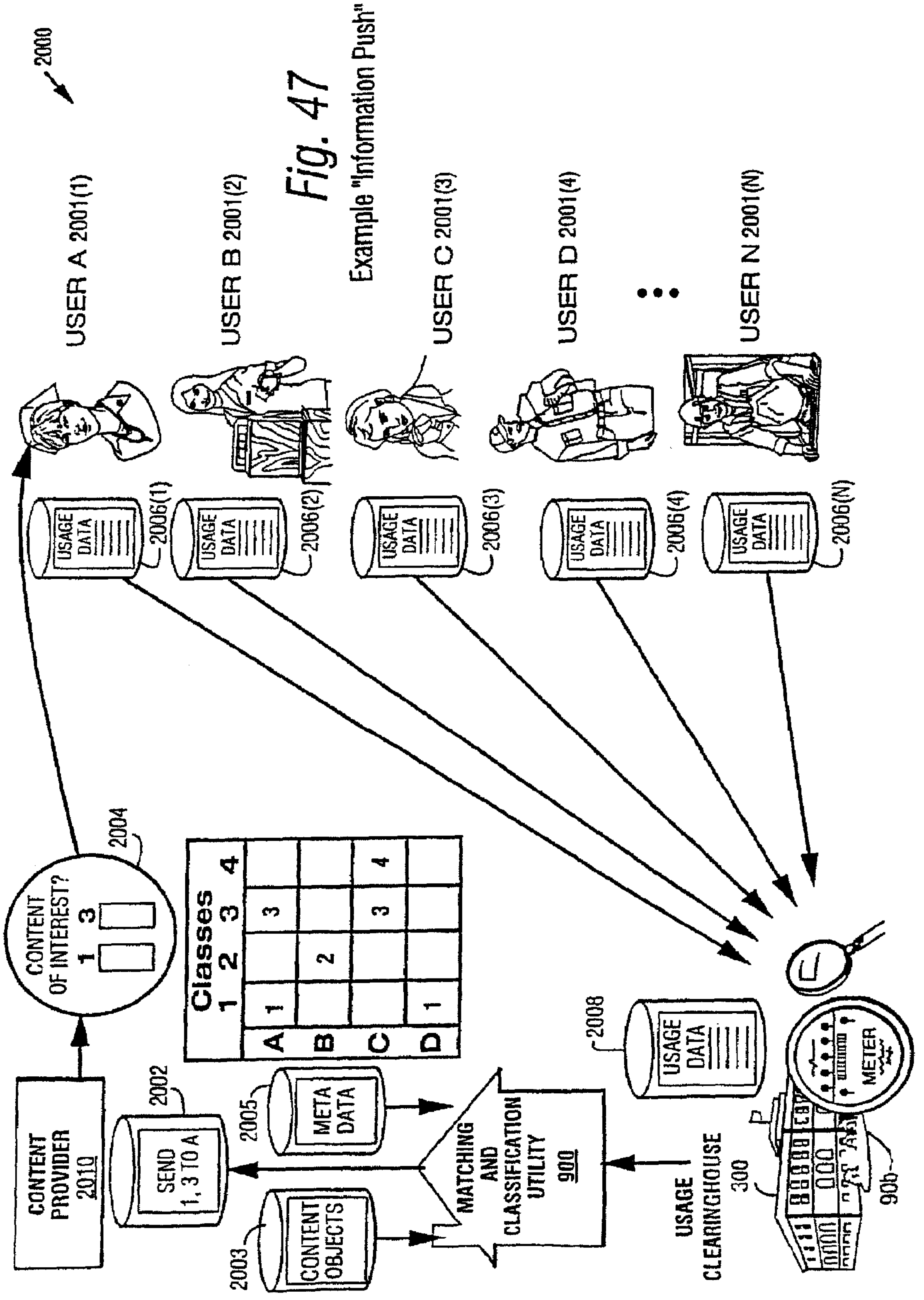

In one example, the matching and classification utility 900 can facilitate much more automated and therefore more efficient and effective content creation, access and/or distribution services that "push" information and/or services to users. Example FIG. 47 shows an example "information push" model 2000 in which an arbitrary number of users 2001(1)–2001(n) each have a VDE node (e.g., a protected processing environment 154) installed on their appliances. These example appliances may be of any kind, including computers, so-called Web television or Web-TV, DVD appliances with some form of backchannel, a settop box with a "back channel", and so on.

Perhaps with the permission of the user or other authority, such as an administrator within an organization, the VDE node collects various usage information or "info exhaust" according to the rules and usage consequences provided by one or more value chain participants. At times specified by default and/or by the associated rules and consequences, audit records are sent, in this example, in VDE containers 2006(1)–2006(n) to a usage clearinghouse 300, which in turn, may send all or a portion of these audit records in a VDE container 2008 to the matching and classification utility 900. The audit records may contain rights management information, including, but not limited to the amount of usage, the amount paid, if any, the payment method used, if any, VDE control sets, and/or data that identify various attributes of the node, user, and/or known and/or used object(s). The audit records may also contain information about objects known to the VDE node (objects with PERC records—see FIGS. 35A, 35B and associated discussions) and/or objects that have been used (objects with URT entries—see FIGS. 40A–40B and associated discussions) on the node.

The matching and classification utility 900 may also receive from one or more providers 2010 content objects 2003 themselves, for example, information in text format and/or metadata 2005 associated with content objects. Using at least one classification method, the matching and classification utility 900 may create at least one object class hierarchy, object class, object classification scheme, object category and/or object category scheme using at least some rights management information and assign at least one object to at least one category and/or class.

The matching and classification utility 900 takes the usage information and other rights management information received from the VDE nodes and/or other information sources and may create at least one category and may assign at least one node and/or user to a cateogry and/or class. In FIG. 47, the matching and classification utility 900 sends a VDE container 2002 to content provider 2010 with information showing the classes of content used by one or more nodes and/or users along with a request that the provider 2010 send similar content back to one or more users 2001. At least one content provider 2010 then sends at least one VDE container 2004 to user A with content and/or information about available content that may be of interest to user A given the history of content usage as reflected in VDE audit records and/or other rights management information. In this "push" example, classes of content or information about available content may be pushed automatically from (a class of) content providers to one or more members of class of users and/or nodes. Consequently, users do not have to search as intensely, if at all, for content of interest to them.

In this example, user A receives content that may be most like content the user has already used, perhaps like content used most frequently in the recent past. The present inventions also support the matching and classification utility 900 and/or content provider sending content that is in a class or classes more distant from topics of prior and current interest to a particular user and/or group of users. Certain classification methods familiar to those skilled in the arts may provide quantitative indicators of distance that, in turn, may be used as at least one criterion for selection.

In another example, matching content to users and/or nodes may be based in part on class assignments that are in turn based in part on information concerning user preferences solicited by the matching and classification utility 900 or other value chain participant, such as a market research firm, advertising agency, provider, distributor, VDE administrator 800, or other Commerce Utility System.

Although the matching and classification utility 900 and/or content provider may send "more of the same," in another example the present inventions support providers at least occasionally sending content more distantly related to the user's apparent interests to determine if the user's circle of interest might be a little larger than that indicated by past usage and other, related rights management information alone.

In another example, providers may from time to time send content unrelated to the user's apparent interests that may nevertheless reflect the interests of persons and/or groups sharing at least one attribute with the user. For instance, the matching and classification utility 900 may, by sending a VDE container with appropriate user and content class information, suggest to a provider that user A receive content similar to content used by another member or members in the same group or class as user A. In one example, the matching and classification utility 900 may suggest sending business information related to a particular vertical market segment because others in the same class as user A have paid attention to that market.

In support of various content narrowcasting or "push" models, the matching and classification utility 900 may provide content class related information to a "subject switch" or "subject mapper," which in turn, matches participants desiring information in one or more specified classes with one or more sources of content in the requested class or classes.

The non-limiting subject switching example 2050, FIG. 47A, shows a number of customers 2053(1)–2053(n) each with an appliance 2052(1)–2052(n) such as a personal computer. Other arrangements may include appliances such as a WebTV interface and/or an intelligent "settop box" connected to an interface device that uses one or more (digital) TVs for display. Still other arrangements may include an NC computer without a local hard disk logically connected to at least one server, a personal digital assistant with a network connection, and/or any other appliances with suitable processing, storage, and communications capabilities.

Referring again to FIG. 47A, each customer appliance 2052 may have a VDE secure node installation 2054 incorporating a protected processing environment 154, as described in "Ginter et al", and messaging services software 2058 that manages communications with other appliances. (In an alternative example, some appliances may lack secure nodes or sufficiently secure nodes, and receive appropriate one or more protected processing environment 154 based services from one or more servers and/or peers.) These appliances may be located in the same physical and/or logical environment, such as on the same local area network, and/or may be distributed across wide area networks such as multi-location corporate Intranets and/or the Internet itself. Among other tasks, messaging services 2058 "listens" for messages destined for that particular appliance or for broadcast messages intended for at least one appliance in the set of appliances that receive the broadcast. In certain instances no appliance may actually be "listening." In other examples, the messaging services 2058 may incorporate delivery assurance capabilities that assure delivery through use of explicit or implicit acknowledgments of receipt combined with the ability to retransmit information that has not been acknowledged. Messaging services 2058 may be designed such that an operator may select from one or more delivery assurance levels, for example "no receipt acknowledgment," "retry n times, then notify operator if not received," "retry until a certain date/time, then notify operator if not received," "retry n times and/or until a certain date/time, no operator notification necessary," et cetera.

Messaging services 2058 may use the secure node 2054 to package one or more messages in a VDE secure container that may also include one or more sets of rules and usage consequences that may be associated with one or more messages in the container as described in "Ginter et al". In this example, messaging services 2058 then sends the secure container to one or more destinations using, for instance, TCP/IP and/or some other network protocol(s). Also, messaging services 2058 may broadcast a VDE container to one or more other customers 2053.

In this example, a customer 2053 uses application 2060 to persistently request or "subscribe" to one or more particular classes of content. For example, a highly detailed class might include "business information concerning the US market share of PC vendors, information in text format, costing less than a dollar per item, and for which the subscriber receives the right to excerpt at least one whole paragraph, provided that the excerpted amount constitutes less than 25% of the entire item based on word count." This same and/or another application may also be used to interact with instances of content in the desired class, for example, by displaying information on a computer screen and/or another output device in accordance with the rules and usage consequences associated with that item. If a user no longer has an interest in one or more classes, they may also use the same (or similar) application 2060 to "unsubscribe" from a particular subject, or specify further narrowing or broadening criteria to adjust the flow of content from one or more classes.

Items in the desired class or classes may be available from more than one content source 2074(1)–2074(n). To enhance the efficiency of locating content of interest to the subscriber or other participant, the matching and classification 900 may have created such a class definition and assigned one or more content items to that class. In one example, the matching and classification 900 may have sent one or more methods, and administrative events necessary to invoke the method(s), in a VDE secure container to one or more content sources 2074 where the classification methods are executed. Such methods may, for example, assign content items to one or more classes. One or more object and/or item identifiers may have been transmitted to the matching and classification utility 900 along with class assignments for each item. If the matching and classification utility 900 has not previously created the desired class and assigned items to it, in response to a request from the subject switch 2051, the matching and classification utility 900 may do so using any appropriate combination of one or more such classification methods and procedures. The matching and classification utility 900 may may create at least one object class hierarchy, object class, object classification scheme, object category and/or object category scheme using at least some rights management information and assign at least one object, item, arid/or subscriber to at least one category and/or class.

Subsequent to receipt of the request and/or "subscribe" message from the customer 2053, the subject switch 2051 may query the matching and classification 900 for content sources 2074 that have items in the desired class or classes.

The matching and classification utility 900 may respond with information indicating known sources of information in the desired class(es), if any. The subject switch 2051 may then send a VDE container to the appropriate content source(s) 2074 indicating that certain customers 2053 are interested in items in the desired class and that the content source 2074 should send items in this class to this customer 2053 and/or groups of customers, and/or include such content in broadcasts which may be received by such subscribers.

The content sources 2074 may have already received class definitions and class assignment information from the matching and classification utility 900 and/or may have received from the matching and classification utility 900 or another party to the transaction one or more classification methods and associated events to invoke one or more of these methods to perform classification and/or class assignment processes.

In one arrangement, the content source 2074 may send the desired items directly to the subscribing customers 2053 by using the messaging services 2058 and subject switch 2051 to publish each item as it becomes available for distribution. In another example, the content source 2074 may broadcast the information such that subscribers' messaging services 2058 will have the opportunity to access the such items from a broadcast. The content source 2074 may call on messaging services 2058 to use the VDE secure node to package the item in a VDE container along with associated rules and usage consequences and then send that container such that one or more listening messaging services 2058 on other appliances 2052(1)–2052(n) will receive it. Based on subject information contained in the message header and/or in unencrypted (but optionally protected for integrity) areas of the VDE container, the listening messaging services 2058 may identify the message as belonging to a subject class it is listening for, then use the VDE node to open the container and view or otherwise use the item in accordance with that item's associated rules and usage consequences.

In another arrangement, the subject switch 2051 may be located on each customer appliance 2052(1)–2052(n). Using messaging services 2058, each subject switch 2051 may communicate with the matching and classification utility 900 to locate sources of content matching the subscribed classes. In this example, the subject switch 2051 on the local appliance then uses the messaging services 2058 to communicate with one or more content sources 2074 indicating classes of content to which it wishes to subscribe. Using the messaging services 2058, one or more content sources 2074 may directly send and/or broadcast items in the desired classes to subscribing customers 2053 in VDE secure containers along with associated rules and consequences. In another arrangement, the content source 2074 may send one set of rules and usage consequences that apply to members of one or more item classes, thus potentially improving the efficiency of distribution and of rights management. In another example, the rules and content items may be sent in separate VDE containers. In this example, the messaging services 2058 and subject switch 2051 listen for messages that are addressed to those customers who subscribe to a particular content item class and makes those items available to customers using an application 2060.

In another arrangement, messaging services 2058 and/or subject switch 2051 may be installed and run on network routers, network switches, one non-limiting example being ATM switches, and other packet and/or cell switches.

EXAMPLE

Digital Broadcasting Based on Matching and Classification

"Shear et al" discloses a Digital Broadcasting Network ("DBN") that may function as a cooperative of Web sites and, for example, service providers, with a central and perhaps regional and logical (e.g., market based) headquarters groups, or it may function as a for profit, shareholder corporation in a business model reminiscent of television broadcast companies (e.g., NBC), or it may function as a cooperative or virtual corporation that has some mix or combination of mixes of the above attributes and employ distributed peer to peer, hierarchical, and centralized administrative business relationships and activities.

In one example, plural corporations may join together to provide the advantages of size and coordination with individual participants providing some degree of specialty expertise and the body of entities coordinating together in some fashion in a "higher" level cooperative or corporation.

Figure 48:
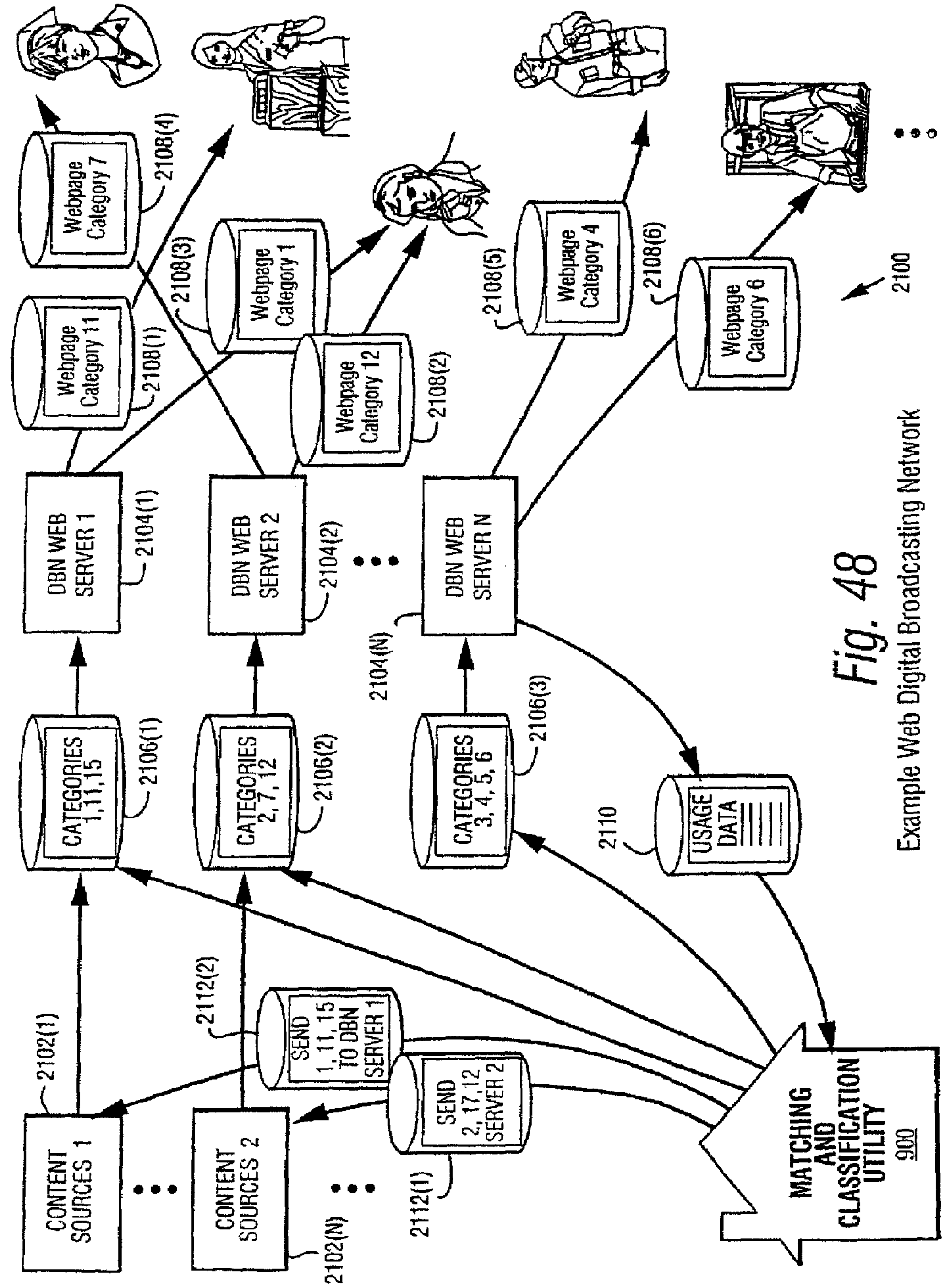

FIG. 48 shows one non-limiting example 2100 of a DBN that includes one or more DBN Web servers 2104(1)–2104(n) and one or more Web users each with VDE nodes. Users are attracted to a specific DBN server (or servers) because it provides access to specialized content and/or services 2108. Based at least in part on rights management information 2110 collected from DBN servers, for example, controls associated with the most frequently requested information, the matching and classification utility 900 creates categories of content (and/or services) and assigns DBN servers to one or more classes according to their specialization(s). The matching and classification utility 900 may may create at least one class hierarchy, class, classification scheme, category and/or category scheme using at least some rights management information and assign at least DBN server and/or at least some information to at least one category and/or class.

For example, one DBN server may specialize in consumer sports information while another may specialize in legal information. DBN servers may specialize in plural content (and/or service) areas. This class and class assignment information is provided to DBN servers, to content (and/or service) providers, or both.

The matching and classification utility 900 in one example sends VDE containers 2112 to content sources 2102 indicating specific classes of content that should be sent to one or more DBN servers 2104. Using this information, content providers 2102(1)–2012(n) then send content in these categories in VDE containers 2106 that match the categories of most frequently hit and/or consumed content on a DBN server 2104(1)–2104(n). (In another example, other information may be used as the basis of classification, matching, and selection.) For instance, the matching and classification utility 900 sends a VDE container 2112(2) to content source 2102(1) with instructions to send content in categories 1, 11, and 15 to DBN server 1 (2104(1)). This content may, in turn, be sent to one or more consumers in VDE containers 2108(1), 2108(3).

In one aspect, this example process is analogous to hard goods manufacturers and distributors keeping Wal-Mart shelves stocked with those items in greatest demand based on point of sales and inventory data. One difference, of course, is that in this example, the DBN server is stocked with intangibles in the same or similar class as the intangibles sold rather than providing replacements for hard goods that have been sold off the shelf. In another example, a DBN server may send its classification data to content providers along with a request that they send more of the same. The request may be sent independently of the class information.

In another example, the matching and classification utility 900 may receive content and/or rights management information from providers and go on to create classes of content and/or content providers in which the classes may be partly defined using rights management data. Content on one class may, among other things, be distinguished from content in another class by price, payment methods, usage opportunities (e.g., available for printing, available for viewing pay-per-use), usage consequences, and/or specific permissions. The matching and classification utility 900 may subsequently send a communication, perhaps in a VDE container, to providers indicating that they send content in one or more specified classes to at least one DBN server.

Non-limiting example FIG. 48 shows that the DBN 2100 may consist of video 2202 and/or audio 2203 content providers who send certain categories of video and/or audio content 2206 to DBN servers 2204(1)–2204(n) based on the categories of content each server may specialize in, which, in turn, may be determined at least in part on frequency of usage and/or other rights management information sent in VDE containers 2213 to the matching and classification utility 900, or to a usage clearinghouse 300 and then to a matching and classification utility 900. (In another example, other information may be used as the basis of classification, matching, and selection.) The matching and classification utility 900 sends VDE containers 2212 to content sources indicating that they should send content in specific categories 2206 to specific DBN servers 2204. In turn, each DBN server 2204(1)–2204(n) delivers video 2208 and/or audio 2209 in VDE containers to parties interested in such content. In another example, a VDE container may hold both video and audio and/or any other content type.

EXAMPLE

Figure 49:
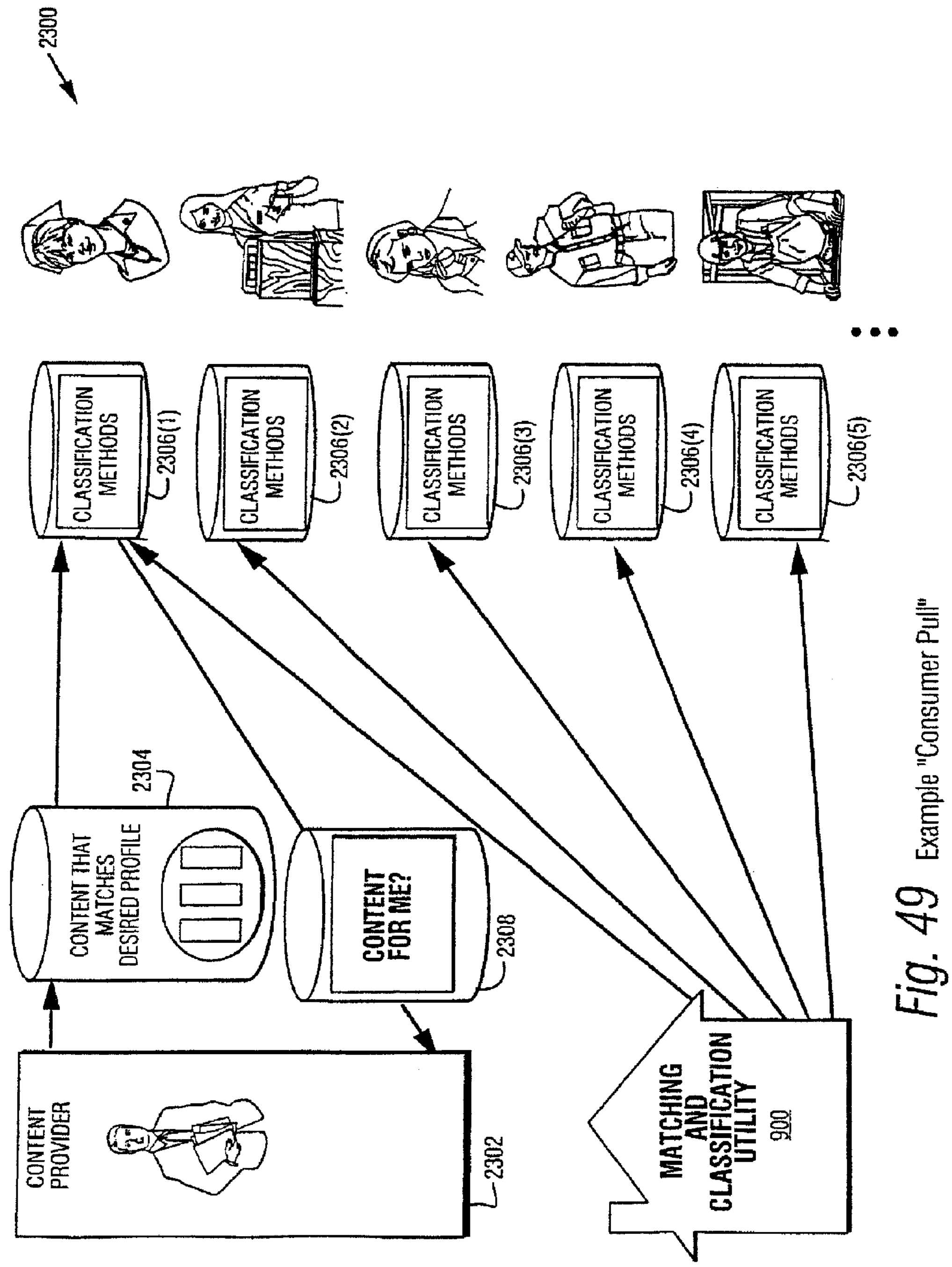

Matching and Classification Utility 900 can also Support "Pull" Distribution Models Based on Classes Notwithstanding the noted trend toward "push" content delivery models, the present inventions also enhance the efficiency, focus, specificity, and convenience of content "pull" models. In one example 2300 (FIG. 49), the matching and classification utility 900 sends in VDE containers 2306 (1)–2306(n) at least one administrative event and/or associated method that performs classification and/or class assignments to a VDE-aware appliance. The administrative events and method(s) are processed under the control of the VDE node. In one example, the results of processing the classification method may indicate at least one class of content and/or services of interest to a user and/or node. The classification method may also create at least one class hierarchy, class, classification scheme, category and/or category scheme using at least some rights management information and assign at least one service and/or at least some content to at least one category and/or class.

Subsequently, a VDE container 2308 may be sent to a provider 2302 with information indicating at least one class of content, services, transactions, rules and/or usage consequences, such as the ability to modify, excerpt and/or reformat, and/or events and a request that that the provider send content and/or pointers to services that meets the stated criteria and/or descriptive information about such content, services, transactions, and/or events to the requesting user and/or node. The request may, for example, be initiated explicitly by the user and/or node or may be initiated by the node according to one or more administrative events and associated methods and/or control sets. In turn, the content provider 2302 sends a VDE container 2304 to the requesting user 2306(1) with content that matches the desired selection criteria and/or profile.

The user may elect to use, consume, purchase, and/or rent one or more content objects (or use one or more services). As this one example shows, the user pulls in content and/or interacts with services by matching at least one class indicating user preferences with at least one class of content objects and/or services and/or transaction types.

EXAMPLE

The Enterprise Distributed Matching and Classification Utility

Businesses and other organizations may be concerned with privacy and confidentiality regarding information and/or services used within the company. This concern may be manifest regardless of whether the information and/or services originated inside and/or outside the organization. Thus some organizations may have strong incentives to take advantage of the present inventions by operating a distributed matching and classification utility 900 to provide matching and classification services within the enterprise while at the same time maintaining a higher degree of confidentiality and privacy by selecting and/or limiting the nature, range, and detail of information sent outside the organization.

Figure 50:
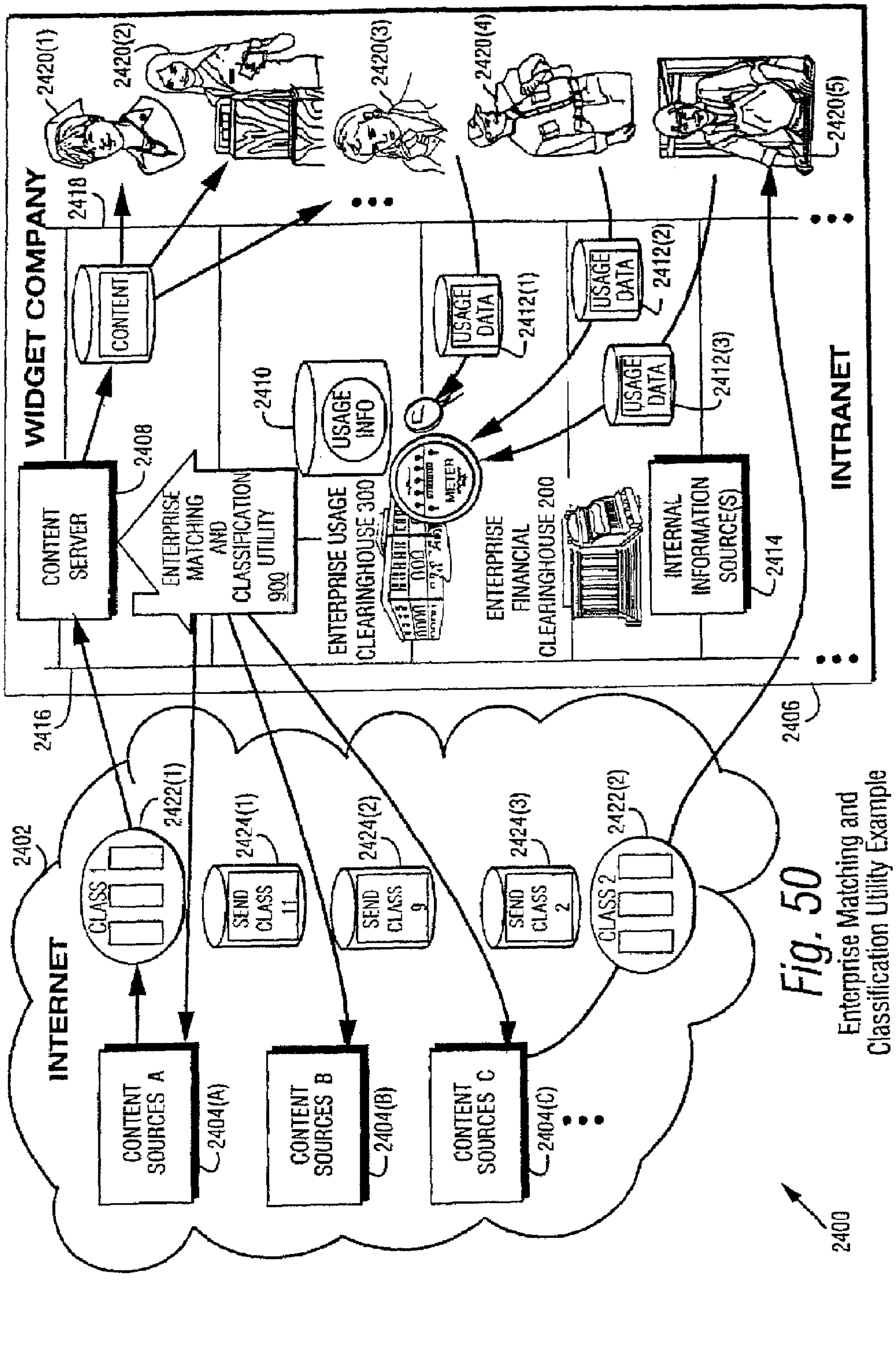

FIG. 50 shows an example 2400 of an entity 2406 that has one or more VDE enabled appliances and users 2420(1)–2420(5) on a corporate Intranet 2418. These appliances may be, for example, computers, workstations, mainframes, or more specialized devices, such as supercomputers and/or graphics workstations for animation and special effects. The company may also operate internally one or more Commerce Utility Systems, perhaps including a financial clearinghouse 200, a usage clearinghouse 300, and a matching and classification utility 900. The company may also operate at least one content server 2414. These commerce utility systems and servers are also connected to the company Intranet 2418. The company 2406 also maintains one or more connects to the Internet 2402. (In another example the company may maintain connections to at least one private network operated by themselves and/or another party in addition to, or instead of one or more connections to the public Internet.) The content server(s) may provide access to internal, proprietary company information and/or to external, often commercial information. The internal content server may act as a gateway to external providers 2404(A)–2404(C) and/or may host commercial content locally on a content server 2408.

In one example, VDE audit records and/or other rights management information are sent in VDE containers 2412 from one or more VDE nodes 2420 to the enterprise usage clearinghouse 300 which may forward at least some of this usage information in VDE containers 2410 to the enterprise matching and classification utility 900. The enterprise matching and classification utility 900 may also collect from internal information sources 2414 information in addition to audit and rights management information, such as information in a human resources, accounting, and/or budgeting database containing data about company employees. These data may indicate, in one example, titles and responsibilities within the company, budgets allocated for external information and/or services, authority to spend, and budget remaining. The budget and financial information may have come in part from the financial clearinghouse 200. The matching and classification utility 900 may also create at least one class hierarchy, class, classification scheme, category and/or category scheme using at least some rights management information and assign at least service and/or at least some content to at least one category and/or class.

In one example, using at least some VDE rights management data, for example, whether certain information can be viewed by anyone, by any employee, or only by employees in certain job classes, such as "manager," the enterprise matching and classification utility 900 creates one or more categories and assigns one or more employees and/or VDE nodes to one or more topic categories. These categories may, for example, indicate content and/or service topics, subjects, and/or content areas of potential interest to each employee and/or groups of employees sharing at least one attribute in common, for example, similar interests and/or responsibilities.

In turn, the enterprise matching and classification utility 900 sends to at least one external content and/or service provider 2404 on Internet 2402 one or more VDE containers 2424 with information that indicates categories of interest. The content providers 2404 may themselves be specialized; in one example, a content provider may specialize in general business and financial news while another may specialize in scientific, medical, and/or technical information. In another example, a single content and/or service provider may provide an extremely broad range of content and/or services.

The external provider may send at least one VDE container 2422(1) with content and/or rules and consequences and/or metadata about content and/or services to a content server internal to the enterprise. In another example, such VDE container(s) 2422(2) may be sent directly to an employee and/or one or more groups of employees. The information sent by the external provider is tailored to, or in some way responsive to the content and/or service categories requested by the enterprise matching and classification utility 900.

In another example, the enterprise matching and classification utility 900 itself may be a distributed commerce utility implemented on more than one computer and/or other appliance within the enterprise. These several matching and classification utility 900*s* may serve different geographic areas and/or may themselves specialize in particular content and/or service areas.

In another example, the enterprise matching and classification utility 900 send class and/or class assignment information to a matching and classification utility 900 in another organization that, in turn, may be part of a common value chain.

EXAMPLE

Chain of Handling and Control Entails Class-based Rules and Usage Consequences VDE-based value chain management or "chain of handling and control" disclosed in "Ginter et al" enables, amongst other things, plural parties to independently contribute rules and usage consequences under the authority and/or control of more senior or prior participants in the value or distribution chain. Class-based rules may play a role in the efficiency and effectiveness of creating, operating, and/or extending value chain processes.

Figure 1A:
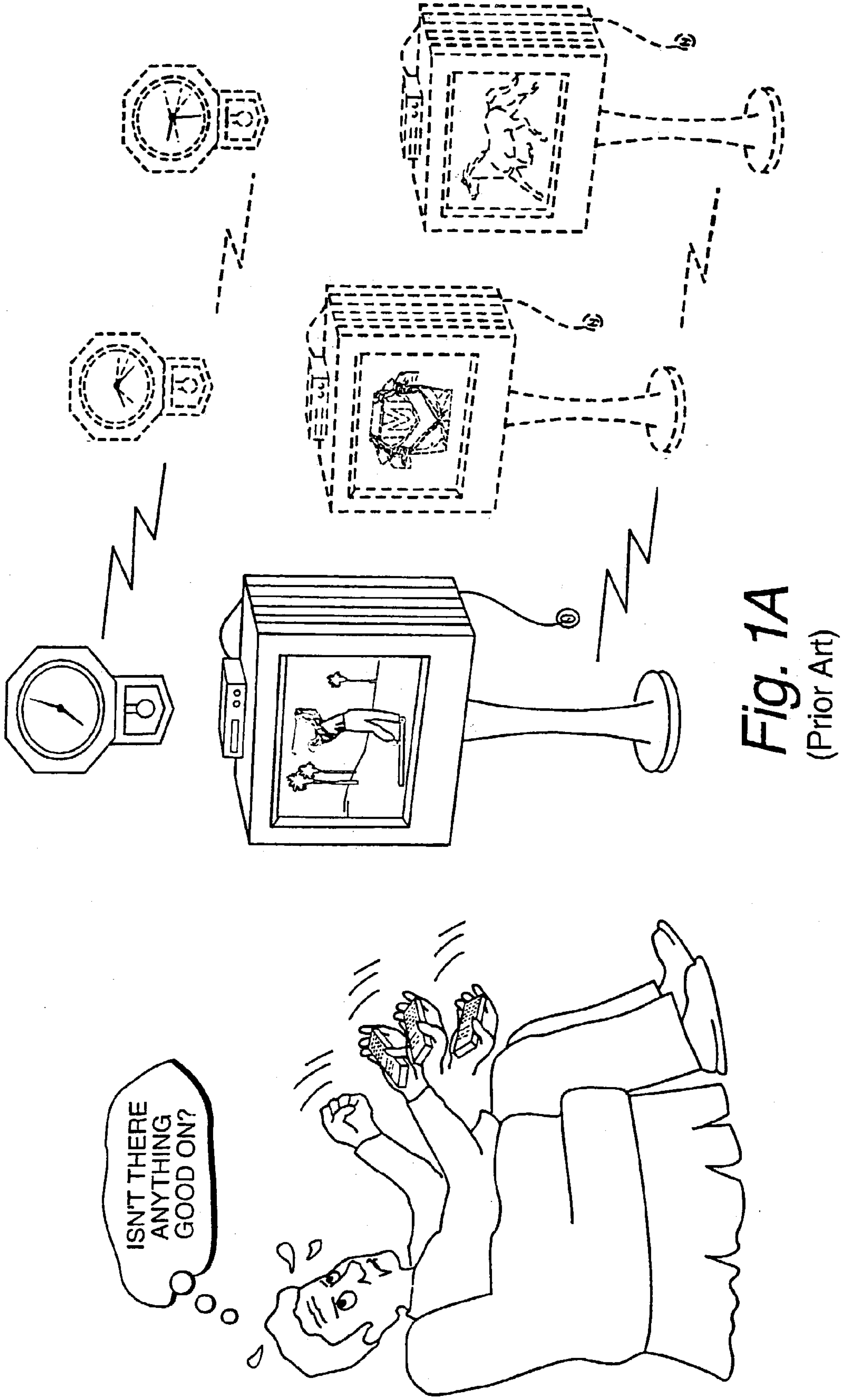
Figure 1B:
Figure 2:
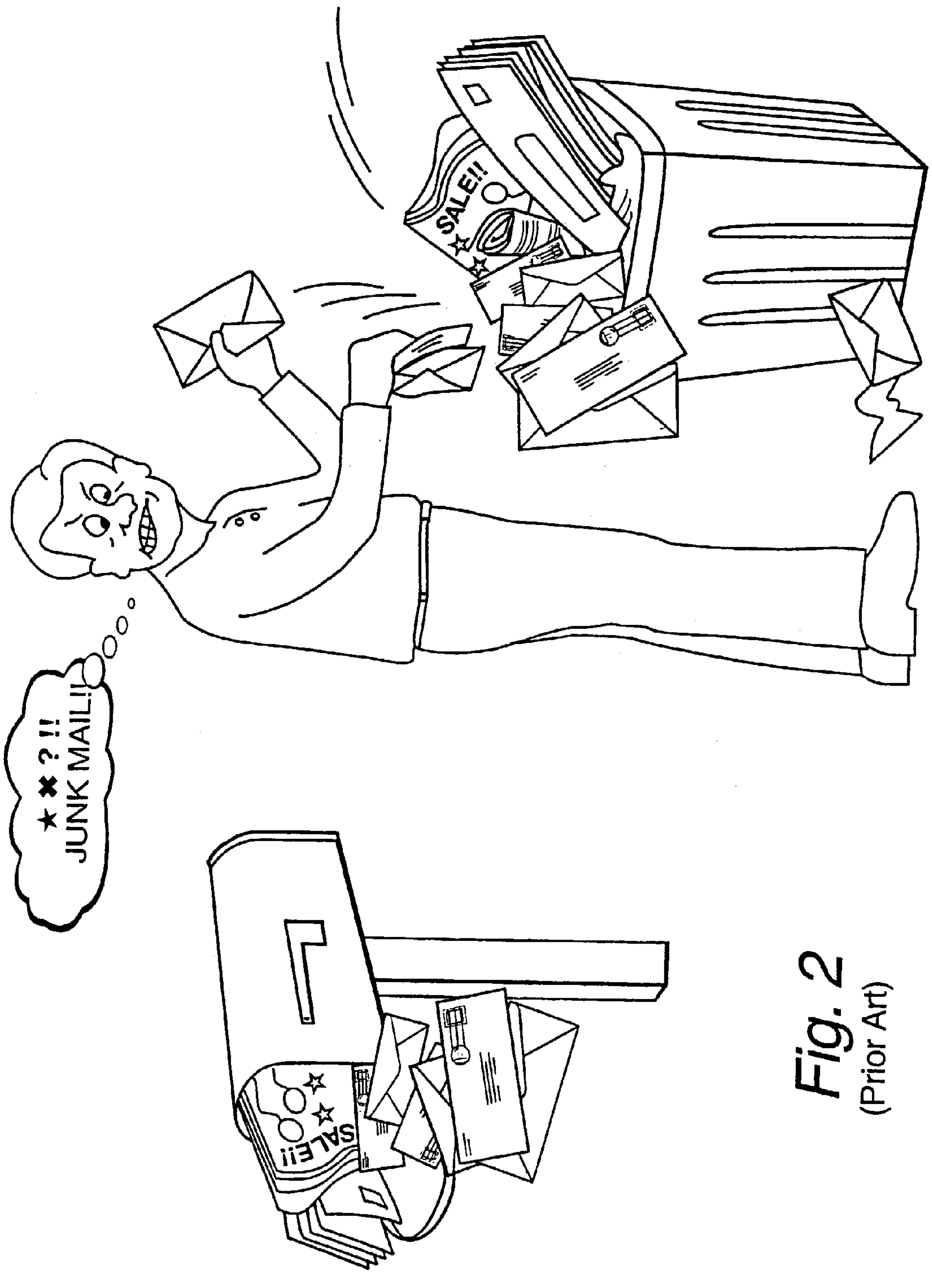
Figure 3:
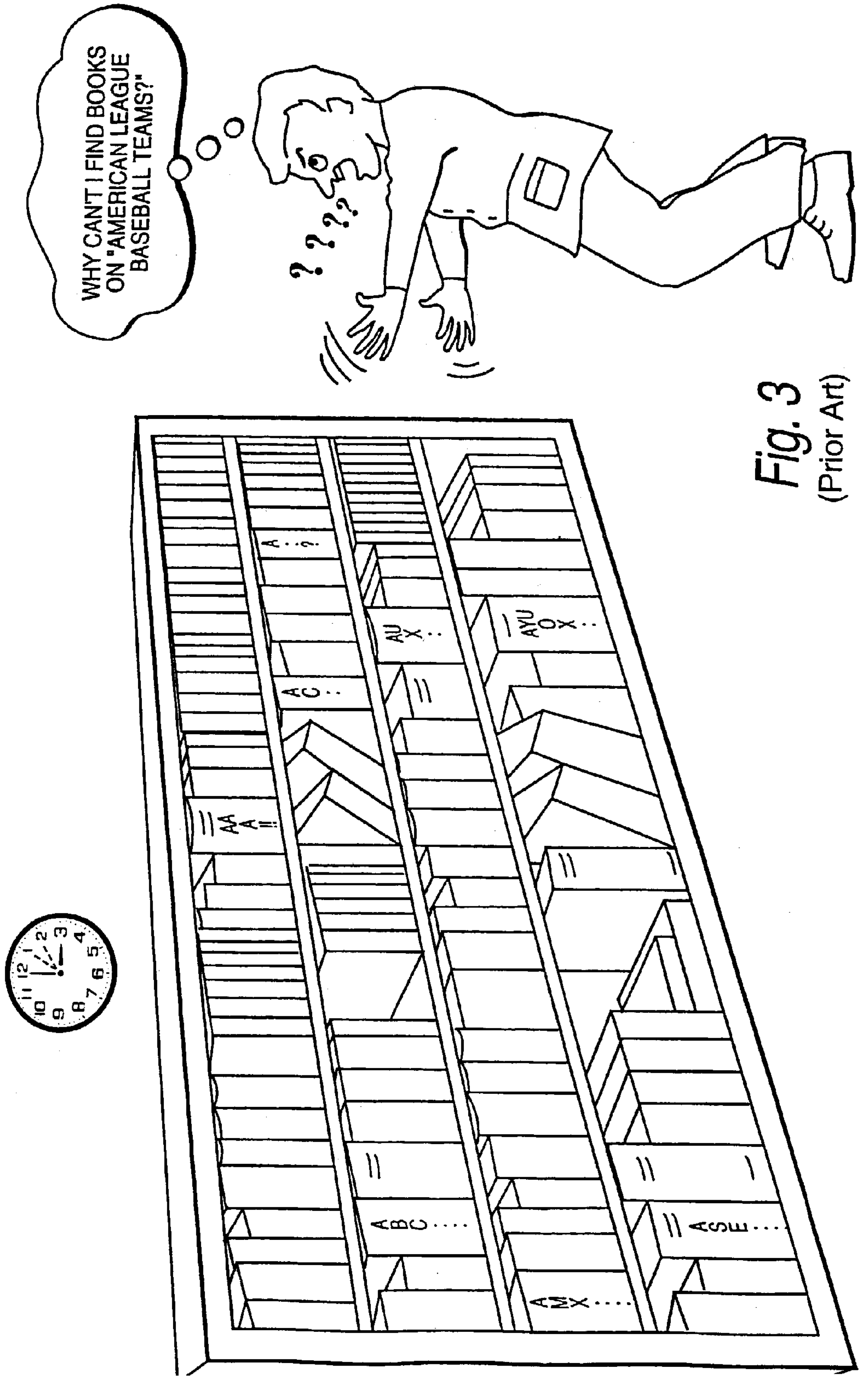
Figure 4:
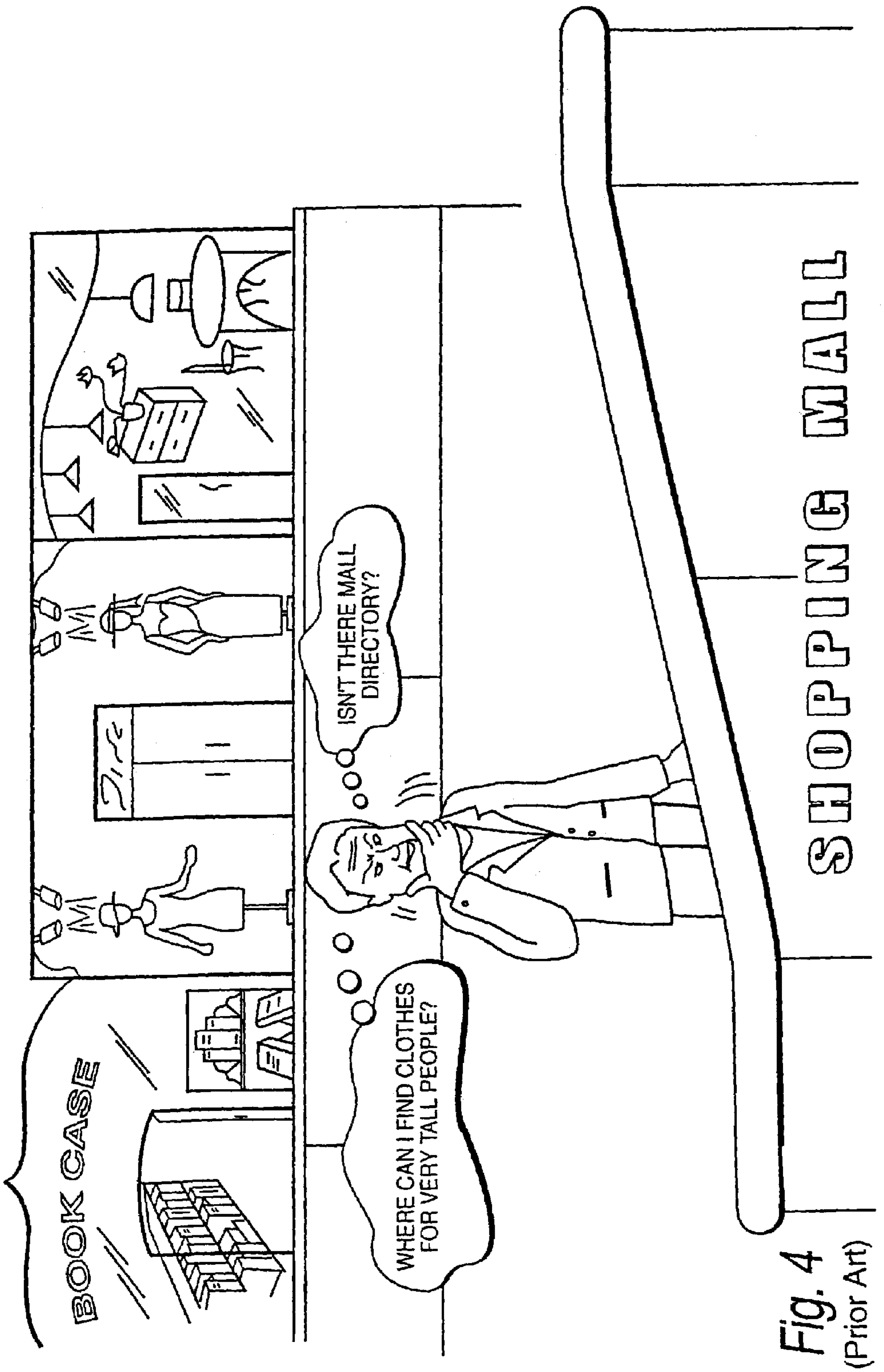
Figure 6:
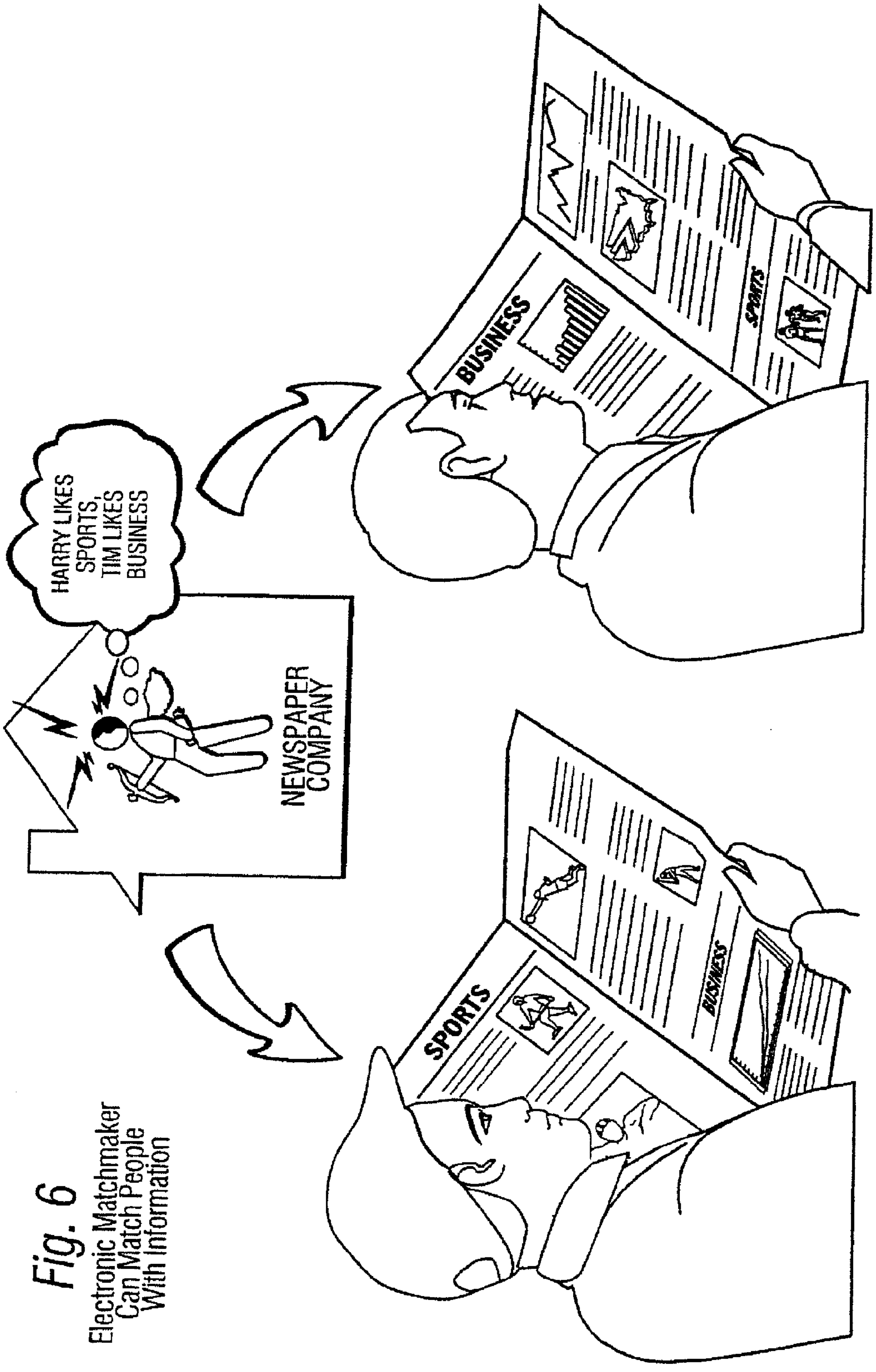
Figure 7:
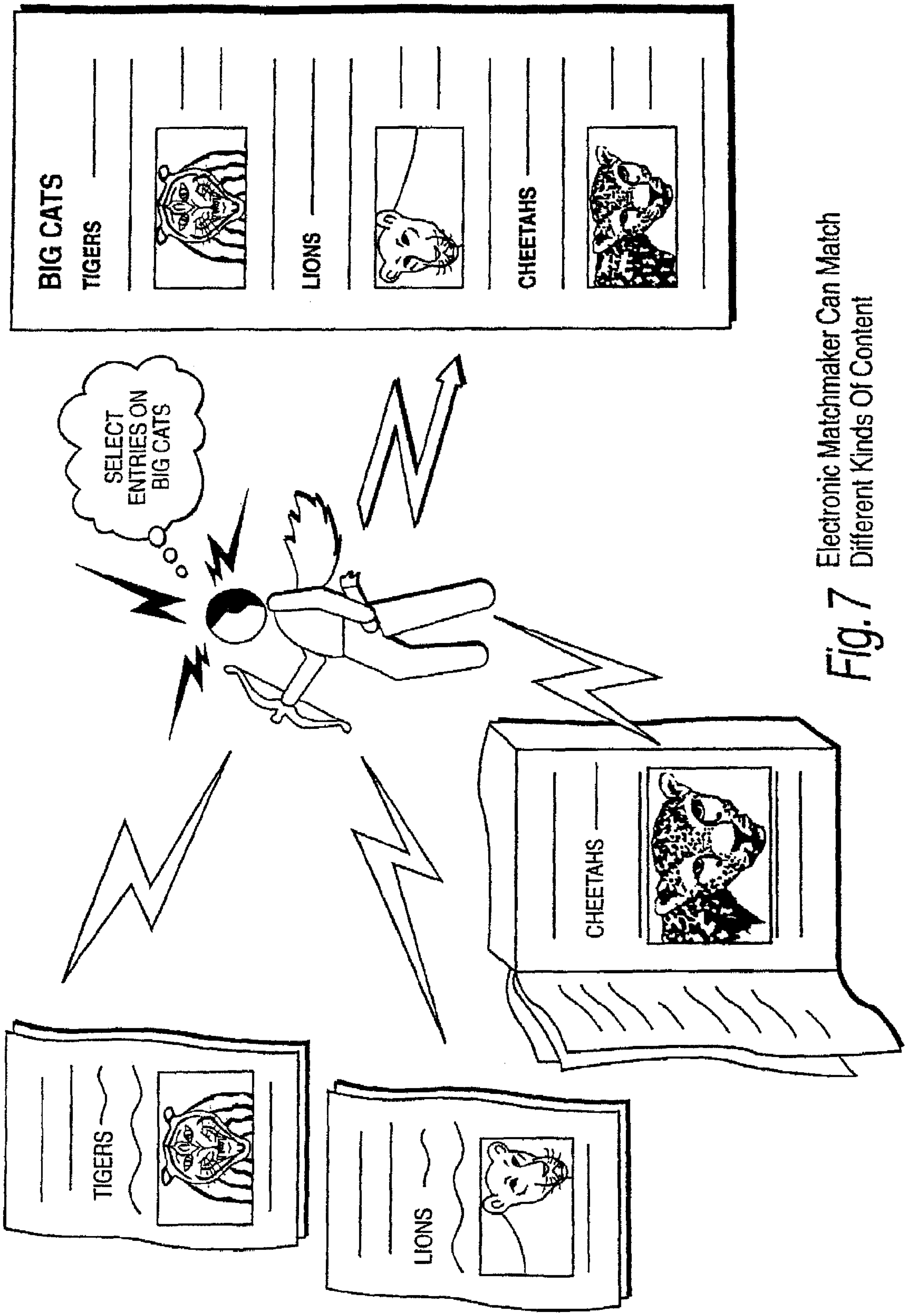
Figure 8:
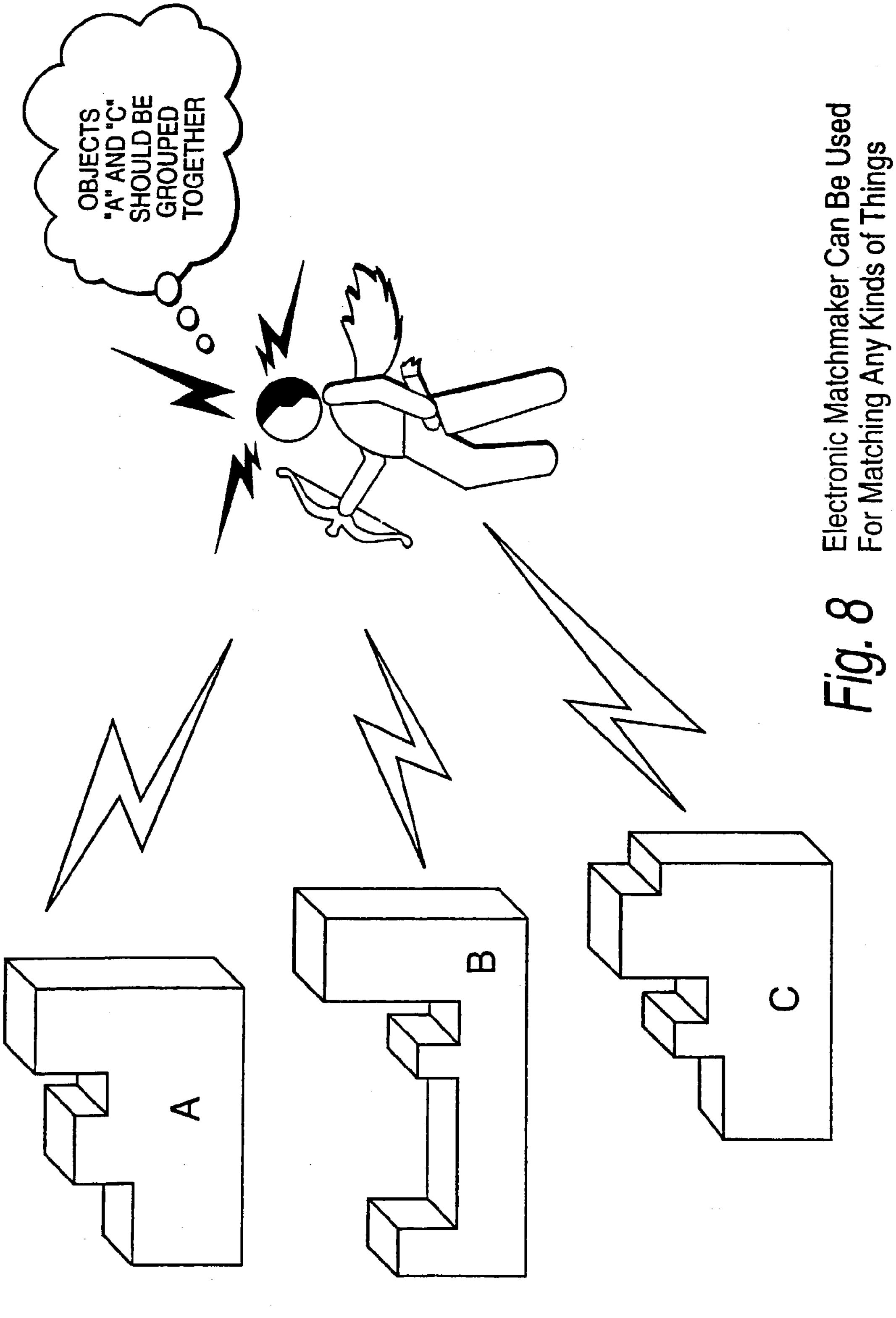
Figure 9:
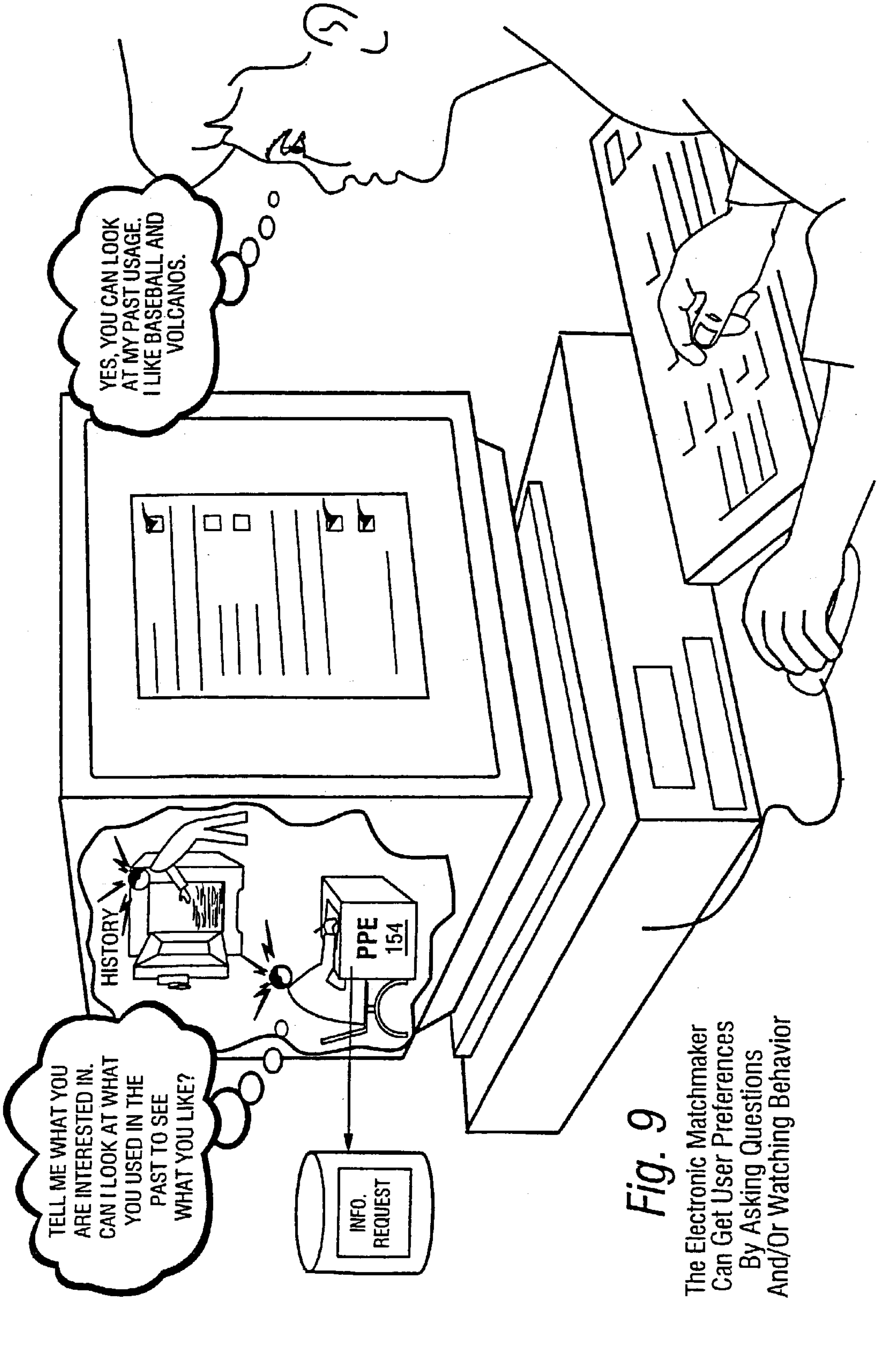
Figure 10:
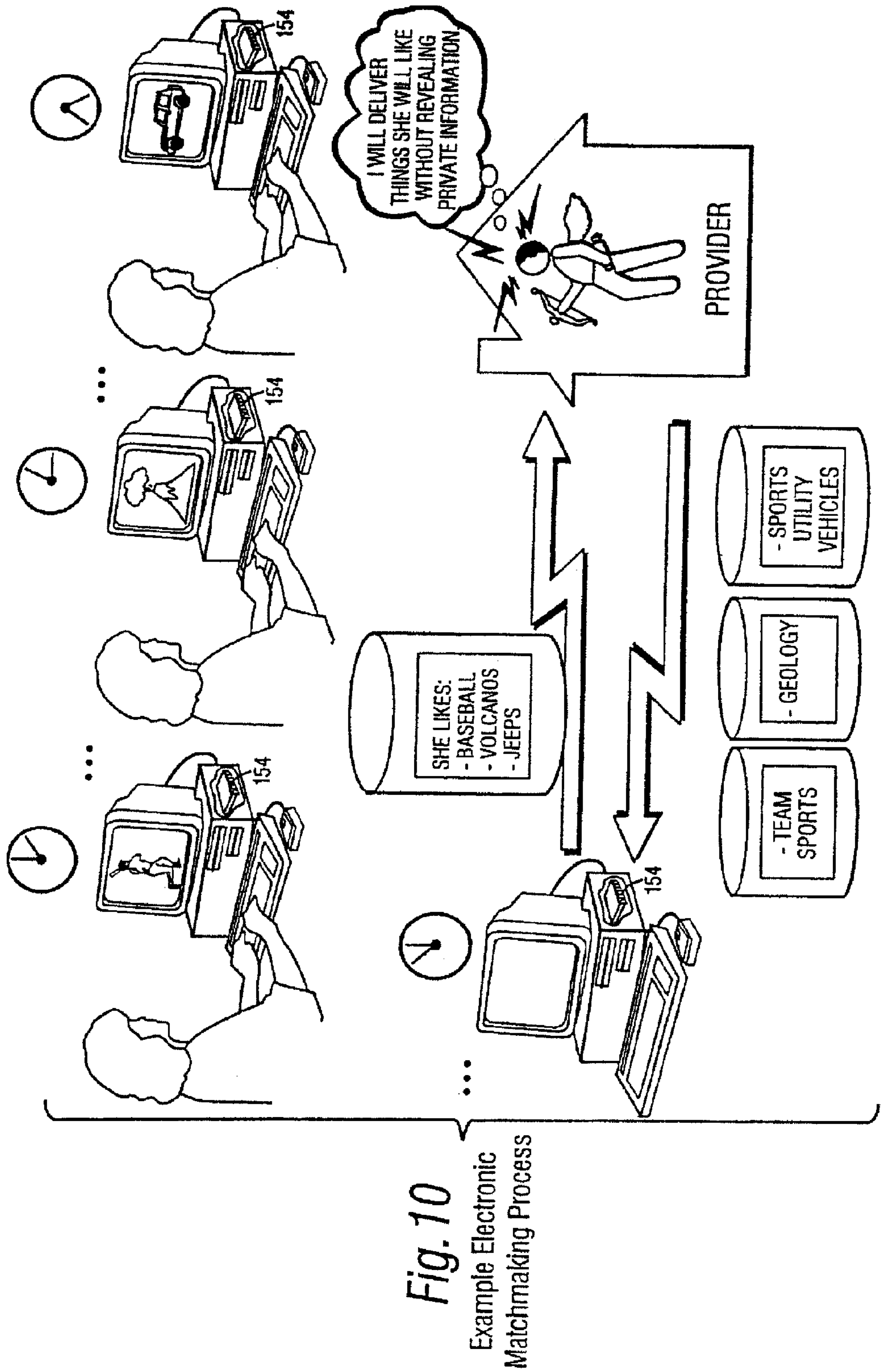
Figure 11:
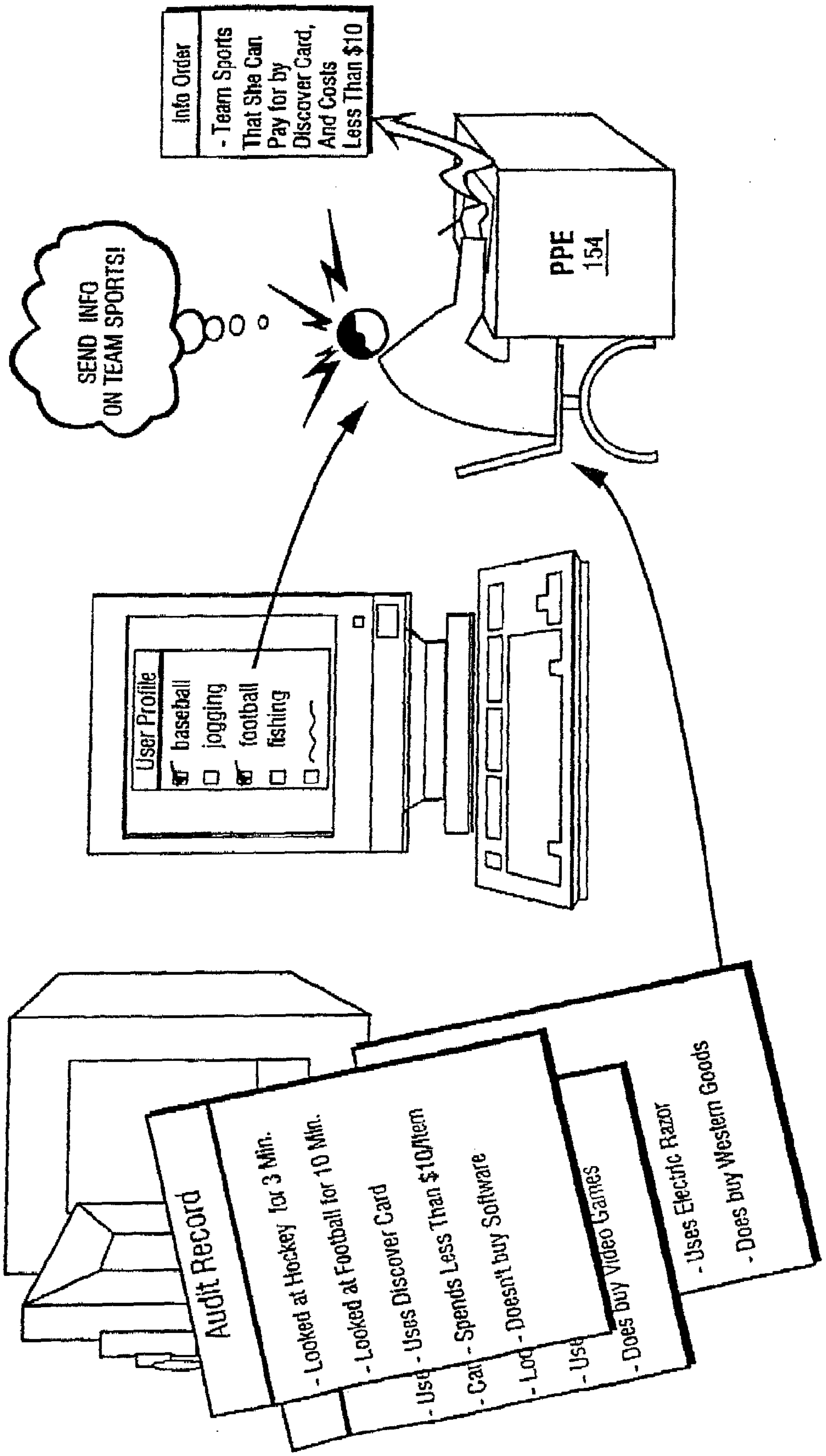
Figure 12:
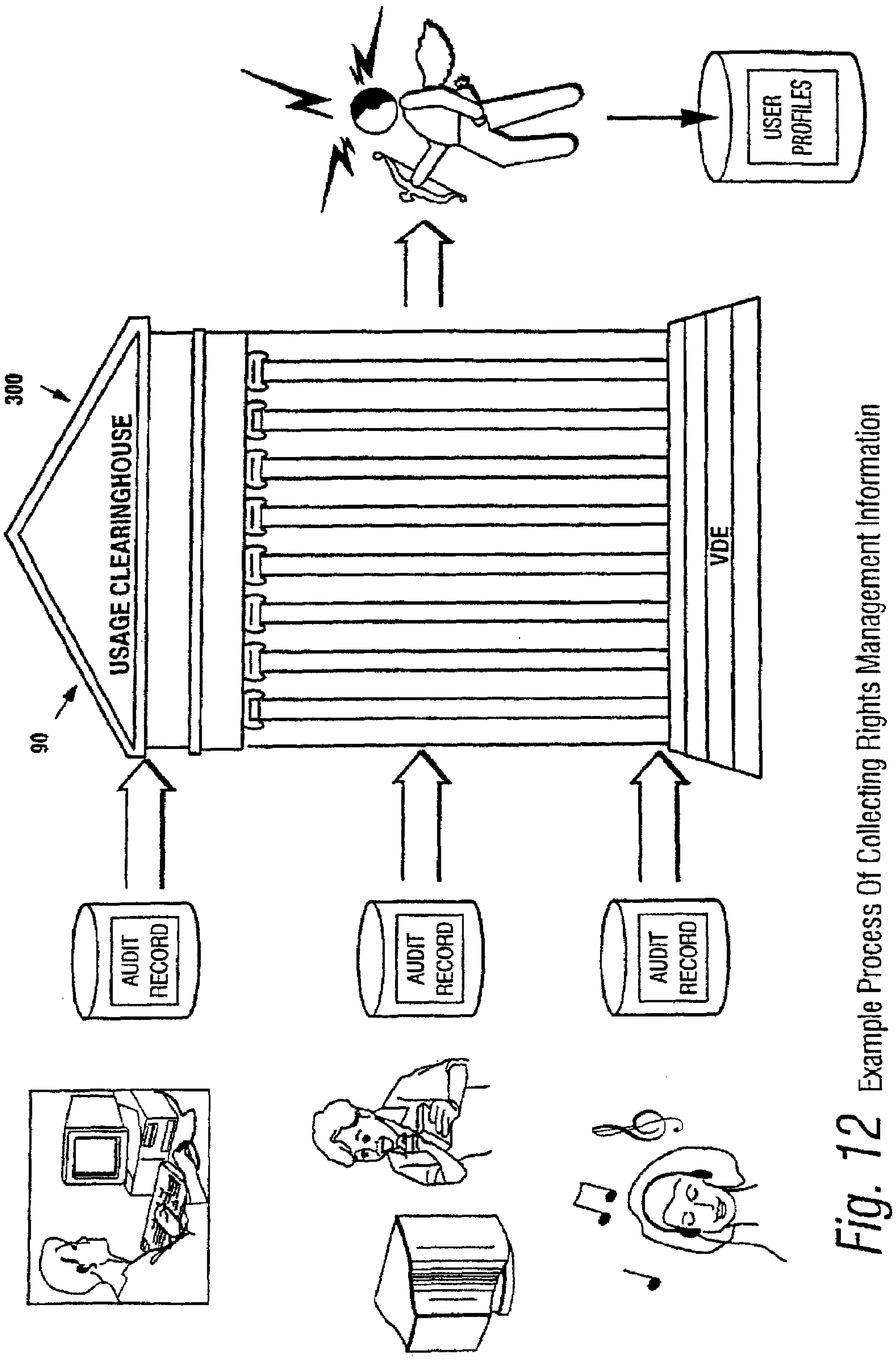

FIG. 1A shows an example 2500 of a publisher ABC 2502 using a VDE packaging application 2510 to put into a VDE secure container 2512 sets of rules and usage consequences that may vary according to class. In this non-limiting example, the class is "content type." The publisher may have rights in a wide variety of content and content types. Consequently, the publisher may create rules for text objects that may differ from rules for audio objects.

The publisher 2502 sends the class-based rules and usage consequences to a first creator 2504 who also has installed VDE on her or his appliance 2516 and who has also been given one or more certificates and/or other digital credentials by the publisher (and/or trusted third party) indicating that he is indeed a creator authorized by the publisher 2502. The publisher has included rules that allow only authorized value chain participants to package content using publisher provided rules and/or to modify, enhance, extent, and/or change some or all of the publisher's rules.

The first creator 2504 then uses a VDE packaging application 2510 to package an image he has created in a VDE container 2514 according to the rules provided by the publisher and with the addition of the creator's own rules. In one example, the first creator contributes rules that implement a one-time 50 cent charge to the consumer for opening and viewing the creator's image. The creator may also contribute rules reflecting his wish to receive audit records with information concerning the consumer and/or context in which the image was used. These creator rules and usage consequences are contributed generally independently of the rules and usage consequences contributed by the publisher. Note that the VDE container 2514 now holds at least the publisher's 2502 rules for each object class, the first creator's image and his associated rules and usage consequences.

A second creator 2506 receives the VDE container from the first creator and using a VDE packaging application 2516 adds a text file to the container 2520 along with her rules and usage consequences. As before, she also has a certificate and/or other digital credential(s) identifying her as authorized by publisher ABC to add and/or modify content and rules and usage consequences. As in the case of the first creator 2504, she adds her text and rules and usage consequences generally independently of controls contributed by prior participants. She may, in one example, prevent printing of the text and charge $1.00 the first time a consumer opens and views the text.

The VDE container 2508 now holds text and rules and usage consequences contributed by creator 2 (2506), an image and rules and usage consequences contributed by creator 1 (2504), and the class based rules (and perhaps other rules as well) contributed by example publisher ABC 2502.

Creator 2 (2506 sends the VDE container 2508 to publisher ABC 2502 who then sends the container 2522 directly and/or indirectly to consumers. When the consumer uses the content, the rules and usage consequences of all three value chain participants (and of other possible participants as well, distributors and repackagers, for example) are applied.

Figure 51A:
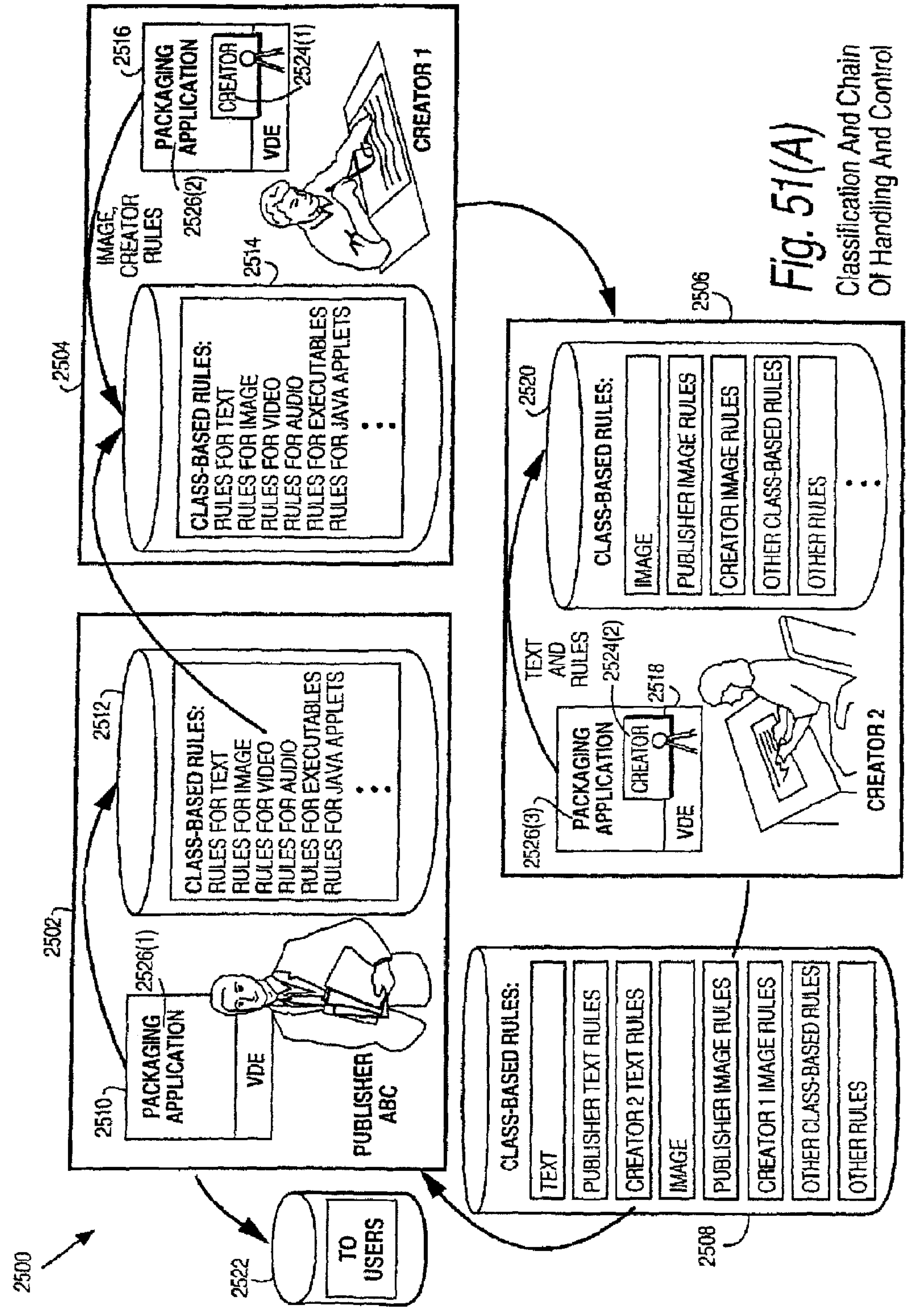
Figure 51B:
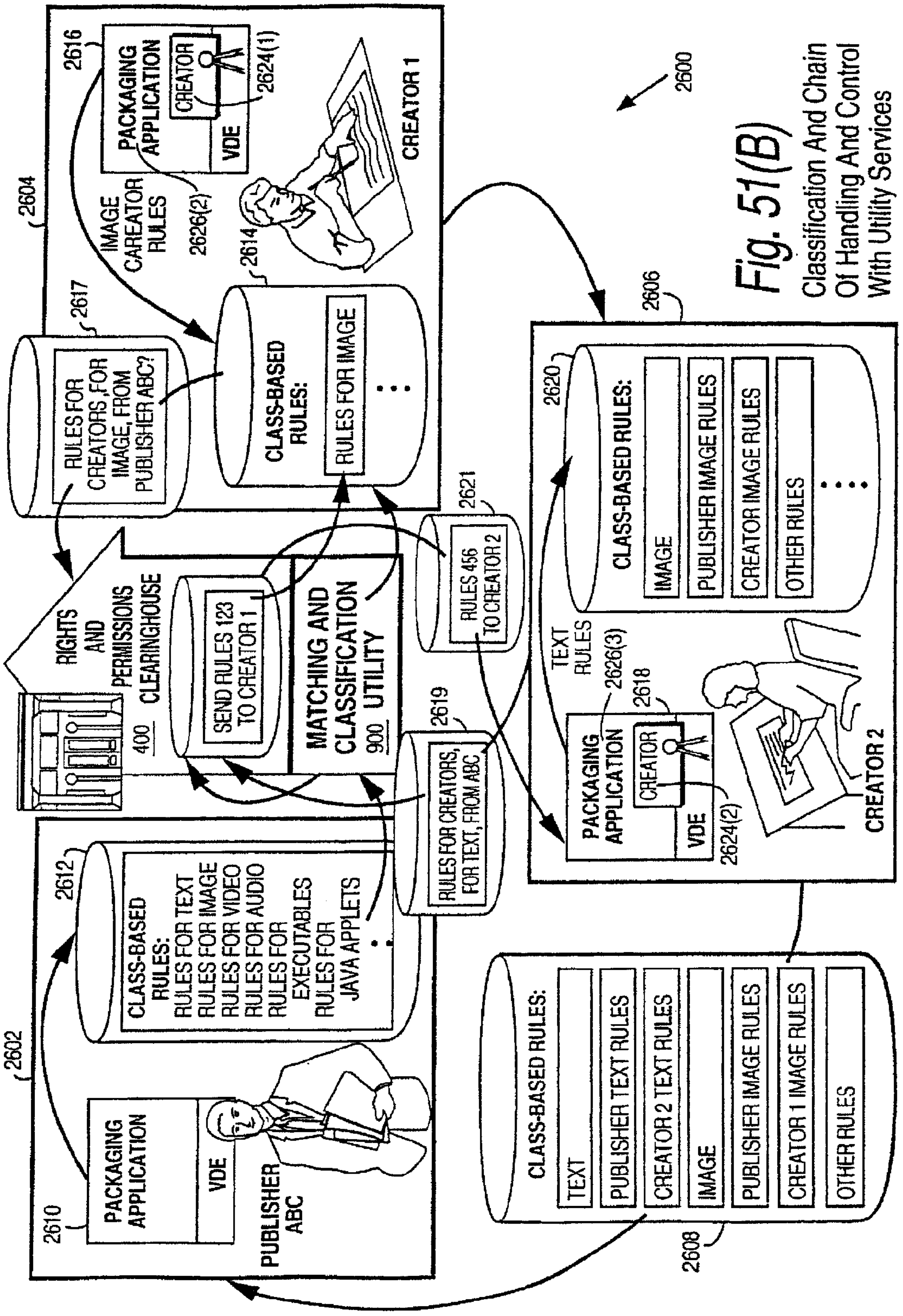

Example 2600, FIG. 51B shows that the publisher 2602 may have sent a VDE container 2612 with various rules and usage consequences to a matching and classification authority 900 who may classify the rules and send the rules and their class assignments to a rights and permissions clearinghouse 400. The matching and classification utility 900 may also create at least one class hierarchy, class, classification scheme, category and/or category scheme using at least some rights management information and assign at least one rule to at least one category and/or class.

An authorized first creator 2604 may send a VDE container 2617 to the rights and permissions clearinghouse 400 asking for rules in the class "rules for authorized creators, for image objects, from publisher ABC." The rights and permissions clearinghouse 400 returns a VDE container 2614 with rules in the requested class. The first creator 2604 uses a packaging application 2616 to package his image using these rules plus rules and usage consequences reflecting his rights and wishes and sends the VDE container 2614 to the second creator 2606.

The second creator 2606 also sends a VDE container 2619 to the rights and permissions clearinghouse 400 asking for rules and consequences in the class "rules for authorized creators, for text objects, from publisher ABC." The rights and permissions clearinghouse 400 returns a VDE container 2621 with rules and consequences in the desired class. The second creator 2606 uses a packaging application 2618 that determines that she is a creator authorized by publisher ABC 2602 and goes ahead and adds her text object and her rules and consequences to the VDE container 2608, which is then sent to the publisher ABC 2602 for further augmentation, vending, and/or distribution to other value chain participants.

EXAMPLE

Secure Directory Services May Provide Class and Class Assignment Information

Whole industries have arisen to target communications to individuals, organizations, groups, and/or other classes sharing at least one common attribute, and/or to provide directories from which others can locate individuals, organizations, groups, and/or other classes. Examples of these industries include direct marketing, advertising, yellow and white pages directories, directories of directories, and various electronic and paper membership lists and professional directories.

In addition to identifying information such as names, e-mail addresses, physical mailing addresses, phone numbers, fax numbers, and/or similar attributes, the secure directory services 600 may also provide information about class membership(s) for individuals, devices, services, groups, and/or organizations. The non-limiting example 2700 shown in FIG. 52 includes a secure directory service 600 that has received class and class assignment information for one or more individuals 2716(1)–2716(n). The class assignment information is shown in the bottom four rows of the directory record 2718(1) for one individual.

In this example, a content provider 2702 sends a VDE container 2704 to a secure directory services 600 asking whether the service can provide a list of individuals in class "AF." The requested class could be any class defined by one or more attributes and may be based on usage profiles that include rights management information, non-exhaustive examples of which include price, payment methods accepted, permitted operations, meters, and privacy controls.

The secure directory services 600 returns to the content provider in a VDE container 2706 an indication that there are presently 57 individuals known to that service in class "AF." In turn, the content provider 2702 sends a VDE container 2708 with at least one piece of content and/or rules and usage consequences back to the secure directory services 600 along with instructions requesting that the secure directory services 600 forward the content and/or control sets to each of the 57 members of class "AF" who might be interested in this piece of content. The secure directory services 600, in turn, forwards the content and/or controls (in VDE containers 2714(1)–2714(n)) to members of class "AF," who may elect to interact with the content in accordance with their associated rules and consequences.

In another example, the secure directory service 600 may send identifying information 2710 directly to the content provider 2702 who may then send content 2712 in one or more classes directly to one or more members 2716(1)–2716(n) of the class. The secure directory services 600 may, for example, include permissions for the class information that have expiration dates and/or limits on the number of times the information can be used.

EXAMPLE

Matching and Classification Utility 900 Supports Class-Based Micro-Merchandising and Micro-Segmented Sales Processes The present inventions may be used in support of services as well as content distribution based business. Example 2800 (FIG. 53) shows a travel company 2801 sending a VDE container 2810 to a matching and classification utility 900 requesting information on those individuals who may be interested in certain combinations of leisure-time activities. These classes might have been defined at least in part on the basis of usage and other rights management information 2816, for example, the kind of leisure-time information recently looked at, for how long, and/or its cost, and/or the kind of Web sites recently frequented, sent from consumer VDE nodes 2802(1)–2802(n) to the matching and classification utility 900, and/or to a usage clearinghouse 300 who, in turn, sends at least some of the usage information (or a summary form of such information) to the matching and classification authority 900. Classes may also be defined using information gathered directly from the consumer 2818, perhaps under the control of VDE. The matching and classification utility 900 may also create at least one class hierarchy, class, classification scheme, category and/or category scheme using at least some rights management information and assign at least one consumer, service, and/or at least some information to at least one category and/or class.

Example FIG. 53 shows that a consumer 2802(1) has recently indicated a preference and/or interest in skiing, music, and flying to Colorado. Another consumer 2802(n) has indicated a preference for and/or interest in surfing Hawaii. These preferences may be determined at least in part on the basis of rights management information. In response queries sent in one or more VDE containers 2810 from the travel company asking for interest and preference information, the matching and classification utility 900 returns one or more VDE containers 2812 with identifying and class information. The travel company may send information about already existing vacation packages and/or packages specially created to meet the specific interests of one or more individuals, for example, information about skiing in Colorado, and rock concerts 2604 to consumer 2802(1) and information 2614 about surfing Hawaii to consumer 2802(n). The recipients may send VDE containers 2806 to the travel company 2801 indicating agreement to buy the package offered or may request additional information or may negotiate terms and conditions such as price, departure date, insurance, and the like. These negotiations may be conducted using the inventions described in "Ginter et al", FIGS. 75A–76B using VDE negotiations.

Both services and/or hard goods may be offered to particular persons, nodes, groups, and/or entities based on the class membership of the potential purchaser and the class membership of the goods and/or services to be purchased. Thus in another example, the travel company could have included the purchase and/or rental of the skis or of the surf board.

EXAMPLE

Matching and Classification Utility 900 Supports Trading in Hard Goods

Business to business trading in goods and/or services may be substantially facilitated through services provided by the matching and classification utility 900. Information on certain classes of goods and services may be delivered to certain people, groups, or entities based on the class membership of the recipient. In one example, these various class memberships may be determined using control set and audit information regarding trading preferences and/or transaction patterns. In another example class membership may be determined by actions and/or information provided by at least one value chain participant.

Example 2900 (FIG. 54) shows a buyer A 2904 sending a VDE container 2908 to a trading company 2902 with a request asking if trading company will sell company A one or more desired items. Trading company 2902 may then send a VDE container 2910 to a matching and classification utility 900 with a query asking who can supply the desired items under terms and conditions that are also included in the container. Since these terms and conditions may be the subject of negotiations, they may be in a format conducive to VDE-based negotiations as described in "Ginter et al" FIGS. 75A–76B.

The matching and classification utility 900 may send inquiries 2910 to one or more suppliers 2906(A)–2906(N) and/or may have already received information and/or associated control sets from suppliers in VDE containers 2912. Based on the request from trading company 2902 and supplier 2906 information obtained 2912, the matching and classification authority 900 returns a VDE container 2916 indicating that in this one example, suppliers A 2906(A) and Z 2906 (N) can provide goods in the class(es) defined by trading company's 2902 request(s) 2910. In turn, trading company 2902 sends at least one VDE container 2918 to buyer A 2904 indicating that they will sell buyer A the previously requested items under the enclosed terms and conditions. In another example, there may be some VDE-based (see "Ginter et al", FIGS. 75A–76B) negotiations between the various parties in this value chain, including between trading company 2902 and buyer A 2904.

In another example, buyer A 2904 may consult the matching and classification authority 900 directly and may then purchase directly from one or more suppliers 2906.

EXAMPLE

Figure 55:
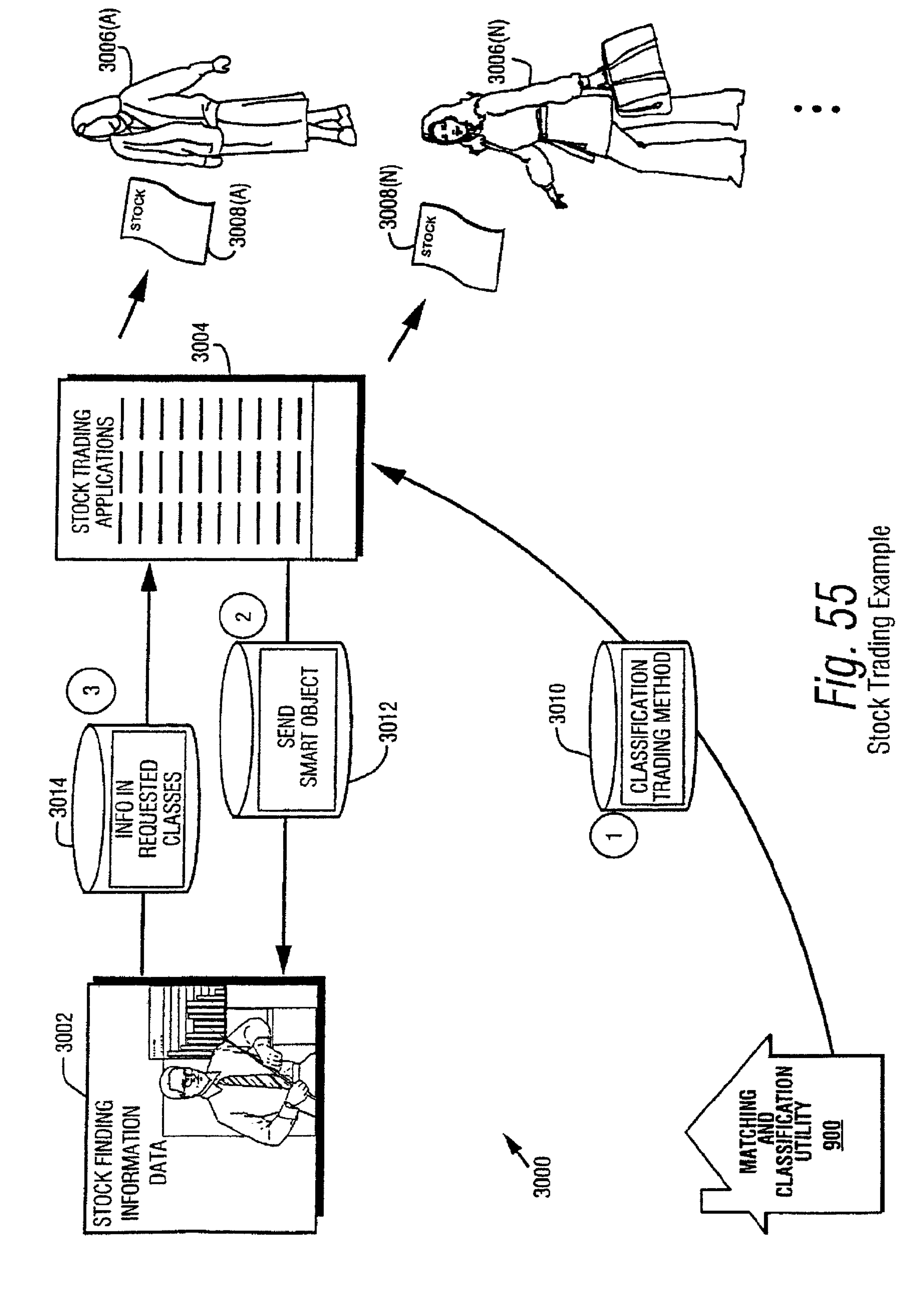

Matching and Classification Utility 900 Supports Securities Trading/Brokering In addition to hard goods, the matching and classification authority 900 may also support securities trading. Example 3000, FIG. 55, shows the matching and classification authority 900 sending to a VDE-aware appliance with one or more stock trading related applications 3004 a VDE container 3010 with an administrative event and method (as described in "Ginter et al") for classifying equities related information, including, as non-limiting examples, current and historical price, volume, and index information, financial performance data for publicly held companies, forecasts, risk management information, options and futures, and the like. The classification method may also utilize rights and permissions, including access control information, permitted operations, and/or expiration times and/or dates for rights management information. The classification method may also create at least one class hierarchy, class, classification scheme, category and/or category scheme using at least some rights management information and assign at least one element to at least one category and/or class.

In turn, using the VDE aware appliance 3004, the stock trader 3006 sends a smart object 3012 to at least one information source 3002 asking for information in at least one class identified by the classification method. In one example, the class may be information concerning "publicly traded companies with annual revenue greater than $500M in the healthcare sector in which the CEO has been in place less than 5 and greater than 1 year and with access restricted to customers (rather than available to anyone) with access and use expiring in 90 days." The information provider(s) 3002 returns a VDE container 3014 with information meeting and/or more closely meeting the stated class criteria. Based upon this and other information, the trader 3006 may go ahead and enter an order for at least one trade in at least one stock 3008. In another example, the trader may create or obtain methods that trade automatically in certain classes of securities.

EXAMPLE

Figure 56:
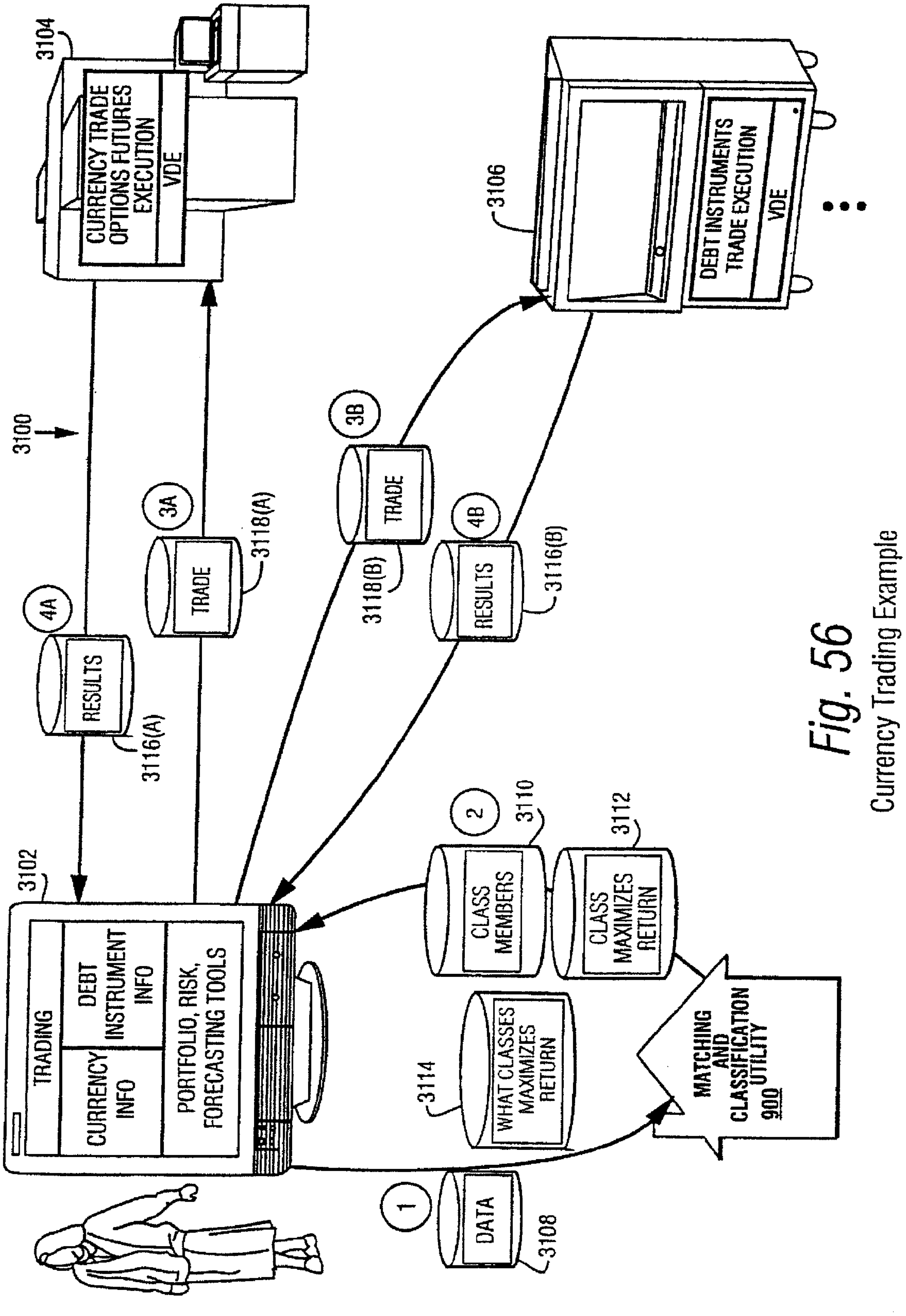

Matching and Classification Utility 900 Supports Trading in Currency and Debt Instruments Among the classes of great value to traders are the classes of items whose trading maximize profits and/or minimize losses. Example 3100, FIG. 56, shows a trader in currency and/or debt instruments 3102 sending a VDE container with market and other financial and economic information and VDE control set information 3108 to a matching and classification authority 900 with a query 3114 asking the matching and classification authority 900 to identify the class of currency trades and/or debt instrument trades that maximizes profit and/or minimizes losses. The matching and classification authority 900 applies one or more methods to the data and returns at least one class definition 3112, the assignment of possible trades to that class 3110, and relevant control set information, such as controls indicating who may see the information, and those that prevent unauthorized modification of the information. The matching and classification authority 900 may also return methods for executing the trade. The matching and classification utility 900 may also create at least one class hierarchy, class, classification scheme, category and/or category scheme using at least some rights management information and assign at least some trading information to at least one category and/or class.

The example trader 3102 examines the recommendation and sends VDE containers 3118 (A, B) with trade methods and control sets to a foreign exchange market 3104 and/or to a debt instrument market 3106 where the trades are consummated. The markets send back VDE containers 3116(A, B) with audit information indicating the results of the trading order. In another example, the matching and classification authority 900 may be instructed to send trading orders directly to the market(s) for execution. In another example the trader may send a VDE container to at least one source of relevant information asking that source to send certain information to the matching and classification authority 900. In another example, having established the desired trade(s) using the matching and classification authority 900, the trader may place the trade by phone and/or computer and/or other communications device without using VDE.

EXAMPLE

Figure 57:
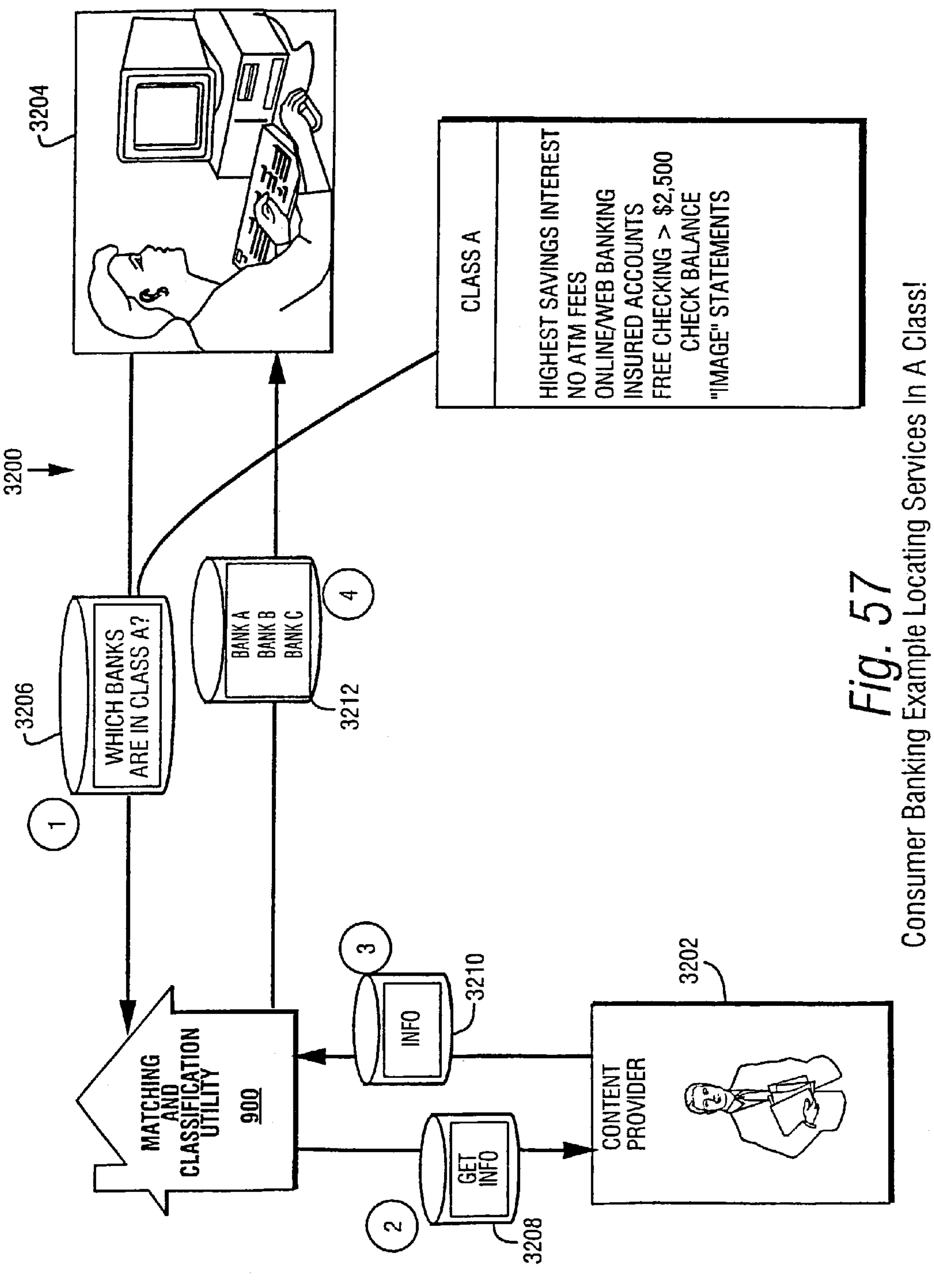

Matching and Classification Utility 900 Supports Consumers Locating Services That Are Members of a Specified Class The services of the matching and classification authority 900 may also benefit consumers by locating certain classes of services. Example 3200, FIG. 57, shows a consumer sending a VDE container 3206 to a matching and classification authority 900 asking, "which banks are in class A?," where class A are "those banks that offer the highest savings interest, no ATM fees, online/Web banking using VDE, insured accounts, free checking with balances larger than $2,500, "image" statements (where check images rather than the actual checks are returned), and complete privacy protection (except where legally required to disclose) for VDE based banking transactions.

The example matching and classification authority 900 sends a query in a VDE container 3208 to one (or more) information sources 3202 and receives one or more VDE containers 3210 with the requested information. The matching and classification authority 900 then determines which bank or banks meet the stated criteria of the consumer 3204 and then sends a VDE container 3212 with the answer to the consumer, in this example, banks A, B, and C. The consumer 3204 may then go ahead and execute a financial transaction, for example, transferring funds from one bank to a bank identified by the matching and classification utility 900 as offering higher interest rates, while being assured of maximal privacy for this (and perhaps other) transactions.

In another example, after determining which banks are in the desired class, the matching and classification authority 900 may send a VDE container to one or more banks saying that the consumer wishes to know about their services and requesting the bank to contact the consumer directly. The bank may send controls ensuring the privacy of future interactions with the customer. For example, controls that apply to audit records such that only the bank and the consumer will have permission to access these records.

EXAMPLE

Matching and Classification Authority 900 Supports Class-Based Software Distribution VDE and the inventions disclosed in "Ginter et al" at last provide a way of ensuring that the efforts expended on creating software will be rewarded since the software can now be persistently protected, usage information can be collected, and payment ensured. These inventions also support micropayments and microtransactions, thus creating a world in which the price of software objects—any kind of objects actually—may become very small. Pay per use, rental, rent to own, and other pay as you go pricing models together with VDE may create a new explosion of creativity in software design and creation, since use prices will be low and providers can be assured of receiving payment.

The present inventions provide opportunities for software providers to more efficiently market their wares. Example 3300, FIG. 58, shows a number of users with VDE installed on their appliances 3304(A–F). These people are using software (and other content). VDE meters usage of various objects and sends audit records in VDE containers 3306 (A–F) to a usage clearinghouse 300, which then sends audit records 3308 to the matching and classification authority 900. A software distributor 3302 sends a VDE container 3310 to the matching and classification authority 900 with a query asking who is in the class, "buys Java applets, with pay per use pricing, and for which the cost per use is between $0.0001 and $0.001?"

The matching and classification authority 900 returns a VDE container 3312 with a list of names and (network) addresses of those matching, or most nearly matching the desired characteristic(s). The software distributor 3302 then sends at least one VDE container 3314 with at least one software object, and/or a pointer to a software object, in this case a Java applet, and perhaps other relevant information, such as VDE control sets and/or various metadata describing some aspect of the object, for example, what it does, what it costs, etc. The user may then elect to use the object or not. In another example, instead of individuals or VDE nodes, the users might be groups of nodes, users, organizations, parts of an organization, and others that can be identified as belonging to at least one class. In this case, the software may be offered to some or all members of class, group and/or organization.

EXAMPLE

Matching & Classification Utilities Provide Services to Authenticated Classes of Nodes, Users, Content Services and/or Transaction Services Among the ways in VDE nodes, users, content services, and/or transaction services can be authenticated is through the use of certificates and/or other digital credentials issued by an appropriate trusted third party, a certifying authority 500, for instance, that warrants and/or attests to some fact or facts, which may include membership in one or more classes, including the identity class. FIG. 59 shows a non-limiting example 3400 in which a number of matching and classification authority 900(1–N)s, each of which may provide its services to different classes, where class membership is authenticated using certificates and/or other digital credentials. In other examples, additional authentication mechanisms may be used in combination with, or instead of certificates, such as information known only to the user, VDE node, and/or appliance, including passwords, cryptographic keys, information stored in hardware, and/or software.

In example 3400, FIG. 59, commerce participants including, the matching and classification authority 900, may make rules and consequences conditional on class definitions and/or the assignment of members to a class. Class membership may be authenticated by a certificate and/or other digital credential issued by one or more commerce participants in addition to, and/or instead of a trusted third party such as a certifying authority 500. For example, a certificate and/or other digital credential may attest to user identity, that is, that a user is the user he or she claims to be. Nodes, devices, networks, servers, clients, and services, are other non-limiting examples of other commerce elements that may be authenticated with certificates and/or other digital credentials. Any commerce participant may issue a certificate, but other participants are not required to accept a given certificate as an authenticator.

FIG. 59 shows multiple matching and classification authorities 900(1)–900(N), each of which may provide services to members of a particular class, in these non-limiting examples, to nodes in a particular deployment (matching and classification authority 900(1)), in a particular vertical segment and/or institution of society, such as Higher Education (matching and classification authority 900(2)), one or more value chains, such as business information content providers (matching and classification authority 900(3)), and/or a particular transaction and/or service arena, such as hard goods trading (matching and classification authority 900(n)). Other commerce utility systems, a certifying authority 500 shown in FIG. 59, for instance, may also provide services to a class. In each of these instances, the services of the matching and classification authority 900 may depend upon finding certain authenticating certificate(s) and/or other digital credentials on the appropriate VDE nodes.

For example, matching and classification utility 900(1) provides services to nodes 3410(1–n) in the deployment 3402 administered by VDE administrator 800. Each node may have a certificate 3412 issued by certifying authority 500(1) that provides services to this deployment.

In another example, certifying authority 500(2) provides certificates and/or other digital credentials to participants in a higher education value chain 3404 consisting of an arbitrary number of colleges and universities 3416(1)–3416(n), providers 3418(1) and students 3418(n), and a matching and classification utility 900(2) that provides classification, matching, and selection services to higher education 3404. In one example, the matching and classification utility 900(2) only provides services to value chain participants who have a certificate 3420 issued by certifying authority 500(2).

Matching and classification utility 900(3) services can be provided only to members of one or more classes based on certificates issued by a certifying authority 500(3). In one example, the class is participants in a business information value chain 3406, comprising an arbitrary number of content providers 3424(1)–3424(n), an arbitrary number of users and/or consumers of business information 3422(1)–3422(n), and a certifying authority 500(3) that issues certificates and/or other digital credentials to members of the value chain 3406.

In addition to membership in certain deployment, institutional, and/or content usage classes, the matching and classification authority 900(4) may provide services to members of a certain transactional value chain, in one example, traditional transactions 3408. In this example, a certifying authority 500(4) issues certificates 3432 to one or more companies 3428(1)–3428(n) and one or more trading companies 3430(1)–3430(n). In another example, other participants may receive certificates and/or other digital credentials, including banks and financial institutions, government authorities, for example, tax and/or customs authorities, consumers, suppliers, and/or transportation companies. The matching and classification utility 900(4) provides services only to those entities and/or individuals in possession of the appropriate certificate 3432 indicating that the holder of the certificate is an authenticated participant in one or another trading value chains.

In other examples, a commerce utility system may provide services to more than one class where class membership is indicated by at least one certificate and/or other digital credential issued by a certifying authority 500 and/or value chain participant. In one example, matching and classification authority 900 might provide services to the class "Higher Education" and to the class "K-12 Education."

Possession of a certificate and/or other digital credential may be among the information used to classify a node, user, appliance, device, entity, and/or other commerce participant, and rules and consequences can be made conditional on membership in one or more authenticated classes and/or on the degree of confidence the rule provider has in the trustedness of the certificate and/or other digital credential issuer. In one example, a discount to higher education may be larger if the root for chain of trust for a given certificate is a well-known, highly respected and trusted third party, such as an authoritative accrediting organization, and smaller if the root belongs to the MIS department of a small college. In this example, the provider is willing to grant a higher discount when there is higher certainty that the recipient is in fact a member of a specific class or classes.

EXAMPLE

Matching and Classification Authority 900 Supports Control Sets Based on Part on Employee Classes, Content Classes, and/or Certificates and/or Other Digital Credentials Chain of handling and control enables, amongst other things, multiple organizations to work together in secure, trusted, efficient, cooperative commerce processes. One way in which the present inventions extend these ideas is through control sets with rules and usage consequences that may be based in part on classes and the assignment of persons, entities, devices, content, services, or other process elements to classes of one kind or another by the matching and classification authority 900.

One example technique to classify employees is at least in part according to their roles and responsibilities within an organization. The matching and classification utility 900 supports classification, matching, creation and/or modification of VDE control set(s) based at least in part the class assignment of individual and/or groups of employees. In part by virtue of their employee classification, at least one employee may receive certain rights management information, for example, permission to access certain classes of information or permission to perform one or more permitted operations, transactions and/or events.

Figure 60A:
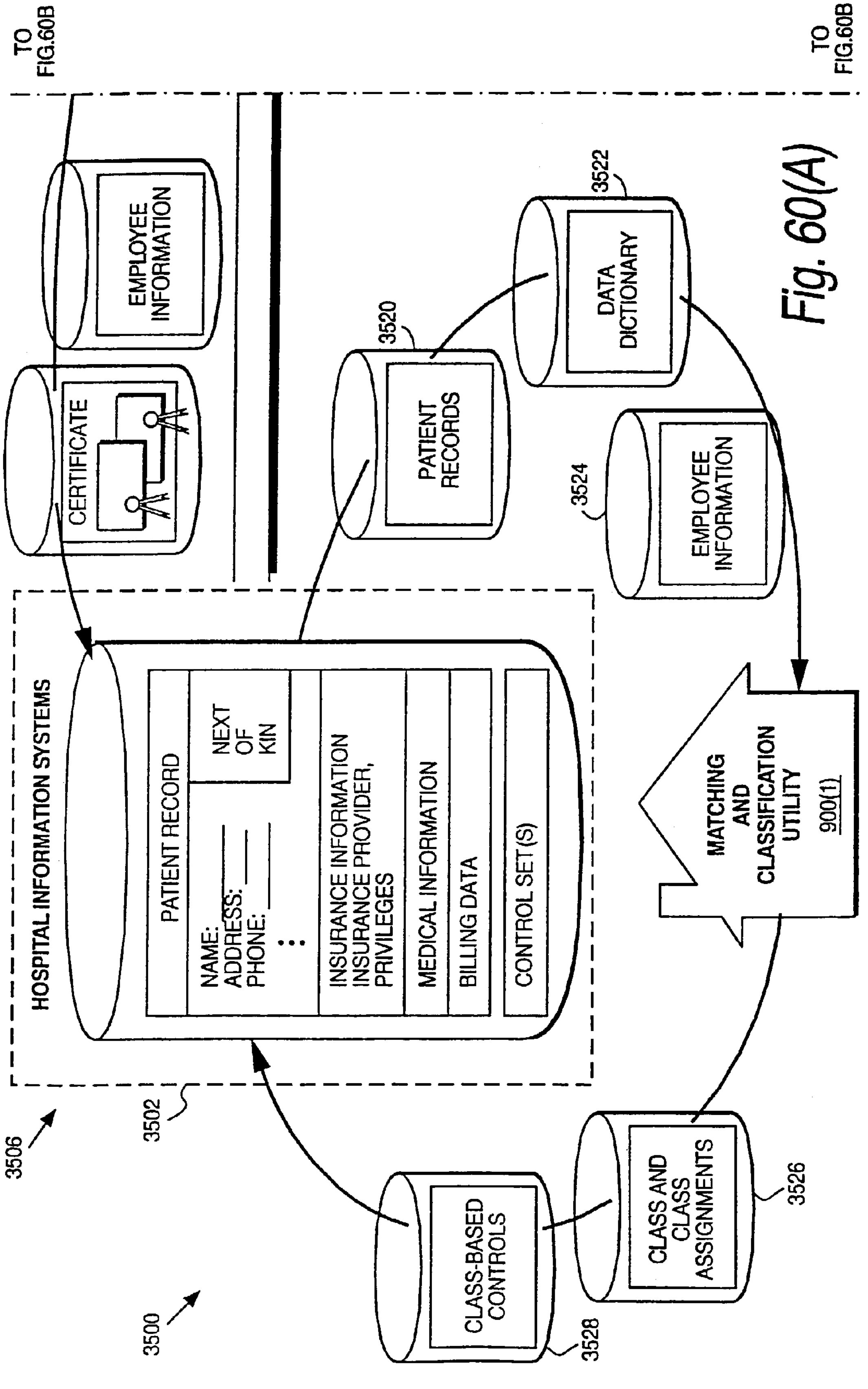
Figure 60B:
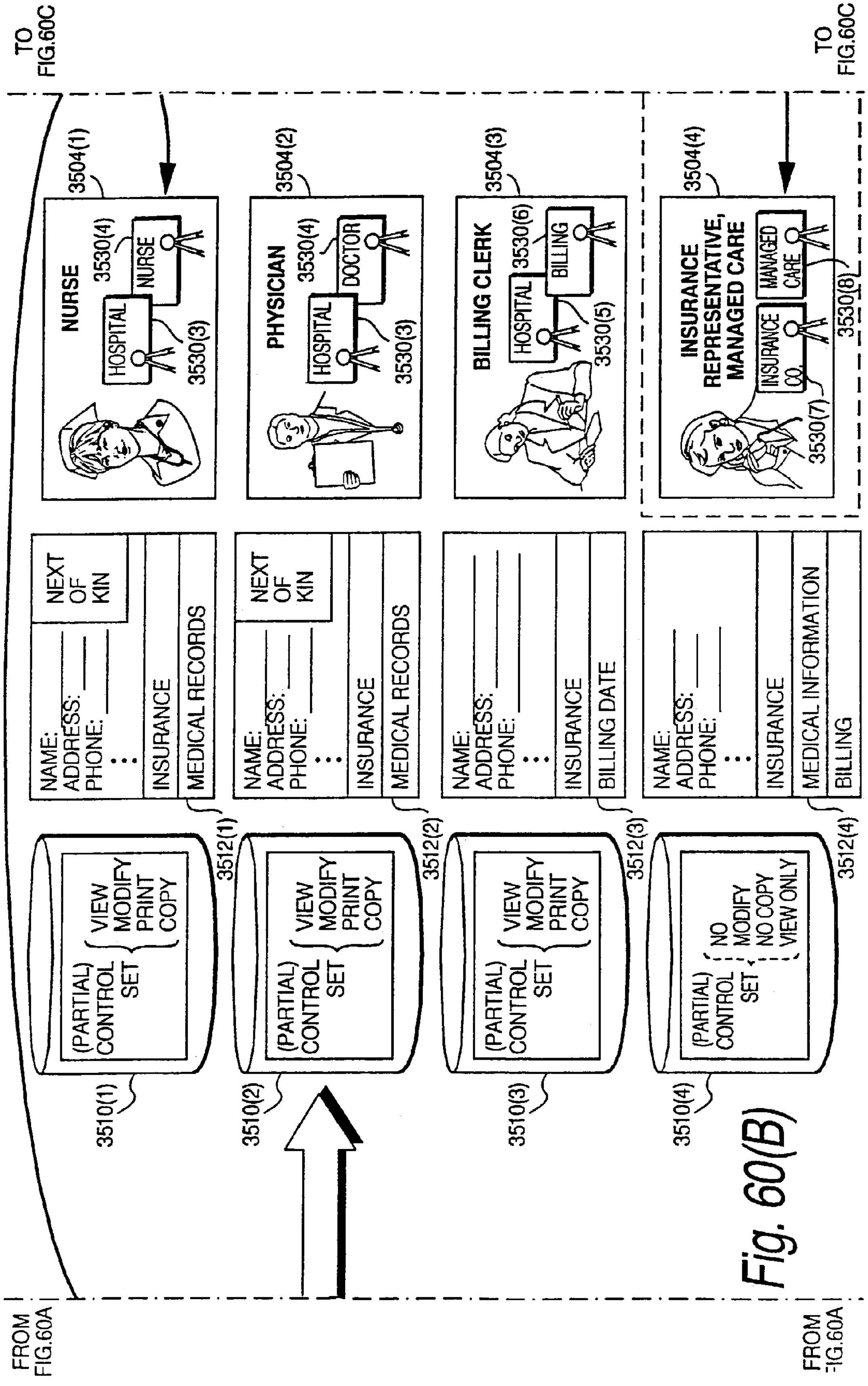
Figure 60C:
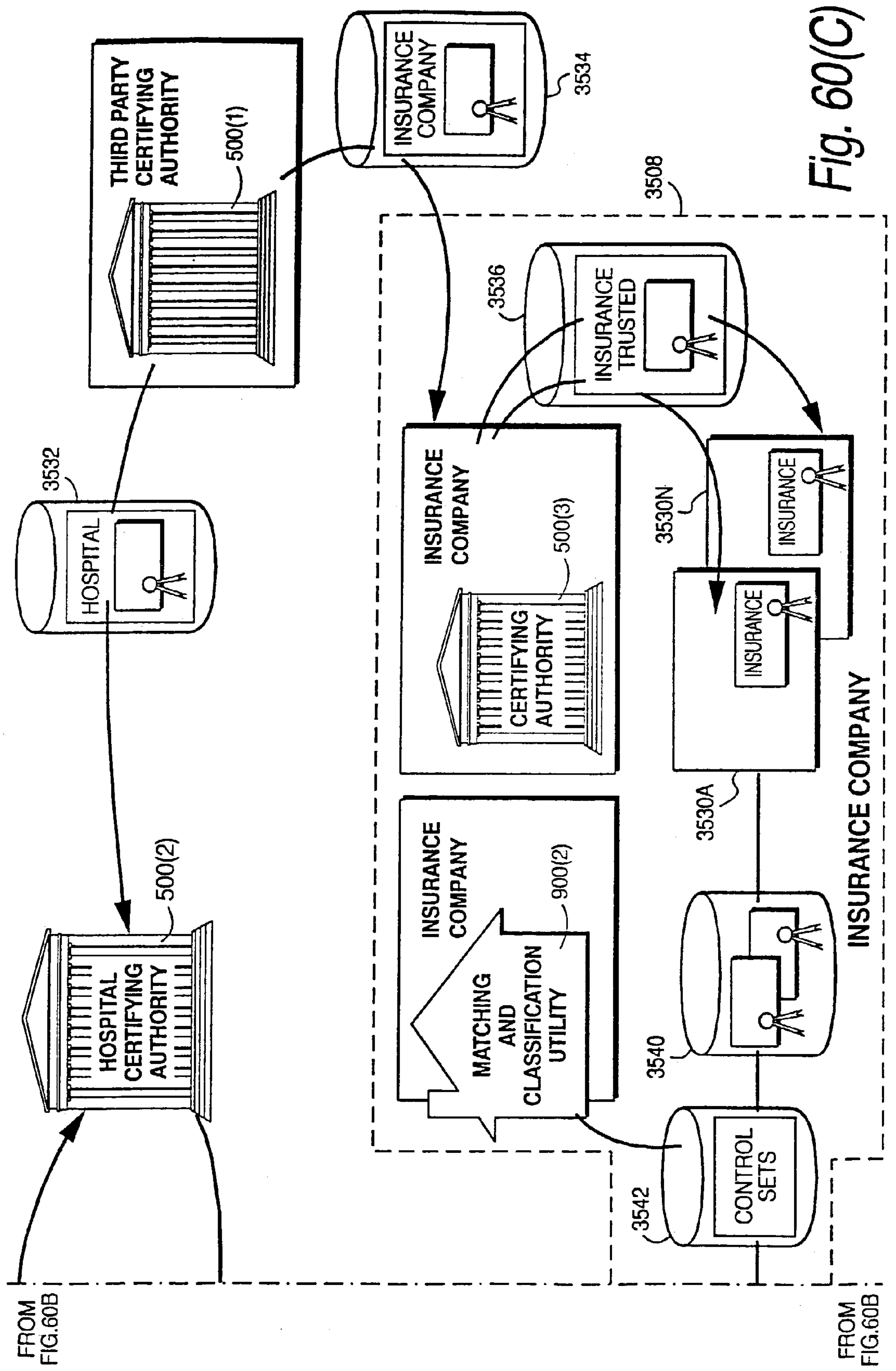

Example 3500, FIGS. 60A–60C shows a nurse 3504(1), physician 3504(2), and billing clerk 3504(3) all work directly for an example hospital. The present inventions are in no way limited to hospitals, but apply to any organization, group, entity, and/or institution with at least some defined roles and responsibilities and/or other class definitions that apply to employees, members, and/or others associated, affiliated, and/or employed by the organization, group, entity and/or institution. Rights management information may be part of the claim definition, for example, permissions to view, modify, excerpt, and so on.

Control sets may provide permissions conditional on employee class, for example, certain classes of employees may modify certain information and/or classes of information in a database while others may not. Class membership may be indicated by digital credentials, non-limiting examples of which include digital certificates and digital membership cards. Controls may be conditional on other information as well, for example, some computers and/or display devices may not show certain classes of data or updates to certain data elements may not be performed from certain computers or display devices.

Another example role is a representative 3504(4) of an insurance company 3508, who may have access to certain classes of hospital information by virtue of her or his class membership(s), some of which may derive from her or his role in the insurance company 3508 and/or from the insurance company's relationship with the hospital and/or with some of the hospital's patients and/or staff. The present inventions are not limited in application to an insurance company, but may be applied to any individual, group, organization, entity, and/or institution with whom the example hospital and/or other entity has some form of relationship.

An example insurance company 3508 have received a certificate in a VDE container 3534 issued by certifying authority 500(1) attesting to the identity of the insurance company. In another example, this certificate and/or one or more additional certificates may attest to the fact that the insurance company has the appropriate charter, licenses, and other grants of authority to be in the health insurance business. The certifying authority 500(1) may also send a certificate in a VDE container 3532 attesting to hospital's identity. In another example, this certificate and/or one or more additional certificates may attest to the fact that the hospital has the appropriate charter, licenses, and other grants of authority to provide hospital and related services.

The insurance company 3508 may have sent one or more control sets to the hospital in a VDE container 3542. These controls may be based in part on one or more certificates 3530 and/or on the classification output of an example matching and classification utility 900(2) operating within and/or on behalf of the insurance company 3508. The controls in container 3542 may indicate which individuals are actually employees of the insurance company, employee membership in one or more classes, permissions associated with that individual and/or class, and/or permissions associated with specific devices, communications channels (devices, ports, etc.), and/or processes. In this one example, the hospital matching and classification utility 900(1) may create controls using the same and/or additional classes and controls received from the insurance company 3508.

The insurance company 3508 may also provide one or more certificates to the hospital attesting to the fact that one or more information sources within the insurance company are to be take by the hospital as trusted sources. Lastly, in this regard, the insurance company may issue one or more certificates on behalf of each employee attesting that each is in fact an employee of the company and may have certain authorizations.

In example 3500, FIGS. 60A–60C, a matching and classification utility 900(1) has identified various classes of hospital employees using information from at least one hospital information system 3502 and/or VDE node. The matching and classification utility 900(1) may also make use of certificates issued by a certifying authority 500(1) outside (a trusted third party) and/or a certifying authority 500(2) inside the hospital. Using data dictionaries 3522, patient records 3520, various employee information 3524, automated procedures, and/or other means, the matching and classification utility 900(1) creates classes 3526 of patient record information and associates one or more control sets 3528 with each class of information and/or with a patient record as a whole. These control sets may specify who has permission to use and/or modify the record and/or an element(s) of the record that has been assigned to one or more classes on which the control set(s) may in part depend. In one example, the class based controls 3528 may be combined with other hospital and/or other party controls, controls from the insurance company 3508, to create new controls 3510(1)–3510(n) associated with patient records 3512(1)–3512(n).

The example nurse 3504(1) and physician 3504(2), for example, may be able to view, modify, print, and/or copy patient's name, address, and other similar descriptive information, next of kin, insurance, and medical information in accordance with controls 3510(1) and 3510(2), respectively. In another example, some members of the class "nurse" and/or the class "physician" may have different permissions by virtue of membership in one or more additional classes. A physician who is in the class "hospital administration" may have different permissions, for example, to billing records.

A billing clerk 3504(3) in the hospital may not have permission in control set 3510(3) to view medical information and/or next of kin, and in this example may be restricted to name and other patient descriptive information, insurance information, and billing information from the patient record. A representative 3504(n) of the insurance company may have permission by virtue of control set 3510(n) to view, but no permission to modify, print, or copy patient record 3512(n). In each of these examples, the VDE control sets are at least partially conditional on the presence and/or absence of certain certificates indicating membership in one or more classes.

The present inventions may be applied to any information, person, group, device, network, service, database that pertains to any commerce activity whatsoever, and regardless of whether the parties to the commerce activity are individuals, groups, entities, organizations, institutions, nations, and/or societies.

EXAMPLE

Matching and Classification Authority 900 Supports Classes and Matching Based in Part on Workflow and Work Process Automation Not only do the present inventions enhance commerce processes that principally entail information, but the present inventions enhance workflow and work process automation as well. Example 3600, FIG. 61, shows PCs 3608(*a*–*c*) functioning as station controllers connected to various manufacturing devices 3610(*a*–*c*). These station controllers that exchange data and instructions with the equipment they control and/or manage. The station controllers are VDE-enabled. In another example, the manufacturing equipment may also have VDE nodes installed.

An example work in progress (WIP) and/or manufacturing control application 3606 keeps track of the overall manufacturing processes and exchanges information with other applications not shown, such as materials management, materials ordering, order databases, logistics, inventory, accounts payable, accounts receivable, general ledger, human resources, time cards, and the like.

An example employee 3602 of the company sends a query 3612 in a VDE container 3604 to an enterprise matching and classification utility 900 within the company asking, "which VDE-controlled equipment will be available 3rd shift today, for 2 hours, capable of performing operations xyz with a nominal error rate of less than 0.0001 per cent?" The enterprise matching and classification utility 900 may request data 3616 from the WIP/manufacturing process control application 3606 and/or may already have access to the required data, indicating equipment availability, security level, capabilities, and statistical error rates. The WIP/manufacturing process control application 3606 may return a VDE container 3618 with the requested information. Based upon the query and available information, the matching and classification utility 900 responds by sending a VDE container 3620 to the employee 3602 with the answer, "equipment B and equipment C." In turn, the employee 3602 sends another VDE container 3622 to the WIP/manufacturing process control application 3606 with VDE a control set(s) indicating B and C should be scheduled for 2 hours on 3rd shift to do xyz operations. As part of this particular chain of handling and control, the WIP/manufacturing process control application 3606 sends VDE container 3624 to the VDE-enabled station controllers for equipment B or C with control sets that schedule work and specify the manufacturing processes and/or "recipes" for those specific equipment 3610(*b*) or 3610(*c*). In turn, the respective station controllers carry out their instructions and report progress and completion in VDE containers 3626 sent back to the WIP/manufacturing process control application 3606, which may in one example, provide results to other applications and/or to the employee who originally requested the work to be scheduled and performed.

EXAMPLE

Matching and Classification Authority 900 Supports Classes and Matching Based in Part on Government/Societal Commerce Administration Among the rightsholders in commerce processes of all kinds are societies and governments. Governments may foster rules indicating that certain classes of individuals may have not have access to certain classes of content. Some classes of information may be treated as members of classes that define permissions, such as "confidential," "secret," "top secret," and so on. Other non-limiting example governmental rights may address permissions for import, use, and/or export of certain classes of hard goods, services, currency and financial instruments, and content. Travelers entering the United States, for example, are usually asked about currency (and currency equivalents) being brought into the country by the traveler. Children, for example, may be prohibited as a matter of law by governments from viewing content in the class "sexually explicit."

Figure 62B:
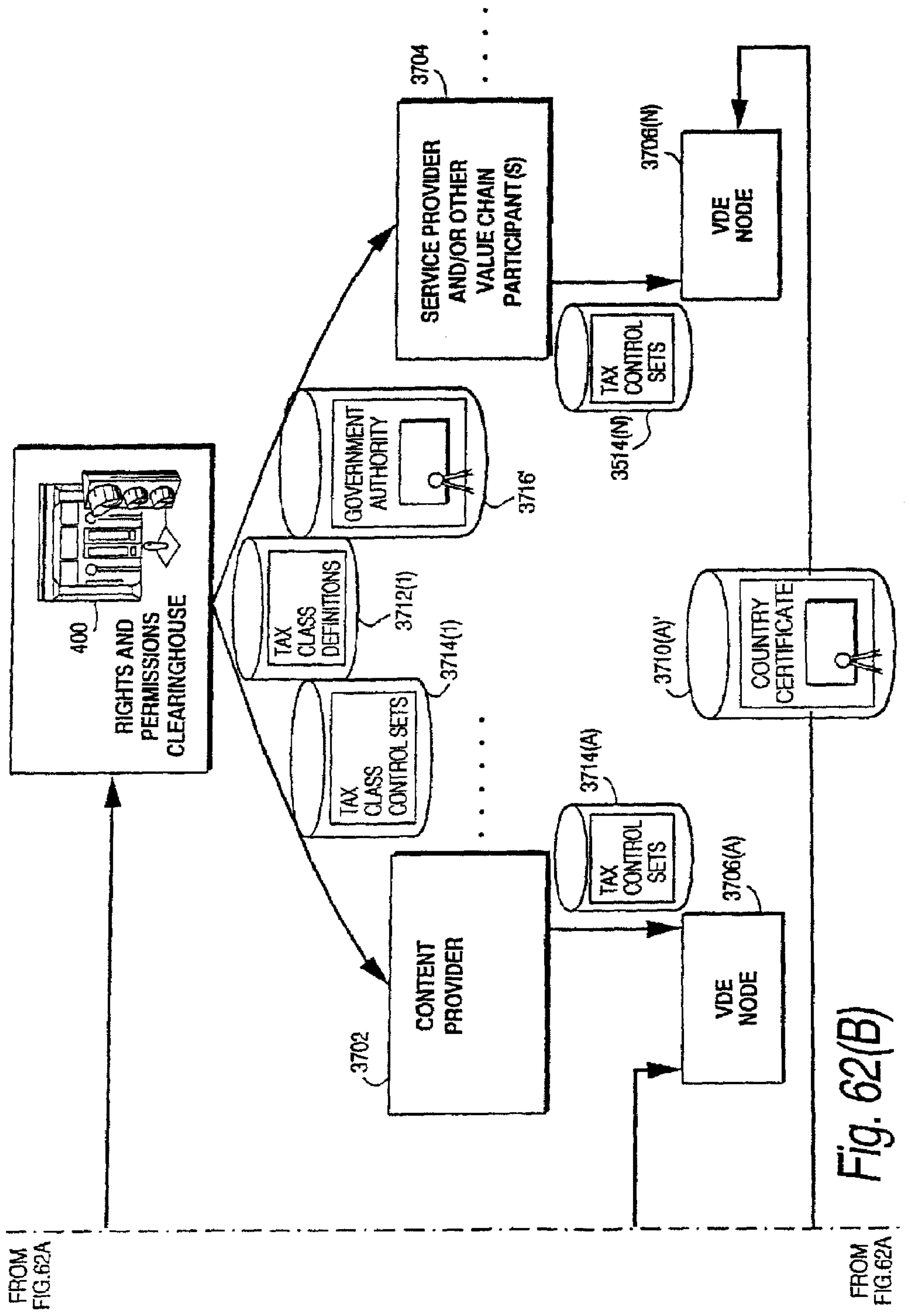

Another example of government rights is that different tax rules may be applied to different classes of electronic commerce transactions using VDE. Example 3700, FIGS. 62A–62B, shows a certifying authority 500 operated by and/or on behalf of a government issuing a certificate and/or other digital credential indicating jurisdiction, namely, country. The certificate is sent in a VDE container 3710(*a*) to a VDE administrator 800. The government certifying authority 500 also sends certificates in VDE containers 3710(b)–3710(n) to the government matching and classification authority 900 attesting to the "country," in one example, the United States, and another certificate 3716 attesting to the fact that the matching and classification authority 900 is indeed an authorized service of the United States government.

In one example, the government matching and classification authority 900 has created tax class definitions 3712 and tax control sets 3714 that apply those definitions in various classes of circumstances, including the presence of certain control-related information, such as an appropriate country certificate from an authorized issuer of such jurisdictional certificates. The tax class definitions 3712, tax control sets 3714, and government authority certificates 3716' are sent in at least one VDE container to a rights and permissions clearinghouse 400, who, in one example, redistributes the tax class definitions 3712(1), tax class control sets 3714(1), and/or government authorization certificate 3716(1) to content providers 3702, service providers 3704, and other value chain participants. The certifying authority 500 also sends country certificates to one or more VDE administrators 800 who, in turn, send country certificates 3710' to VDE nodes 3706(A)–3706(n) in their deployment. When content provider 3702 distributes content of any kind, the appropriate tax control sets 3714(A) are also included in the VDE container. A tax control set is applied whenever content is used in accordance with a tax class and provided that the appropriate jurisdictional certificate 3710' is present on the VDE node 3706(*a*). For instance, a VDE node may have a tax control set to be applied to sales of a class of content, specifically, to the class of "software." Whenever a software vend occurs, the appropriate tax is applied according to these rules.

In another example, the various country and government authority certificates may be sent directly from the certifying authority 500 to one or more VDE nodes 3706. The VDE controls that implement tax policy for one or more classes may also be sent directly to VDE nodes 3706 and/or to VDE administrators 800.

EXAMPLE

Classification May be Used in Automatically Selecting the Proper Display Context Based on Classes of Information Content objects may be displayed using one or another formats according to class membership of that object. In example 3800, shown in FIG. 63A, a matching and classification utility 900 provides content class information 3810 to information providers 3802. A consumer 3807(1) previously has sent a VDE container to a provider of sports information 3802(1) indicating interest in "class b" stories, and perhaps other classes as well. The sports information provider 3802(1) sends back a VDE container 3808(1) with one or more stories in "class b," perhaps "all stories about baseball, New York, Yankees, history, heroes with permission to print" an example of which is 3814(1), along with, in this example, one or more VDE control sets. The VDE container 3808(1) is received by a customer 3807(1) who then displays the content 3814(1) using one or another page formatting technologies based on macros, scripts, administrative events, methods, and/or other techniques. Also included in the VDE container is an image 3812(1) that was selected by the information provider as especially appropriate to the class of story being sent. In this example, perhaps the image 3812(1) is a faint image of Joe DiMaggio. This image also meets the criteria of "permission to print."

Example 3800, FIG. 63A, also shows another instance in which a different consumer 3807(n) previously has informed a nature information provider 3802(n) of interest in class A stories. Here the information provider sends a VDE container 3808(n) that/holds a class of stories different from the class of interest in the previous example. This VDE container 3808 holds a "class A" story, an example of which is 3814(n), that is displayed with a different image 3812(n), one that is appropriate to the story class, in this case, an image of a dog.

The class assigned to each story may be carried in the container as metadata for one or more story objects in another example. An example Web browser may request of the information provider an image appropriate to that class, which if available, would be sent in another VDE container.

Class may affect display rules in other example ways as well. For instance, several team sports news stories may be displayed in a Web browser window in which a scene from a football or basketball game is faintly discernible in the background. Which image is displayed may be determined by the user's preferences given the classes of stories being presented on the page. The user, may have looked most at stories about the New England Patriots and a Patriots-related image may be displayed as background even stories about teams in addition to (or even instead of) the Patriots were being displayed.

Figure 63B:
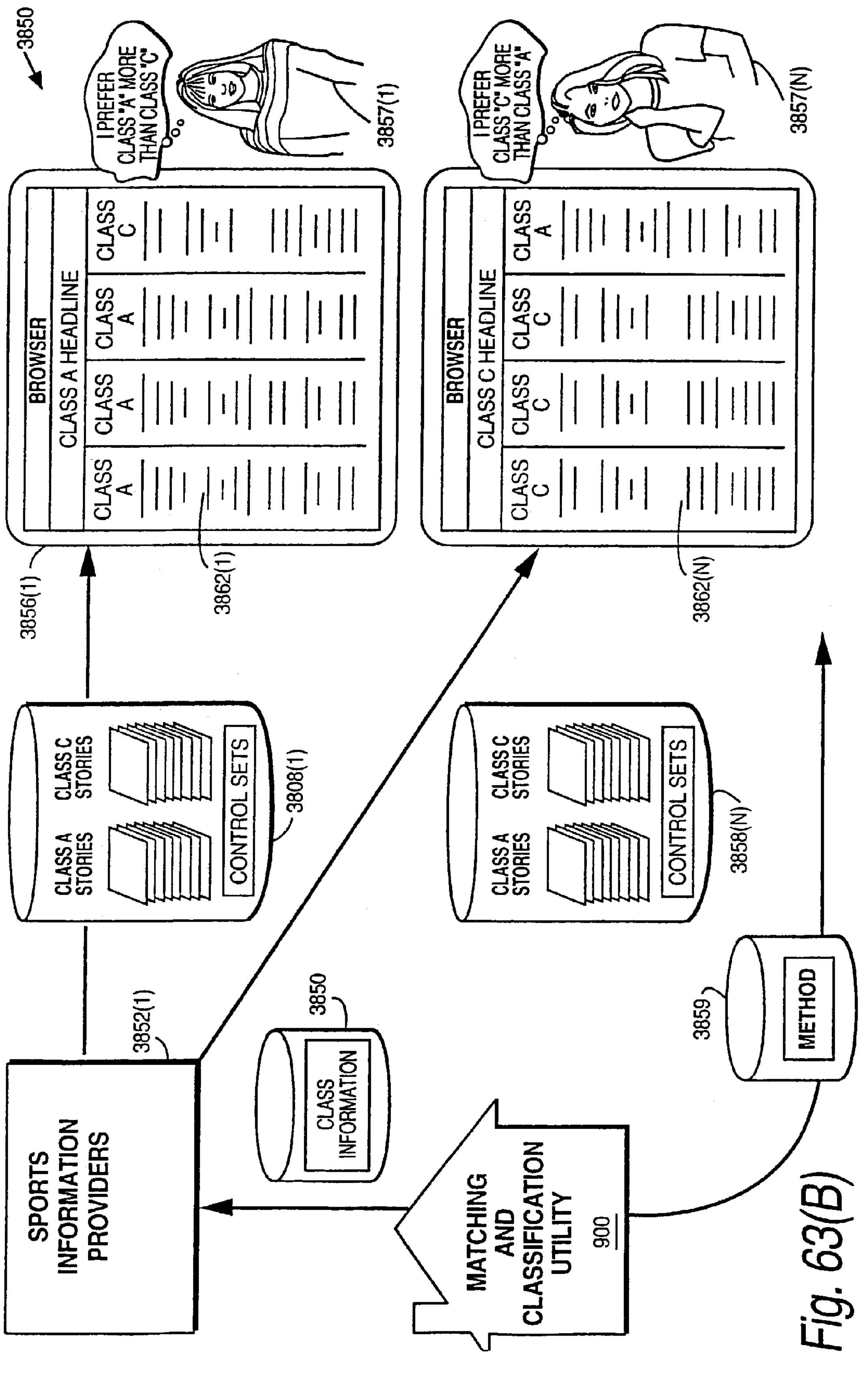

In (another) example 3850, shown in FIG. 63B, a matching and classification utility 900 provides class information to a provider 3852(1). Previously, one user 3857(1) has indicated to the provider 3852(1) that she prefers information in topic class A more than information in topic class C and information that costs less than $0.50 per article while the other user 3857(n) has the opposite preferences and is not price sensitive. A matching and classification utility 900 may provide classification information, class assignments for objects, administrative events, and/or methods for these and related purposes. Regardless, the information provider 3852(1) sends the identical VDE container 3858 to each of the users 3857. However, their browser and page formatting software 3856 produces different pages in accordance with each user's topic class preferences. In the example first case, the user 3857(1) sees three columns of topic A and one column of topic C while the second example user 3857(n) sees three columns of topic C and one column of topic A. As this example illustrates, the class preferences of users may affect the way in which the user interacts with content in various classes.

In another example, the matching and classification utility 900 may have sent one or more administrative events and/or methods 3859 to at least one user 3857 where the method performs the topic classification on documents and/or establishes topic classes and/or topic classes of greatest interest to the user.

EXAMPLE

Information May be Classified with Respect to Difficulty—and this May Pre-Determine an Appropriate Interface The class of content and/or the class of user may determine at least one display characteristic. One interesting example way of classifying content is with respect to its difficulty. One example measure of difficulty is reading level, which may reflect such aspects as vocabulary and/or complexity. It is well known that children (and adults) of the same approximate age read at different levels. In the example 3900, shown in FIG. 64, a provider sends a VDE container 3902(1) with text at a 4th grade reading level and controls indicating that when used by a person reading at that level, the charge is 50 cents. However, if a person reads at less than the 4th grade level, the charge is only 40 cents. "Reading level" may be indicated by a certificate and/or other digital credential.

A matching and classification utility 900 may send administrative events and/or classification methods 3910 to information providers, one or more other value chain participants, or to the students appliances directly. These methods may, for example, classify documents according to the degree of difficulty and create or modify controls for the whole document and/or subparts of the document, controls that may indicate the different prices for users at different reading levels. The matching and classification utility 900 may also send administrative events and methods to users that know how to make the document appear in the example browser at a lower reading level.

The example VDE container 3902(1) is sent from the provider to a child 3906(1) in the 4th grade who is reading that at that level. When the child opens the container to view (or otherwise use) the text, she or he is charged 40 cents (which might be paid by a third party such as a school and/or parent. The child sees the text as written 3904(1)

Figure 64:
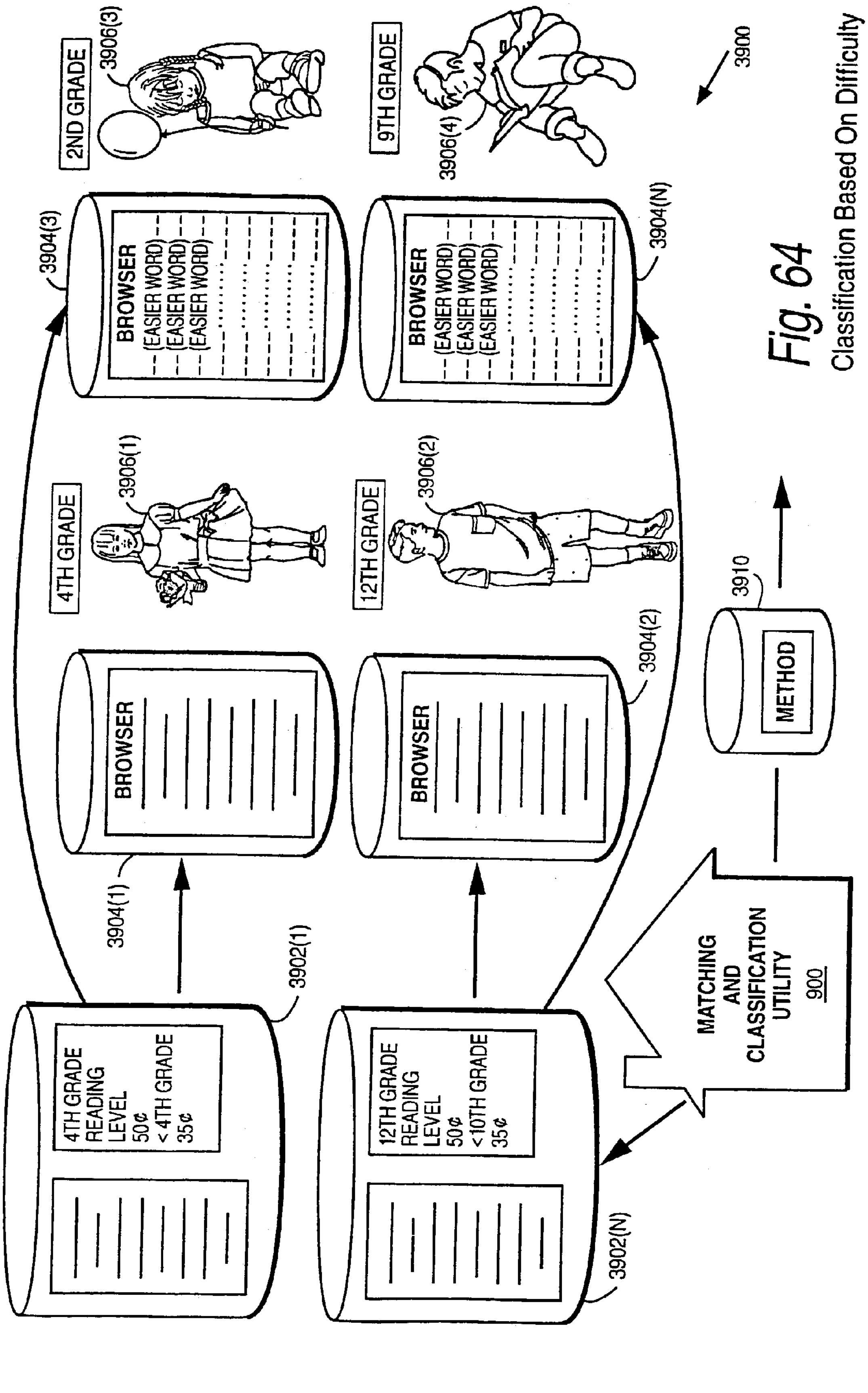

Example 3900, FIG. 64, also shows the exact same document being read by a student 3906(3) in the class of 2nd grade readers. Now the browser displays the document 3904(3) modified by methods that may make the syntax less complex and may substitute simpler words and/or phrases for harder ones. A similar example document and controls in a VDE container 3902(n) involving a $12^{th}$ 3906(2) and 9th grader 3906(n) is also shown.

In other examples, the prices may be higher when users are reading text below their capabilities, they may be offered discounts for reading at a higher level, and/or they may be charged more for reading on different levels since modifying the text is a value added process, and providers of that value may wish to be compensated for their efforts.

EXAMPLE

Classification May Describe Degree of Focus of the Content Unit or Portion on a Topic, or Characteristics Related to Conventional Formatting, Such as File Type Sometimes the most interesting and/or useful content is at the intersection of various topics. Also, user often want content in a form or format that will be most useful, and most practical, to them. In the example 4000, shown in FIG. 65, a matching and classification utility 900 receives from user 4002 a VDE container 4004 holding a request for documents in the class, "on economics and politics, costing less than $5.00, and in MS Word format." The matching and classification utility 900 responds in this example by providing in a VDE container 4006 at least one Uniform Resource Locator (URL) that points to the location of the document(s) on the World Wide Web.

The user 4002 in this example sends a message in a VDE container 4008 asking for the document identified in the URL. A provider sends back a VDE container 4012 with the desired document 4010 that has been classified by the matching and classification utility 900. In this example, parameter data is provided in the form of scores indicating the relative emphasis on various topic classes, including Economics (score=15), Politics (score=7), and Religion (score=2). Also indicated is the format of the content, which in this example is the desired MS Word. Also conveyed in the VDE container 4012 are a control set indicating, among other things, that the price is $2.98 and no modifications are allowed.

In other examples, the classes might have been much more narrow, for example, "Clinton," "Greenspan", Federal Reserve Policy, Interest Rates. Also, the customer might have requested only those documents for which controls could be obtained that permitted modifications and/or excerpting and/or derivative works. In another example, the matching and classification utility 900 may send one or more administrative events and/or classification and/or matching methods to the customer so that these methods could be applied by the customer. Alternatively, the customer may have send one or more methods as part of a smart object to one or more information providers in search of information meeting the desired criteria.

EXAMPLE

The Atomic Aspects can Support Automated Extraction of Portions of a Content Unit for Aggregation with Topically Consistent Portions and/or Units from Other Sources Not only may people desire specific information, but that information may come from different parts of the same object or parts of two or more objects. The matching and classification utility 900 can support the use of smart, classification based extraction and aggregation methods, as shown in example 4100, FIG. 66, where two documents 4102(1,2) have been classified by the matching and classification utility 900 into "chunks" or subobjects reflecting topic classes and VDE controls have been provided for each chunk. The "chunking", classification, and control set creation may be performed and stored in a database and/or may be performed "on the fly" or as needed.

To satisfy a request for information concerning travel to and in the United Kingdom plus background information, an information provider extracts parts of each document in the desired classes and creates a new, recombinant document comprised of the subobjects and packages the new document with appropriate controls in a VDE container 4102(n). VDE controls for the subobjects may also be carried along and may be modified by the provider and/or other participants in a chain of handling and control.

The request for information may have been generated using any query and/or search method, including semantic, Boolean, heuristic, concept-based, and other approaches, and may have been generated explicitly and intentionally by a user and/or other value chain participant, or may have resulted more automatically from the analysis by a matching and classification utility 900 of usage, audit, and/or other rights management information and/or of "info exhaust," and/or of preference, demographic, and/or psychographic data and/or classes of data.

In another example, the matching and classification utility 900 may have sent administrative events and/or classification, search, and/or subobject combining methods 4106 to a provider and/or to a user for execution under the control of a local VDE node.

EXAMPLE

Matching and Classification Utility 900 Supports Classification for Subsets of Content Within a Content Unit (Nested Virtual Classifications)

Not only may the matching and classification utility 900 assist in locating whole objects, it may also assist in identifying and/or classifying any number of subobjects for a given whole. New control sets may be associated with each of these subobjects. These new control sets may differ from the control set that applies to the object as a whole. This capability allows matching and classification utility 900 and others value chain participants to locate desired classes of content that may be part of a larger object and possibly to retrieve, pay for, manage, use, or combine these parts in addition to, and/or instead of the whole object.

In example 4200, FIG. 67, a VDE container 4202 created by the matching and classification utility 900 holds a text document that in this non-limiting example is the US "State of the Union Address." The matching and classification utility 900 has first classified the entire document in the class "politics." The matching and classification utility 900 has also identified various subparts or subobjects and has classified each them into different classes or categories. In this example, the different classes represent different topic categories.

A user and/or other value chain participant may request only subobjects that have been categorized in one or more desired class(es). The desired subobjects may be packaged in a VDE container 4204 along with appropriate VDE controls for both the overall, new composite object and/or for each of the desired subobjects. (The VDE controls can also be sent separately from the content subobjects.) These controls may pertain to the new whole object created from subparts selected on the basis of their membership in one or more specified class(es) and/or to the whole, new object comprised of these selected subobjects. In another example, the subobjects may be drawn from different documents sharing the same overall topic, for example, from State of the Union addresses given in different years.

In one example, any value chain participant may send distribute one or more subparts of the original object.

In another example, the matching and classification utility 900 may send one or more administrative events and/or methods 4206 to value chain participants who may execute the methods to perform the operations to identify subobjects and/or to subset the whole object in to parts based on class assignments.

Search engines can also use the subobject classifications to provide more precise results. For example, a search engine may have retrieved the State of the Union Address because the search criteria were "US politics speeches," but the whole or part of the object may also have been retrieved searching for "US politics speeches welfare" or "speeches US president defense."

EXAMPLE

Matching and Classification Utility 900 Supports Classes of Classes Based on Object Identifier Standards and/or Other Object Metadata Among the numerous advantages of the present inventions is the ability to create classes of classes based in part on rights management information. The feature may enhance search efficiency by enabling search engines to locate members of classes provided by any of numerous schemes for object naming and object metadata that have been proposed. For example, the IETF Uniform Resource Locator (URL), the International Standard Book Number (ISBN), International Standard Serial Number (ISSN), MARC library catalog records, and the recent proposed "Dublin Core" (Weibel, Stuart, Jean Godby, Eric Miller, and Ron Daniel, "OCLC/NCSA Metadata Workshop Report", URL http://www.oclc.org:5047/oclc/research/conferences/metadata/dublin_core_report.html) are non-limiting examples of prior classifications that can themselves be classified using the present inventions.

Figure 68B:
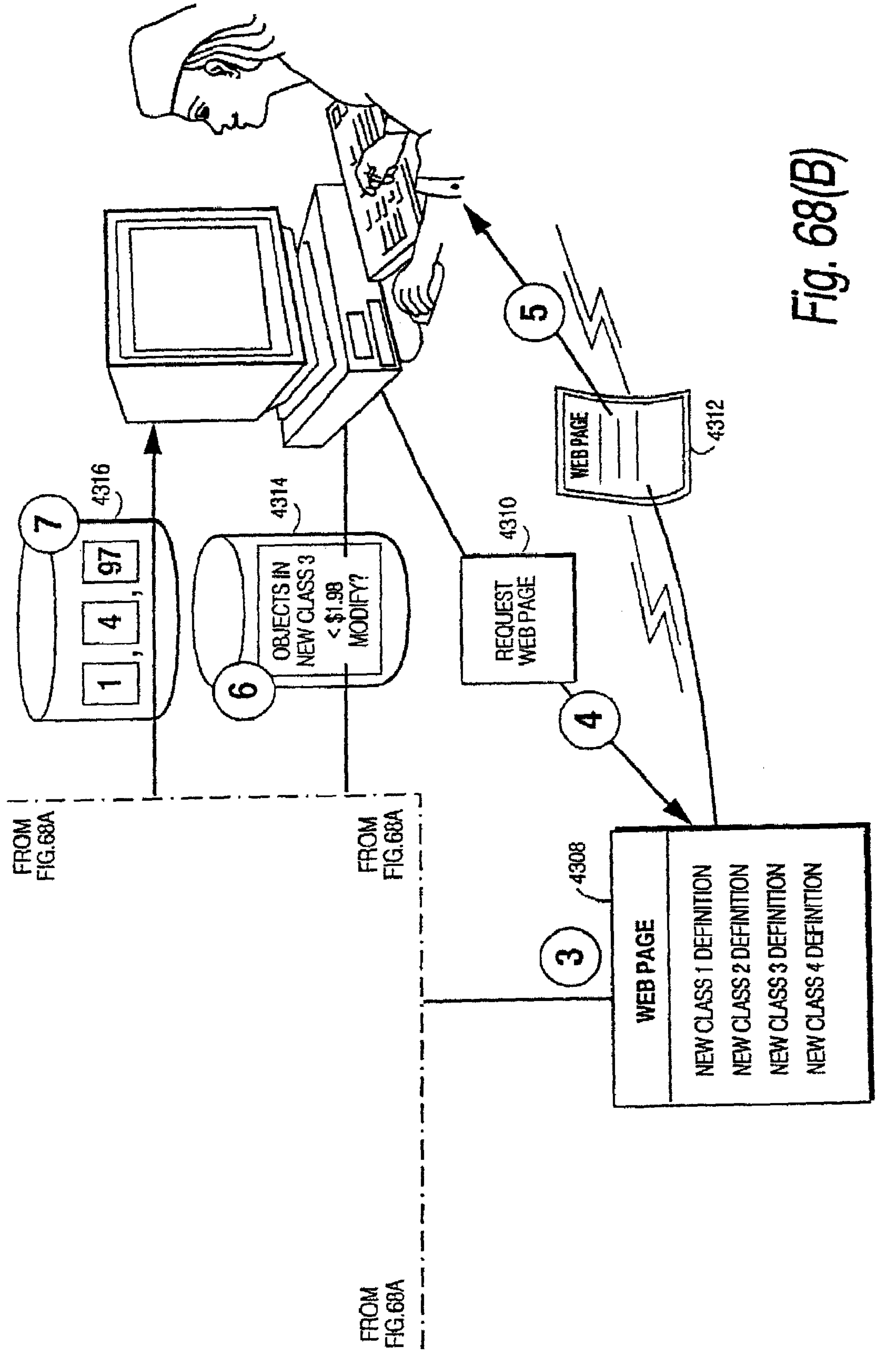

Example 4300, FIGS. 68A–68B, shows several objects 4304(1)–4304(n) each of which may have associated with it various metadata 4302(1)–4302(n) that locates the object in one or more classes, non-limiting examples of which may include network address (URL), price, control set information, permission strings, subject category, title, and publisher.

In example step "1," object metadata 4302 is sent to a matching and classification utility 900 which (example step "2") may create new "classes of classes" 4306. These new classes 4306 are then made available on a Web page 4308 (example step "3") to interested parties who may then search for objects according to their membership in one (or more) of these new classes of classes. In example step "4" an interested party 4320 sends a VDE container with a request to retrieve the Web page 4308 with the classes of metadata information. The Web server (in example step "5") returns a copy of the page 4312 to the interested user 4320, who (in example step "6") sends a VDE container with a query to the matching and classification utility 900 asking, in this example, for objects in new class 3 that cost less than $1.98, and that grant a "modify" permission. In example step "7," the matching and classification utility 900 returns a VDE container 4316 with list of objects that match the criteria. The matching and classification utility 900 may, in turn, provide URLs or other location information for at least one member of the desired class(es) in the list in container 4316.

EXAMPLE

Matching and Classification Utility 900 Supports Electronic Gambling

Electronic gambling may be among the services that will drive Internet growth in coming years. Such services raise many questions for both providers and for users or players of the service. For example, providers want to be able create attractive, compelling entertainment experiences and in doing so, capture an important share of their intended markets. Users of these services will of course want to locate the most stimulating, entertaining, and perhaps most of all, rewarding gambling experiences.

Gambling providers may, in one example, differing classes of games, rules, payoffs, odds, and/or interfaces. The present inventions can assist players in identifying the nature of various classes and locating specific instances of one or more classes. Within a particular class of games, for example, players may be particularly interested in the odds at the game of blackjack. In one example, a player may prefer playing with a single digital deck of 52 cards and a particular number of (emulated) shuffles rather than with say four decks and more shuffles, the affect of the latter being to create a more random distribution. Smaller decks and fewer shuffles may make it easier to count cards and/or to otherwise increase the odds in favor of the player, or at least in favor of the experienced, knowledgeable player.

In example 4400, shown in FIG. 69, an arbitrary number of gamblers 4402(1)–4402(n) whose usage information flows in VDE containers 4404(1)–4404(n) to a usage clearinghouse 300. The usage clearinghouse 300 sends in VDE containers 4406 at least some of this usage information to a matching and classification utility 900. In another example, the usage information may be sent directly from at least one user to the matching and classification utility 900. In this example, an arbitrary number of gambling providers 4406(1)–4406(n) may also send in VDE containers 4408(1)–4408(n) descriptive and/or usage information to the matching and classification utility 900. Based on available information from relevant sources, the matching and classification utility 900 may create one or more classes and assign one or more providers, services, and/or users to a class. These class definitions may at least in part be based on privacy-related control information.

In this one example, a gambler 4402(1) sends a VDE container 4410 with a query concerning best odds for blackjack to a matching and classification utility 900, who, in turn, sends back a VDE container 4412 with content indicating that gambling provider 2 gives the best odds in blackjack, "best" here meaning those most favorable to the player. In another example, the gambler may then contact gambling provider 2 to play, and the play may consist of a series of communications in VDE containers between the gambling provider and the gambler.

EXAMPLE

Matching and Classification Utility 900 Supports Electronic Ticket Sales and Distribution The performing arts, exhibitions, theaters, and conferences are some non-limiting examples of events that may require tickets for admission. Electronic ticket agencies on the Internet and other electronic arenas provide a connection between the consumer and producers of the event. Consumers may want to know such information as the nature of the event, what classes of tickets exist for a given event and/or class of events, the price for different classes of tickets to an event, the availability of different classes of tickets to different classes of events, and similar information.

In the example 4500, shown in FIG. 70, an arbitrary number of users 4504(1)–4504(n) whose usage information is sent in VDE containers 4508 to a usage clearinghouse 300 who, in turn, may send at least some of this usage information in at least one VDE container 4526 to a matching and classification utility 900. The usage information may reflect past ticket purchases, prices, seating preferences, preferred payment methods, preferred theaters and other venues, and other user preference and historical information.

Various ticket agencies 4506(1)–4506(n) may send information about specific events 4512(1)–4512(n) and/or information about agency services 4514(1)–4514(n) to the matching and classification utility 900. In another example, an event promoter may send event information directly to the matching and classification utility 900.

In one example, a user wishes to find four seats for a particular concert or class of concerts and/or other events whose cost is not more than $25.00. The user sends a VDE container with a request for information on who can supply the desired tickets to the desired events at the requested price. In turn, the matching and classification utility 900 returns a VDE container indicating that tick agency 2 can provide the tickets.

In this example, user 2 sends a VDE container with a purchase request to ticket agency 2. The purchase request may specify not only the specific event, desired pricing, and class of tickets, seat location, for example, but payment method as well, MasterCard for example. The ticket agency, in turn, may return a VDE container with confirmation of the ticket purchase at a given price, location, date, event, and/or using a particular payment method.

In another example, the tickets may be digital and may have associated with them one or more "seals", digital signatures, and/or certificates indicating the authenticity and/or integrity of the digital tickets.

While the inventions have been described in connection with what is presently considered to be the most practical and preferred embodiments, the inventions are not to be limited to the disclosed embodiments but, on the contrary, is intended to cover various modifications and equivalent arrangements included within the spirit and scope of the appended claims.

We claim:

1. A method including the steps of:

generating a first content object;

packaging the first content object with metadata and a first rule;

communicating the first content object to a matching and classification utility;

at the matching and classification utility, using the metadata to assign the content object to a content class;

packaging the first content object in a secure container having associated the first rule, and a second rule added at the matching and classification utility;

communicating the secure container to a user chosen based at least in part on a match between the content class and a user class to which the user had been assigned;

at the user's site, the user complying with the first rule or the second rule and, based on the compliance, opening the secure container to retrieve at least a portion of the first content object; and at the user's site, the user using at least a portion of the first content object, the use at least in part controlled by the first rule or the second rule.

2. A method as in claim 1, further including:

before the step of communicating the secure container to the user, the matching and classification utility receiving demographic information from the user and, based at least in part on the demographic information, the matching and classification utility assigning the user to the user class.

3. A method as in claim 2, further including:

before the matching and classification utility receives demographic information from the user, the user packaging the demographic information in a secure container and associating a rule with the secure container, the rule at least in part governing use of at least a portion of the secure container contents, the demographic information being received by the matching and classification utility in the secure container and the matching and classification utility complying with the rule in making a use of at least a portion of the demographic information.

4. A method as in claim 1, further including:

before the step of communicating the secure container to the user, the matching and classification utility receiving usage information from a usage clearinghouse, the usage information relating to the user and, based at least in part on the usage information, the matching and classification utility assigning the user to the user class.

5. A method as in claim 4, in which:

the usage information includes information relating to the user's usage of a second content object, the second content object being a member of the content class.

6. A method as in claim 1, in which the first rule relates, at least in part, to a requirement that payment be made for at least one aspect of use of the content object.

7. A method as in claim 1, further including the step of:

receiving a request from the user's site for a content object assigned to the content class.

8. A method as in claim 7, further including:

receiving a digital certificate relating, at least in part, to one or more characteristics of the user's site or the user.

9. A method as in claim 8, further including:

evaluating the digital certificate, and determining whether to communicate the content object to the user based at least in part on a result of the evaluation.

10. A method as in claim 8, further including:

comparing information conveyed by the digital certificate with one or more requirements specified by the first rule, and determining whether to communicate the content object to the user, the determination being based at least in part on whether the information conveyed by the digital certificate satisfies the one or more requirements specified by the first rule.

11. A method as in claim 8, in which the content object comprises, at least in part, software.

12. A method as in claim 8, in which the digital certificate provides, at least in part, information regarding the trustworthiness of the user's site or the user.

13. A method as in claim 1, further comprising:

communicating the second rule to the user's site;

wherein the second rule is used, at least in part, to govern at least one aspect of use of the content object at the user's site.

14. A method as in claim 1, in which the content object and the second rule are communicated to the user's site independently.

15. The method of claim 1 further including the step of:

receiving a request for a content object of a specified class, the request indicating one or more desired characteristics of control information associated with the content object, the request also including information about the user's site or the user.

16. A method as in claim 15, in which the information about the user's site or the user includes a digital certificate relating, at least in part, to one or more characteristics of the user's site or the use.

17. A method as in claim 15, in which the content object comprises software, and in which the at least one use comprises executing the software.

18. A method as in claim 16, in which the digital certificate includes information relating to the trustworthiness of the user's site or the user.

19. A method as in claim 1, in which the content object comprises, at least in part, software.

20. A method as in claim 1, further including receiving a digital certificate relating, at least in part, to one or more characteristics of the user's site or the user.

21. A method as in claim 20, in which the digital certificate provides, at least in part, information regarding the trustworthiness of the user's site or the user.

22. A method as in claim 20, further including comparing information conveyed by the digital certificate with one or more requirements specified by the first rule.

23. A method as in claim 22, further including determining whether to communicate the content object to the user, the determination being based at least in part on whether the information conveyed by the digital certificate satisfies the one or more requirements specified by the first rule.

24. A method as in claim 20, in which the content object comprises, at least in part, software.

25. A method as in claim 1 wherein choosing the user, to which the secure container is communicated, includes identifying the user's site that wishes to obtain a content object assigned to the content class.

26. A method as in claim 25, in which identifying a remote site includes receiving a request from the user's site for a content object assigned to the content class.

* * * * *

UNITED STATES PATENT AND TRADEMARK OFFICE

CERTIFICATE OF CORRECTION

PATENT NO. : 7,143,066 B2

APPLICATION NO. : 10/272911
DATED : November 28, 2006
INVENTOR(S) : Victor H. Shear, David M. Van Wie and Robert P. Weber It is certified that error appears in the above-identified patent and that said Letters Patent is hereby corrected as shown below:

In claim 16, column 80, line 47, “the use.” should read --the user.--.

Signed and Sealed this

Twenty-seventh Day of February, 2007

JON W. DUDAS
*Director of the United States Patent and Trademark Office*